United States Patent
Wexler et al.

(10) Patent No.: US 10,313,552 B2
(45) Date of Patent: Jun. 4, 2019

(54) SYSTEMS AND METHODS FOR PROVIDING VISUAL FEEDBACK OF A FIELD OF VIEW

(71) Applicant: OrCam Technologies Ltd., Jerusalem (IL)

(72) Inventors: Yonatan Wexler, Jerusalem (IL); Amnon Shashua, Mevaseret Zion (IL)

(73) Assignee: ORCAM TECHNOLOGIES LTD., Jerusalem (IL)

( * ) Notice: Subject to any disclaimer, the term of this patent is extended or adjusted under 35 U.S.C. 154(b) by 0 days.

(21) Appl. No.: 15/793,661

(22) Filed: Oct. 25, 2017

(65) Prior Publication Data

US 2018/0115696 A1   Apr. 26, 2018

Related U.S. Application Data

(60) Provisional application No. 62/413,103, filed on Oct. 26, 2016, provisional application No. 62/418,296, (Continued)

(51) Int. Cl.
*H04N 1/32* (2006.01)
*G06F 16/23* (2019.01)
(Continued)

(52) U.S. Cl.
CPC ....... *H04N 1/32101* (2013.01); *G01S 5/0027* (2013.01); *G06F 1/163* (2013.01); *G06F 3/011* (2013.01); *G06F 16/23* (2019.01); *G06F 16/51* (2019.01); *G06F 16/5838* (2019.01); *G06F 21/31* (2013.01); *G06K 9/00288* (2013.01); *G06K 9/00362* (2013.01); *G06K 9/00671* (2013.01); *G06K 9/4676* (2013.01); *G06K 9/6217* (2013.01); *G06N 5/04* (2013.01); *G06Q 50/01* (2013.01); *G06T 1/0007* (2013.01); *G06T 7/20* (2013.01); *G06T 7/60* (2013.01); *G06T 7/70* (2017.01); *G06T 7/73* (2017.01); *H04L 51/32* (2013.01); *H04L 67/22* (2013.01); *H04L 67/306* (2013.01); *H04N 5/2251* (2013.01); *H04N 5/23206* (2013.01); *H04N 5/23229* (2013.01); *H04N 7/185* (2013.01); *H04N 21/41407* (2013.01); *G06K 2209/21* (2013.01); *G06K 2209/27* (2013.01);
(Continued)

(58) Field of Classification Search
CPC ............. H04N 1/32101; H04N 5/2251; H04N 5/23206; H04N 7/185; G01S 5/0027
See application file for complete search history.

(56) References Cited

U.S. PATENT DOCUMENTS 5,589,905 A * 12/1996 McIntyre ............... G03B 7/16
                                                            396/106
6,934,461 B1 * 8/2005 Strub ................ G11B 27/031
                                                            348/E7.088
(Continued)

*Primary Examiner* — Lin Ye
*Assistant Examiner* — Chriss S Yoder, III
(74) *Attorney, Agent, or Firm* — Finnegan, Henderson, Farabow, Garrett & Dunner, LLP

(57) ABSTRACT

A wearable apparatus may include at least one image sensor configured to capture a plurality of images from an environment of a user of the wearable apparatus and at least one projector. The at least one light projector may be configured to emit a light pattern configured to visually indicate to the user of the wearable apparatus an active field of view of the at least one image sensor.

29 Claims, 59 Drawing Sheets

Related U.S. Application Data filed on Nov. 7, 2016, provisional application No. 62/418,300, filed on Nov. 7, 2016, provisional application No. 62/439,899, filed on Dec. 29, 2016, provisional application No. 62/546,141, filed on Aug. 16, 2017.

(51) Int. Cl.
| | |
|---|---|
| G06F 16/51 | (2019.01) |
| G06F 16/583 | (2019.01) |
| G06T 7/73 | (2017.01) |
| G06Q 50/00 | (2012.01) |
| G06T 7/60 | (2017.01) |
| G06T 7/70 | (2017.01) |
| G06T 1/00 | (2006.01) |
| G06F 1/16 | (2006.01) |
| G06F 3/01 | (2006.01) |
| G06K 9/00 | (2006.01) |
| H04L 12/58 | (2006.01) |
| G01S 5/00 | (2006.01) |
| H04N 5/225 | (2006.01) |
| H04N 5/232 | (2006.01) |
| H04N 7/18 | (2006.01) |
| G06K 9/46 | (2006.01) |
| G06K 9/62 | (2006.01) |
| G06N 5/04 | (2006.01) |
| H04L 29/08 | (2006.01) |
| H04N 21/414 | (2011.01) |
| G06F 21/31 | (2013.01) |
| G06T 7/20 | (2017.01) |

(52) U.S. Cl.
CPC .............. *G06T 2207/10004* (2013.01); *G06T 2207/30196* (2013.01); *G06T 2207/30201* (2013.01)

(56) References Cited

U.S. PATENT DOCUMENTS

| | | | |
|---|---|---|---|
| 9,578,221 B1* | 2/2017 | Brown | H04N 5/2256 |
| 2012/0212593 A1* | 8/2012 | Na'aman | G06K 9/00671 |
| | | | 348/62 |
| 2013/0021491 A1* | 1/2013 | Lee | H04N 19/56 |
| | | | 348/222.1 |

* cited by examiner

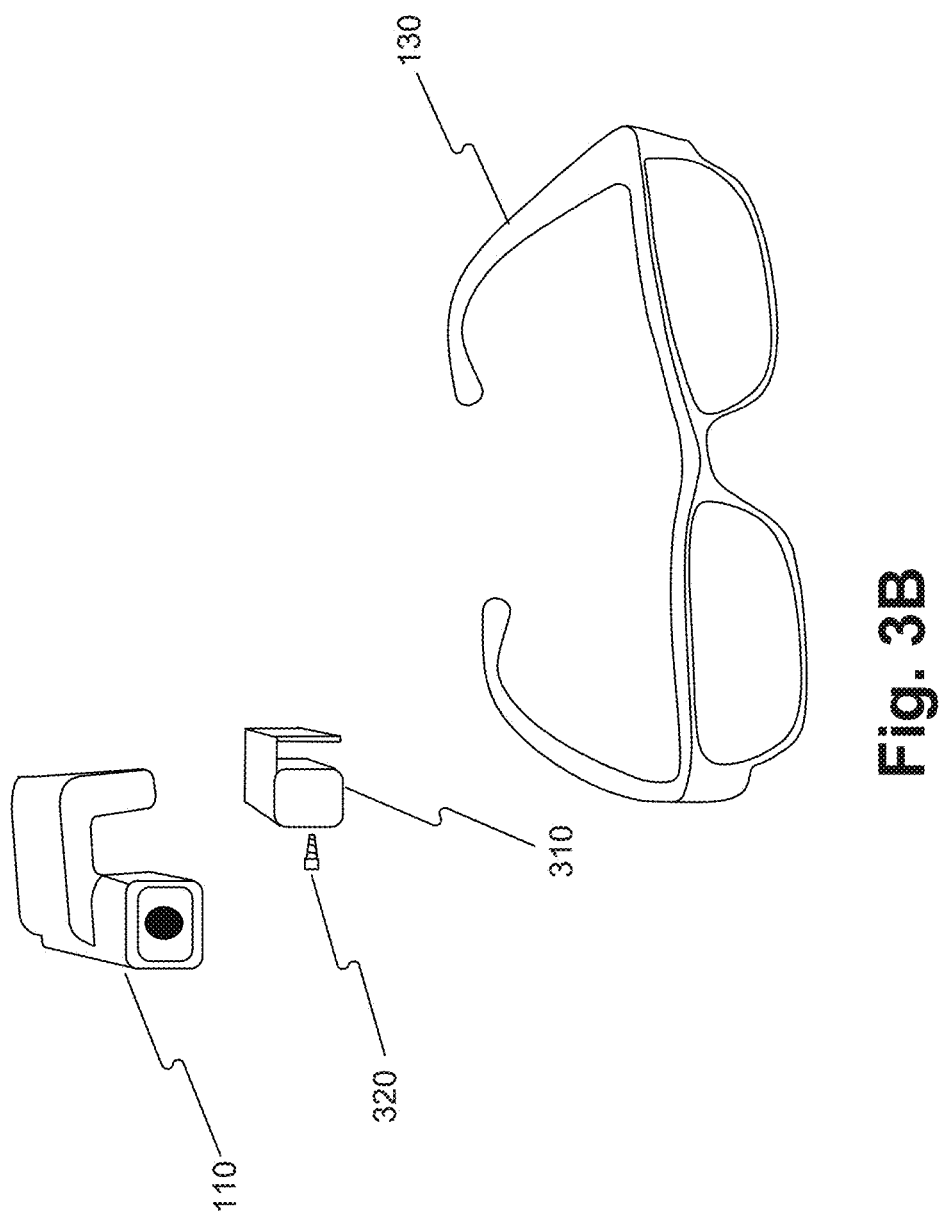

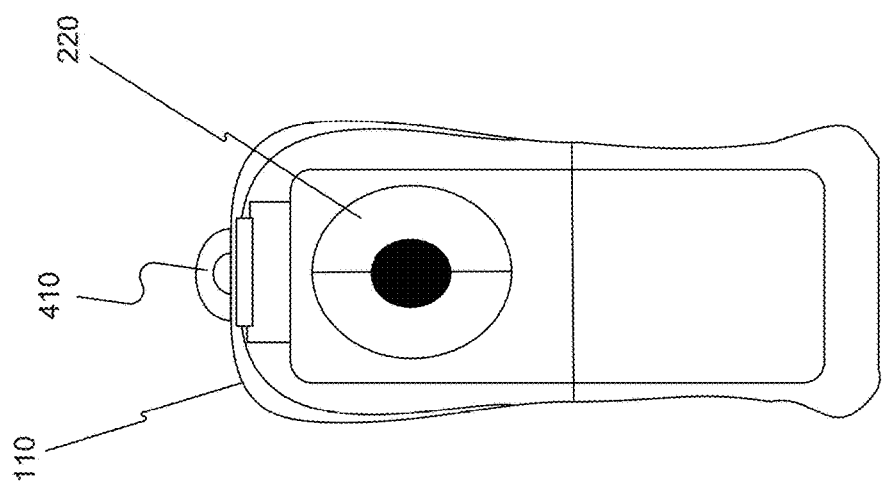

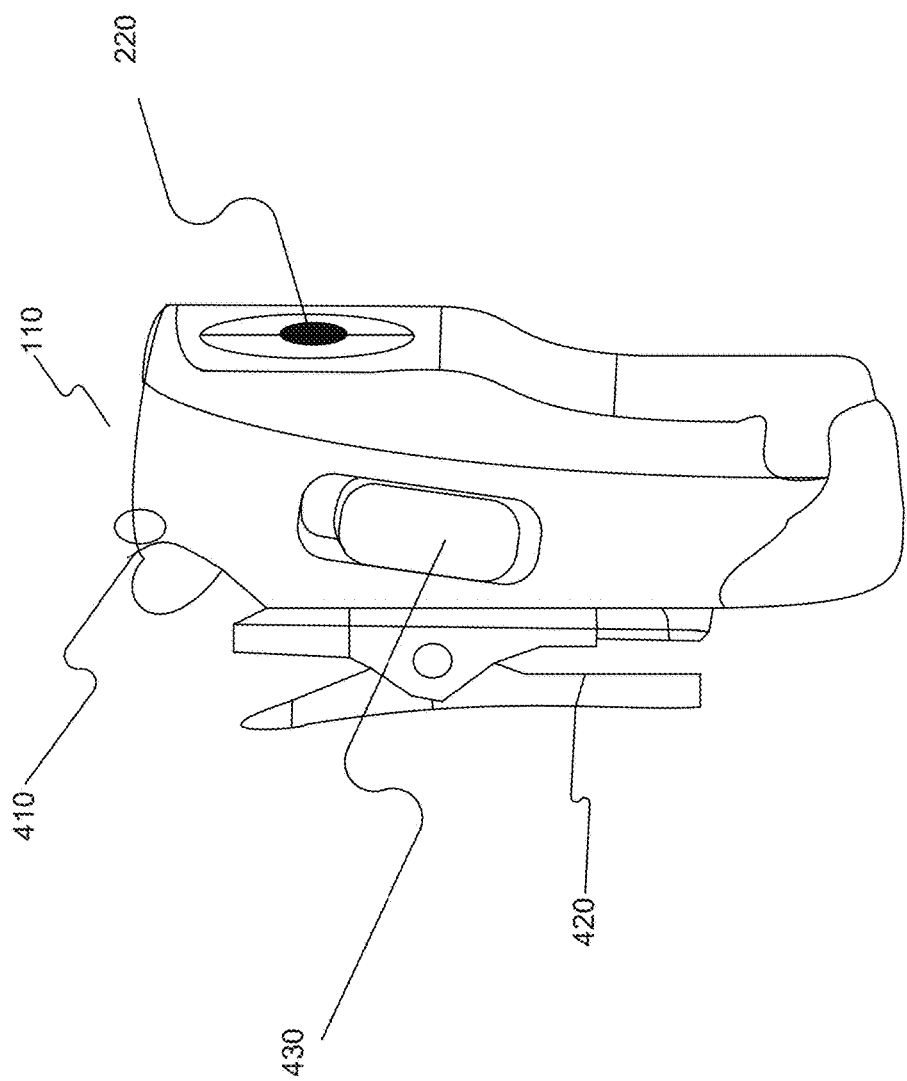

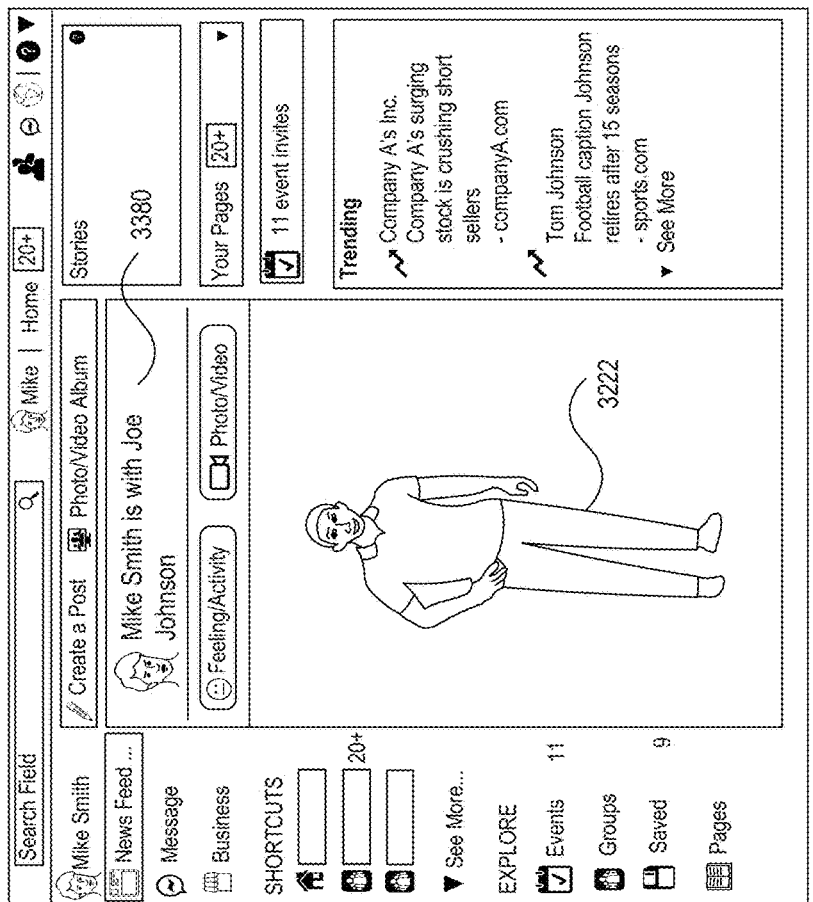
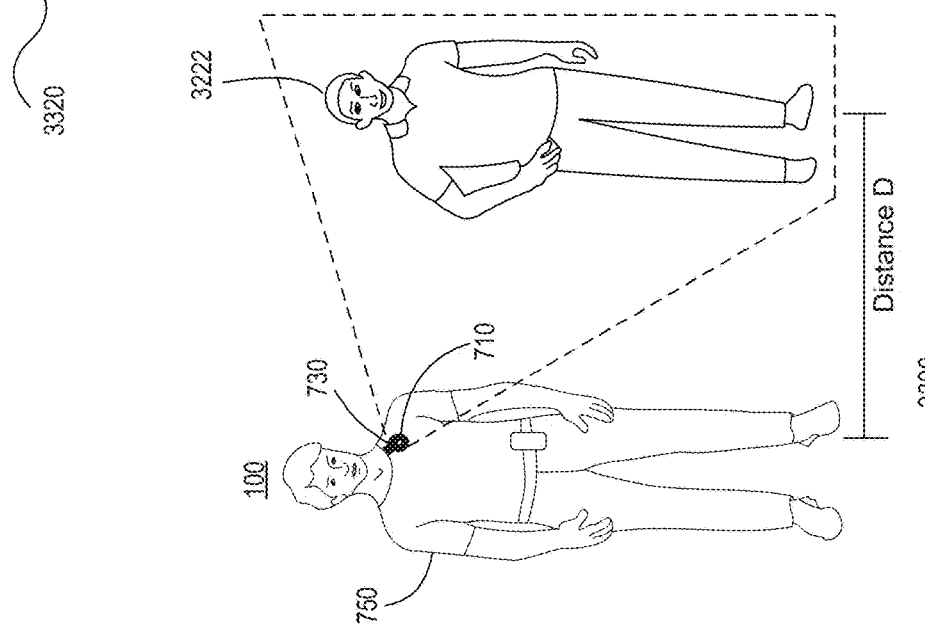
FIG. 33B
FIG. 33A

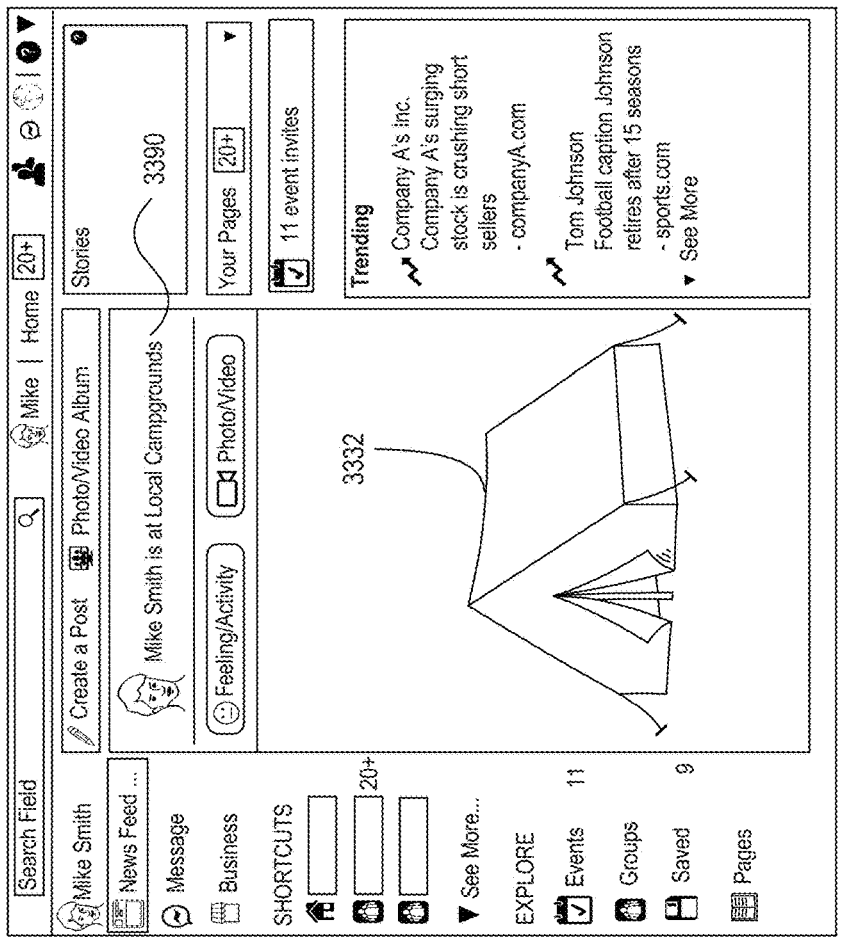
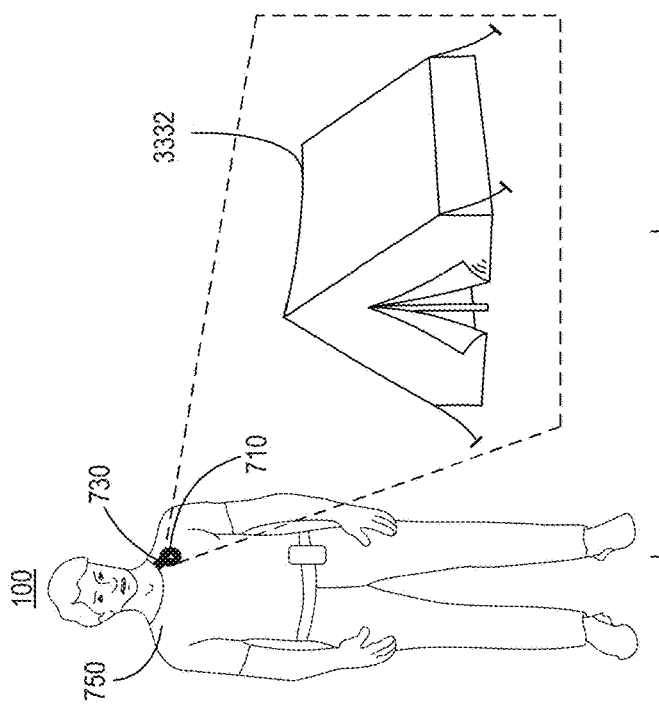
FIG. 33D
FIG. 33C

SYSTEMS AND METHODS FOR PROVIDING VISUAL FEEDBACK OF A FIELD OF VIEW

CROSS REFERENCES TO RELATED APPLICATIONS

This application claims the benefit of priority of U.S. Provisional Patent Application No. 62/413,103, filed Oct. 26, 2016; U.S. Provisional Application No. 62/418,296, filed Nov. 7, 2016; U.S. Provisional Application No. 62/418,300, filed Nov. 7, 2016; U.S. Provisional Application No. 62/439,899, filed Dec. 29, 2016; and U.S. Provisional Application No. 62/546,141 filed Aug. 16, 2017. All of the foregoing applications are incorporated herein by reference in their entirety.

BACKGROUND

Technical Field

This disclosure generally relates to devices and methods for capturing and processing images from an environment of a user, and using information derived from captured images. More particularly, this disclosure relates to devices and methods for selection of a device action based on a detected person.

Background Information

Today, technological advancements make it possible for wearable devices to automatically capture images and store information that is associated with the captured images. Certain devices have been used to digitally record aspects and personal experiences of one's life in an exercise typically called "lifelogging." Some individuals log their life so they can retrieve moments from past activities, for example, social events, trips, etc. Lifelogging may also have significant benefits in other fields (e.g., business, fitness and healthcare, and social research). Lifelogging devices, while useful for tracking daily activities, may be improved with capability to enhance one's interaction in his environment with feedback and other advanced functionality based on the analysis of captured image data.

Even though users can capture images with their smartphones and some smartphone applications can process the captured images, smartphones may not be the best platform for serving as lifelogging apparatuses in view of their size and design. Lifelogging apparatuses should be small and light, so they can be easily worn. Moreover, with improvements in image capture devices, including wearable apparatuses, additional functionality may be provided to assist users in navigating in and around an environment, identifying persons and objects they encounter, and providing feedback to the users about their surroundings and activities. Therefore, there is a need for apparatuses and methods for automatically capturing and processing images to provide useful information to users of the apparatuses, and for systems and methods to process and leverage information gathered by the apparatuses.

SUMMARY

Embodiments consistent with the present disclosure provide devices and methods for automatically capturing and processing images from an environment of a user, and systems and methods for processing information related to images captured from the environment of the user.

In one embodiment, a wearable apparatus for causing an action to be executed based on a person being present in an environment of a user of the wearable apparatus may comprise a wearable image sensor configured to capture a plurality of images from the environment of the user of the wearable apparatus and at least one processing device. The at least one processing device may be programmed to analyze at least one of the plurality of images to detect the person; analyze at least one of the plurality of images to identify an attribute of the detected person; and select at least one category for the detected person based on the identified attribute. The at least one processing device may be further programmed to select at least one action based on the at least one category and cause the at least one selected action to be executed.

In one embodiment, a method is provided for causing an action to be executed based on a person being present in an environment of a user of a wearable apparatus. The method includes receiving a plurality of images captured by an image sensor of the wearable apparatus from the environment of the user of the wearable apparatus; analyzing at least one of the plurality of images to detect the person; analyzing at least one of the plurality of images to identify an attribute of the detected person; selecting at least one category for the detected person based on the identified attribute; selecting at least one action based on the at least one category; and causing the at least one selected action to be executed.

In one embodiment, a wearable apparatus for causing an action to be executed based on whether a person is physically present in an environment of a user of the wearable apparatus may comprise a wearable image sensor configured to capture a plurality of images from the environment of the user of the wearable apparatus and at least one processing device. The at least one processing device may be programmed to analyze at least one of the plurality of images to detect the person and analyze at least one of the plurality of images to determine whether the detected person is physically present in the environment of the user. The at least one processing device may be further programmed to select at least one action based on whether the detected person is physically present in the environment of the user and cause the selected at least one action to be executed.

In one embodiment, a wearable apparatus for causing an action to be executed based on whether a person is visible on a display of a device in an environment of a user of the wearable apparatus may comprise a wearable image sensor configured to capture a plurality of images from the environment of the user of the wearable apparatus and at least one processing device. The at least one processing device may be programmed to analyze at least one of the plurality of images to detect the person and analyze at least one of the plurality of images to determine whether the detected person is visible on the display of the device. The at least one processing device may be further programmed to select at least one action based on whether the detected person is visible on the display of the device and cause the at least one action to be executed.

In one embodiment, a wearable apparatus for causing an action to be executed based on whether a person is physically present in an environment of a user of the wearable apparatus may comprise a wearable image sensor configured to capture a plurality of images from the environment of the user of the wearable apparatus and at least one processing device. The at least one processing device may be programmed to analyze at least one of the plurality of images to detect the person and analyze at least one of the plurality of images to determine whether the detected person is physically present in the environment of the user or whether a graphical representation of the detected person appears in the environment of the user. The at least one processing device may be further programmed to select a first action after the determination is made that the detected person is physically present in the environment of the user, select a second action different from the first action after the determination is made that the graphical representation of the detected person appears in the environment of the user, and cause the first action or the second action to be executed.

In one embodiment, a method for causing an action to be executed based on whether a person is physically present in an environment of a user of the wearable apparatus may comprise receiving a plurality of images of the environment of the user from an image sensor of the wearable apparatus, analyzing at least one of the plurality of images to detect the person, and analyzing at least one of the plurality of images to determine whether the detected person is physically present in the environment of the user. The method may further comprise selecting at least one action based on whether the detected person is physically present in the environment of the user and causing the selected at least one action to be executed.

In one embodiment, a method for causing an action to be executed based on whether a person is visible on a display of a device in an environment of a user of the wearable apparatus may comprise receiving a plurality of images of the environment of the user from an image sensor of the wearable apparatus, analyzing at least one of the plurality of images to detect the person, and analyzing at least one of the plurality of images to determine whether the detected person is visible on the display of the device. The method may further comprise selecting at least one action based on whether the detected person is visible on the display of the device and causing the at least one action to be executed.

In one embodiment, a method for causing an action to be executed based on whether a person is physically present in an environment of a user of the wearable apparatus may receiving a plurality of images of the environment of the user from an image sensor of the wearable apparatus, analyzing at least one of the plurality of images to detect the person, and analyzing at least one of the plurality of images to determine whether the detected person is physically present in the environment of the user or whether a graphical representation of the detected person appears in the environment of the user. The method may further comprise selecting a first action after the determination is made that the detected person is physically present in the environment of the user, selecting a second action different from the first action after the determination is made that the graphical representation of the detected person appears in the environment of the user, and causing the first action or the second action to be executed.

In one embodiment, a system for updating profile information based on data collected by a wearable apparatus may comprise a database storing a plurality of profiles and at least one processing device. The at least one processing device may be programmed to obtain identification information associated with a person detected in one or more images captured by a wearable image sensor included in the wearable apparatus and obtain, from the wearable apparatus, auxiliary information associated with the detected person. The at least one processing device may be further programmed to identify, in the database, a profile associated with the detected person based on the identification information and update the identified profile based on the auxiliary information.

In one embodiment, a method is provided for updating profile information based on data collected by a wearable apparatus. The method may comprise obtaining identification information associated with a person detected in one or more images captured by a wearable image sensor included in the wearable apparatus and obtaining, from the wearable apparatus, auxiliary information associated with the detected person. The method may further comprise identifying, in a database storing a plurality of profiles, a profile associated with the detected person based on the identification information and updating the identified profile based on the auxiliary information.

In one embodiment, a system is provided for providing information to a user of a wearable apparatus. The system includes at least one processing device programmed to identify a person represented in at least one image captured by a wearable image sensor included in the wearable apparatus, obtain information associated with the person represented in the at least one captured image, and obtain at least one affinity measurement representing a degree of a relationship between the user and the person. The at least one processing device is further programmed to determine, based on the at least one affinity measurement, an information level to be disclosed to the user of the wearable apparatus and provide, to the user of the wearable apparatus, the information based on the information associated with the person and on the information level.

In one embodiment, a method is provided for providing information to a user of a wearable apparatus. The method includes identifying a person represented in at least one image captured by a wearable image sensor included in the wearable apparatus, obtaining information associated with the person represented in the at least one captured image, and obtaining at least one affinity measurement representing a degree of a relationship between the user and the person. The method further includes determining, based on the at least one affinity measurement, an information level to be disclosed to the user of the wearable apparatus and providing, to the user of the wearable apparatus, the information based on the information associated with the person and on the information level.

In one embodiment, a wearable apparatus is provided for registering a verbal contract. The wearable apparatus includes at least one image sensor configured to capture a plurality of images from an environment of a user of the wearable apparatus and at least one audio sensor configured to capture audio data from the environment of the user of the wearable apparatus. The wearable apparatus also includes at least one processing device programmed to analyze the plurality of images to detect a person in the environment of the user of the wearable apparatus, obtain identification information associated with the detected person, analyze at least a portion of the audio data to identify one or more words associated with the verbal contract and spoken by the user of the wearable apparatus or the detected person, and obtain at least one profile of the user. The at least one processing device is also programmed to authenticate an identity of the user based on the at least one profile of the user and, based on the authentication of the identity of the user, register the verbal contract and the identification information associated with the detected person.

In another embodiment, a method is provided for registering a verbal contract. The method includes analyzing a plurality of images captured by at least one image sensor from an environment of a user of a wearable apparatus to detect a person in the environment of the user of the wearable apparatus, obtaining identification information associated with the detected person, and analyzing at least a portion of audio data captured by at least one audio sensor from the environment of the user of the wearable apparatus to identify one or more words associated with the verbal contract and spoken by the user of the wearable apparatus or the detected person. The method also includes obtaining at least one profile of the user, authenticating an identity of the user based on the at least one profile of the user and, based on the authentication of the identity of the user, registering the verbal contract and the identification information associated with the detected person.

In one embodiment, a wearable apparatus for providing information to a user of the wearable apparatus is disclosed. The apparatus may include at least one image sensor configured to capture a plurality of images from an environment of the user of the wearable apparatus, at least one communication device, and at least one processing device. The processing device may be programmed to analyze at least one of the plurality of images to detect an object in the environment of the user of the wearable apparatus, determine a measurement of an estimated physical distance from the user to the object, and transmit, based on the measurement and using the at least one communication device, information related to the detected object.

In one embodiment, a method provides information to a user of a wearable apparatus. The method may be performed by at least one image sensor, at least one communication device, and at least one processing device. The method may include capturing, via the at least one image sensor, a plurality of images from an environment of the user of the wearable apparatus, analyzing, via the at least one processing device, at least one of the plurality of images to detect an object in the environment of the user of the wearable apparatus, determining a measurement of an estimated physical distance from the user to the object, and transmitting based on the measurement and using the at least one communication device, information related to the detected object.

In one embodiment, a system for providing recommendations based on images captured by a wearable apparatus is disclosed. The system may include a wearable image sensor and at least one processing device. The processing device may be programmed to analyze at least one image captured by the wearable image sensor included in the wearable apparatus from an environment of a user of the wearable apparatus, obtain information based on a result of the analysis of the at least one captured image, generate at least one contact recommendation for at least one new social network contact based on the obtained information, and provide the at least one contact recommendation to at least one of the user and at least one other person.

In one embodiment, a method provides recommendations based on images captured by a wearable apparatus. The method may be performed by a wearable image sensor and at least one processing device. The method may include analyzing at least one image captured by the wearable image sensor included in the wearable apparatus from an environment of a user of the wearable apparatus, obtaining information based on a result of the analysis of the at least one captured image, generating at least one contact recommendation for at least one new social network contact based on the obtained information, and providing the at least one contact recommendation to at least one of the user and at least one other person.

In one embodiment, a wearable apparatus is disclosed. The apparatus may include at least one image sensor configured to capture a plurality of images from an environment of a user of the wearable apparatus, and at least one projector configured to emit a light pattern configured to visually indicate to the user of the wearable apparatus an active field of view of the at least one image sensor.

In one embodiment, a method provides visual feedback to a user of a wearable apparatus. The method may include capturing, via at least one image sensor included in the wearable apparatus, a plurality of images from an environment of the user of the wearable apparatus, activating at least one projector included in the wearable apparatus based at least on a visual trigger appearing in at least one of the plurality of images, and emitting, via the at least one projector, a light pattern configured to visually indicate to the user of the wearable apparatus an active field of view of the at least one image sensor.

Consistent with other disclosed embodiments, non-transitory computer-readable storage media may store program instructions, which are executed by at least one processor and perform any of the methods described herein.

The foregoing general description and the following detailed description are exemplary and explanatory only and are not restrictive of the claims.

BRIEF DESCRIPTION OF THE DRAWINGS

The accompanying drawings, which are incorporated in and constitute a part of this disclosure, illustrate various disclosed embodiments. In the drawings:

FIG. 3B is an exploded view of the example of the wearable apparatus shown in FIG. 3A.

FIG. 4A is a schematic illustration of an example of the wearable apparatus shown in FIG. 1B from a first viewpoint.

FIG. 4B is a schematic illustration of the example of the wearable apparatus shown in FIG. 1B from a second viewpoint.

FIG. 33A is a schematic illustration of an example of a user wearing a wearable apparatus and capturing an image of a person according to a disclosed embodiment.

FIG. 33B is a schematic illustration of an example of an update of a social network profile according to a disclosed embodiment.

FIG. 33C is a schematic illustration of an example of a user wearing a wearable apparatus and capturing an image of an object according to a disclosed embodiment.

FIG. 33D is a schematic illustration of an example of an update of a social network profile according to a disclosed embodiment.

DETAILED DESCRIPTION

Figure 1A:
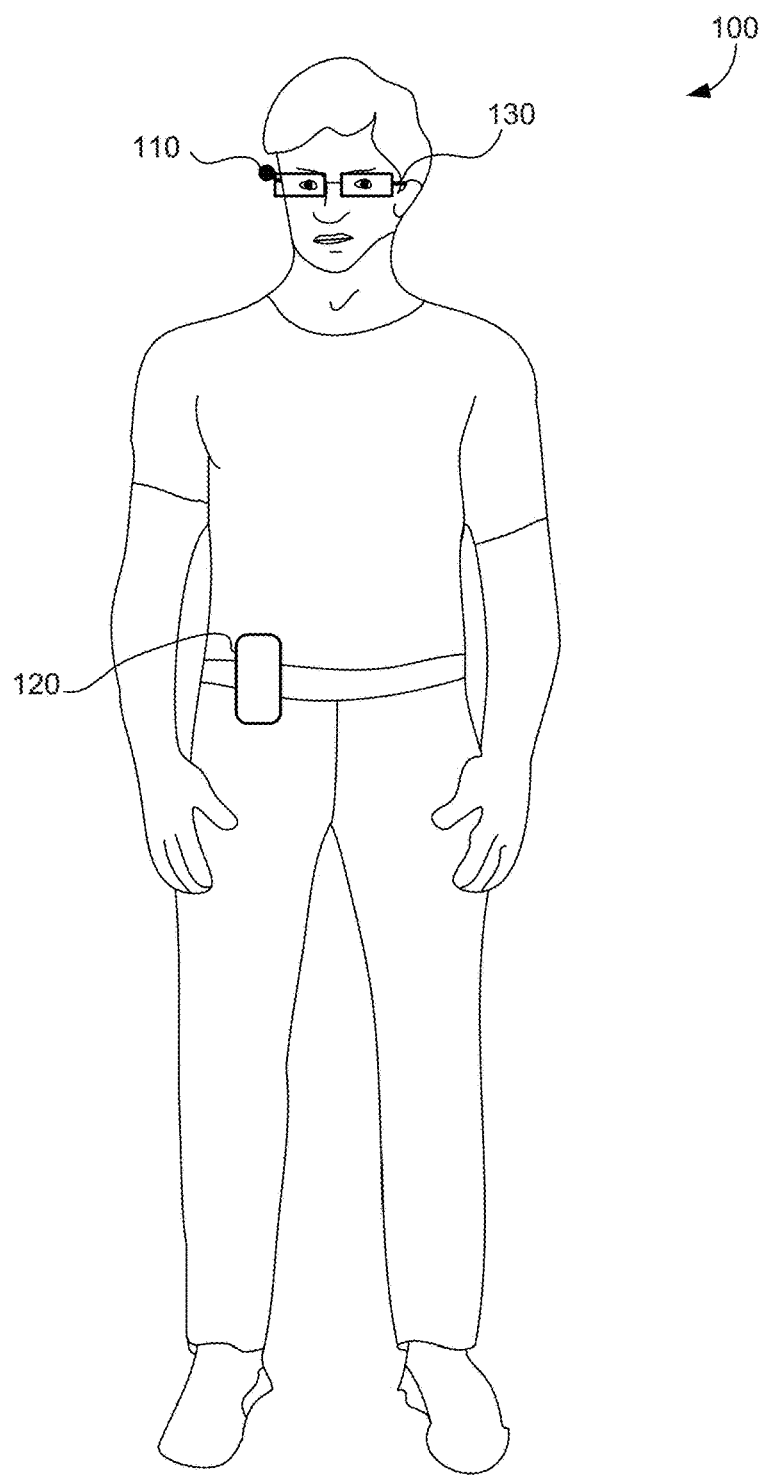
FIG. 1A is a schematic illustration of an example of a user wearing a wearable apparatus according to a disclosed embodiment.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

FIG. 1A illustrates a user 100 wearing an apparatus 110 that is physically connected (or integral) to glasses 130, consistent with the disclosed embodiments. Glasses 130 may be prescription glasses, magnifying glasses, non-prescription glasses, safety glasses, sunglasses, etc. Additionally, in some embodiments, glasses 130 may include parts of a frame and earpieces, nosepieces, etc., and one or no lenses. Thus, in some embodiments, glasses 130 may function primarily to support apparatus 110, and/or an augmented reality display device or other optical display device. In some embodiments, apparatus 110 may include an image sensor (not shown in FIG. 1A) for capturing real-time image data of the field-of-view of user 100. The term "image data" includes any form of data retrieved from optical signals in the near-infrared, infrared, visible, and ultraviolet spectrums. The image data may include video clips and/or photographs.

In some embodiments, apparatus 110 may communicate wirelessly or via a wire with a computing device 120. In some embodiments, computing device 120 may include, for example, a smartphone, or a tablet, or a dedicated processing unit, which may be portable (e.g., can be carried in a pocket of user 100). Although shown in FIG. 1A as an external device, in some embodiments, computing device 120 may be provided as part of wearable apparatus 110 or glasses 130, whether integral thereto or mounted thereon. In some embodiments, computing device 120 may be included in an augmented reality display device or optical head mounted display provided integrally or mounted to glasses 130. In other embodiments, computing device 120 may be provided as part of another wearable or portable apparatus of user 100 including a wrist-strap, a multifunctional watch, a button, a clip-on, etc. And in other embodiments, computing device 120 may be provided as part of another system, such as an on-board automobile computing or navigation system. A person skilled in the art can appreciate that different types of computing devices and arrangements of devices may implement the functionality of the disclosed embodiments. Accordingly, in other implementations, computing device 120 may include a Personal Computer (PC), laptop, an Internet server, etc.

Figure 1B:
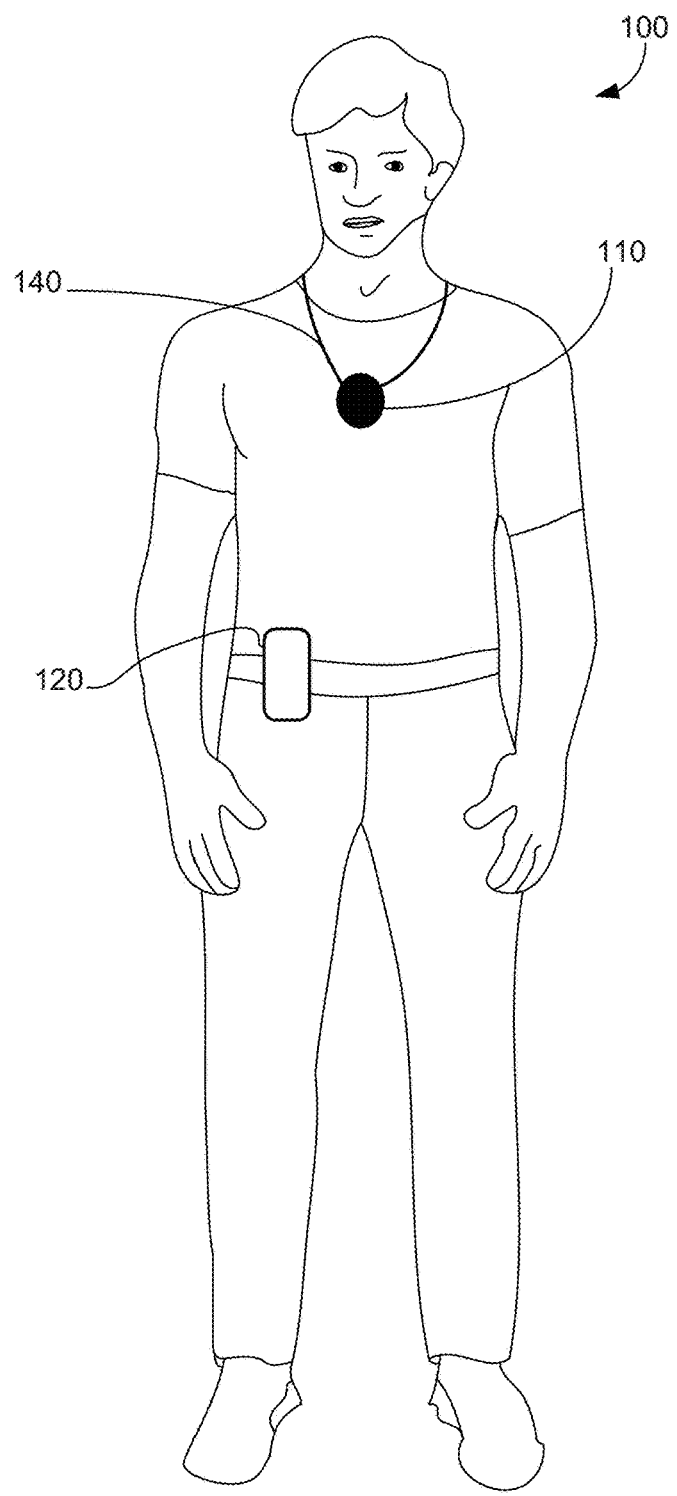
FIG. 1B is a schematic illustration of an example of the user wearing a wearable apparatus according to a disclosed embodiment.

FIG. 1B illustrates user 100 wearing apparatus 110 that is physically connected to a necklace 140, consistent with a disclosed embodiment. Such a configuration of apparatus 110 may be suitable for users that do not wear glasses some or all of the time. In this embodiment, user 100 can easily wear apparatus 110, and take it off.

Figure 1C:
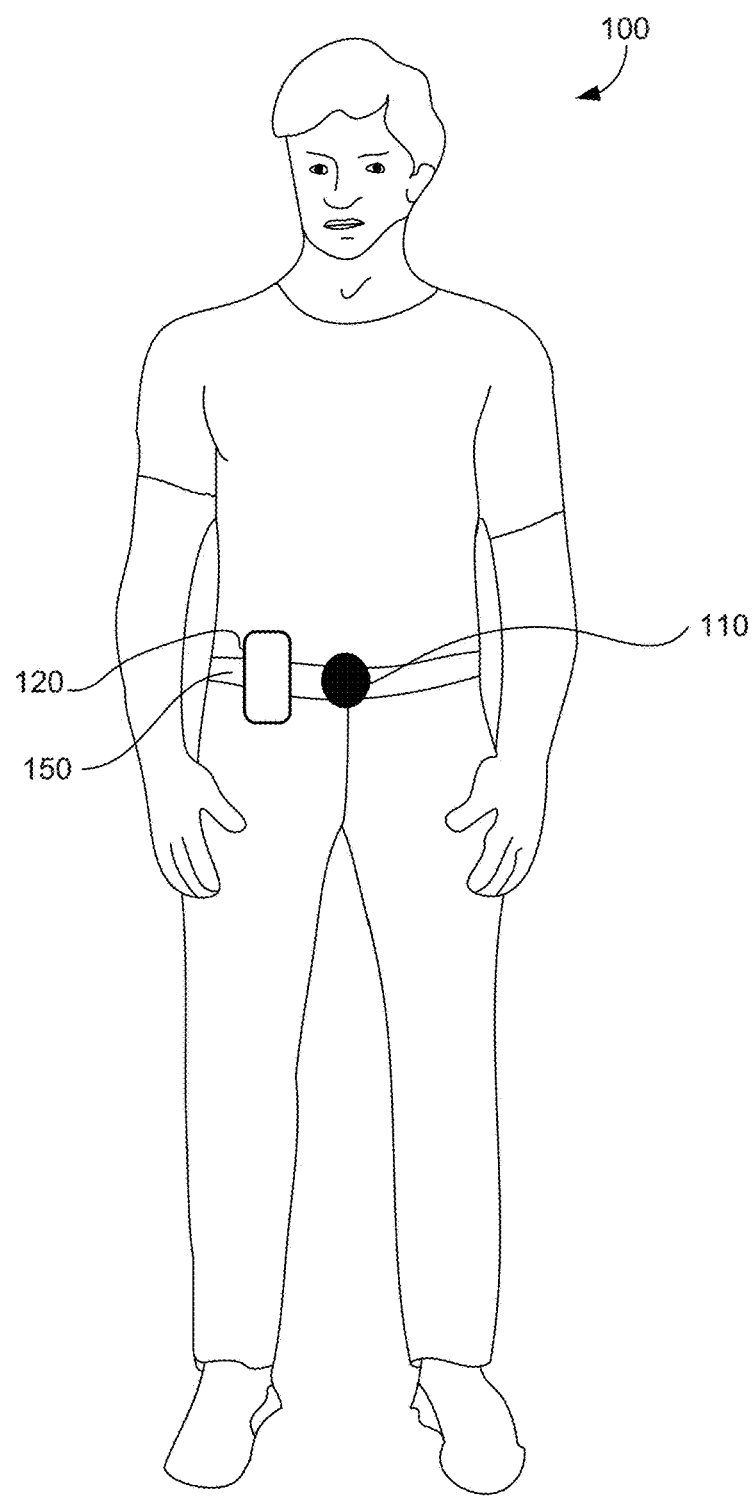
FIG. 1C is a schematic illustration of an example of the user wearing a wearable apparatus according to a disclosed embodiment.

FIG. 1C illustrates user 100 wearing apparatus 110 that is physically connected to a belt 150, consistent with a disclosed embodiment. Such a configuration of apparatus 110 may be designed as a belt buckle. Alternatively, apparatus 110 may include a clip for attaching to various clothing articles, such as belt 150, or a vest, a pocket, a collar, a cap or hat or other portion of a clothing article.

Figure 1D:
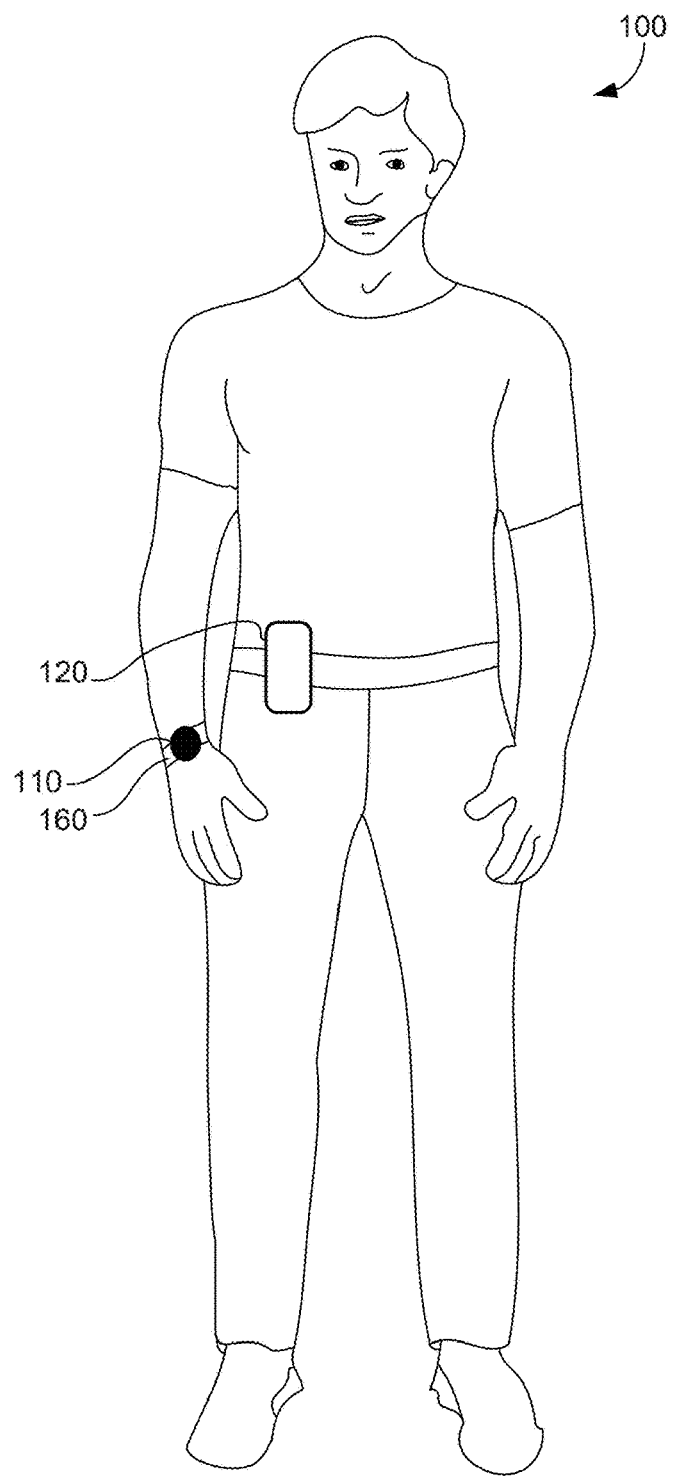
FIG. 1D is a schematic illustration of an example of the user wearing a wearable apparatus according to a disclosed embodiment.

FIG. 1D illustrates user 100 wearing apparatus 110 that is physically connected to a wrist strap 160, consistent with a disclosed embodiment. Although the aiming direction of apparatus 110, according to this embodiment, may not match the field-of-view of user 100, apparatus 110 may include the ability to identify a hand-related trigger based on the tracked eye movement of a user 100 indicating that user 100 is looking in the direction of the wrist strap 160. Wrist strap 160 may also include an accelerometer, a gyroscope, or other sensor for determining movement or orientation of a user's 100 hand for identifying a hand-related trigger.

Figure 2:
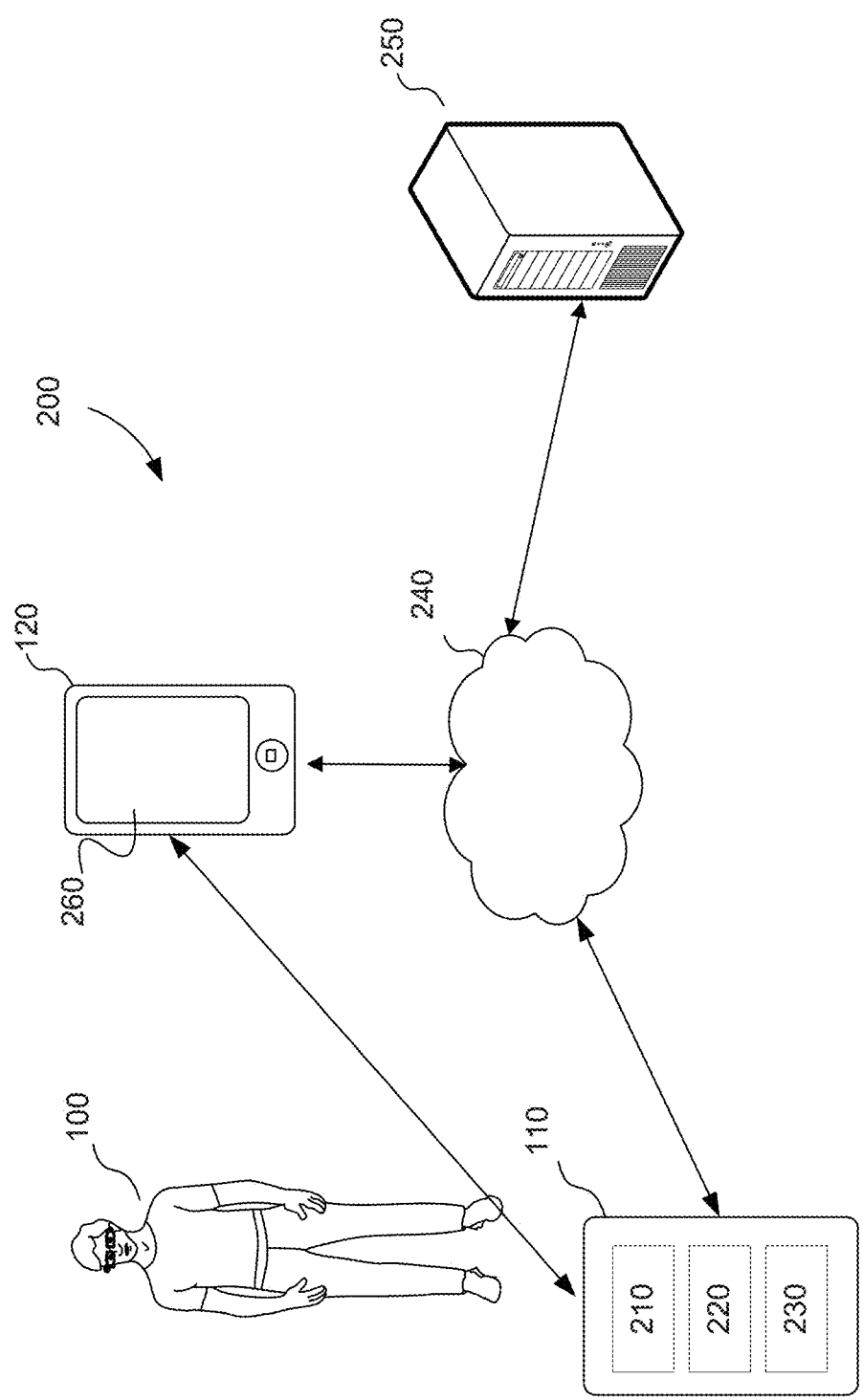
FIG. 2 is a schematic illustration of an example system consistent with the disclosed embodiments.

FIG. 2 is a schematic illustration of an exemplary system 200 including a wearable apparatus 110, worn by user 100, and an optional computing device 120 and/or a server 250 capable of communicating with apparatus 110 via a network 240, consistent with disclosed embodiments. In some embodiments, apparatus 110 may capture and analyze image data, identify a hand-related trigger present in the image data, and perform an action and/or provide feedback to a user 100, based at least in part on the identification of the hand-related trigger. In some embodiments, optional computing device 120 and/or server 250 may provide additional functionality to enhance interactions of user 100 with his or her environment, as described in greater detail below.

According to the disclosed embodiments, apparatus 110 may include an image sensor system 220 for capturing real-time image data of the field-of-view of user 100. In some embodiments, apparatus 110 may also include a processing unit 210 for controlling and performing the disclosed functionality of apparatus 110, such as to control the capture of image data, analyze the image data, and perform an action and/or output a feedback based on a hand-related trigger identified in the image data. According to the disclosed embodiments, a hand-related trigger may include a gesture performed by user 100 involving a portion of a hand of user 100. Further, consistent with some embodiments, a hand-related trigger may include a wrist-related trigger. Additionally, in some embodiments, apparatus 110 may include a feedback outputting unit 230 for producing an output of information to user 100.

As discussed above, apparatus 110 may include an image sensor 220 for capturing image data. The term "image sensor" refers to a device capable of detecting and converting optical signals in the near-infrared, infrared, visible, and ultraviolet spectrums into electrical signals. The electrical signals may be used to form an image or a video stream (i.e. image data) based on the detected signal. The term "image data" includes any form of data retrieved from optical signals in the near-infrared, infrared, visible, and ultraviolet spectrums. Examples of image sensors may include semiconductor charge-coupled devices (CCD), active pixel sensors in complementary metal-oxide-semiconductor (CMOS), or N-type metal-oxide-semiconductor (NMOS, Live MOS). In some cases, image sensor 220 may be part of a camera included in apparatus 110.

Apparatus 110 may also include a processor 210 for controlling image sensor 220 to capture image data and for analyzing the image data according to the disclosed embodiments. As discussed in further detail below with respect to FIG. 5A, processor 210 may include a "processing device" for performing logic operations on one or more inputs of image data and other data according to stored or accessible software instructions providing desired functionality. In some embodiments, processor 210 may also control feedback outputting unit 230 to provide feedback to user 100 including information based on the analyzed image data and the stored software instructions. As the term is used herein, a "processing device" may access memory where executable instructions are stored or, in some embodiments, a "processing device" itself may include executable instructions (e.g., stored in memory included in the processing device).

In some embodiments, the information or feedback information provided to user 100 may include time information. The time information may include any information related to a current time of day and, as described further below, may be presented in any sensory perceptive manner. In some embodiments, time information may include a current time of day in a preconfigured format (e.g., 2:30 pm or 14:30). Time information may include the time in the user's current time zone (e.g., based on a determined location of user 100), as well as an indication of the time zone and/or a time of day in another desired location. In some embodiments, time information may include a number of hours or minutes relative to one or more predetermined times of day. For example, in some embodiments, time information may include an indication that three hours and fifteen minutes remain until a particular hour (e.g., until 6:00 pm), or some other predetermined time. Time information may also include a duration of time passed since the beginning of a particular activity, such as the start of a meeting or the start of a jog, or any other activity. In some embodiments, the activity may be determined based on analyzed image data. In other embodiments, time information may also include additional information related to a current time and one or more other routine, periodic, or scheduled events. For example, time information may include an indication of the number of minutes remaining until the next scheduled event, as may be determined from a calendar function or other information retrieved from computing device 120 or server 250, as discussed in further detail below.

Feedback outputting unit 230 may include one or more feedback systems for providing the output of information to user 100. In the disclosed embodiments, the audible or visual feedback may be provided via any type of connected audible or visual system or both. Feedback of information according to the disclosed embodiments may include audible feedback to user 100 (e.g., using a Bluetooth™ or other wired or wirelessly connected speaker, or a bone conduction headphone). Feedback outputting unit 230 of some embodiments may additionally or alternatively produce a visible output of information to user 100, for example, as part of an augmented reality display projected onto a lens of glasses 130 or provided via a separate heads up display in communication with apparatus 110, such as a display 260 provided as part of computing device 120, which may include an onboard automobile heads up display, an augmented reality device, a virtual reality device, a smartphone, PC, table, etc.

The term "computing device" refers to a device including a processing unit and having computing capabilities. Some examples of computing device 120 include a PC, laptop, tablet, or other computing systems such as an on-board computing system of an automobile, for example, each configured to communicate directly with apparatus 110 or server 250 over network 240. Another example of computing device 120 includes a smartphone having a display 260. In some embodiments, computing device 120 may be a computing system configured particularly for apparatus 110, and may be provided integral to apparatus 110 or tethered thereto. Apparatus 110 can also connect to computing device 120 over network 240 via any known wireless standard (e.g., Wi-Fi, Bluetooth®, etc.), as well as near-filed capacitive coupling, and other short range wireless techniques, or via a wired connection. In an embodiment in which computing device 120 is a smartphone, computing device 120 may have a dedicated application installed therein. For example, user 100 may view on display 260 data (e.g., images, video clips, extracted information, feedback information, etc.) that originate from or are triggered by apparatus 110. In addition, user 100 may select part of the data for storage in server 250.

Network 240 may be a shared, public, or private network, may encompass a wide area or local area, and may be implemented through any suitable combination of wired and/or wireless communication networks. Network 240 may further comprise an intranet or the Internet. In some embodiments, network 240 may include short range or near-field wireless communication systems for enabling communication between apparatus 110 and computing device 120 provided in close proximity to each other, such as on or near a user's person, for example. Apparatus 110 may establish a connection to network 240 autonomously, for example, using a wireless module (e.g., Wi-Fi, cellular). In some embodiments, apparatus 110 may use the wireless module when being connected to an external power source, to prolong battery life. Further, communication between apparatus 110 and server 250 may be accomplished through any suitable communication channels, such as, for example, a telephone network, an extranet, an intranet, the Internet, satellite communications, off-line communications, wireless communications, transponder communications, a local area network (LAN), a wide area network (WAN), and a virtual private network (VPN).

As shown in FIG. 2, apparatus 110 may transfer or receive data to/from server 250 via network 240. In the disclosed embodiments, the data being received from server 250 and/or computing device 120 may include numerous different types of information based on the analyzed image data, including information related to a commercial product, or a person's identity, an identified landmark, and any other information capable of being stored in or accessed by server 250. In some embodiments, data may be received and transferred via computing device 120. Server 250 and/or computing device 120 may retrieve information from different data sources (e.g., a user specific database or a user's social network account or other account, the Internet, and other managed or accessible databases) and provide information to apparatus 110 related to the analyzed image data and a recognized trigger according to the disclosed embodiments. In some embodiments, calendar-related information retrieved from the different data sources may be analyzed to provide certain time information or a time-based context for providing certain information based on the analyzed image data.

Figure 3A:
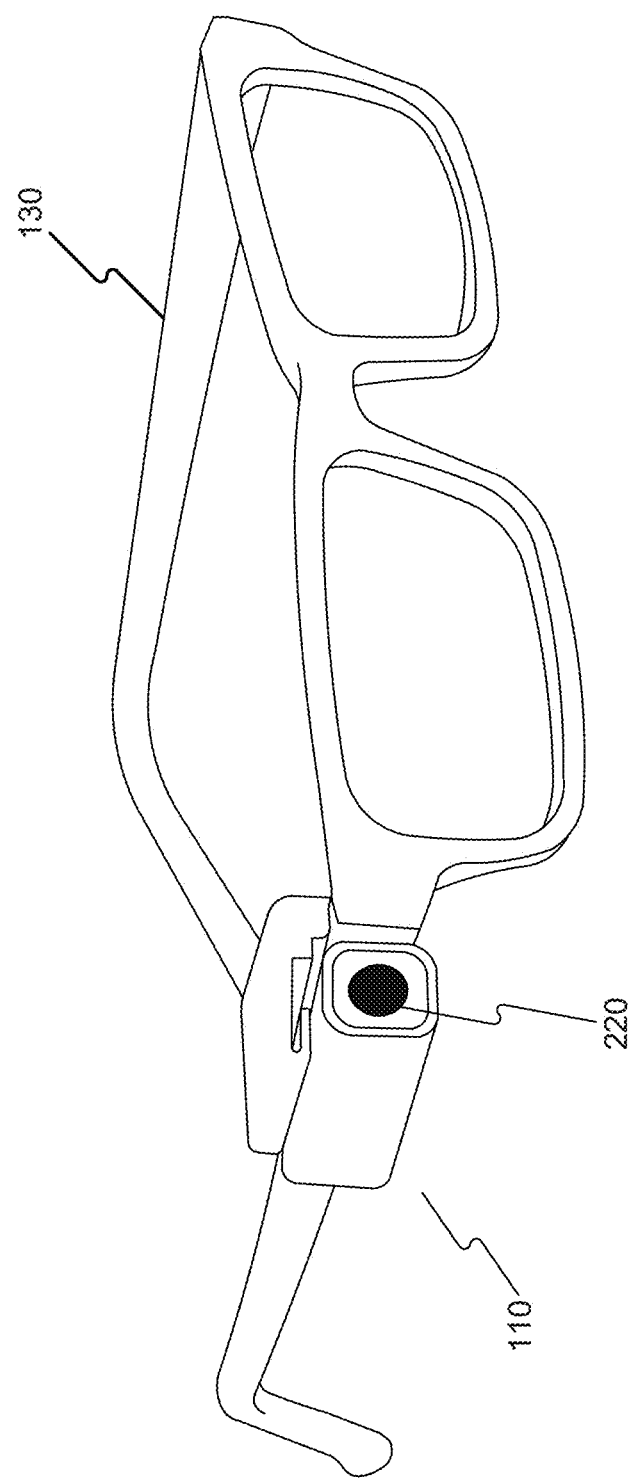
FIG. 3A is a schematic illustration of an example of the wearable apparatus shown in FIG. 1A.

An example of wearable apparatus 110 incorporated with glasses 130 according to some embodiments (as discussed in connection with FIG. 1A) is shown in greater detail in FIG. 3A. In some embodiments, apparatus 110 may be associated with a structure (not shown in FIG. 3A) that enables easy detaching and reattaching of apparatus 110 to glasses 130. In some embodiments, when apparatus 110 attaches to glasses 130, image sensor 220 acquires a set aiming direction without the need for directional calibration. The set aiming direction of image sensor 220 may substantially coincide with the field-of-view of user 100. For example, a camera associated with image sensor 220 may be installed within apparatus 110 in a predetermined angle in a position facing slightly downwards (e.g., 5-15 degrees from the horizon). Accordingly, the set aiming direction of image sensor 220 may substantially match the field-of-view of user 100.

FIG. 3B is an exploded view of the components of the embodiment discussed regarding FIG. 3A. Attaching apparatus 110 to glasses 130 may take place in the following way. Initially, a support 310 may be mounted on glasses 130 using a screw 320, in the side of support 310. Then, apparatus 110 may be clipped on support 310 such that it is aligned with the field-of-view of user 100. The term "support" includes any device or structure that enables detaching and reattaching of a device including a camera to a pair of glasses or to another object (e.g., a helmet). Support 310 may be made from plastic (e.g., polycarbonate), metal (e.g., aluminum), or a combination of plastic and metal (e.g., carbon fiber graphite). Support 310 may be mounted on any kind of glasses (e.g., eyeglasses, sunglasses, 3D glasses, safety glasses, etc.) using screws, bolts, snaps, or any fastening means used in the art.

In some embodiments, support 310 may include a quick release mechanism for disengaging and reengaging apparatus 110. For example, support 310 and apparatus 110 may include magnetic elements. As an alternative example, support 310 may include a male latch member and apparatus 110 may include a female receptacle. In other embodiments, support 310 can be an integral part of a pair of glasses, or sold separately and installed by an optometrist. For example, support 310 may be configured for mounting on the arms of glasses 130 near the frame front, but before the hinge. Alternatively, support 310 may be configured for mounting on the bridge of glasses 130.

In some embodiments, apparatus 110 may be provided as part of a glasses frame 130, with or without lenses. Additionally, in some embodiments, apparatus 110 may be configured to provide an augmented reality display projected onto a lens of glasses 130 (if provided), or alternatively, may include a display for projecting time information, for example, according to the disclosed embodiments. Apparatus 110 may include the additional display or alternatively, may be in communication with a separately provided display system that may or may not be attached to glasses 130.

In some embodiments, apparatus 110 may be implemented in a form other than wearable glasses, as described above with respect to FIGS. 1B-1D, for example. FIG. 4A is a schematic illustration of an example of an additional embodiment of apparatus 110 from a first viewpoint. The viewpoint shown in FIG. 4A is from the front of apparatus 110. Apparatus 110 includes an image sensor 220, a clip (not shown), a function button (not shown) and a hanging ring 410 for attaching apparatus 110 to, for example, necklace 140, as shown in FIG. 1B. When apparatus 110 hangs on necklace 140, the aiming direction of image sensor 220 may not fully coincide with the field-of-view of user 100, but the aiming direction would still correlate with the field-of-view of user 100.

FIG. 4B is a schematic illustration of the example of a second embodiment of apparatus 110, from a second viewpoint. The viewpoint shown in FIG. 4B is from a side orientation of apparatus 110. In addition to hanging ring 410, as shown in FIG. 4B, apparatus 110 may further include a clip 420. User 100 can use clip 420 to attach apparatus 110 to a shirt or belt 150, as illustrated in FIG. 1C. Clip 420 may provide an easy mechanism for disengaging and reengaging apparatus 110 from different articles of clothing. In other embodiments, apparatus 110 may include a female receptacle for connecting with a male latch of a car mount or universal stand.

In some embodiments, apparatus 110 includes a function button 430 for enabling user 100 to provide input to apparatus 110. Function button 430 may accept different types of tactile input (e.g., a tap, a click, a double-click, a long press, a right-to-left slide, a left-to-right slide). In some embodiments, each type of input may be associated with a different action. For example, a tap may be associated with the function of taking a picture, while a right-to-left slide may be associated with the function of recording a video.

The example embodiments discussed above with respect to FIGS. 3A, 3B, 4A, and 4B are not limiting. In some embodiments, apparatus 110 may be implemented in any suitable configuration for performing the disclosed methods. For example, referring back to FIG. 2, the disclosed embodiments may implement an apparatus 110 according to any configuration including an image sensor 220 and a processor unit 210 to perform image analysis and for communicating with a feedback unit 230.

Figure 5A:
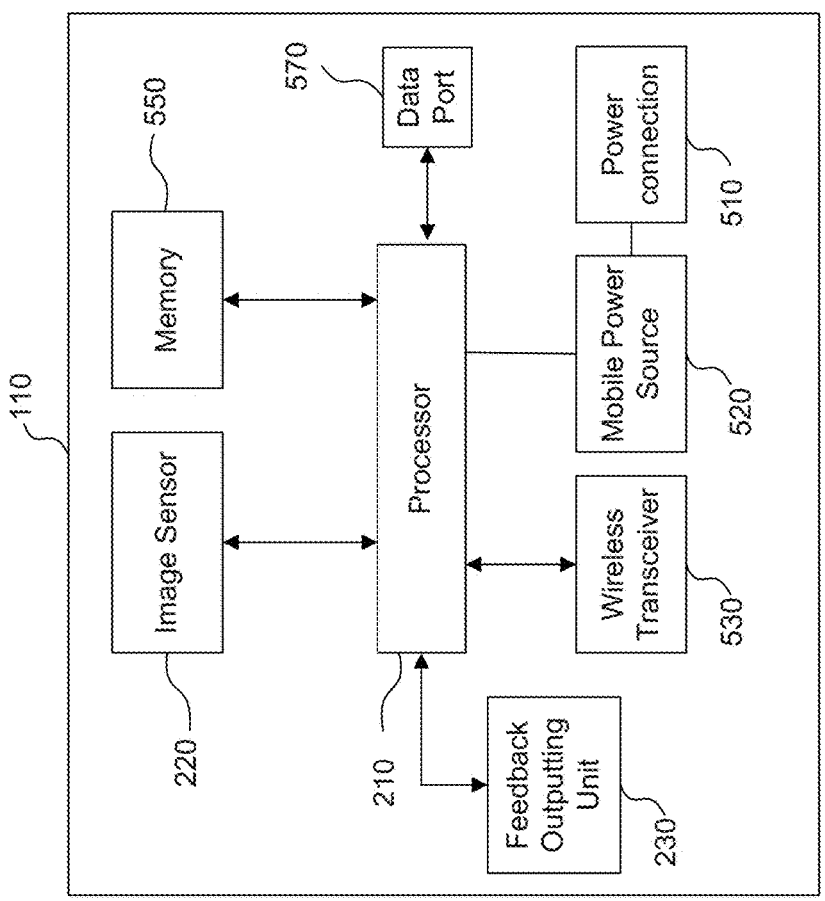
FIG. 5A is a block diagram illustrating an example of the components of a wearable apparatus according to a first embodiment.

FIG. 5A is a block diagram illustrating the components of apparatus 110 according to an example embodiment. As shown in FIG. 5A, and as similarly discussed above, apparatus 110 includes an image sensor 220, a memory 550, a processor 210, a feedback outputting unit 230, a wireless transceiver 530, and a mobile power source 520. In other embodiments, apparatus 110 may also include buttons, other sensors such as a microphone, and inertial measurements devices such as accelerometers, gyroscopes, magnetometers, temperature sensors, color sensors, light sensors, etc. Apparatus 110 may further include a data port 570 and a power connection 510 with suitable interfaces for connecting with an external power source or an external device (not shown).

Processor 210, depicted in FIG. 5A, may include any suitable processing device. The term "processing device" includes any physical device having an electric circuit that performs a logic operation on input or inputs. For example, processing device may include one or more integrated circuits, microchips, microcontrollers, microprocessors, all or part of a central processing unit (CPU), graphics processing unit (GPU), digital signal processor (DSP), field-programmable gate array (FPGA), or other circuits suitable for executing instructions or performing logic operations. The instructions executed by the processing device may, for example, be pre-loaded into a memory integrated with or embedded into the processing device or may be stored in a separate memory (e.g., memory 550). Memory 550 may comprise a Random Access Memory (RAM), a Read-Only Memory (ROM), a hard disk, an optical disk, a magnetic medium, a flash memory, other permanent, fixed, or volatile memory, or any other mechanism capable of storing instructions.

Although, in the embodiment illustrated in FIG. 5A, apparatus 110 includes one processing device (e.g., processor 210), apparatus 110 may include more than one processing device. Each processing device may have a similar construction, or the processing devices may be of differing constructions that are electrically connected or disconnected from each other. For example, the processing devices may be separate circuits or integrated in a single circuit. When more than one processing device is used, the processing devices may be configured to operate independently or collaboratively. The processing devices may be coupled electrically, magnetically, optically, acoustically, mechanically or by other means that permit them to interact.

In some embodiments, processor 210 may process a plurality of images captured from the environment of user 100 to determine different parameters related to capturing subsequent images. For example, processor 210 can determine, based on information derived from captured image data, a value for at least one of the following: an image resolution, a compression ratio, a cropping parameter, frame rate, a focus point, an exposure time, an aperture size, and a light sensitivity. The determined value may be used in capturing at least one subsequent image. Additionally, processor 210 can detect images including at least one hand-related trigger in the environment of the user and perform an action and/or provide an output of information to a user via feedback outputting unit 230.

In another embodiment, processor 210 can change the aiming direction of image sensor 220. For example, when apparatus 110 is attached with clip 420, the aiming direction of image sensor 220 may not coincide with the field-of-view of user 100. Processor 210 may recognize certain situations from the analyzed image data and adjust the aiming direction of image sensor 220 to capture relevant image data. For example, in one embodiment, processor 210 may detect an interaction with another individual and sense that the individual is not fully in view, because image sensor 220 is tilted down. Responsive thereto, processor 210 may adjust the aiming direction of image sensor 220 to capture image data of the individual. Other scenarios are also contemplated where processor 210 may recognize the need to adjust an aiming direction of image sensor 220.

In some embodiments, processor 210 may communicate data to feedback-outputting unit 230, which may include any device configured to provide information to a user 100. Feedback outputting unit 230 may be provided as part of apparatus 110 (as shown) or may be provided external to apparatus 110 and communicatively coupled thereto. Feedback-outputting unit 230 may be configured to output visual or nonvisual feedback based on signals received from processor 210, such as when processor 210 recognizes a hand-related trigger in the analyzed image data.

The term "feedback" refers to any output or information provided in response to processing at least one image in an environment. In some embodiments, as similarly described above, feedback may include an audible or visible indication of time information, detected text or numerals, the value of currency, a branded product, a person's identity, the identity of a landmark or other environmental situation or condition including the street names at an intersection or the color of a traffic light, etc., as well as other information associated with each of these. For example, in some embodiments, feedback may include additional information regarding the amount of currency still needed to complete a transaction, information regarding the identified person, historical information or times and prices of admission etc. of a detected landmark etc. In some embodiments, feedback may include an audible tone, a tactile response, and/or information previously recorded by user 100. Feedback-outputting unit 230 may comprise appropriate components for outputting acoustical and tactile feedback. For example, feedback-outputting unit 230 may comprise audio headphones, a hearing aid type device, a speaker, a bone conduction headphone, interfaces that provide tactile cues, vibrotactile stimulators, etc. In some embodiments, processor 210 may communicate signals with an external feedback outputting unit 230 via a wireless transceiver 530, a wired connection, or some other communication interface. In some embodiments, feedback outputting unit 230 may also include any suitable display device for visually displaying information to user 100.

As shown in FIG. 5A, apparatus 110 includes memory 550. Memory 550 may include one or more sets of instructions accessible to processor 210 to perform the disclosed methods, including instructions for recognizing a hand-related trigger in the image data. In some embodiments memory 550 may store image data (e.g., images, videos) captured from the environment of user 100. In addition, memory 550 may store information specific to user 100, such as image representations of known individuals, favorite products, personal items, and calendar or appointment information, etc. In some embodiments, processor 210 may determine, for example, which type of image data to store based on available storage space in memory 550. In another embodiment, processor 210 may extract information from the image data stored in memory 550.

As further shown in FIG. 5A, apparatus 110 includes mobile power source 520. The term "mobile power source" includes any device capable of providing electrical power, which can be easily carried by hand (e.g., mobile power source 520 may weigh less than a pound). The mobility of the power source enables user 100 to use apparatus 110 in a variety of situations. In some embodiments, mobile power source 520 may include one or more batteries (e.g., nickel-cadmium batteries, nickel-metal hydride batteries, and lithium-ion batteries) or any other type of electrical power supply. In other embodiments, mobile power source 520 may be rechargeable and contained within a casing that holds apparatus 110. In yet other embodiments, mobile power source 520 may include one or more energy harvesting devices for converting ambient energy into electrical energy (e.g., portable solar power units, human vibration units, etc.).

Mobile power source 520 may power one or more wireless transceivers (e.g., wireless transceiver 530 in FIG. 5A). The term "wireless transceiver" refers to any device configured to exchange transmissions over an air interface by use of radio frequency, infrared frequency, magnetic field, or electric field. Wireless transceiver 530 may use any known standard to transmit and/or receive data (e.g., Wi-Fi, Bluetooth®, Bluetooth Smart, 802.15.4, or ZigBee). In some embodiments, wireless transceiver 530 may transmit data (e.g., raw image data, processed image data, extracted information) from apparatus 110 to computing device 120 and/or server 250. Wireless transceiver 530 may also receive data from computing device 120 and/or server 250. In other embodiments, wireless transceiver 530 may transmit data and instructions to an external feedback outputting unit 230.

Figure 5B:
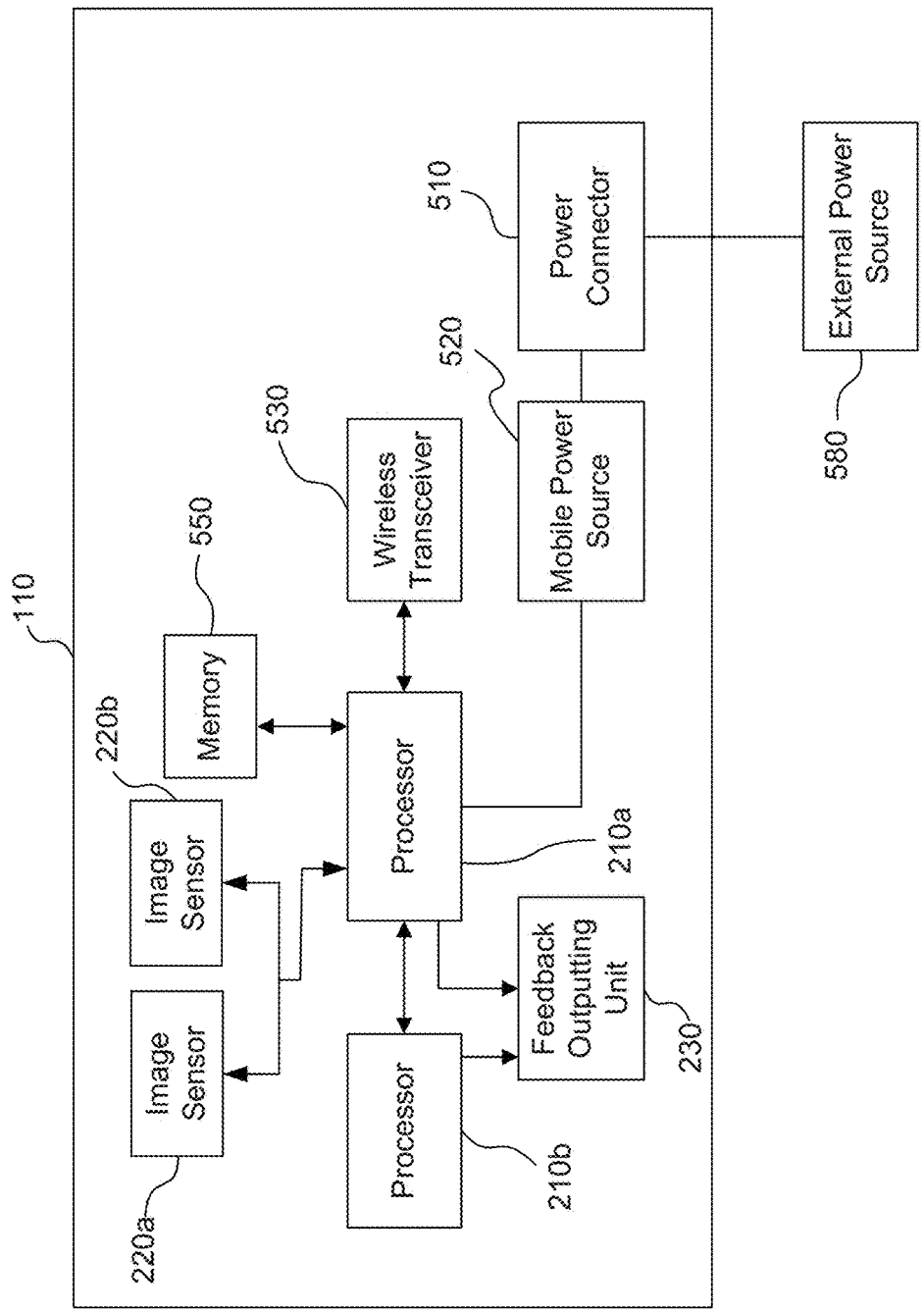
FIG. 5B is a block diagram illustrating an example of the components of a wearable apparatus according to a second embodiment.

FIG. 5B is a block diagram illustrating the components of apparatus 110 according to another example embodiment. In some embodiments, apparatus 110 includes a first image sensor 220a, a second image sensor 220b, a memory 550, a first processor 210a, a second processor 210b, a feedback outputting unit 230, a wireless transceiver 530, a mobile power source 520, and a power connector 510. In the arrangement shown in FIG. 5B, each of the image sensors may provide images in a different image resolution, or face a different direction. Alternatively, each image sensor may be associated with a different camera (e.g., a wide angle camera, a narrow angle camera, an IR camera, etc.). In some embodiments, apparatus 110 can select which image sensor to use based on various factors. For example, processor 210a may determine, based on available storage space in memory 550, to capture subsequent images in a certain resolution.

Apparatus 110 may operate in a first processing-mode and in a second processing-mode, such that the first processing-mode may consume less power than the second processing-mode. For example, in the first processing-mode, apparatus 110 may capture images and process the captured images to make real-time decisions based on an identifying hand-related trigger, for example. In the second processing-mode, apparatus 110 may extract information from stored images in memory 550 and delete images from memory 550. In some embodiments, mobile power source 520 may provide more than fifteen hours of processing in the first processing-mode and about three hours of processing in the second processing-mode. Accordingly, different processing-modes may allow mobile power source 520 to produce sufficient power for powering apparatus 110 for various time periods (e.g., more than two hours, more than four hours, more than ten hours, etc.).

In some embodiments, apparatus 110 may use first processor 210a in the first processing-mode when powered by mobile power source 520, and second processor 210b in the second processing-mode when powered by external power source 580 that is connectable via power connector 510. In other embodiments, apparatus 110 may determine, based on predefined conditions, which processors or which processing modes to use. Apparatus 110 may operate in the second processing-mode even when apparatus 110 is not powered by external power source 580. For example, apparatus 110 may determine that it should operate in the second processing-mode when apparatus 110 is not powered by external power source 580, if the available storage space in memory 550 for storing new image data is lower than a predefined threshold.

Although one wireless transceiver is depicted in FIG. 5B, apparatus 110 may include more than one wireless transceiver (e.g., two wireless transceivers). In an arrangement with more than one wireless transceiver, each of the wireless transceivers may use a different standard to transmit and/or receive data. In some embodiments, a first wireless transceiver may communicate with server 250 or computing device 120 using a cellular standard (e.g., LTE or GSM), and a second wireless transceiver may communicate with server 250 or computing device 120 using a short-range standard (e.g., Wi-Fi or Bluetooth®). In some embodiments, apparatus 110 may use the first wireless transceiver when the wearable apparatus is powered by a mobile power source included in the wearable apparatus, and use the second wireless transceiver when the wearable apparatus is powered by an external power source.

Figure 5C:
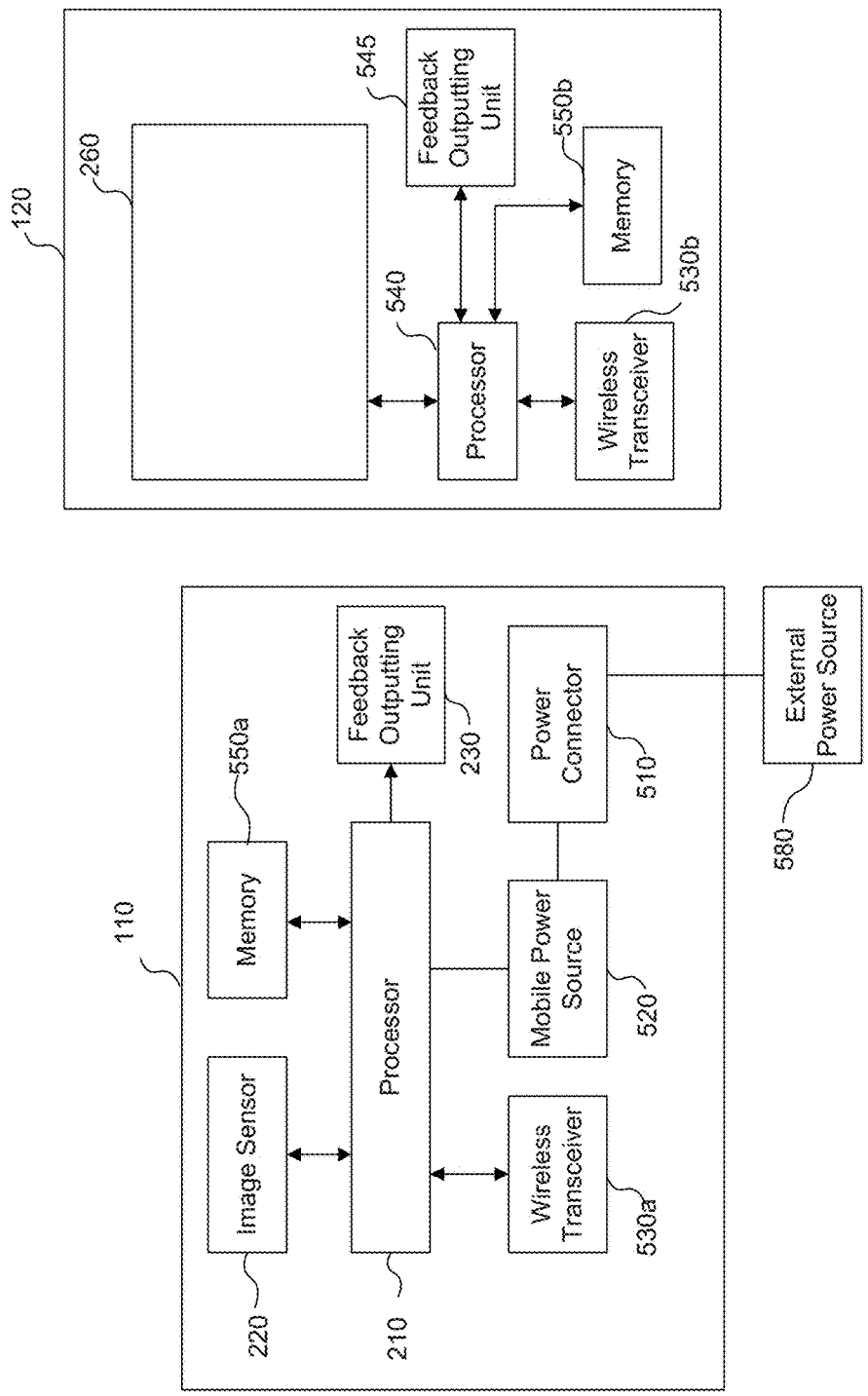
FIG. 5C is a block diagram illustrating an example of the components of a wearable apparatus according to a third embodiment.

FIG. 5C is a block diagram illustrating the components of apparatus 110 according to another example embodiment including computing device 120. In this embodiment, apparatus 110 includes an image sensor 220, a memory 550a, a first processor 210, a feedback-outputting unit 230, a wireless transceiver 530a, a mobile power source 520, and a power connector 510. As further shown in FIG. 5C, computing device 120 includes a processor 540, a feedback-outputting unit 545, a memory 550b, a wireless transceiver 530b, and a display 260. One example of computing device 120 is a smartphone or tablet having a dedicated application installed therein. In other embodiments, computing device 120 may include any configuration such as an on-board automobile computing system, a PC, a laptop, and any other system consistent with the disclosed embodiments. In this example, user 100 may view feedback output in response to identification of a hand-related trigger on display 260. Additionally, user 100 may view other data (e.g., images, video clips, object information, schedule information, extracted information, etc.) on display 260. In addition, user 100 may communicate with server 250 via computing device 120.

In some embodiments, processor 210 and processor 540 are configured to extract information from captured image data. The term "extracting information" includes any process by which information associated with objects, individuals, locations, events, etc., is identified in the captured image data by any means known to those of ordinary skill in the art. In some embodiments, apparatus 110 may use the extracted information to send feedback or other real-time indications to feedback outputting unit 230 or to computing device 120. In some embodiments, processor 210 may identify in the image data the individual standing in front of user 100, and send computing device 120 the name of the individual and the last time user 100 met the individual. In another embodiment, processor 210 may identify in the image data, one or more visible triggers, including a hand-related trigger, and determine whether the trigger is associated with a person other than the user of the wearable apparatus to selectively determine whether to perform an action associated with the trigger. One such action may be to provide a feedback to user 100 via feedback-outputting unit 230 provided as part of (or in communication with) apparatus 110 or via a feedback unit 545 provided as part of computing device 120. For example, feedback-outputting unit 545 may be in communication with display 260 to cause the display 260 to visibly output information. In some embodiments, processor 210 may identify in the image data a hand-related trigger and send computing device 120 an indication of the trigger. Processor 540 may then process the received trigger information and provide an output via feedback outputting unit 545 or display 260 based on the hand-related trigger. In other embodiments, processor 540 may determine a hand-related trigger and provide suitable feedback similar to the above, based on image data received from apparatus 110. In some embodiments, processor 540 may provide instructions or other information, such as environmental information to apparatus 110 based on an identified hand-related trigger.

In some embodiments, processor 210 may identify other environmental information in the analyzed images, such as an individual standing in front user 100, and send computing device 120 information related to the analyzed information such as the name of the individual and the last time user 100 met the individual. In a different embodiment, processor 540 may extract statistical information from captured image data and forward the statistical information to server 250. For example, certain information regarding the types of items a user purchases, or the frequency a user patronizes a particular merchant, etc. may be determined by processor 540. Based on this information, server 250 may send computing device 120 coupons and discounts associated with the user's preferences.

When apparatus 110 is connected or wirelessly connected to computing device 120, apparatus 110 may transmit at least part of the image data stored in memory 550a for storage in memory 550b. In some embodiments, after computing device 120 confirms that transferring the part of image data was successful, processor 540 may delete the part of the image data. The term "delete" means that the image is marked as 'deleted' and other image data may be stored instead of it, but does not necessarily mean that the image data was physically removed from the memory.

As will be appreciated by a person skilled in the art having the benefit of this disclosure, numerous variations and/or modifications may be made to the disclosed embodiments. Not all components are essential for the operation of apparatus 110. Any component may be located in any appropriate apparatus and the components may be rearranged into a variety of configurations while providing the functionality of the disclosed embodiments. For example, in some embodiments, apparatus 110 may include a camera, a processor, and a wireless transceiver for sending data to another device. Therefore, the foregoing configurations are examples and, regardless of the configurations discussed above, apparatus 110 can capture, store, and/or process images.

Further, the foregoing and following description refers to storing and/or processing images or image data. In the embodiments disclosed herein, the stored and/or processed images or image data may comprise a representation of one or more images captured by image sensor 220. As the term is used herein, a "representation" of an image (or image data) may include an entire image or a portion of an image. A representation of an image (or image data) may have the same resolution or a lower resolution as the image (or image data), and/or a representation of an image (or image data) may be altered in some respect (e.g., be compressed, have a lower resolution, have one or more colors that are altered, etc.).

For example, apparatus 110 may capture an image and store a representation of the image that is compressed as a .JPG file. As another example, apparatus 110 may capture an image in color, but store a black-and-white representation of the color image. As yet another example, apparatus 110 may capture an image and store a different representation of the image (e.g., a portion of the image). For example, apparatus 110 may store a portion of an image that includes a face of a person who appears in the image, but that does not substantially include the environment surrounding the person. Similarly, apparatus 110 may, for example, store a portion of an image that includes a product that appears in the image, but does not substantially include the environment surrounding the product. As yet another example, apparatus 110 may store a representation of an image at a reduced resolution (i.e., at a resolution that is of a lower value than that of the captured image). Storing representations of images may allow apparatus 110 to save storage space in memory 550. Furthermore, processing representations of images may allow apparatus 110 to improve processing efficiency and/or help to preserve battery life.

In addition to the above, in some embodiments, any one of apparatus 110 or computing device 120, via processor 210 or 540, may further process the captured image data to provide additional functionality to recognize objects and/or gestures and/or other information in the captured image data. In some embodiments, actions may be taken based on the identified objects, gestures, or other information. In some embodiments, processor 210 or 540 may identify in the image data, one or more visible triggers, including a hand-related trigger, and determine whether the trigger is associated with a person other than the user to determine whether to perform an action associated with the trigger.

Some embodiments of the present disclosure may include an apparatus securable to an article of clothing of a user. Such an apparatus may include two portions, connectable by a connector. A capturing unit may be designed to be worn on the outside of a user's clothing, and may include an image sensor for capturing images of a user's environment. The capturing unit may be connected to or connectable to a power unit, which may be configured to house a power source and a processing device. The capturing unit may be a small device including a camera or other device for capturing images. The capturing unit may be designed to be inconspicuous and unobtrusive, and may be configured to communicate with a power unit concealed by a user's clothing. The power unit may include bulkier aspects of the system, such as transceiver antennas, at least one battery, a processing device, etc. In some embodiments, communication between the capturing unit and the power unit may be provided by a data cable included in the connector, while in other embodiments, communication may be wirelessly achieved between the capturing unit and the power unit. Some embodiments may permit alteration of the orientation of an image sensor of the capture unit, for example to better capture images of interest.

Figure 6:
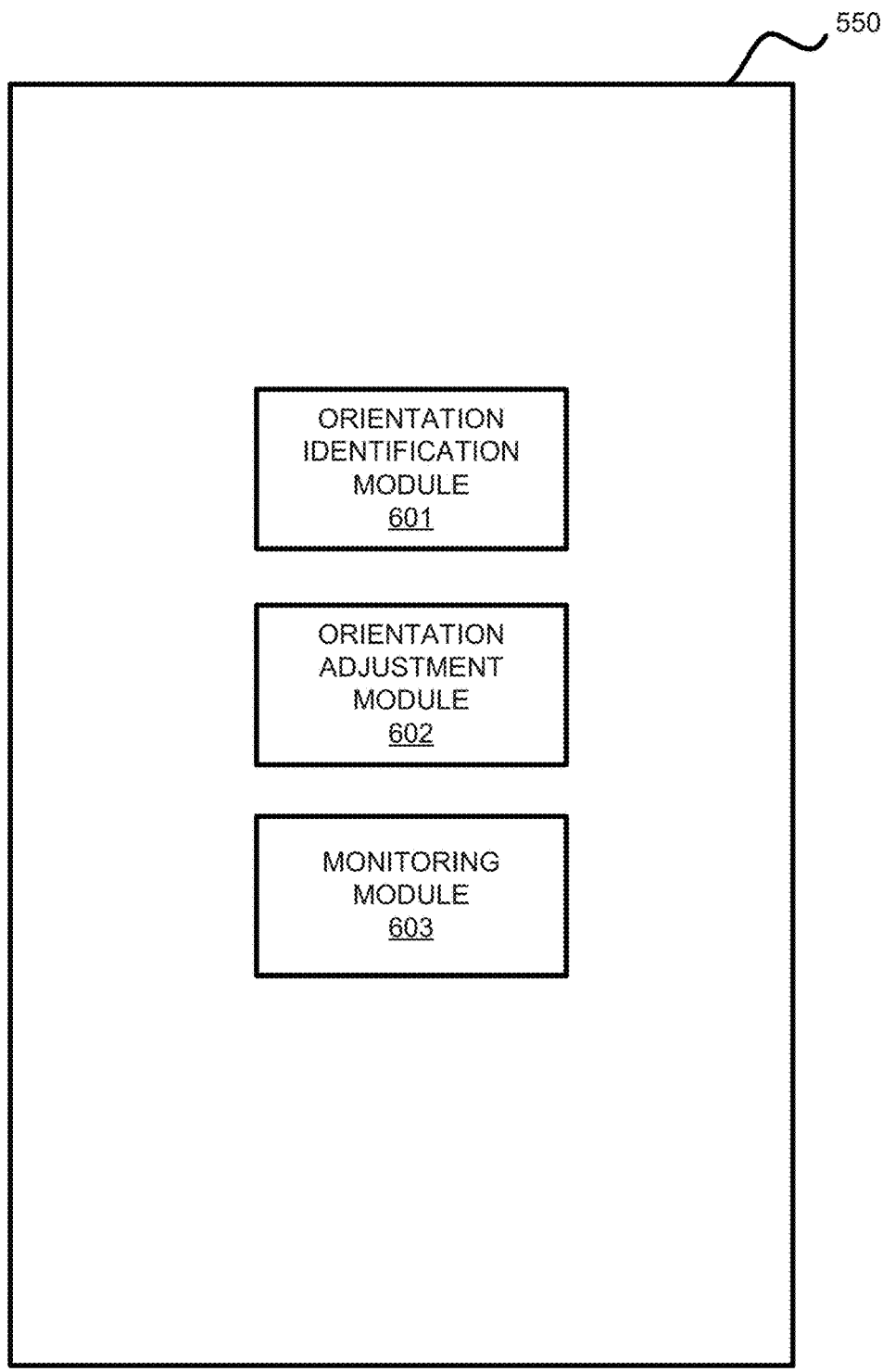
FIG. 6 illustrates an exemplary embodiment of a memory containing software modules consistent with the present disclosure.

FIG. 6 illustrates an exemplary embodiment of a memory containing software modules consistent with the present disclosure. Included in memory 550 are orientation identification module 601, orientation adjustment module 602, and motion tracking module 603. Modules 601, 602, 603 may contain software instructions for execution by at least one processing device, e.g., processor 210, included with a wearable apparatus. Orientation identification module 601, orientation adjustment module 602, and motion tracking module 603 may cooperate to provide orientation adjustment for a capturing unit incorporated into wireless apparatus 110.

Figure 7:
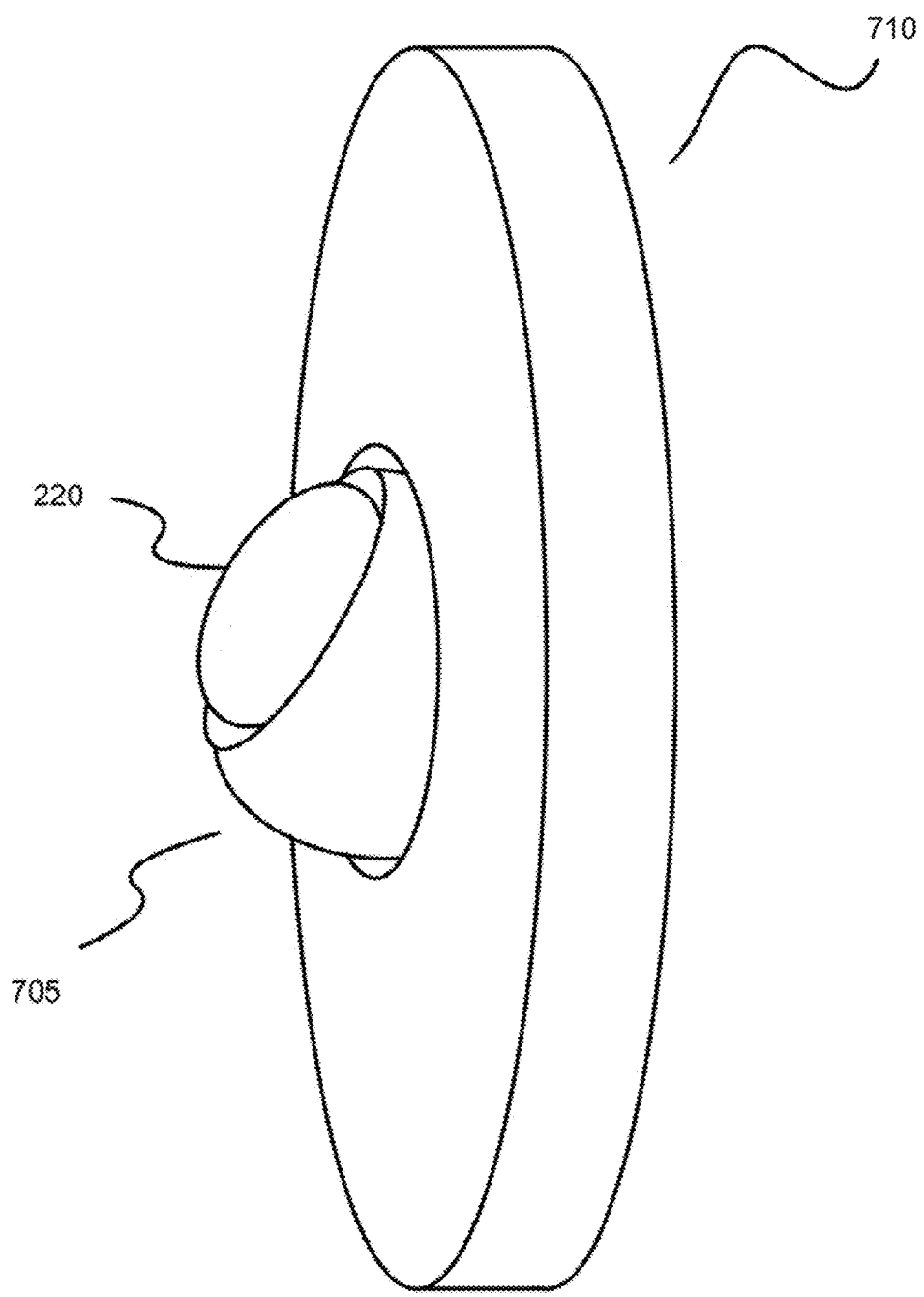
FIG. 7 is a schematic illustration of an embodiment of a wearable apparatus including an orientable image capture unit.

FIG. 7 illustrates an exemplary capturing unit 710 including an orientation adjustment unit 705. Orientation adjustment unit 705 may be configured to permit the adjustment of image sensor 220. As illustrated in FIG. 7, orientation adjustment unit 705 may include an eye-ball type adjustment mechanism. In alternative embodiments, orientation adjustment unit 705 may include gimbals, adjustable stalks, pivotable mounts, and any other suitable unit for adjusting an orientation of image sensor 220.

Image sensor 220 may be configured to be movable with the head of user 100 in such a manner that an aiming direction of image sensor 220 substantially coincides with a field of view of user 100. For example, as described above, a camera associated with image sensor 220 may be installed within capturing unit 710 at a predetermined angle in a position facing slightly upwards or downwards, depending on an intended location of capturing unit 710. Accordingly, the set aiming direction of image sensor 220 may match the field-of-view of user 100. In some embodiments, processor 210 may change the orientation of image sensor 220 using image data provided from image sensor 220. For example, processor 210 may recognize that a user is reading a book and determine that the aiming direction of image sensor 220 is offset from the text. That is, because the words in the beginning of each line of text are not fully in view, processor 210 may determine that image sensor 220 is tilted in the wrong direction. Responsive thereto, processor 210 may adjust the aiming direction of image sensor 220.

Orientation identification module 601 may be configured to identify an orientation of an image sensor 220 of capturing unit 710. An orientation of an image sensor 220 may be identified, for example, by analysis of images captured by image sensor 220 of capturing unit 710, by tilt or attitude sensing devices within capturing unit 710, and by measuring a relative direction of orientation adjustment unit 705 with respect to the remainder of capturing unit 710.

Orientation adjustment module 602 may be configured to adjust an orientation of image sensor 220 of capturing unit 710. As discussed above, image sensor 220 may be mounted on an orientation adjustment unit 705 configured for movement. Orientation adjustment unit 705 may be configured for rotational and/or lateral movement in response to commands from orientation adjustment module 602. In some embodiments orientation adjustment unit 705 may be adjust an orientation of image sensor 220 via motors, electromagnets, permanent magnets, and/or any suitable combination thereof.

In some embodiments, monitoring module 603 may be provided for continuous monitoring. Such continuous monitoring may include tracking a movement of at least a portion of an object included in one or more images captured by the image sensor. For example, in one embodiment, apparatus 110 may track an object as long as the object remains substantially within the field-of-view of image sensor 220. In additional embodiments, monitoring module 603 may engage orientation adjustment module 602 to instruct orientation adjustment unit 705 to continually orient image sensor 220 towards an object of interest. For example, in one embodiment, monitoring module 603 may cause image sensor 220 to adjust an orientation to ensure that a certain designated object, for example, the face of a particular person, remains within the field-of view of image sensor 220, even as that designated object moves about. In another embodiment, monitoring module 603 may continuously monitor an area of interest included in one or more images captured by the image sensor. For example, a user may be occupied by a certain task, for example, typing on a laptop, while image sensor 220 remains oriented in a particular direction and continuously monitors a portion of each image from a series of images to detect a trigger or other event. For example, image sensor 210 may be oriented towards a piece of laboratory equipment and monitoring module 603 may be configured to monitor a status light on the laboratory equipment for a change in status, while the user's attention is otherwise occupied.

In some embodiments consistent with the present disclosure, capturing unit 710 may include a plurality of image sensors 220. The plurality of image sensors 220 may each be configured to capture different image data. For example, when a plurality of image sensors 220 are provided, the image sensors 220 may capture images having different resolutions, may capture wider or narrower fields of view, and may have different levels of magnification. Image sensors 220 may be provided with varying lenses to permit these different configurations. In some embodiments, a plurality of image sensors 220 may include image sensors 220 having different orientations. Thus, each of the plurality of image sensors 220 may be pointed in a different direction to capture different images. The fields of view of image sensors 220 may be overlapping in some embodiments. The plurality of image sensors 220 may each be configured for orientation adjustment, for example, by being paired with an image adjustment unit 705. In some embodiments, monitoring module 603, or another module associated with memory 550, may be configured to individually adjust the orientations of the plurality of image sensors 220 as well as to turn each of the plurality of image sensors 220 on or off as may be required. In some embodiments, monitoring an object or person captured by an image sensor 220 may include tracking movement of the object across the fields of view of the plurality of image sensors 220.

Embodiments consistent with the present disclosure may include connectors configured to connect a capturing unit and a power unit of a wearable apparatus. Capturing units consistent with the present disclosure may include least one image sensor configured to capture images of an environment of a user. Power units consistent with the present disclosure may be configured to house a power source and/or at least one processing device. Connectors consistent with the present disclosure may be configured to connect the capturing unit and the power unit, and may be configured to secure the apparatus to an article of clothing such that the capturing unit is positioned over an outer surface of the article of clothing and the power unit is positioned under an inner surface of the article of clothing. Exemplary embodiments of capturing units, connectors, and power units consistent with the disclosure are discussed in further detail with respect to FIGS. 8-14.

Figure 8:
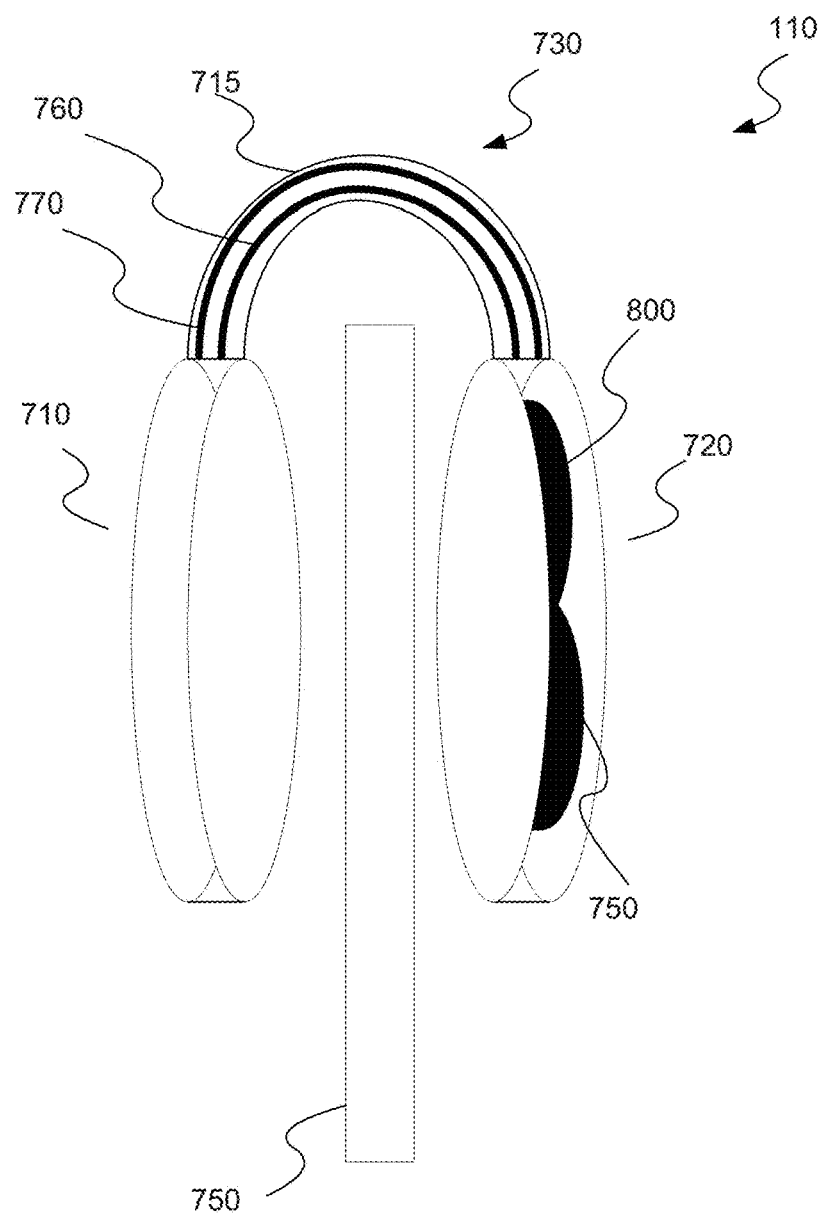
FIG. 8 is a schematic illustration of an embodiment of a wearable apparatus securable to an article of clothing consistent with the present disclosure.

FIG. 8 is a schematic illustration of an embodiment of wearable apparatus 110 securable to an article of clothing consistent with the present disclosure. As illustrated in FIG. 8, capturing unit 710 and power unit 720 may be connected by a connector 730 such that capturing unit 710 is positioned on one side of an article of clothing 750 and power unit 720 is positioned on the opposite side of the clothing 750. In some embodiments, capturing unit 710 may be positioned over an outer surface of the article of clothing 750 and power unit 720 may be located under an inner surface of the article of clothing 750. The power unit 720 may be configured to be placed against the skin of a user.

Capturing unit 710 may include an image sensor 220 and an orientation adjustment unit 705 (as illustrated in FIG. 7). Power unit 720 may include mobile power source 520 and processor 210. Power unit 720 may further include any combination of elements previously discussed that may be a part of wearable apparatus 110, including, but not limited to, wireless transceiver 530, feedback outputting unit 230, memory 550, and data port 570.

Connector 730 may include a clip 715 or other mechanical connection designed to clip or attach capturing unit 710 and power unit 720 to an article of clothing 750 as illustrated in FIG. 8. As illustrated, clip 715 may connect to each of capturing unit 710 and power unit 720 at a perimeter thereof, and may wrap around an edge of the article of clothing 750 to affix the capturing unit 710 and power unit 720 in place. Connector 730 may further include a power cable 760 and a data cable 770. Power cable 760 may be capable of conveying power from mobile power source 520 to image sensor 220 of capturing unit 710. Power cable 760 may also be configured to provide power to any other elements of capturing unit 710, e.g., orientation adjustment unit 705. Data cable 770 may be capable of conveying captured image data from image sensor 220 in capturing unit 710 to processor 800 in the power unit 720. Data cable 770 may be further capable of conveying additional data between capturing unit 710 and processor 800, e.g., control instructions for orientation adjustment unit 705.

Figure 9:
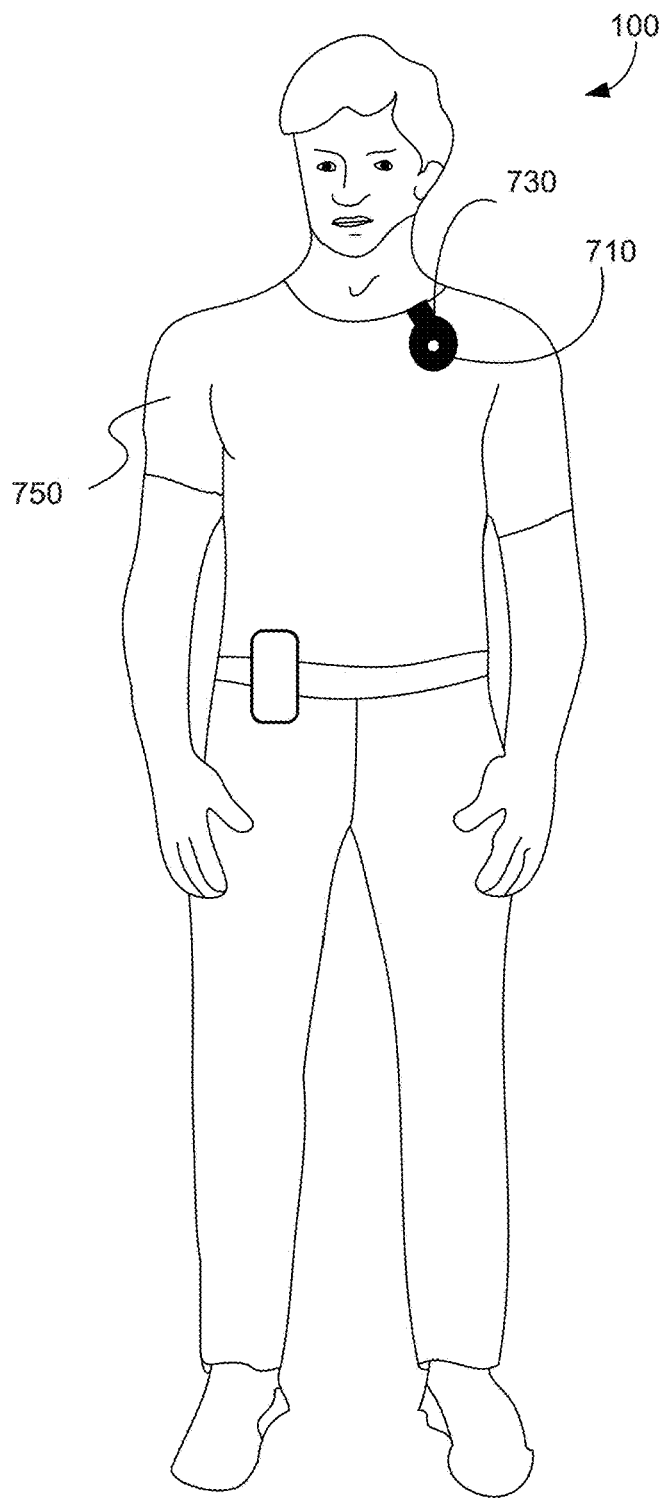
FIG. 9 is a schematic illustration of a user wearing a wearable apparatus consistent with an embodiment of the present disclosure.

FIG. 9 is a schematic illustration of a user 100 wearing a wearable apparatus 110 consistent with an embodiment of the present disclosure. As illustrated in FIG. 9, capturing unit 710 is located on an exterior surface of the clothing 750 of user 100. Capturing unit 710 is connected to power unit 720 (not seen in this illustration) via connector 730, which wraps around an edge of clothing 750.

Figure 10:
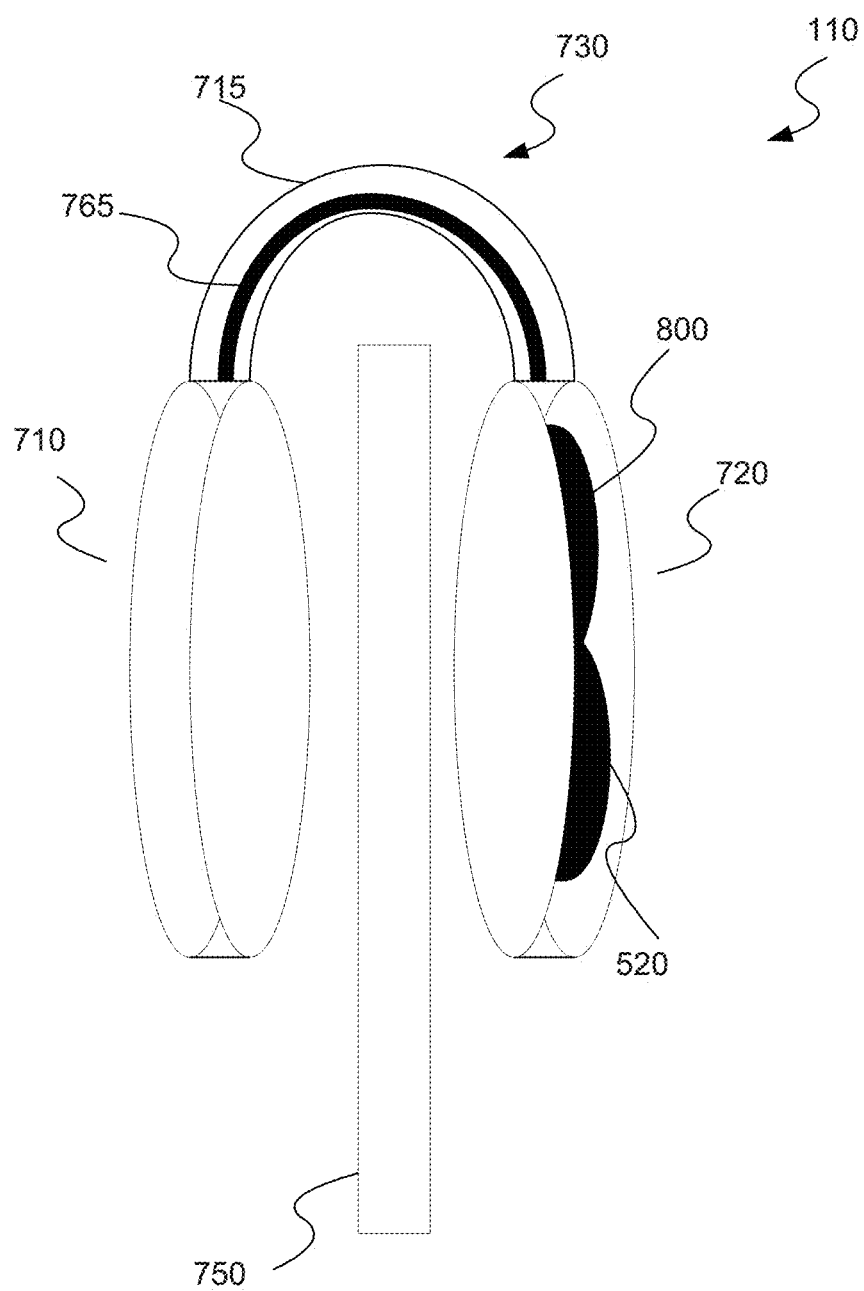
FIG. 10 is a schematic illustration of an embodiment of a wearable apparatus securable to an article of clothing consistent with the present disclosure.

In some embodiments, connector 730 may include a flexible printed circuit board (PCB). FIG. 10 illustrates an exemplary embodiment wherein connector 730 includes a flexible printed circuit board 765. Flexible printed circuit board 765 may include data connections and power connections between capturing unit 710 and power unit 720. Thus, in some embodiments, flexible printed circuit board 765 may serve to replace power cable 760 and data cable 770. In alternative embodiments, flexible printed circuit board 765 may be included in addition to at least one of power cable 760 and data cable 770. In various embodiments discussed herein, flexible printed circuit board 765 may be substituted for, or included in addition to, power cable 760 and data cable 770.

Figure 11:
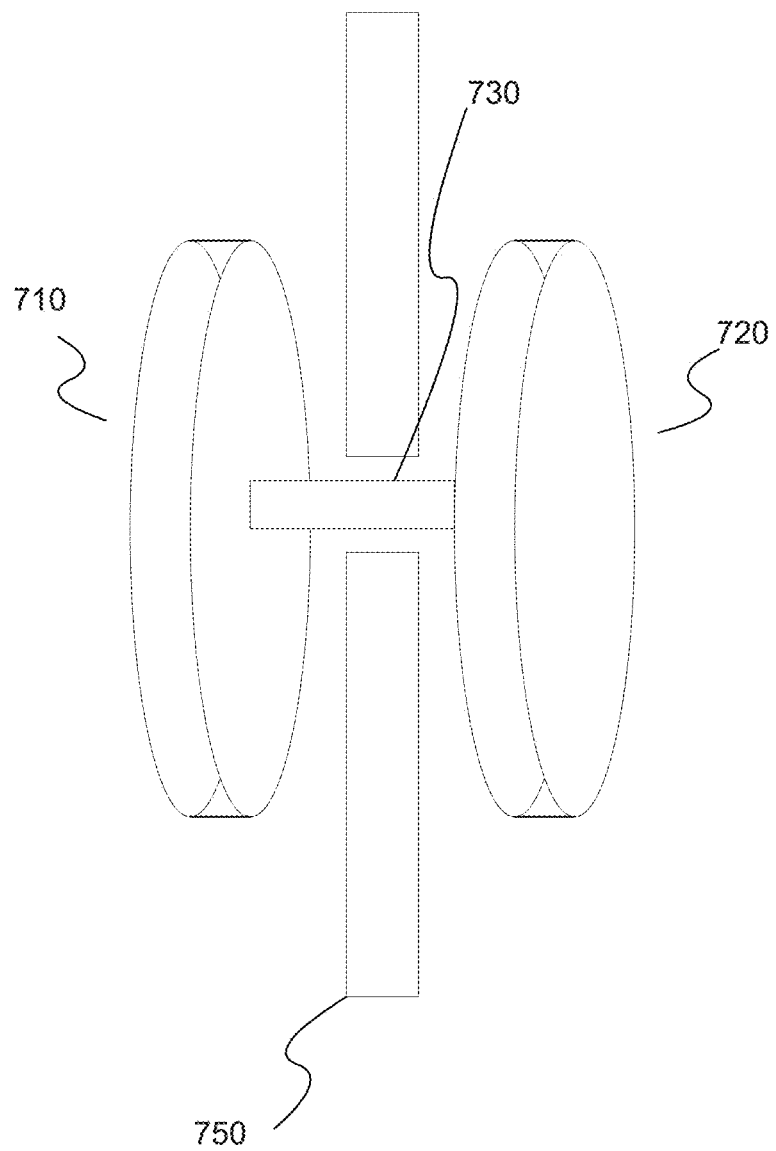
FIG. 11 is a schematic illustration of an embodiment of a wearable apparatus securable to an article of clothing consistent with the present disclosure.

FIG. 11 is a schematic illustration of another embodiment of a wearable apparatus securable to an article of clothing consistent with the present disclosure. As illustrated in FIG. 11, connector 730 may be centrally located with respect to capturing unit 710 and power unit 720. Central location of connector 730 may facilitate affixing apparatus 110 to clothing 750 through a hole in clothing 750 such as, for example, a button-hole in an existing article of clothing 750 or a specialty hole in an article of clothing 750 designed to accommodate wearable apparatus 110.

Figure 12:
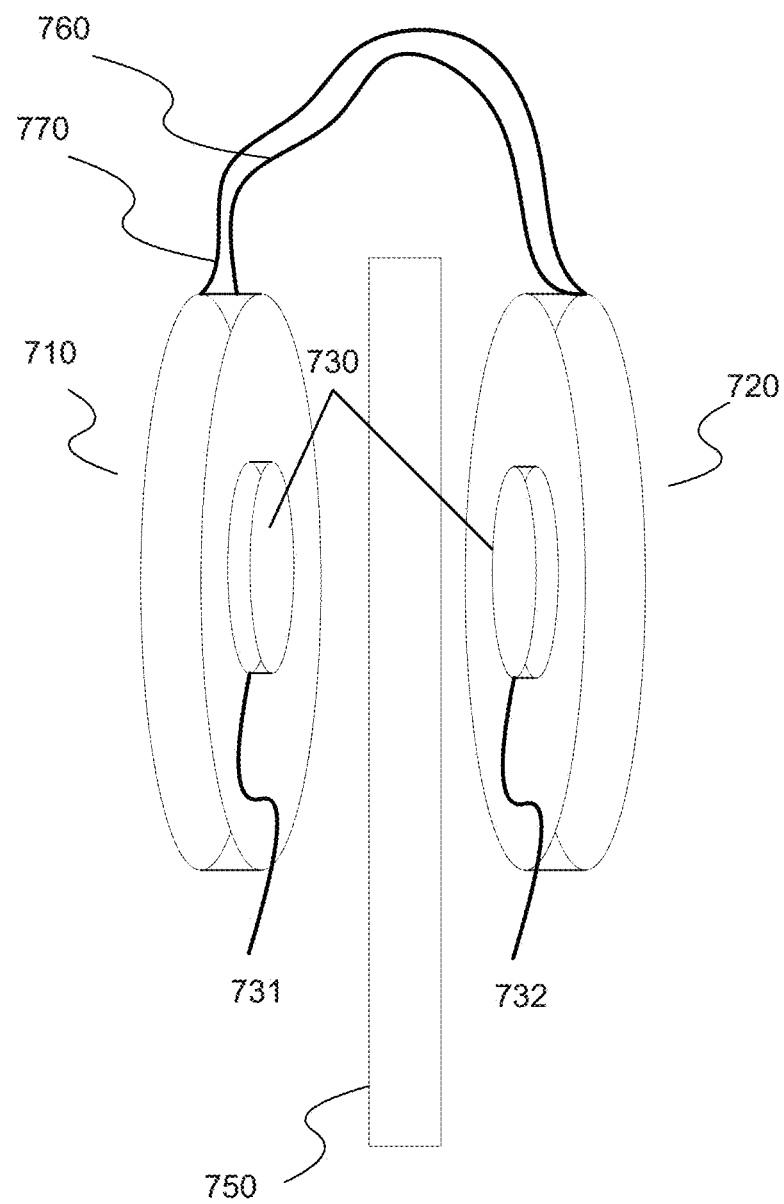
FIG. 12 is a schematic illustration of an embodiment of a wearable apparatus securable to an article of clothing consistent with the present disclosure.

FIG. 12 is a schematic illustration of still another embodiment of wearable apparatus 110 securable to an article of clothing. As illustrated in FIG. 12, connector 730 may include a first magnet 731 and a second magnet 732. First magnet 731 and second magnet 732 may secure capturing unit 710 to power unit 720 with the article of clothing positioned between first magnet 731 and second magnet 732. In embodiments including first magnet 731 and second magnet 732, power cable 760 and data cable 770 may also be included. In these embodiments, power cable 760 and data cable 770 may be of any length, and may provide a flexible power and data connection between capturing unit 710 and power unit 720. Embodiments including first magnet 731 and second magnet 732 may further include a flexible PCB 765 connection in addition to or instead of power cable 760 and/or data cable 770. In some embodiments, first magnet 731 or second magnet 732 may be replaced by an object comprising a metal material.

Figure 13:
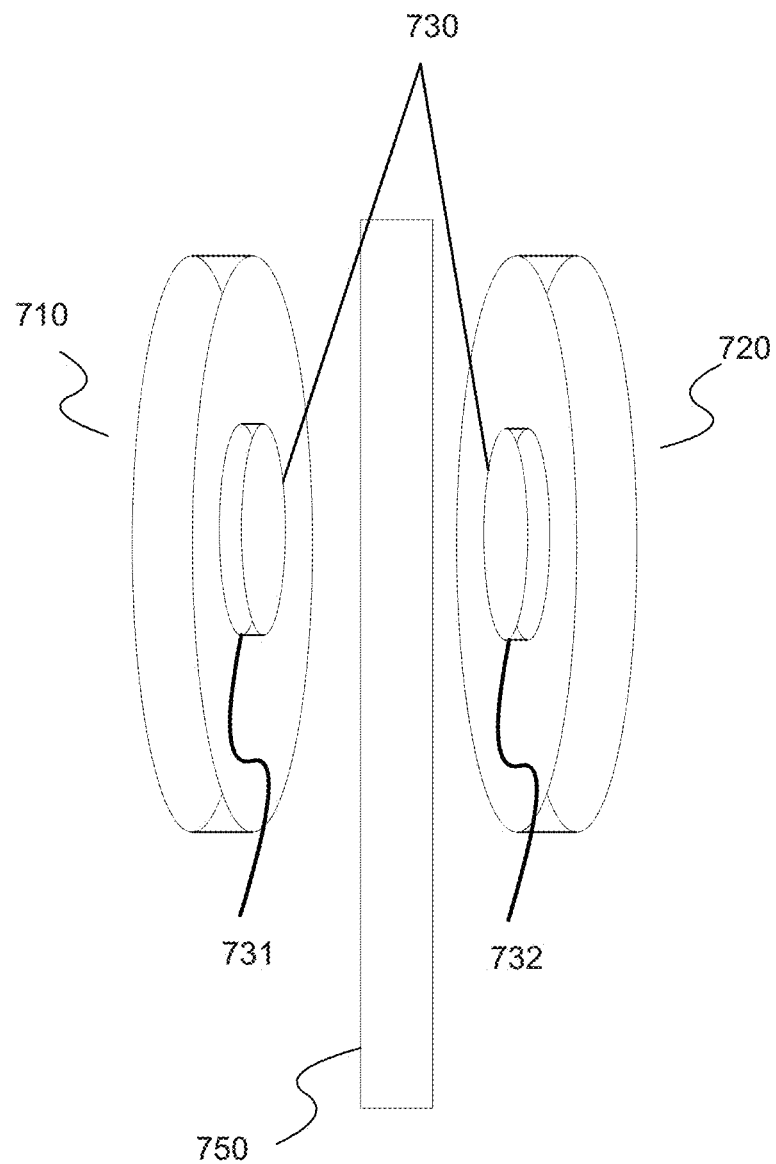
FIG. 13 is a schematic illustration of an embodiment of a wearable apparatus securable to an article of clothing consistent with the present disclosure.

FIG. 13 is a schematic illustration of yet another embodiment of a wearable apparatus 110 securable to an article of clothing. FIG. 13 illustrates an embodiment wherein power and data may be wirelessly transferred between capturing unit 710 and power unit 720. As illustrated in FIG. 13, first magnet 731 and second magnet 732 may be provided as connector 730 to secure capturing unit 710 and power unit 720 to an article of clothing 750. Power and/or data may be transferred between capturing unit 710 and power unit 720 via any suitable wireless technology, for example, magnetic and/or capacitive coupling, near field communication technologies, radiofrequency transfer, and any other wireless technology suitable for transferring data and/or power across short distances.

Figure 14:
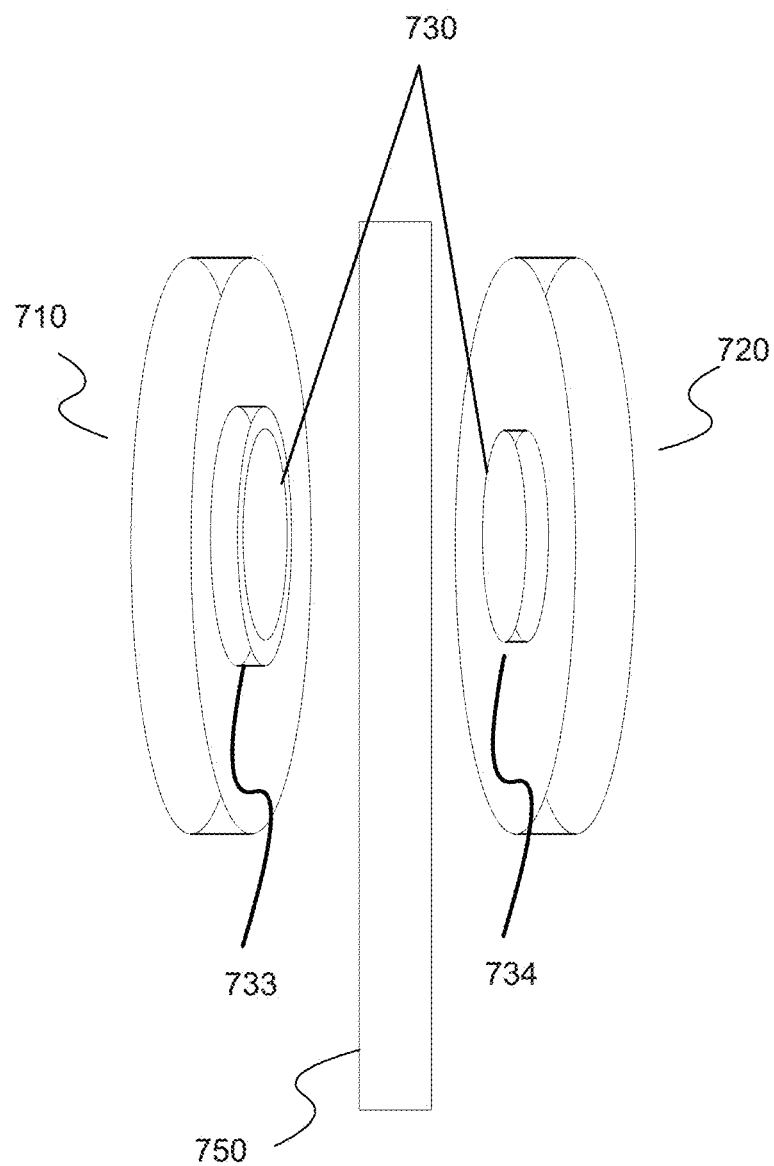
FIG. 14 is a schematic illustration of an embodiment of a wearable apparatus securable to an article of clothing consistent with the present disclosure.

FIG. 14 illustrates still another embodiment of wearable apparatus 110 securable to an article of clothing 750 of a user. As illustrated in FIG. 14, connector 730 may include features designed for a contact fit. For example, capturing unit 710 may include a ring 733 with a hollow center having a diameter slightly larger than a disk-shaped protrusion 734 located on power unit 720. When pressed together with fabric of an article of clothing 750 between them, disk-shaped protrusion 734 may fit tightly inside ring 733, securing capturing unit 710 to power unit 720. FIG. 14 illustrates an embodiment that does not include any cabling or other physical connection between capturing unit 710 and power unit 720. In this embodiment, capturing unit 710 and power unit 720 may transfer power and data wirelessly. In alternative embodiments, capturing unit 710 and power unit 720 may transfer power and data via at least one of cable 760, data cable 770, and flexible printed circuit board 765.

Figure 15:
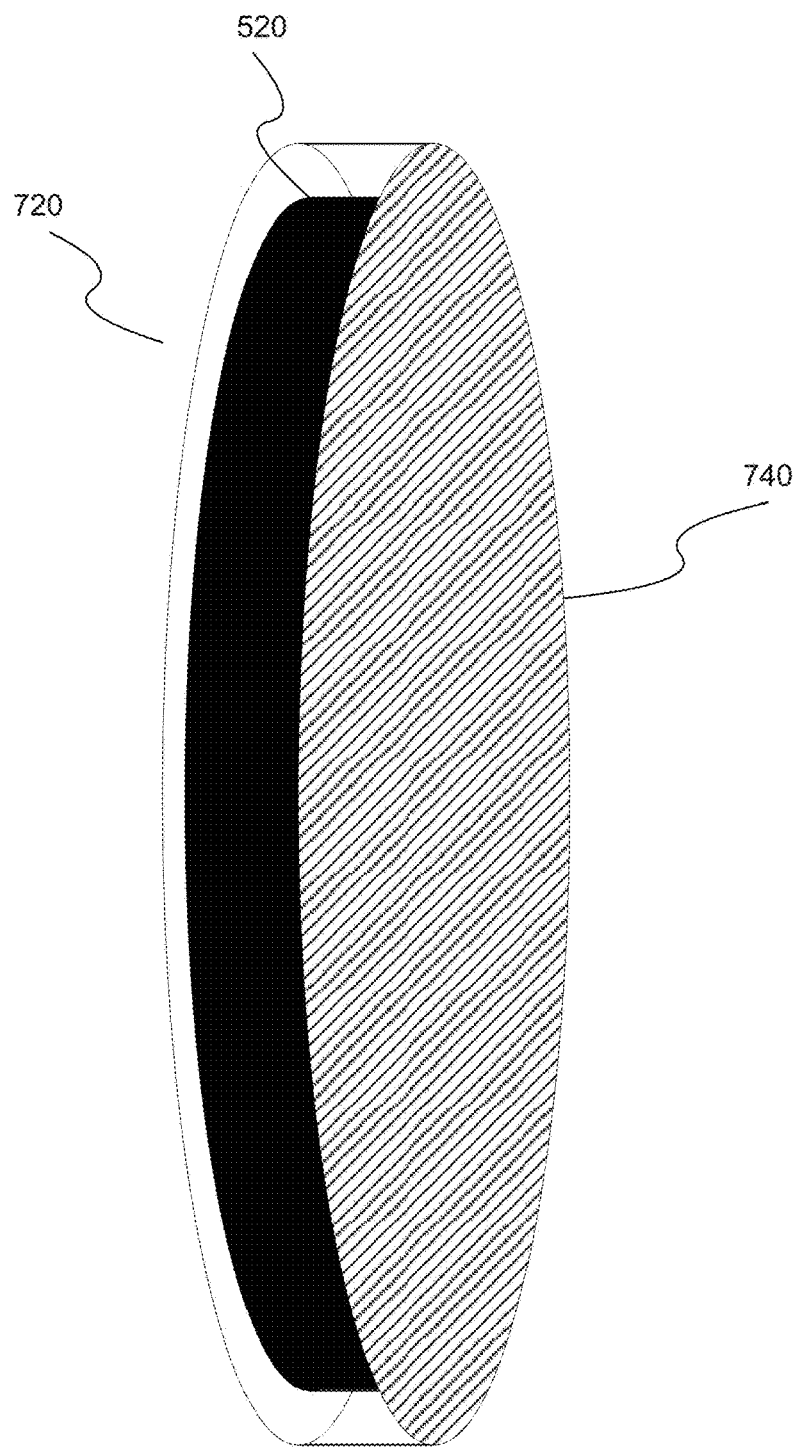
FIG. 15 is a schematic illustration of an embodiment of a wearable apparatus power unit including a power source.

FIG. 15 illustrates another aspect of power unit 720 consistent with embodiments described herein. Power unit 720 may be configured to be positioned directly against the user's skin. To facilitate such positioning, power unit 720 may further include at least one surface coated with a biocompatible material 740. Biocompatible materials 740 may include materials that will not negatively react with the skin of the user when worn against the skin for extended periods of time. Such materials may include, for example, silicone, PTFE, kapton, polyimide, titanium, nitinol, platinum, and others. Also as illustrated in FIG. 15, power unit 720 may be sized such that an inner volume of the power unit is substantially filled by mobile power source 520. That is, in some embodiments, the inner volume of power unit 720 may be such that the volume does not accommodate any additional components except for mobile power source 520. In some embodiments, mobile power source 520 may take advantage of its close proximity to the skin of user's skin. For example, mobile power source 520 may use the Peltier effect to produce power and/or charge the power source.

Figure 16:
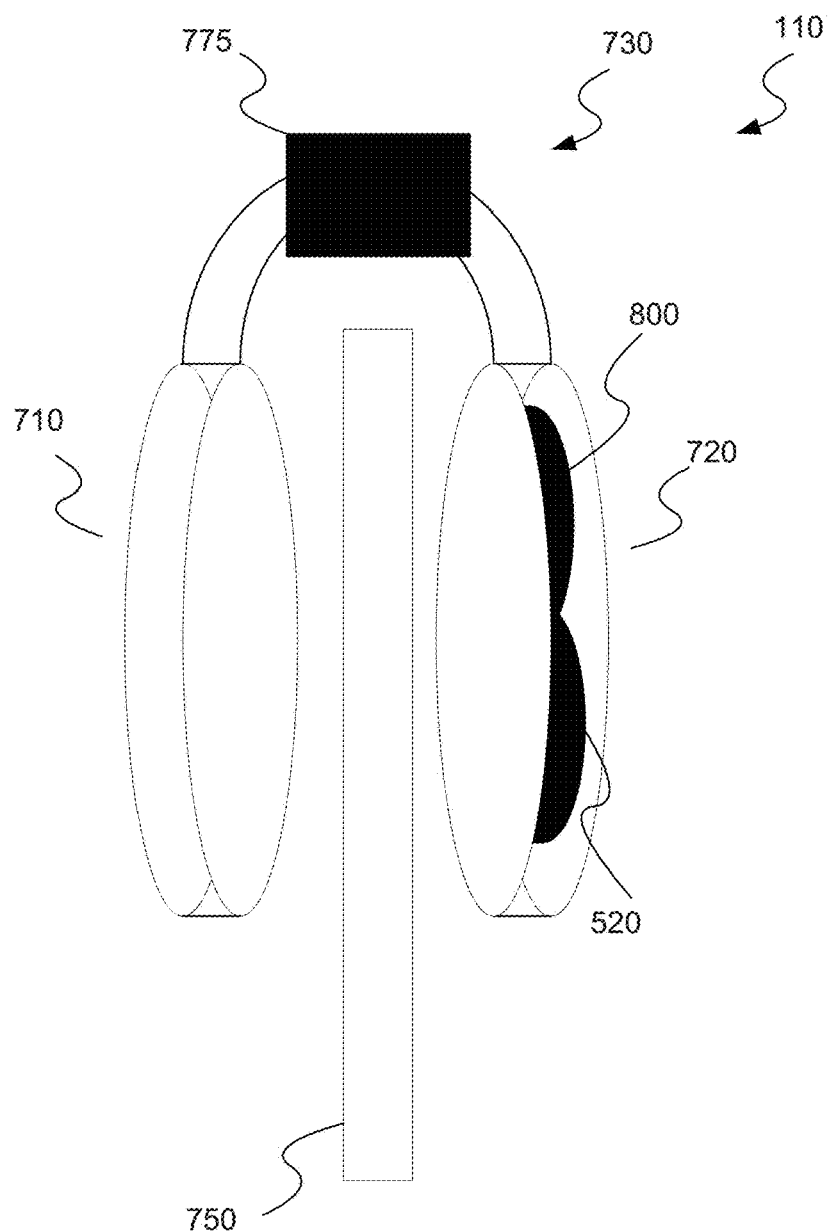
FIG. 16 is a schematic illustration of an exemplary embodiment of a wearable apparatus including protective circuitry.

In further embodiments, an apparatus securable to an article of clothing may further include protective circuitry associated with power source 520 housed in power unit 720. FIG. 16 illustrates an exemplary embodiment including protective circuitry 775. As illustrated in FIG. 16, protective circuitry 775 may be located remotely with respect to power unit 720. In alternative embodiments, protective circuitry 775 may also be located in capturing unit 710, on flexible printed circuit board 765, or in power unit 720.

Protective circuitry 775 may be configured to protect image sensor 220 and/or other elements of capturing unit 710 from potentially dangerous currents and/or voltages produced by mobile power source 520. Protective circuitry 775 may include passive components such as capacitors, resistors, diodes, inductors, etc., to provide protection to elements of capturing unit 710. In some embodiments, protective circuitry 775 may also include active components, such as transistors, to provide protection to elements of capturing unit 710. For example, in some embodiments, protective circuitry 775 may comprise one or more resistors serving as fuses. Each fuse may comprise a wire or strip that melts (thereby braking a connection between circuitry of image capturing unit 710 and circuitry of power unit 720) when current flowing through the fuse exceeds a predetermined limit (e.g., 500 milliamps, 900 milliamps, 1 amp, 1.1 amps, 2 amp, 2.1 amps, 3 amps, etc.) Any or all of the previously described embodiments may incorporate protective circuitry 775.

In some embodiments, the wearable apparatus may transmit data to a computing device (e.g., a smartphone, tablet, watch, computer, etc.) over one or more networks via any known wireless standard (e.g., cellular, Wi-Fi, Bluetooth®, etc.), or via near-filed capacitive coupling, other short range wireless techniques, or via a wired connection. Similarly, the wearable apparatus may receive data from the computing device over one or more networks via any known wireless standard (e.g., cellular, Wi-Fi, Bluetooth®, etc.), or via near-filed capacitive coupling, other short range wireless techniques, or via a wired connection. The data transmitted to the wearable apparatus and/or received by the wireless apparatus may include images, portions of images, identifiers related to information appearing in analyzed images or associated with analyzed audio, or any other data representing image and/or audio data. For example, an image may be analyzed and an identifier related to an activity occurring in the image may be transmitted to the computing device (e.g., the "paired device"). In the embodiments described herein, the wearable apparatus may process images and/or audio locally (on board the wearable apparatus) and/or remotely (via a computing device). Further, in the embodiments described herein, the wearable apparatus may transmit data related to the analysis of images and/or audio to a computing device for further analysis, display, and/or transmission to another device (e.g., a paired device). Further, a paired device may execute one or more applications (apps) to process, display, and/or analyze data (e.g., identifiers, text, images, audio, etc.) received from the wearable apparatus.

Some of the disclosed embodiments may involve systems, devices, methods, and software products for determining at least one keyword. For example, at least one keyword may be determined based on data collected by apparatus 110. At least one search query may be determined based on the at least one keyword. The at least one search query may be transmitted to a search engine.

In some embodiments, at least one keyword may be determined based on at least one or more images captured by image sensor 220. In some cases, the at least one keyword may be selected from a keywords pool stored in memory. In some cases, optical character recognition (OCR) may be performed on at least one image captured by image sensor 220, and the at least one keyword may be determined based on the OCR result. In some cases, at least one image captured by image sensor 220 may be analyzed to recognize: a person, an object, a location, a scene, and so forth. Further, the at least one keyword may be determined based on the recognized person, object, location, scene, etc. For example, the at least one keyword may comprise: a person's name, an object's name, a place's name, a date, a sport team's name, a movie's name, a book's name, and so forth.

In some embodiments, at least one keyword may be determined based on the user's behavior. The user's behavior may be determined based on an analysis of the one or more images captured by image sensor 220. In some embodiments, at least one keyword may be determined based on activities of a user and/or other person. The one or more images captured by image sensor 220 may be analyzed to identify the activities of the user and/or the other person who appears in one or more images captured by image sensor 220. In some embodiments, at least one keyword may be determined based on at least one or more audio segments captured by apparatus 110. In some embodiments, at least one keyword may be determined based on at least GPS information associated with the user. In some embodiments, at least one keyword may be determined based on at least the current time and/or date.

In some embodiments, at least one search query may be determined based on at least one keyword. In some cases, the at least one search query may comprise the at least one keyword. In some cases, the at least one search query may comprise the at least one keyword and additional keywords provided by the user. In some cases, the at least one search query may comprise the at least one keyword and one or more images, such as images captured by image sensor 220. In some cases, the at least one search query may comprise the at least one keyword and one or more audio segments, such as audio segments captured by apparatus 110.

In some embodiments, the at least one search query may be transmitted to a search engine. In some embodiments, search results provided by the search engine in response to the at least one search query may be provided to the user. In some embodiments, the at least one search query may be used to access a database.

For example, in one embodiment, the keywords may include a name of a type of food, such as quinoa, or a brand name of a food product; and the search will output information related to desirable quantities of consumption, facts about the nutritional profile, and so forth. In another example, in one embodiment, the keywords may include a name of a restaurant, and the search will output information related to the restaurant, such as a menu, opening hours, reviews, and so forth. The name of the restaurant may be obtained using OCR on an image of signage, using GPS information, and so forth. In another example, in one embodiment, the keywords may include a name of a person, and the search will provide information from a social network profile of the person. The name of the person may be obtained using OCR on an image of a name tag attached to the person's shirt, using face recognition algorithms, and so forth. In another example, in one embodiment, the keywords may include a name of a book, and the search will output information related to the book, such as reviews, sales statistics, information regarding the author of the book, and so forth. In another example, in one embodiment, the keywords may include a name of a movie, and the search will output information related to the movie, such as reviews, box office statistics, information regarding the cast of the movie, show times, and so forth. In another example, in one embodiment, the keywords may include a name of a sport team, and the search will output information related to the sport team, such as statistics, latest results, future schedule, information regarding the players of the sport team, and so forth. For example, the name of the sport team may be obtained using audio recognition algorithms.

Selecting Actions Based on a Detected Person

In some embodiments, wearable apparatus 110 may execute a variety of actions, such as identifying persons in captured images, uploading images of persons (e.g., to one or more social networks, to one or more cloud storage folders, etc.), tagging images of persons, sending images of persons (e.g., via email, text message, or the like), updating a Gnatt chart or a calendar, sending information to one or more matchmaking services, updating one or more social network profiles, providing one or more statistics, or the like. The wearable apparatus 110 may select one or more actions to perform based on one or more attributes of a detected person, such as age, gender, weight, height, relationship with a wearer of the device (e.g., social, family, business, etc.). In doing so, embodiments consistent with the present disclosure may address the technical problem of extracting information from an environment of the wearer of the wearable apparatus that is relevant to the wearer and then determining how to use that information in a way that is useful to the wearer and/or according to the user's preferences. For example, the wearer may wish to track encounters with certain people who are related to them or persons with whom the wearer is associated with at work, but may have different preferences as to the kinds of information that the wearer would like to store regarding different persons. Embodiments of the present disclosure may address this problem through techniques for categorizing information extracted or determined from images of the wearer's environment and executing appropriate actions related to the extracted information.

Figure 17:
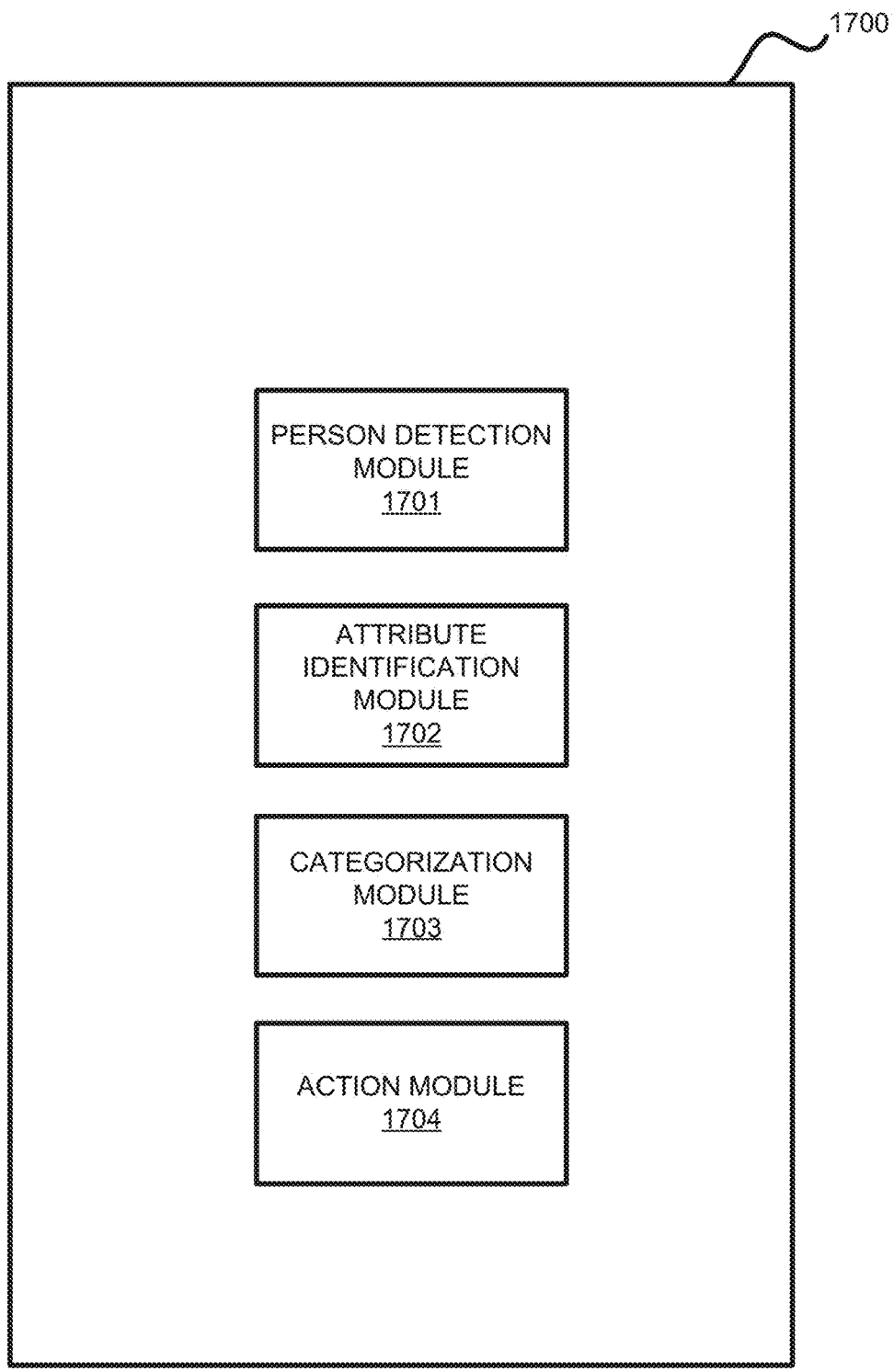
FIG. 17 illustrates an exemplary embodiment of a memory containing software modules for selecting an action based on a detected person consistent with the present disclosure.

FIG. 17 illustrates an exemplary embodiment of a memory 1700 containing software modules consistent with the present disclosure. Memory 1700 may be included in apparatus 110 in lieu of or in combination with memory 550. In some embodiments, the software modules of memory 1700 may be combined with one or more software modules of memory 550 into one or more memories. Memory 1700 may store more or fewer modules than those shown in FIG. 17.

As illustrated in FIG. 17, included in memory 1700 are software instructions to execute a person detection module 1701, an attribute identification module 1702, a categorization module 1703, and an action module 1704. Modules 1701, 1702, 1703, and 1704 may contain software instructions for execution by at least one processing device, e.g., processor 210, included in a wearable apparatus, e.g., wearable apparatus 110. In some embodiments, person detection module 1701, attribute identification module 1702, categorization module 1703, and action module 1704 may cooperate to execute method 1900 (or a variant thereof) of FIG. 19.

Person detection module 1701 may be configured to analyze one or more images captured from a wearable apparatus to detect at least one person within the images. For example, person detection module 1701 may be configured to identify a subset of the captured data that includes at least one person. In some embodiments, person detection module 1701 may be configured to receive a plurality of images and to identify one or more of the plurality of images that include at least one person. For example, module 1701 may receive a plurality of images of an environment surrounding a user wearing the wearable apparatus 110 and identify which of the plurality of images include at least one person.

In some embodiments, such an analysis may be performed by employing a facial recognition algorithm designed to detect facial features (e.g., mouth, eyes, etc.), facial contours, body shape, or any other suitable identifying feature of a person. In other embodiments, the at least one person may be identified using a thermal signature algorithm designed to detect the presence of at least one person based on the heat generated by the at least one person. In such embodiments, the wearable apparatus 110 may capture thermal images, either alone or in combination with visual images, for processing by the thermal signature algorithm. Thermal recognition of the at least one person may be desirable in implementations in which the wearable device 110 is operating in reduced lighting situations. In some embodiments, the at least one person may be identified through the application of one or more image classification techniques. For example, at least one image classification technique may be used to classify at least one feature of an image. In some embodiments, an image classification technique may include one or more of image enhancement, edge detection, image analysis, and data extraction. Specific examples of the methods for identifying at least one person are exemplary only, and a person of ordinary skill in the art will recognize other methods for identifying the at least one person that remain consistent with the present disclosure. In some examples, the at least one person may be detected using a facial detection algorithm, using a neural network trained to detect faces and/or persons in images, and so forth. In some examples, the at least one person may be identified using a facial recognition algorithm, using a neural network trained to identify people in images, and so forth.

Attribute identification module 1702 may be configured to receive one or more images of detected persons and further analyze the one or more images to determine one or more attributes (e.g., age, gender, weight, height, relationship with a wearer of the wearable apparatus) associated with the identified persons. In some embodiments, attribute identification module 1702 may determine more than one attribute for each detected person.

In some embodiments, at least one attribute of a detected person may be determined based on analysis of one or more images of the detected person. For example, one or more algorithms may analyze one or more of detected facial features (e.g., mouth, eyes, etc.), facial contours, body shape, or any other suitable identifying feature of a person to estimate or determine information such as a the detected person's age, gender, weight, height, etc. For example, a neural network trained to identify attributes of a person from an image may be used.

In some embodiments, attribute identification module 1702 may determine an identity of a detected person (e.g., through facial recognition), and then access one or more databases (stored, e.g., locally in a memory of wearable apparatus 110 and/or accessible remotely over a network, e.g., such as by accessing server 250) to retrieve at least one attribute of the detected person. For example, after identifying a detected person as a particular individual (e.g., determining a match based on facial recognition to a known person's image), attribute identification module 1702 may access a database to retrieve information about the detected person, such as the detected person's age, family members, etc.

Categorization module 1703 may be configured to use associated attributes to categorize identified persons. For example, categorization module 1703 may classify a detected person as an adult, a teenager, a child, a brother of the wearer, a mother-in-law of the wearer, a tall (e.g., above median) person, a short (e.g., below median) person, a male, a female, or the like.

In some embodiments, based on an attribute of a particular individual, categorization module 1703 may associate the detected person with one or more relevant categories. For example, if an attribute of a person indicates he or she is more than a predetermined height (e.g., six feet or taller), categorization module 1703 may associate the detected person a category of "tall." Similarly, if an attribute of a person indicates he or she is less than a predetermined age (e.g., 18 years), categorization module 1703 may associate the detected person a category of "child." Categorization module 1703 may further associate more than one category with a detected person. For example, a detected person who has an attribute of an age of fifteen years old may be associated with both a category of "child" and a category of "teenager."

In some embodiments, categorization module 1703 may be configured to receive one or more images of detected persons and further analyze the one or more images to categorize identified persons. In some examples, the detected person may be classified to one of a number of predefined categorizes using an image classifier that assign a category to a person based on images of a person. The image classifier may be a result of a machine learning algorithm trained on a set of examples, where an example may include images of a person along with the desired category for the person. In some examples, a neural network trained to assign one or more categories to a person based on images of a person may be used.

In some embodiments, categorization module 1703 may be configured to receive one or more images and analyze the one or more images to detect persons of a select category. In some examples, the one or more images may be analyzed using a detector configured to detect females, males, children, elderly persons, business persons, and so forth. For example, the detector may comprise a classifier that classifies images and/or portion of images as ones that contain and ones that do not contain a person matching the selected category. The classifier may be a result of a machine learning algorithm trained using training examples, where a training example may comprise images and a desired answer. For example, the detector may comprise a neural network trained to detect persons that match the selected category in images.

Action module 1704 may be configured to select one or more actions based on the categories. For example, action module 1704 may identify the detected person, when the detected person is categorized as business contact of the wearer. By way of further example, action module 1704 may upload and tag an image (e.g., to a cloud storage service, a social network, etc.) when, for example, the detected person is categorized as a friend or family of the wearer. In another example, action module 1704 may update a timeline, calendar, Gnatt chart, or the like, when the detected person is categorized as a coworker or significant other of the wearer. In yet another example, action module 1704 may provide information related to a potential dating match, e.g., when the detected person is categorized in one or more categories matching dating preferences of the wearer (e.g., gender, height, hair color, etc.).

Alternatively or concurrently to performing one or more actions such as those above, action module 1704 may update one or more statistics based on the categorization. In some embodiments, the statistics may be accumulated over geographical regions and/or time frames.

In some embodiments, action module 1704 may cause the selected one or more actions to be executed by providing information (e.g., one or more instructions and/or one or more parameters to an instruction) to a device paired with the wearable apparatus (e.g., a smartphone) and/or by providing information (e.g., one more instructions and/or one or more parameters to an instruction) to a remote server (e.g., server 250) over a network. For example, action module 1704 may transmit one or more instructions to a paired device to update a calendar displayed on a screen of the paired device to indicate that the user had a meeting with a co-worker on a particular day.

Modules 1701-1704 may be implemented in software, hardware, firmware, a mix of any of those, or the like. For example, if the modules are implemented in software, they may be stored, for example, in memory 550. However, in some embodiments, any one or more of modules 1701-1704 may, for example, be stored in processor 540 and/or located on server 250, which may include one or more processing devices. Processing devices of server 250 may be configured to execute the instructions of modules 1701-1704. In some embodiments, aspects of modules 1701-1704 may include software, hardware, or firmware instructions (or a combination thereof) executable by one or more processors, alone or in various combinations with each other. For example, modules 1701-1704 may be configured to interact with each other and/or other modules of server 250 and/or a wearable camera system to perform functions consistent with disclosed embodiments. In some embodiments, any of the disclosed modules may each include dedicated sensors (e.g., IR, image sensors, etc.) and/or dedicated application processing devices to perform the functionality associated with each module.

Figure 18A:
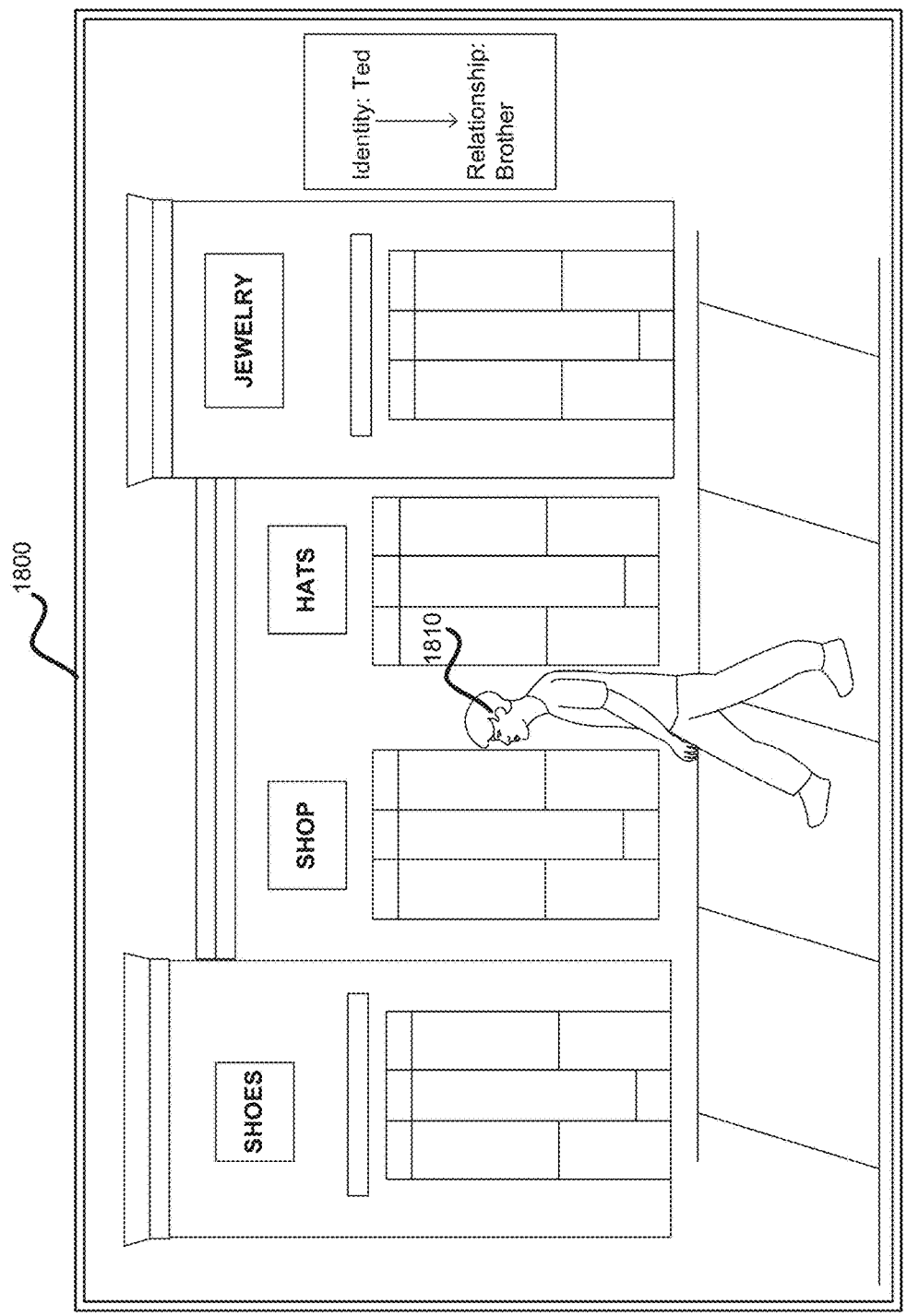
FIG. 18A is a schematic illustration of an example image captured by a wearable apparatus consistent with an embodiment of the present disclosure.

FIG. 18A is an illustration of an example image 1800 captured by a wearable apparatus, such as wearable apparatus 110. In the example of FIG. 18A, image 1800 contains a person 1810. In the example of FIG. 18A, wearable apparatus 110 may classify person 1810 as a brother of the wearer of apparatus 110. The classification may be determined using any one or more of the techniques discussed above in connection with FIG. 17. Based on this classification, wearable apparatus 110 may take one or more actions. For example, apparatus 110 may identify person 1810 as "brother" and/or by the name "Ted," may upload and tag an image of person 1810 (e.g., to a social network account associated with the wearer), may update a social network account associated with the wearer to indicate that the wearer was with person 1810, or the like.

Figure 18B:
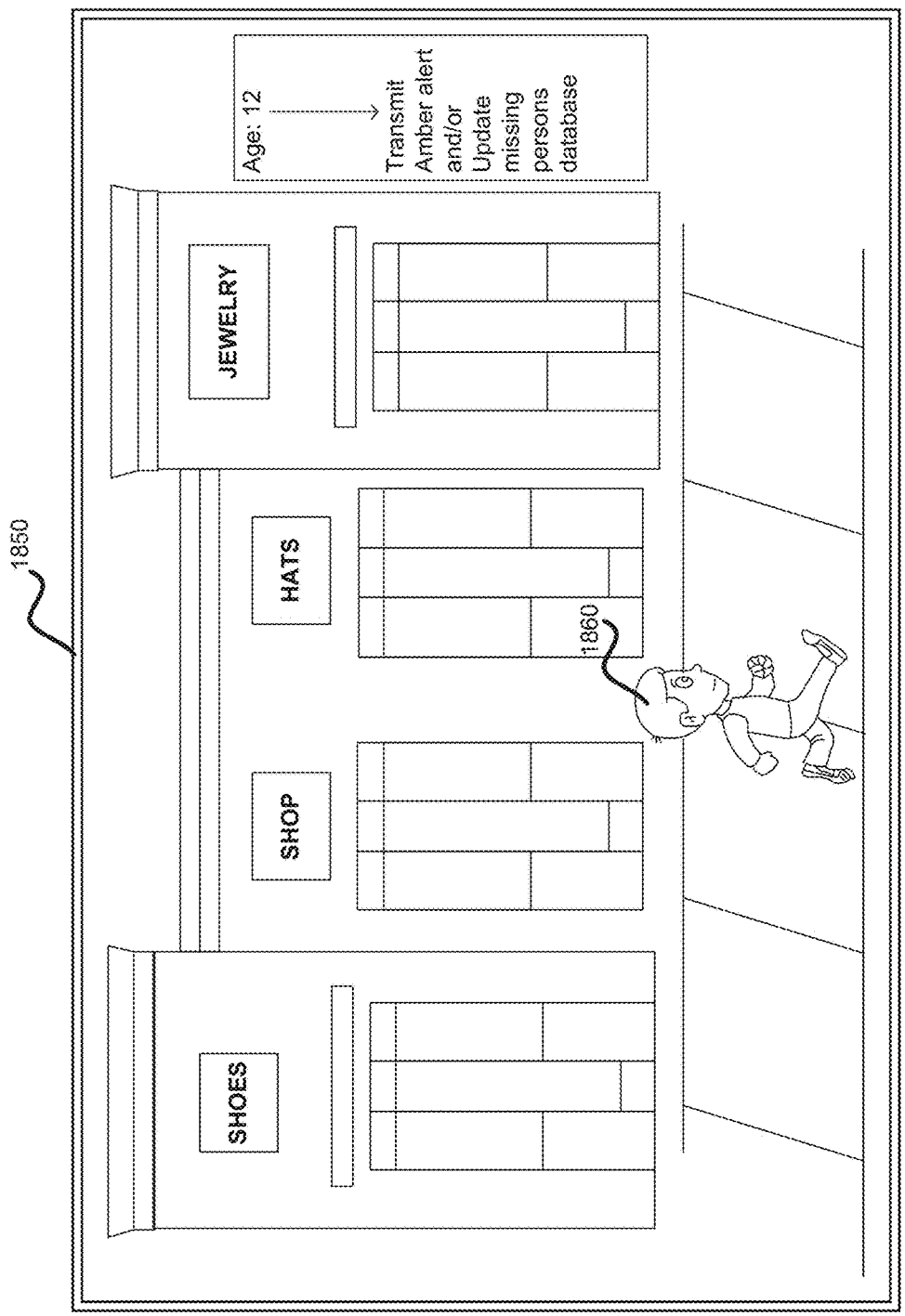
FIG. 18B is a schematic illustration of another example image captured by a wearable apparatus consistent with an embodiment of the present disclosure.

FIG. 18B is an illustration of another example image 1850 captured by a wearable apparatus such as wearable apparatus 110. In the example of FIG. 18B, image 1850 contains a person 1860. In the example of FIG. 18B, wearable apparatus 110 may classify person 1860 as a child (e.g., based on a determined age of person 1860). Based on this classification, apparatus 110 may take one or more actions. For example, as depicted in FIG. 18B, wearable apparatus 110 may transmit an amber alert based on the classification of person 1860 as a child and/or based on the absence of other persons, such as adults, nearby. Alternatively or concurrently, as depicted in FIG. 18B, wearable apparatus 110 may transmit an update to a database providing information related to missing persons. Such an update may verify if person 1860 is in the missing persons database and, if so, transmit a time and/or a location of the capture of image 1850 to the database. In some examples, wearable apparatus 110 may forgo certain actions based on the category of the person, for example in FIG. 18B the apparatus may forgo uploading images of person 1860 to a social network or a public photo album based on the categorization of person 1860 as a child.

FIGS. 18A and 18B are examples of persons being detected and categorized by wearable apparatus 110. As would be understood by one of ordinary skill in the art, wearable apparatus 110 may capture images throughout the user's day at a variety of locations as the environment surrounding the user changes. For example, images may be captured when the user visits a restaurant for dinner, commutes to and from work, attends social events, etc. In this way, wearable apparatus 110 may be configured to monitor the environment surrounding user 100 throughout the user's activities to identify exposure to one or more persons throughout the time user wears wearable apparatus 110, and then determine attributes of detected persons, base categories on the determined attributes, and take appropriate actions based on the categories.

Figure 19:
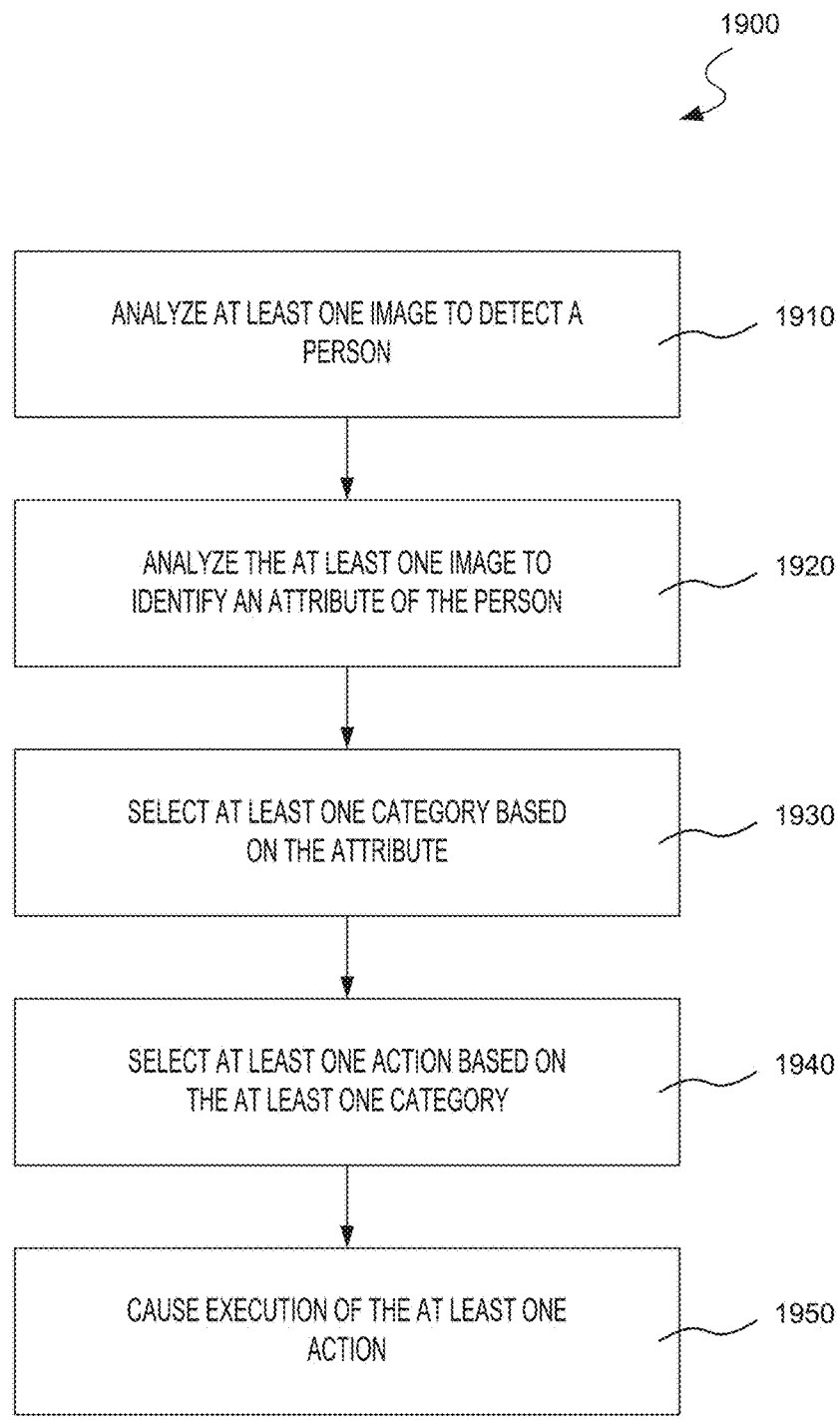
FIG. 19 is a flowchart of an example method for selecting an action based on a detected person consistent with the present disclosure.

FIG. 19 illustrates a flowchart of an example method 1900 for selecting an action based on a detected person. Method 1900 may be implemented by at least one processing device (e.g., processor 210 of wearable apparatus 110) and by a wearable image sensor (e.g., image sensor 220 of wearable apparatus 110) configured to capture a plurality of images from the environment of the user of the wearable apparatus.

At step 1910, the processing device may analyze at least one of the plurality of images to detect the person. For example, received image data may be processed by software steps executed by person detection module 1701. In some embodiments, the processing device may compare one or more regions of the at least one image against a database of known patterns and/or images to determine whether a person is included in the one or more regions. Alternatively or concurrently, the processing device may apply one or more classifiers to the one or more regions, and the one or more classifiers may output whether a person is detected in the one or more regions. Still further, the processing device may execute one or more algorithms to detect facial features (e.g., mouth, eyes, etc.), facial contours, body shape, or any other suitable identifying feature of a person.

In some embodiments, the detection may be binary. In such embodiments, the comparison and/or classifiers may output true if a person is detected and false if a person is not detected. In other embodiments, the detection may be threshold-based. In such embodiments, the comparison and/or classifiers may output a percentage or other measurement of confidence that the one or more regions include a person. For example, the comparison may output a likelihood (e.g., a 58% likelihood) that the one or more regions include a person. By way of further example, the classifiers may output a score (e.g., a score of 8 out of 10) that the one or more regions include a person. In such embodiments, the processing device may use a threshold (e.g., at least 55%, at least 7 out of 10, etc.) to convert the output to a binary detection.

At step 1920, the processing device may analyze at least one of the plurality of images to identify an attribute of the detected person. For example, received image data may be processed by software steps executed by attribute identification module 1702. Similar to step 1910, the processing device may compare one or more regions of the at least one image against a database of known patterns and/or images to determine the attribute. Alternatively or concurrently, the processing device may apply one or more classifiers to the one or more regions, and the one or more classifiers may output the attribute. For example, as discussed earlier, one or more algorithms may analyze one or more of detected facial features (e.g., mouth, eyes, etc.), facial contours, body shape, or any other suitable identifying feature of a person to estimate or determine information such as a the detected person's age, gender, weight, height, etc. In some embodiments, as discussed earlier, attribute identification module 1702 may determine an identity of a detected person (e.g., through facial recognition), and then access one or more databases (stored, e.g., locally in a memory of wearable apparatus 110 and/or accessible remotely over a network, e.g., such as by accessing server 250) to retrieve at least one attribute of the detected person.

In some embodiments, a confidence score or the like may be associated with the attribute. For example, the comparison may output an attribute with a 64% confidence score. By way of further example, the classifiers may output an attribute with a confidence score of 4 (out of 10). In such embodiments, the comparison and/or classifiers may output a plurality of attributes, and the processing device may select the attribute with the highest confidence score as the associated attribute.

As one example, analyzing at least one of the plurality of images to identify an attribute of the detected person may include analyzing the at least one of the plurality of images to estimate an age of the detected person. As a second example, analyzing at least one of the plurality of images to identify an attribute of the detected person may include analyzing the at least one of the plurality of images to estimate a height of the detected person. In a third example, analyzing at least one of the plurality of images to identify an attribute of the detected person may include analyzing the at least one of the plurality of images to estimate a weight of the detected person. As a fourth example, analyzing at least one of the plurality of images to identify an attribute of the detected person may include analyzing the at least one of the plurality of images to estimate a gender of the detected person.

In some embodiments, analyzing at least one of the plurality of images to identify an attribute of the detected person may include analyzing the at least one of the plurality of images to determine an identity of the detected person. For example, an identity of the detected person may comprise a name, a job title, a phone number, or other identifier of the detected person. In some embodiments, the processing device may compare one or more regions of the at least one image against a database of known patterns to identify the detected person. Alternatively or concurrently, the processing device may apply one or more classifiers to the one or more regions, and the one or more classifiers may output an identity of the detected person. In some embodiments, a confidence score or the like may be associated with the identity. For example, the classifiers may output an identity with a confidence score (e.g., a 43% confidence score). By way of further example, the comparison may output an identity with a confidence score (e.g., a confidence score of 9 out of 10). In such embodiments, the comparison and/or classifiers may output a plurality of identities, and the processing device may select the identity with the highest confidence score as the associated identity.

Based on the identity of the detected person, the processing device may determine a type of a relationship between the user and the detected person, as depicted in the example of FIG. 18A. For example, the relationship may comprise a category of relationship (such as family, friend, social, business, etc.), a specific relationship (such as brother, cousin, coworker, client, etc.), or the like. In some embodiments, the processing device may determine multiple types of relationships (e.g., the detected person is a family member and, more specifically, is the wearer's brother).

At step 1930, the processing device may select at least one category for the detected person based on the identified attribute. Selecting the at least one category may be facilitated by software steps executed by categorization module 1704. In some embodiments, the at least one category may be selected from a plurality of attribute categories. For example, the processing device may categorize the detected person into the at least one category based on the estimated age of the detected person (such as adult, child, teenager, senior citizen, etc.). In a second example, the processing device may categorize the detected person into the at least one category based on the estimated height of the detected person (such as tall, average, short, etc.). As a third example, the processing device may categorize the detected person into the at least one category based on the estimated weight of the detected person (such as heavy, average, thin, etc.). In a fourth example, the processing device may categorize the detected person into the at least one category based on the estimated gender of the detected person (such as male, female, etc.).

In embodiments where the processing device has determined an identity of the detected person and determined a type of a relationship between the user and the detected person, the processing device may categorize the detected person into the at least one category based on the type of the relationship between the user and the detected person (such as family, friend, social, business, sibling, coworker, etc.).

In some embodiments, the at least one category may include a statistical category. For example, the processing device may retain a collection of statistics on the age, height, weight, and/or gender of persons detected in images captured by the wearable apparatus. Statistical categories may thus be based on the collection of statistics, for example, medians, modes, means, deciles, quartiles, quintiles, or the like. In some embodiments, the statistical category may be associated with a geographical region and/or associated with a time period. For example, the median may be measured only for a portion of the collection associated with North America. By way of further example, the quartiles may be measured only for a portion of the collection associated with the previous week.

In some embodiments, method 1900 may skip steps 1910 and 1920, and step 1930 may detect persons that match a selected category in images, for example using categorization module 1704.

At step 1940, the processing device may select at least one action based on the at least one category. Selection of the at least one action may be facilitated via action module 1704. For example, the at least one action may include identifying the person, at least one of uploading an image and tagging an image, at least one of updating a log and updating a timeline or a Gantt chart, providing information related to a potential dating match, updating at least one of a social graph and a social network profile, or the like. The at least one action may be based on the at least one category. For example, the processing device may select updating a timeline or a Gnatt chart (or other calendar or task list) if the detected person is categorized as a coworker or client. By way of further example, the processing device may provide information related to a potential dating match if the detected person is categorized in one or more categories that match a dating profile of the user. In another example, the processing device may update a social graph and/or a social network profile if the detected person is categorized as a friend.

In some embodiments, the at least one action may be selected from a plurality of alternative actions associated with the at least one category. For example, the category of friend may be associated with at least one of uploading an image and tagging an image and/or updating at least one of a social graph and a social network profile. In such an example, the processing device may select at least one of uploading an image and tagging an image and/or updating at least one of a social graph and a social network profile when the detected person is categorized as a friend. In another example, the category of coworker may be associated with at least one of updating a log and updating a timeline or a Gantt chart and/or providing information related to a potential dating match. In such an example, the processing device may select at least one of updating a log and updating a timeline or a Gantt chart and/or providing information related to a potential dating match when the detected person is categorized as a coworker.

In embodiments with a plurality of categories, the processing device may use a second category to select at least one action from a plurality of alternative actions associated with the first category. Accordingly, in an example where the category of friend is associated with at least one of uploading an image and tagging an image and/or providing information related to a potential dating match, the processing device may select providing information related to a potential dating match when the gender of the detected person matches a preferred gender in a dating profile of the user.

In embodiments where the at least one category includes a statistical category, the at least one action may include updating information related to the statistical category. For example, updating the information related to the statistical category includes updating a count of unique persons associated with the statistical category. Accordingly, the processing device may keep track of a total number of friends, coworkers, males, females, short persons, tall persons, heavy persons, thin persons, or the like that are detected by the wearable apparatus. As explained above, this count may be associated with a geographical region and/or associated with a time period.

At step 1950, the processing device may cause the at least one selected action to be executed. In some embodiments, causing the at least one selected action to be executed may include sending information to a device paired with the wearable apparatus. A device paired with the wearable apparatus may include a smartphone, a tablet, a laptop, or the like. Accordingly, the processing device may send information to the paired device using a wired connection (such as a universal serial bus (USB), or the like), a direct wireless connection (such as Bluetooth®, or the like), and/or an indirect wireless connection (such as WiFi, 4G, or the like).

The transmitted information may include at least one of the plurality of images, one or more regions of at least one image (e.g., one or more regions used to detect a person and/or identify an attribute), one or more attributes of detected persons in the plurality of images, one or more categories for detected persons, one or more identities or detected persons, or the like. Furthermore, the transmitted information may allow the paired device to executed one or more selected actions. For example, the processing device may transmit information to the paired device such that the paired device may identify the person, upload an image, tag an image, update a log, update a timeline or a Gantt chart, provide information related to a potential dating match, update at least one of a social graph and a social network profile, or the like.

Method 1900 may further include additional steps. For example, the processing device may analyze at least one of the plurality of images to detect a second person. The detection of the second person may be performed as the detection of the first person in step 1910. Furthermore, method 1900 may further include analyzing at least one of the plurality of images to identify an attribute of the second person and selecting at least one category for the second person based on the identified attribute of the second person.

In some embodiments, one or more steps regarding the second person may be performed after steps 1910 to 1950 regarding the first person. In other embodiments, one or more steps regarding the second person may be interspersed with steps 1910 to 1950. For example, the processing device may detect the second person after detecting the first person but before identifying an attribute of the first person and/or selecting at least one category for the first person. By way of further example, the processing device may identify an attribute of the second person concurrently with identifying an attribute of the first person and/or may select at least one category for the second person concurrently with selecting at least one category for the first person.

In some embodiments, method 1900 may base the selection of the at least one action on the at least one category selected for the second person. For example, if a first detected person is categorized as a child and a second detected person is categorized as an adult, the processing device may verify if the first detected person has been reported as abducted or kidnapped by the second detected person using a database of missing persons, a database of police reports, or the like. By way of further example, if a first detected person is categorized as a coworker and a second detected person is categorized as a client, the processing device may update a timeline or a Gantt chart (or a calendar or task list) with a log of the meeting with the identified coworker and the identified client.

In some embodiments, method 1900 may detect and categorize a plurality of persons appearing in one or more images, for example in a fashion similar to the one described above. In some examples, step 1940 may base the selection of the at least one action on the categories of the plurality of persons. For example, the selection of the at least one action may be based on a distribution of the categories of a group of persons. For example, the entropy of the distribution of the categories of a group of persons may be calculated, and the selection of the at least one action may be based on the calculated entropy.

Executing Actions Based on Physical Presence of a Detected Person

As explained above, in some embodiments, wearable apparatus 110 of the present disclosure may execute a variety of actions. Some actions may be associated with a physical location of the apparatus, such as transmitting information associated with a physical location of the wearable apparatus, updating at least one of a database and a social network profile based on information associated with a physical location of the wearable apparatus, determining one or more statistics based, at least in part, on information associated with a physical location of the wearable apparatus, or the like. Other actions may be associated with a time and date (e.g., a time and date of capture of one or more images), such as transmitting information associated with at least one of a time and a date, updating a database or a social network based on information associated with at least one of a time and a date, identifying one or more statistics based, at least in part, on information associated with at least one of a time and a date, or the like.

In some embodiments, wearable apparatus 110 may determine one or more actions to take based on whether a detected person is physically present in an environment of a user of the wearable apparatus or visible on a display of a device in an environment of a user of the wearable apparatus. In doing so, embodiments consistent with the present disclosure may address the technical problem of extracting and using information from an environment of the wearer of the wearable apparatus when the wearer is interacting with other people and not with images or screens. For example, the wearer may wish to track encounters with certain people but not with any images of people in picture frames and/or on television screens, tablet screens, smartphone screens, or the like. Alternatively, the wearer may wish to track encounters with images separately from tracking physical encounters with other people. Embodiments of the present disclosure may address this problem through techniques for assessing physical presence of others based on images of the wearer's environment and executing appropriate actions based on the assessment.

Figure 20:
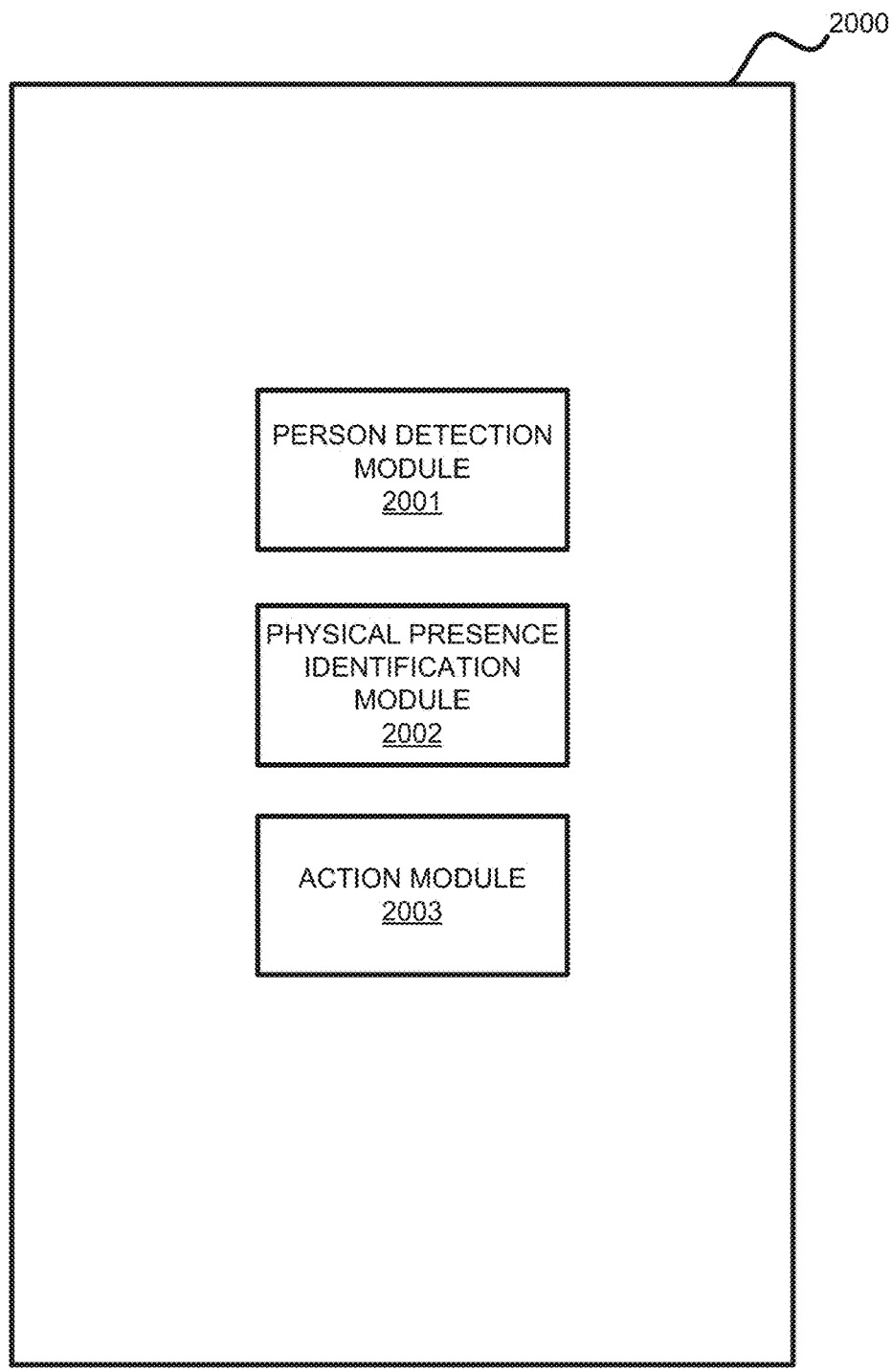
FIG. 20 illustrates an exemplary embodiment of a memory containing software modules for selecting an action based on a detected person consistent with the present disclosure.

FIG. 20 illustrates an exemplary embodiment of a memory 2000 containing software modules consistent with the present disclosure. Memory 200 may be included in apparatus 110 in lieu of or in combination with memory 550. In some embodiments, the software modules of memory 2000 may be combined with one or more software modules of memory 550 into one or more memories. Memory 2000 may store more or fewer modules than those shown in FIG. 20.

As illustrated in FIG. 20, included in memory 2000 are software instructions to execute a person detection module 2001, a physical presence identification module 2002, and action module 2003. Modules 2001, 2002, and 2003 may contain software instructions for execution by at least one processing device, e.g., processor 210, included in a wearable apparatus, e.g., wearable apparatus 110. In some embodiments, person detection module 2001, physical presence identification module 2002, and action module 2003 may cooperate to execute method 2200 of FIG. 22A, method 2230 of FIG. 22B, and/or method 2260 of FIG. 22C (or variants or combinations thereof).

Person detection module 2001 may be configured to analyze one or more images captured from a wearable apparatus to detect at least one person within the images. For example, person detection module 2001 may be configured to identify a subset of the captured data that includes at least one person. In some embodiments, person detection module 2001 may be configured to receive a plurality of images and to identify one or more of the plurality of images that include at least one person. For example, module 2001 may receive a plurality of images of an environment surrounding a user wearing the wearable apparatus 110 and identify which of the plurality of images, if any, include at least one person.

In some embodiments, such an analysis may be performed by employing a facial recognition algorithm designed to detect facial features (e.g., mouth, eyes, etc.), facial contours, body shape, or any other suitable identifying feature of a person. In other embodiments, the at least one person may be identified using a thermal signature algorithm designed to detect the presence of at least one person based on the heat generated by the at least one person. In such embodiments, the wearable apparatus 110 may capture thermal images, either alone or in combination with visual images, for processing by the thermal signature algorithm. In such embodiments, module 2001 (or another module not depicted) may align the thermal images with the visual images such that at least one person detected on a thermal image may then be identified on a corresponding visual image. Thermal recognition of the at least one person may be desirable in implementations in which the wearable device 110 is operating in reduced lighting situations.

In some embodiments, the at least one person may be identified through the application of one or more image classification techniques. For example, at least one image classification technique may be used to classify at least one feature of an image. In some embodiments, an image classification technique may include one or more of image enhancement, edge detection, image analysis, and data extraction. In some examples, the at least one person may be detected using a facial detection algorithm, using a neural network trained to detect faces and/or persons in images, and so forth. Specific examples of the methods for identifying at least one person are exemplary only, and a person of ordinary skill in the art will recognize other methods for identifying the at least one person that remain consistent with the present disclosure.

Physical presence identification module 2002 may be configured to receive one or more images of detected persons and further analyze the one or more images to determine whether the detected persons are physically present or visible on a display of a device. For example, module 2002 may receive one or more images in which person detection module 2001 has determined include at least one person and may identify if one or more persons of the at least one person are physically present and/or visible on a display of a device.

In some embodiments, physical presence and/or visibility on a screen of a detected person may be determined based on analysis of one or more images of the detected person. For example, one or more algorithms may analyze and/or compare one or more of detected facial features (e.g., mouth, eyes, etc.), facial contours, body shape, or any other suitable identifying feature of a person to determine whether the detected person was physically present in the one or more images or was visible on a display in the one or more images. For example, visibility on a display may cause one or more proportions of the detected person in the one or more images to differ from one or more expected proportions if the detected person were physically present. In some examples, visibility on a display may cause pixilation and/or other aberrations of the detected person in the one or more images to exceed one or more expected values of such aberrations if the detected person were physically present.

In some embodiments, physical presence and/or visibility on a screen of a detected person may be determined based on analysis of areas adjacent to or surrounding the detected person and/or in the background of the detected person. Such analysis may include determining whether the detected person is bordered by a frame or other surface, such as the edge of a display screen. In such instances, the analysis may include determining that certain features or parts (e.g., arms, legs, hands, feet, etc.) of the detected person do not continue beyond a surface or edge depicted and detected in one or more images captured by the wearable apparatus, such as for example, when only a person's face is shown on display screen, but the person's body is not present on the display. Such analysis may further or alternatively include comparing features or parts of the detected person to other areas of one or more captured images to determine whether the detected person is not fully visible in the captured images. In some examples, such analysis may indicate that a detected person is interacting with items known to be the environment of a wearer of the wearable apparatus (e.g., an item previously identified in the wearer's environment, and now associated with a detected person). For example, the wearer may have picked up a particular item (e.g., a cup of coffee) and held the item in his or her hand previously before setting the item down (e.g., on a table) or handing it to another person. Identification of the item in the hand of a detected person (or near the detected person) may contribute to or constitute a determination to that the detected person is physically present in the wearer's environment. Such a determination may further taken into an amount of time that has elapsed since the wearer or detected person held the item, interacted with the item, or otherwise encountered the item in his or her environment. For example, if the wearer held the item within a predetermined time period (e.g., within 5 seconds, within 10 seconds, within 30 seconds, within 45 seconds, within 1 minute, etc.) before or after the item was identified in association with a detected person, then physical presence identification module 2002 may determine that the detected person is in fact in the environment of the wearer.

In some embodiments, physical presence and/or visibility on a screen of a detected person may be determined based on analysis of one or more 3D images of the detected person. For example, a person visible on a screen may correspond to a flat surface in the 3D images, while a person which is physically present may correspond to a surface with convex and/or concave curves typical to a physical human body and/or face.

In some embodiments, physical presence identification module 2002 may be configured to receive one or more images, and analyze the one or more images using a detector configured to detect persons that are physically present and not to detect persons that are visible on a screen and/or in a photo. For example, the detector may comprise using a classifier that classifies images and/or regions of images as depicting people that are physically present. The classifier may be a result of a machine learning algorithm trained on training examples, where a training example may comprise images and a label of the desired result. For example, the classifier may comprise a neural network trained to detect persons that are physically present in images.

In some embodiments, physical presence identification module 2002 may be configured to receive one or more images, and analyze the one or more images using a detector configured to detect persons that are visible on a screen and/or in a photo and not to detect persons that are physically present. For example, the detector may comprise using a classifier that classifies images and/or regions of images as depicting people that are visible on a screen and/or in a photo. The classifier may be a result of a machine learning algorithm trained on training examples, where a training example may comprise images and a label of the desired result. For example, the classifier may comprise a neural network trained to detect persons that are visible on a screen and/or in a photo in images.

In some embodiments, physical presence and/or visibility on a screen of a detected person may be determined based on analysis of one or more images depicting the detected person. For example, regions of the images containing the detected person may be compared with regions of the images that do not contain the detected person, and the determination may be made based on the comparison results. For example, shadows may be detected in regions of the images containing the detected person and in regions of the images that do not contain the detected person, properties of the shadows, such as the angle of the shadow, may be compared, and the determination may be made based on the comparison results, for example determining that the detected person is physically present if and only if the angles match. For example, statistics about colors and/or edges may be collected from regions of the images containing the detected person and from regions of the images that do not contain the detected person, the statistics may be compared, and the determination may be made based on the comparison results.

In some embodiments, a determination as to whether or not a detected person is physically present may be based on a scoring or weighting approach in which certain cues (e.g., indicators tending to establish or not establish physical presence) are considered to determine whether or not a detected person is physically present or is depicted in an image on a display screen. As such, weights or scores may be assigned to one or more cues determined from image analysis, and physical presence identification module 2002 may use a cumulative weight value or score value for the one or more cues to make a determination (e.g., the cumulative weight value or score value exceeding a predetermined threshold may result in a determination that a detected person is or is not physically present with the wearer). Any combination of weighting and or scoring any one or more cues is contemplated and consistent with the disclosed embodiments.

In addition or in combination, certain rules or predetermined rule combinations may contribute to such determinations by physical presence identification module 2002. For example, if a detected person's hands and/or feet are visible in one or more captured images, and at least a portion of a background of the detected person includes an item known to be in the environment of the wearer of the wearable apparatus, physical presence identification module 2002 may conclude that the detected person is physically present in the wearer's environment. In contrast, if a detected person's hands and/or feet are not visible in one or more captured images, and at least a portion of a background of the detected person has no known commonality with the environment of the wearer of the wearable apparatus (e.g., no items known to be in the environment of the wearer), physical presence identification module 2002 may conclude that the detected person is not physically present in the wearer's environment and, instead, is visible on a display or in photograph. In some embodiments, any one of these example cues individually (e.g., that the detected person's hands and/or feet are or are not visible) may constitute a sufficient determination to arrive at a conclusion as to physical presence or a lack of physical presence.

Specific examples of the methods for determining whether a detected person is physically present or visible on a display are exemplary only, and a person of ordinary skill in the art will recognize other methods for identifying the at least one person that remain consistent with the present disclosure. In some examples, physical presence may be determined using an algorithm, using a neural network trained to detect physical presence in images, and so forth.

Action module 2003 may be configured to select one or more actions based on whether the detected person is physically present in the environment of the user and/or based on whether the detected person is visible on the display of the device. For example, action module 2003 may update at least one of a database and a social network profile based on information associated with a physical location of the wearable apparatus when the detected person is physically present. In such an example, a social network profile of the wearer may be updated with a new status indicating that the wearer interacted with the detected person at the physical location. By way of further example, action module 2003 may update a database or a social network based on information associated with at least one of a time and a date (e.g., a time or a date of capture of one or more images) when the detected person is visible on a display. In such an example, a social network profile of the wearer may be updated with a new status indicating that the wearer watched a particular television show, movie, or other source of the detected person at the time and/or the date.

Alternatively or concurrently to performing one or more actions such as those above, action module 2003 may identify, determine, and/or update one or more statistics based, at least in part, on whether the detected person is physically present in the environment of the user or visible on the display of the device. The one or more statistics may, alternatively or concurrently, be based, at least in part, on information associated with at least one of a time and a date and/or associated with a physical location of the wearable apparatus. Accordingly, in some embodiments, the statistics may be accumulated over physical locations and/or time frames.

In some embodiments, action module 2003 may cause the selected one or more actions to be executed by providing information (e.g., one or more instructions) to a device paired with the wearable apparatus (e.g., a smartphone) and/or by providing information (e.g., one more instructions) to a remote server (e.g., server 250) over a network. For example, action module 1704 may transmit one or more instructions to a paired device to update a social network profile displayed on a screen of the paired device to indicate that the user interacted with the detected person, watched a particular television show, or the like.

Modules 2001, 2002, and 2003 may be implemented in software, hardware, firmware, a mix of any of those, or the like. For example, if the modules are implemented in software, they may be stored, for example, in memory 550. However, in some embodiments, any one or more of modules 2001, 2002, and 2003 may, for example, be stored in processor 540 and/or located on server 250, which may include one or more processing devices. Processing devices of server 250 may be configured to execute the instructions of modules 2001, 2002, and 2003. In some embodiments, aspects of modules 2001, 2002, and 2003 may include software, hardware, or firmware instructions (or a combination thereof) executable by one or more processors, alone or in various combinations with each other. For example, modules 2001, 2002, and 2003 may be configured to interact with each other and/or other modules of server 250 and/or a wearable camera system to perform functions consistent with disclosed embodiments. In some embodiments, any of the disclosed modules may each include dedicated sensors (e.g., IR, image sensors, etc.) and/or dedicated application processing devices to perform the functionality associated with each module.

Figure 21A:
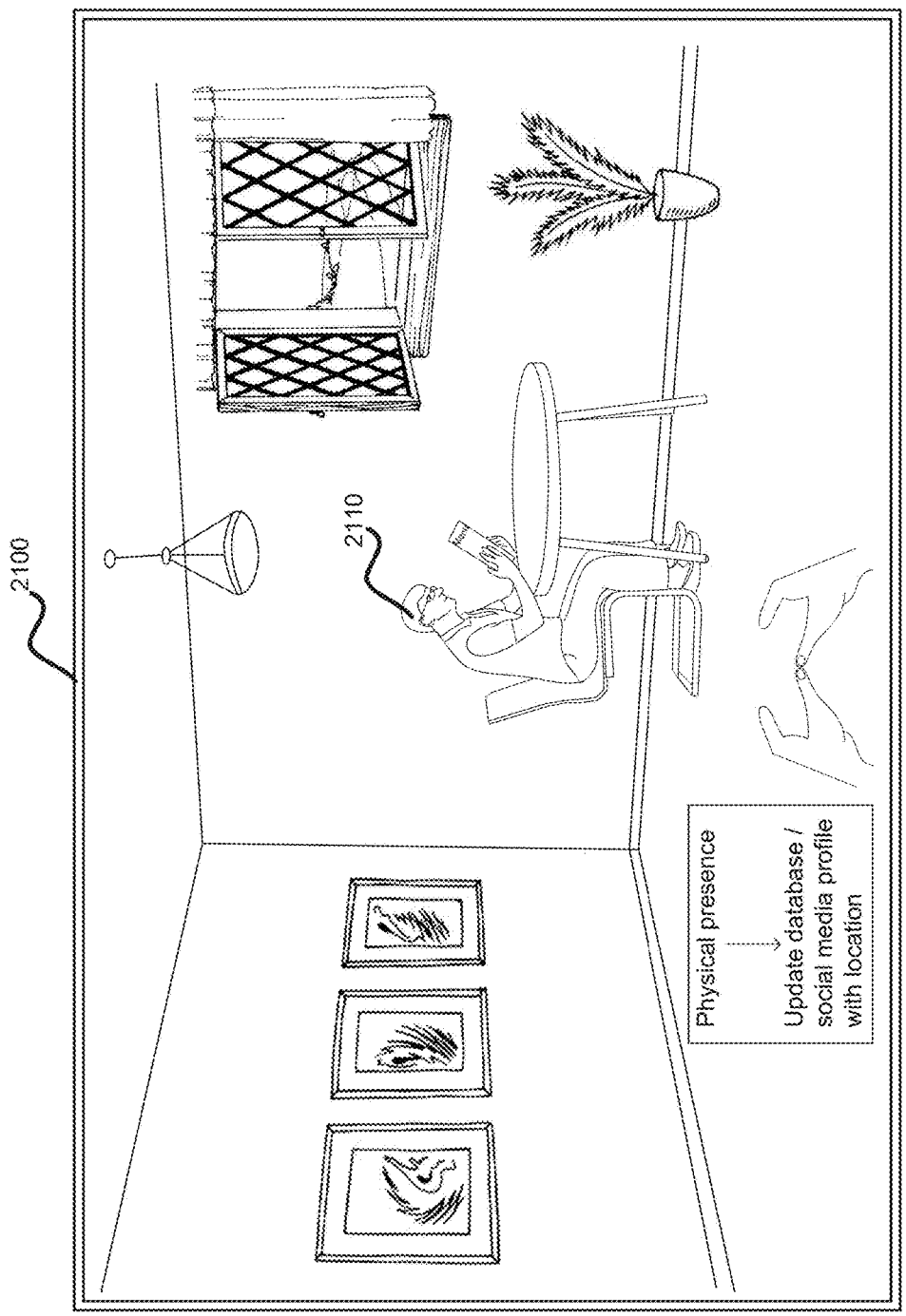
FIG. 21A is a schematic illustration of an example image captured by a wearable apparatus consistent with an embodiment of the present disclosure.

FIG. 21A is an illustration of an example image 2100 captured by a wearable apparatus, such as wearable apparatus 110. In the example of FIG. 21A, image 2100 contains a person 2110. In the example of FIG. 21A, wearable apparatus 110 may determine that person 2110 is physically present in the environment of the wearer of apparatus 110. This determination may be made using any one or more of the techniques discussed above in connection with FIG. 20. Based on this determination, wearable apparatus 110 may take one or more actions. For example, apparatus 110 may update a social network account associated with the wearer to indicate that the wearer was with person 2110, or the like. In such an example, apparatus 110 may include a physical location of apparatus 110 in the update (e.g., to indicate that the wearer was with person 2110 at the Starbucks on K St NW in Washington, D.C.).

Figure 21B:
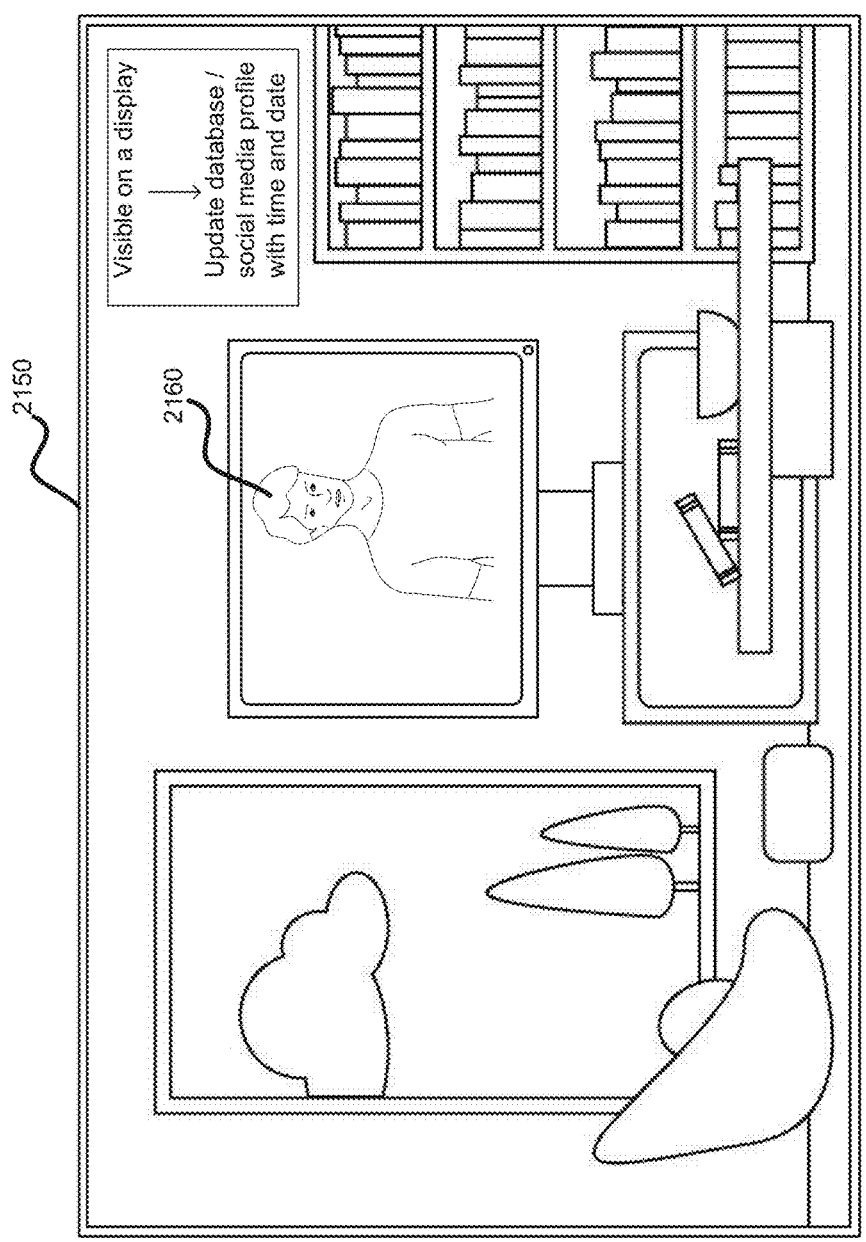
FIG. 21B is a schematic illustration of another example image captured by a wearable apparatus consistent with an embodiment of the present disclosure.

FIG. 21B is an illustration of another example image 2150 captured by a wearable apparatus, such as wearable apparatus 110. In the example of FIG. 21B, image 2150 contains a person 2160. In the example of FIG. 21B, wearable apparatus 110 may determine that person 2160 is visible on a display of a device in the environment of the wearer of apparatus 110. This determination may be made using any one or more of the techniques discussed above in connection with FIG. 20. For example, as depicted in FIG. 21B, person 2160 may be visible on a display of a television. In other examples, person 2160 may be visible on a display of a tablet, a display of a laptop, a display of a smartphone, or the like. In the example of FIG. 21B, wearable apparatus 110 may determine that person 2160 is visible in a photo.

Based on this determination, wearable apparatus 110 may take one or more actions. For example, apparatus 110 may update a social network account associated with the wearer to indicate that the wearer was watching person 2110 (or a television show or movie including person 211), or the like. In such an example, apparatus 110 may include at least one of a time and date in the update (e.g., to indicate that the wearer was watching Casablanca at 9:05 pm on Monday, October 16).

FIGS. 21A and 21B are examples of persons being detected and determined to be either physically present or visible on a display by wearable apparatus 110. As would be understood by one of ordinary skill in the art, wearable apparatus 110 may capture images throughout the user's day at a variety of locations as the environment surrounding the user changes. For example, images may be captured when the user visits a coffee shop to meet a friend, commutes to and from work, relaxes in a living room of the user's house, etc. In this way, wearable apparatus 110 may be configured to monitor the environment surrounding user 100 throughout the user's activities to identify exposure to one or more persons throughout the time user wears wearable apparatus 110, and then determine whether detected persons are physically present or visible on a display and take appropriate actions based on the determinations.

Figure 22A:
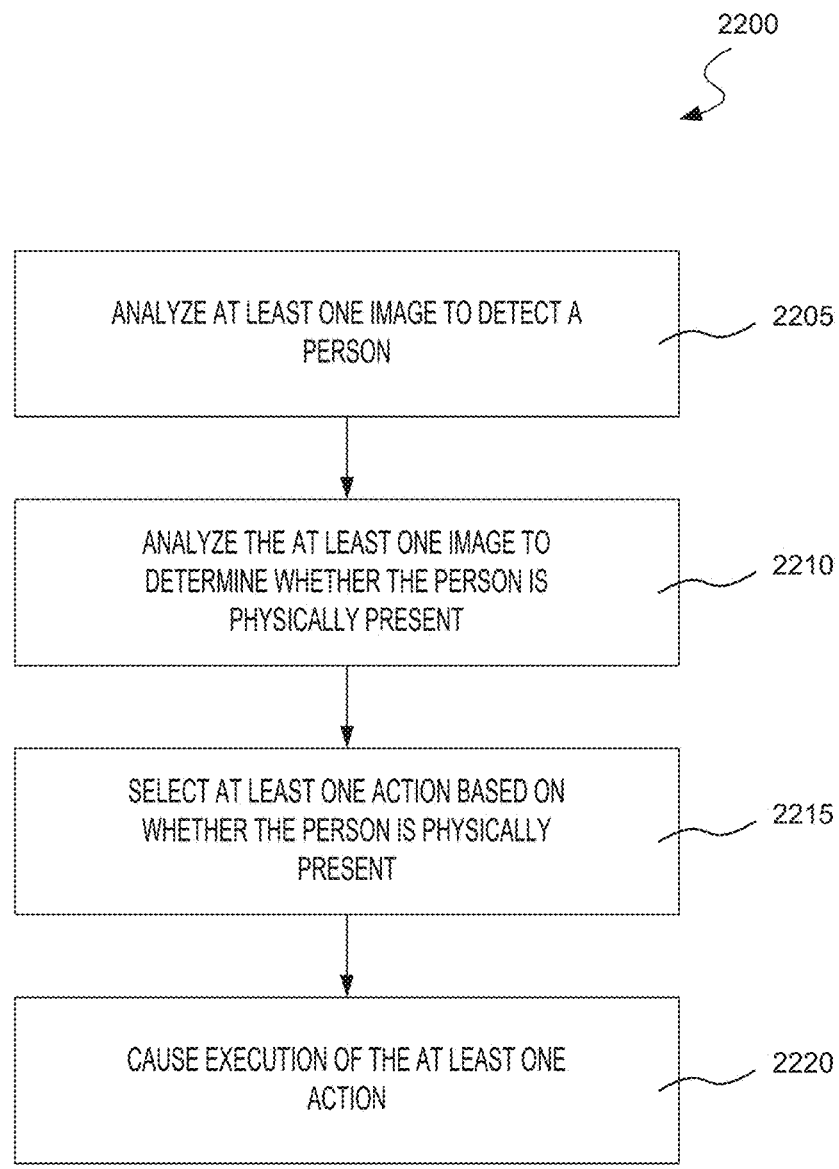
FIG. 22A is a flowchart of an example method for causing execution of an action based on physical presence of a detected person consistent with the present disclosure.

FIG. 22A illustrates a flowchart of an example method 2200 for causing execution of an action based on physical presence of a detected person. Method 2200 may be implemented by at least one processing device (e.g., processor 210 of wearable apparatus 110) and by a wearable image sensor (e.g., image sensor 220 of wearable apparatus 110) configured to capture a plurality of images from the environment of the user of the wearable apparatus.

At step 2205, the processing device may analyze at least one of the plurality of images to detect the person. For example, received image data may be processed by software steps executed by person detection module 2001. In some embodiments, the processing device may compare one or more regions of the at least one image against a database of known patterns and/or to determine whether a person is included in the one or more regions. Alternatively or concurrently, the processing device may apply one or more classifiers to the one or more regions, and the one or more classifiers may output whether a person is detected in the one or more regions. Still further, the processing device may execute one or more algorithms to detect facial features (e.g., mouth, eyes, etc.), facial contours, body shape, or any other suitable identifying feature of a person.

In some embodiments, the detection may be binary. In such embodiments, the comparison and/or classifiers may output true if a person is detected and false if a person is not detected. In other embodiments, the detection may be threshold-based. In such embodiments, the comparison and/or classifiers may output a percentage or other measurement of confidence that the one or more regions include a person. For example, the comparison may output a likelihood (e.g., a 58% likelihood) that the one or more regions include a person. By way of further example, the classifiers may output a score (e.g., a score of 8 out of 10) that the one or more regions include a person. In such embodiments, the processing device may use a threshold (e.g., at least 55%, at least 7 out of 10, etc.) to convert the output to a binary detection.

At step 2210, the processing device may analyze at least one of the plurality of images to determine whether the detected person is physically present in the environment of the user. For example, received image data may be processed by software steps executed by physical presence identification module 2002 executing any one or more of the techniques discussed above. Similar to step 2205, the processing device may compare one or more regions of the at least one image against a database of known patterns and/or images to make the determination. Alternatively or concurrently, the processing device may apply one or more classifiers to the one or more regions, and the one or more classifiers may output the determination. Accordingly, in some embodiments, the analysis may include selecting, in the at least one of the plurality of images, one or more regions located within a threshold distance from the detected person and analyzing the selected one or more regions. Additionally or alternatively, analyzing the at least one of the plurality of images to determine whether the person is physically present in the environment of the user may include analyzing whether the person is visible on a display of a device in the environment of the user of the wearable apparatus.

In some embodiments, a confidence score or the like may be associated with the determination. For example, the comparison may output the determination with a confidence score (e.g., a 64% confidence score). By way of further example, the classifiers may output the determination with a confidence score (e.g., a score of 4 out of 10). In such embodiments, the processing device may use a threshold (e.g., at least 55%, at least 7 out of 10, etc.) to finalize the determination. Alternatively or concurrently, the comparison and/or classifiers may output a first confidence score or the like associated with a determination that the detected person is physically present in the environment of the user and a second confidence score or the like associated with a determination that the detected person is visible on a display of a device in the environment of the user of the wearable apparatus. In such embodiments, the processing device may select the determination with the highest confidence score.

At step 2215, the processing device may select at least one action based on whether the detected person is physically present in the environment of the user. Selection of the at least one action may be facilitated via action module 2003. For example, the at least one action may include transmitting information associated with a physical location of the wearable apparatus, updating at least one of a database and a social network profile based on information associated with a physical location of the wearable apparatus; determining one or more statistics based, at least in part, on information associated with a physical location of the wearable apparatus; or the like. As an example, when the detected person is physically present in the environment of the user, the processing device may update a database and/or a social network profile with a record of the interaction between the user and the detected person. In such an example, the update may include a physical location of the wearable apparatus. Alternatively or concurrently, the update may include a time and/or a date of the interaction. In embodiments where the at least one action include determining one or more statistics, the processing device may update a count of persons associated with a physical location of the wearable apparatus and/or associated with a time and/or date of the interaction.

At step 2220, the processing device may cause the at least one selected action to be executed. In some embodiments, causing the at least one selected action to be executed may include sending information to a device paired with the wearable apparatus. A device paired with the wearable apparatus may include a smartphone, a tablet, a laptop, or the like. Accordingly, the processing device may send information to the paired device using a wired connection (such as a universal serial bus (USB), or the like), a direct wireless connection (such as Bluetooth®, or the like), and/or an indirect wireless connection (such as WiFi, 4G, or the like).

The transmitted information may include at least one of the plurality of images, one or more regions of at least one image (e.g., one or more regions used to detect a person and/or identify an attribute), one or more determinations of whether detected persons in the plurality of images are physically present or visible on a display, a physical location of the wearable apparatus, a time and/or a date of capture of the images, or the like. Furthermore, the transmitted information may allow the paired device to execute one or more selected actions. For example, the processing device may update at least one of a database and a social network profile based on information associated with a physical location of the wearable apparatus; determine one or more statistics based, at least in part, on information associated with a physical location of the wearable apparatus; or the like.

Method 2200 may further include additional steps. For example, the processing device may analyze at least one of the plurality of images to detect a second person. The detection of the second person may be performed as the detection of the first person in step 2205. Furthermore, method 2200 may further include analyzing at least one of the plurality of images to determine whether the second person is visible on a display of a device.

In some embodiments, one or more steps regarding the second person may be performed after steps 2205 to 2220 regarding the first person. In other embodiments, one or more steps regarding the second person may be interspersed with steps 2205 to 2220. For example, the processing device may detect the second person after detecting the first person but before determining whether the first person is physically present. By way of further example, the processing device may determine whether the second person is visible on a display of a device concurrently with determining whether the first person is physically present.

In some embodiments, method 2200 may include further basing the selection of the at least one action on whether the second person is visible on the display of the device. For example, if a first detected person is determined as physically present and a second detected person is determined as visible on a display, the processing device may update a database and/or a social network profile and include the first detected person in the update and omit the second detected person from the update, or the like. By way of further example, the processing device may update a first statistic based on the determination that the first detected person is physically present and update a second statistic based on the determination that the second detected person is visible on a display. In another example, based on the determination that the first detected person is physically present and the second detected person is visible on a display, the processing device may update a database and/or a social network profile with information regarding the interaction of wearer and the first detected person with the second person, for example indicating that the wearer and the first detected person are in a video conference with the second detected person.

Figure 22B:
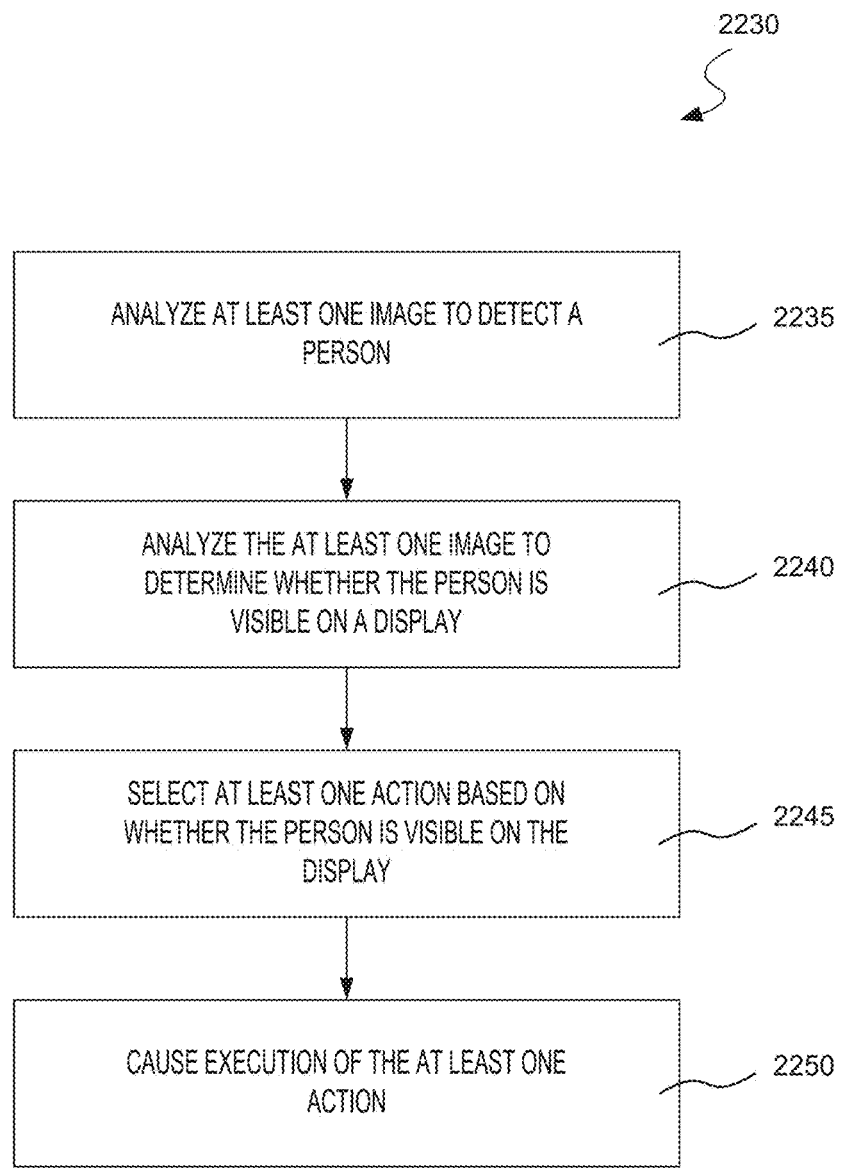
FIG. 22B is a flowchart of an example method for causing execution of an action based on whether a detected person is visible on a display consistent with the present disclosure.

FIG. 22B illustrates a flowchart of an example method 2230 for causing execution of an action based on whether a detected person is visible on a display of a device. Method 2230 may be implemented by at least one processing device (e.g., processor 210 of wearable apparatus 110) and by a wearable image sensor (e.g., image sensor 220 of wearable apparatus 110) configured to capture a plurality of images from the environment of the user of the wearable apparatus.

At step 2235, the processing device may analyze at least one of the plurality of images to detect the person. For example, received image data may be processed by software steps executed by person detection module 2001. In some embodiments, the processing device may compare one or more regions of the at least one image against a database of known patterns and/or to determine whether a person is included in the one or more regions. Alternatively or concurrently, the processing device may apply one or more classifiers to the one or more regions, and the one or more classifiers may output whether a person is detected in the one or more regions. Still further, the processing device may execute one or more algorithms to detect facial features (e.g., mouth, eyes, etc.), facial contours, body shape, or any other suitable identifying feature of a person.

In some embodiments, the detection may be binary. In such embodiments, the comparison and/or classifiers may output true if a person is detected and false if a person is not detected. In other embodiments, the detection may be threshold-based. In such embodiments, the comparison and/or classifiers may output a percentage or other measurement of confidence that the one or more regions include a person. For example, the comparison may output a likelihood (e.g., a 58% likelihood) that the one or more regions include a person. By way of further example, the classifiers may output a score (e.g., a score of 8 out of 10) that the one or more regions include a person. In such embodiments, the processing device may use a threshold (e.g., at least 55%, at least 7 out of 10, etc.) to convert the output to a binary detection.

At step 2240, the processing device may analyze at least one of the plurality of images to determine whether the detected person is visible on the display of the device. For example, received image data may be processed by software steps executed by physical presence identification module 2002 executing any one or more of the techniques discussed above. Similar to step 2235, the processing device may compare one or more regions of the at least one image against a database of known patterns and/or images to make the determination. Alternatively or concurrently, the processing device may apply one or more classifiers to the one or more regions, and the one or more classifiers may output the determination. Accordingly, in some embodiments, the analysis may include selecting, in the at least one of the plurality of images, one or more regions located within a threshold distance from the detected person and analyzing the selected one or more regions. Additionally or alternatively, analyzing the at least one of the plurality of images to determine whether the detected person is visible on the display of the device may include analyzing whether the detected person is physically present in the environment of the user of the wearable apparatus.

In some embodiments, a confidence score or the like may be associated with the determination. For example, the comparison may output the determination with a confidence score (e.g., a 64% confidence score). By way of further example, the classifiers may output the determination with a confidence score (e.g., a score of 4 out of 10). In such embodiments, the processing device may use a threshold (e.g., at least 55%, at least 7 out of 10, etc.) to finalize the determination. Alternatively or concurrently, the comparison and/or classifiers may output a first confidence score or the like associated with a determination that the detected person is visible on the display of the device and a second confidence score or the like associated with a determination that the detected person is physically present in the environment of the user of the wearable apparatus. In such embodiments, the processing device may select the determination with the highest confidence score.

At step 2245, the processing device may select at least one action based on whether the detected person is visible on the display of the device. Selection of the at least one action may be facilitated via action module 2003. For example, the at least one action may include transmitting information associated with at least one of a time and a date (e.g., a time and a date of capture of at least one of the plurality of images), updating a database or a social network based on information associated with at least one of a time and a date (e.g., a time and a date of capture of at least one of the plurality of images); identifying one or more statistics based, at least in part, on information associated with at least one of a time and a date (e.g., a time and a date of capture of at least one of the plurality of images); or the like. As an example, when the detected person is visible on the display of the device, the processing device may update a database and/or a social network profile with a television show, movie, or other media in which the detected person appears. In such an example, the update may include a time and/or a date of capture of the at least one image with the detected person. Alternatively or concurrently, the update may include a physical location associated with the wearable apparatus. In embodiments where the at least one action include identifying one or more statistics, the processing device may update a count of displays (or television shows or movies or the like) associated with a time and/or a date of capture of the at least one image with the detected person and/or associated with a physical location of the wearable apparatus.

At step 2250, the processing device may cause the at least one selected action to be executed. In some embodiments, causing the at least one selected action to be executed may include sending information to a device paired with the wearable apparatus. A device paired with the wearable apparatus may include a smartphone, a tablet, a laptop, or the like. Accordingly, the processing device may send information to the paired device using a wired connection (such as a universal serial bus (USB), or the like), a direct wireless connection (such as Bluetooth®, or the like), and/or an indirect wireless connection (such as WiFi, 4G, or the like).

The transmitted information may include at least one of the plurality of images, one or more regions of at least one image (e.g., one or more regions used to detect a person and/or identify an attribute), one or more determinations of whether detected persons in the plurality of images are visible on the display or physically present, a physical location of the wearable apparatus, a time and/or a date of capture of the images, or the like. Furthermore, the transmitted information may allow the paired device to execute one or more selected actions. For example, the processing device may update at least one of a database and a social network profile based on information associated with a time and/or a date; identify one or more statistics based, at least in part, on information associated with a time and/or a date; or the like.

Method 2230 may further include additional steps. For example, the processing device may analyze at least one of the plurality of images to determine that the detected person is visible on the display device and is taking part in a video conference and further base the selection of the at least one action on the determination that the detected person is visible on the display device and is taking part in the video conference. In such an example, the processing device may update a database and/or a social network profile with a record of the video conference in which the detected person appears. In such an example, the update may include a time and/or a date of the videoconference.

By way of additional example, the processing device may analyze at least one of the plurality of images to determine that the detected person is included in at least one of a video image and a still image and further base the selection of the at least one action on the determination that the detected person is included in at least one of a video image and a still image. For example, if the detected person is included in a video image, the processing device may then analyze at least one of the plurality of images to determine that the detected person is visible on the display device and is taking part in a video conference. Alternatively or concurrently, the processing device may update a database and/or a social network profile with a television show, movie, or other media in which the detected person appears. In such an example, the update may include a time and/or a date of capture of the at least one image with the detected person. In other embodiments, if the detected person is included in a still image, the processing device may update a database and/or a social network profile with a record of the image in which the detected person appears. Alternatively, the processing device may take no action.

In another example, the processing device may analyze at least one of the plurality of images to detect a second person. The detection of the second person may be performed as the detection of the first person in step 2235. Furthermore, method 2230 may further include analyzing at least one of the plurality of images to determine whether the second person is physically present in the environment of the user.

In some embodiments, one or more steps regarding the second person may be performed after steps 2235 to 2250 regarding the first person. In other embodiments, one or more steps regarding the second person may be interspersed with steps 2235 to 2250. For example, the processing device may detect the second person after detecting the first person but before determining whether the first person is visible on the display of the device. By way of further example, the processing device may determine whether the second person is physically present in the environment of the user concurrently with determining whether the first person is visible on the display of the device.

In some embodiments, method 2230 may include further basing the selection of the at least one action on whether the second person is physically present in the environment of the user. For example, if a first detected person is determined as visible on the display and a second detected person is determined as physically present, the processing device may update a database and/or a social network profile and include the second detected person in the update and omit the first detected person from the update, or the like. By way of further example, the processing device may update a first statistic based on the determination that the first detected person is visible on the display and update a second statistic based on the determination that the second detected person is physically present.

Figure 22C:
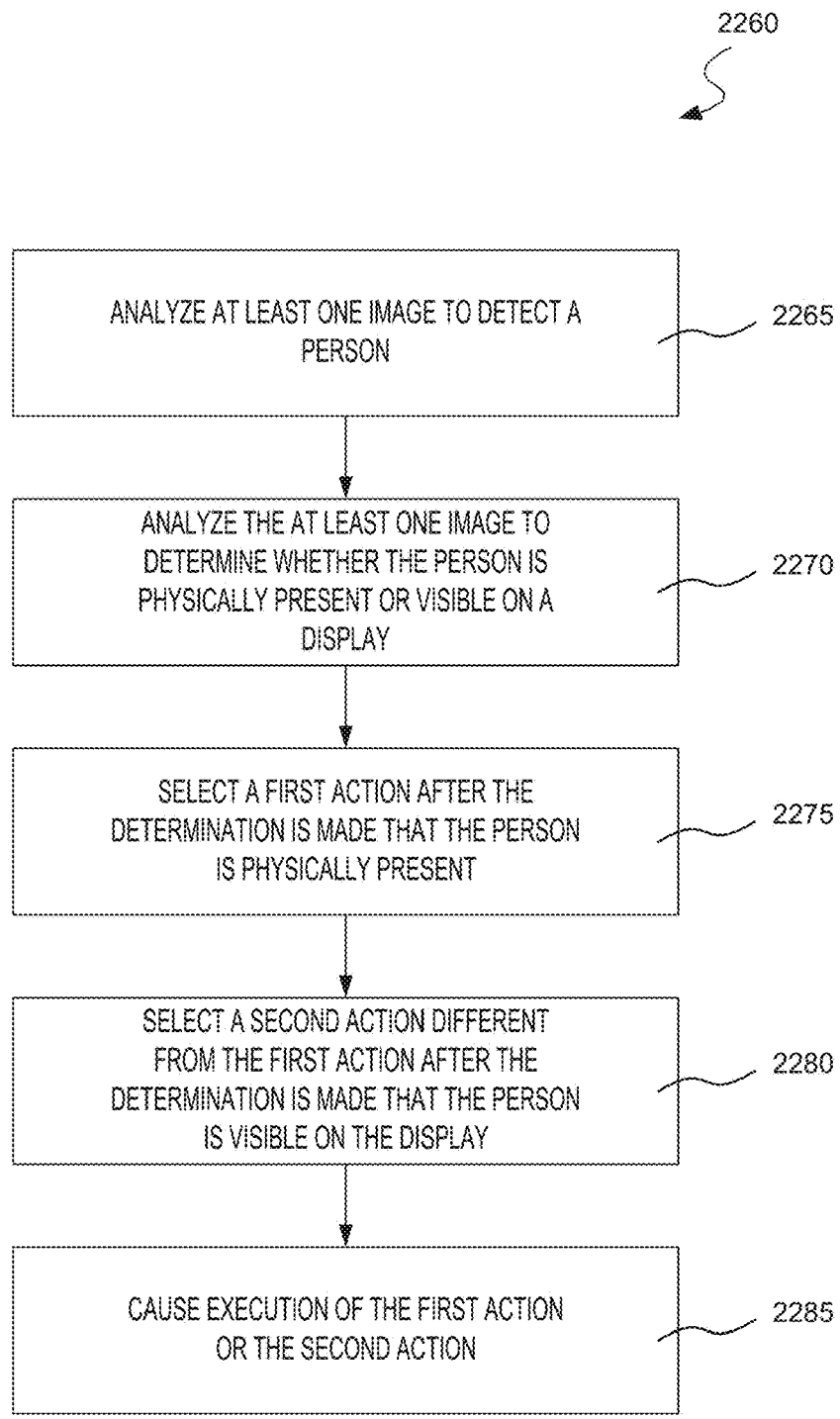
FIG. 22C is a flowchart of another example method for causing execution of an action based on physical presence of a detected person consistent with the present disclosure.

FIG. 22C illustrates a flowchart of an example method 2260 for causing execution of an action based on physical presence of a detected person. Method 2260 may be implemented by at least one processing device (e.g., processor 210 of wearable apparatus 110) and by a wearable image sensor (e.g., image sensor 220 of wearable apparatus 110) configured to capture a plurality of images from the environment of the user of the wearable apparatus.

At step 2265, the processing device may analyze at least one of the plurality of images to detect the person. For example, received image data may be processed by software steps executed by person detection module 2001. In some embodiments, the processing device may compare one or more regions of the at least one image against a database of known patterns and/or to determine whether a person is included in the one or more regions. Alternatively or concurrently, the processing device may apply one or more classifiers to the one or more regions, and the one or more classifiers may output whether a person is detected in the one or more regions. Still further, the processing device may execute one or more algorithms to detect facial features (e.g., mouth, eyes, etc.), facial contours, body shape, or any other suitable identifying feature of a person.

In some embodiments, the detection may be binary. In such embodiments, the comparison and/or classifiers may output true if a person is detected and false if a person is not detected. In other embodiments, the detection may be threshold-based. In such embodiments, the comparison and/or classifiers may output a percentage or other measurement of confidence that the one or more regions include a person. For example, the comparison may output a likelihood (e.g., a 58% likelihood) that the one or more regions include a person. By way of further example, the classifiers may output a score (e.g., a score of 8 out of 10) that the one or more regions include a person. In such embodiments, the processing device may use a threshold (e.g., at least 55%, at least 7 out of 10, etc.) to convert the output to a binary detection.

At step 2270, the processing device may analyze at least one of the plurality of images to determine whether the detected person is physically present in the environment of the user or whether a graphical representation of the detected person appears in the environment of the user. For example, received image data may be processed by software steps executed by physical presence identification module 2002 executing any one or more of the techniques discussed above. Similar to step 2265, the processing device may compare one or more regions of the at least one image against a database of known patterns and/or images to make the determination. Alternatively or concurrently, the processing device may apply one or more classifiers to the one or more regions, and the one or more classifiers may output the determination. Accordingly, in some embodiments, the analysis may include selecting, in the at least one of the plurality of images, one or more regions located within a threshold distance from the detected person and analyzing the selected one or more regions.

In some embodiments, a confidence score or the like may be associated with the determination. For example, the comparison may output the determination with a confidence score (e.g., a 64% confidence score). By way of further example, the classifiers may output the determination with a confidence score (e.g., a score of 4 out of 10). In such embodiments, the processing device may use a threshold (e.g., at least 55%, at least 7 out of 10, etc.) to finalize the determination. Alternatively or concurrently, the comparison and/or classifiers may output a first confidence score or the like associated with a determination that the detected person is physically present in the environment of the user and a second confidence score or the like associated with a determination that a graphical representation of the detected person appears in the environment of the user. In such embodiments, the processing device may select the determination with the highest confidence score.

At step 2275, the processing device may select a first action after the determination is made that the detected person is physically present in the environment of the user. Selection of the first action may be facilitated via action module 2003. For example, the first action may include transmitting information associated with a physical location of the wearable apparatus, updating at least one of a database and a social network profile based on information associated with a physical location of the wearable apparatus; determining one or more statistics based, at least in part, on information associated with a physical location of the wearable apparatus; or the like. As an example, when the detected person is physically present in the environment of the user, the processing device may update a database and/or a social network profile with a record of the interaction between the user and the detected person. In such an example, the update may include a physical location of the wearable apparatus. Alternatively or concurrently, the update may include a time and/or a date of the interaction. In embodiments where the first action include determining one or more statistics, the processing device may update a count of persons associated with a physical location of the wearable apparatus and/or associated with a time and/or date of the interaction.

At step 2280, the processing device may select a second action different from the first action after the determination is made that the graphical representation of the detected person appears in the environment of the user. Selection of the second action may be facilitated via action module 2003. For example, the second action may include transmitting information associated with at least one of a time and a date (e.g., a time and a date of capture of at least one of the plurality of images), updating a database or a social network based on information associated with at least one of a time and a date (e.g., a time and a date of capture of at least one of the plurality of images); identifying one or more statistics based, at least in part, on information associated with at least one of a time and a date (e.g., a time and a date of capture of at least one of the plurality of images); or the like. As an example, when the graphical representation of the detected person appears in the environment of the user, the processing device may update a database and/or a social network profile with a television show, movie, or other media in which the graphical representation appears. In such an example, the update may include a time and/or a date of capture of the at least one image with the detected person. Alternatively or concurrently, the update may include a physical location associated with the wearable apparatus. In embodiments where the second action include identifying one or more statistics, the processing device may update a count of displays (or television shows or movies or the like) associated with a time and/or a date of capture of the at least one image with the detected person and/or associated with a physical location of the wearable apparatus.

In addition, the first action and/or the second action may include taking no action. Accordingly, the wearable apparatus 110 may take no action if the detected person is physically present in the environment of the user and/or if a graphical representation of the detected person appears in the environment of the user. Accordingly, wearable apparatus may only update at least one of a database and a social network profile, determine or identify one or more statistics or the like when the detected person is physically present in the environment of the user and/or if a graphical representation of the detected person appears in the environment of the user.

At step 2285, the processing device may cause the first action or the second action to be executed. In some embodiments, causing the first action or the second action to be executed may include sending information to a device paired with the wearable apparatus. A device paired with the wearable apparatus may include a smartphone, a tablet, a laptop, or the like. Accordingly, the processing device may send information to the paired device using a wired connection (such as a universal serial bus (USB), or the like), a direct wireless connection (such as Bluetooth®, or the like), and/or an indirect wireless connection (such as WiFi, 4G, or the like).

The transmitted information may include at least one of the plurality of images, one or more regions of at least one image (e.g., one or more regions used to detect a person and/or identify an attribute), one or more determinations of whether detected persons in the plurality of images are visible on the display or physically present, a physical location of the wearable apparatus, a time and/or a date of capture of the images, or the like. Furthermore, the transmitted information may allow the paired device to execute one or more selected actions. For example, the processing device may update at least one of a database and a social network profile based on information associated with a time and/or a date; identify one or more statistics based, at least in part, on information associated with a time and/or a date; or the like.

Method 2260 may further include additional steps. For example, any of the additional steps of method 2230 and/or method 2200 may be included in method 2260.

Updating Profile Information for a Person Viewed by Multiple Wearable Apparatuses In some embodiments, a plurality of persons may use a plurality of wearable apparatuses, such as wearable apparatus 110, and a profile associated with a particular person may be updated using information from one or more of the plurality of wearable apparatuses. In some embodiments in which the profile is updated based on information from a plurality of wearable apparatuses, the profile may be considered to be a joint profile as the profile may reflect information collected and/or updated from the plurality of wearable apparatuses.

In certain aspects, the profile may be stored and updated on a server and/or on a shared storage and/or on a shared database to which the information from the one or more wearable apparatuses is sent. In doing so, embodiments consistent with the present disclosure may address the technical problem of extracting, collating, and indexing information from a plurality of wearable apparatuses and keeping the information updated such that it remains useful rather than stale, out-of-date, and/or inaccurate. Further, collecting and leveraging data from multiple wearable apparatuses may contribute to an approved accuracy of a particular person's profile. For example, updates to the profile may be more frequent and therefore are more likely to be accurate and complete. Moreover, the improved accuracy and completeness of the profile may provide for the delivery or relevant news, advertisements, or the like to the person associated with the profile. Embodiments of the present disclosure may address this problem through techniques for managing information extracted or determined from images of multiple wearable devices and properly indexing and storing the extracted or determined information in a database of profiles.

Although discussed herein in association with a profile related to a particular person, the disclosed systems and methods may equally apply to updating and/or managing a profile related to an object or a place.

Figure 23:
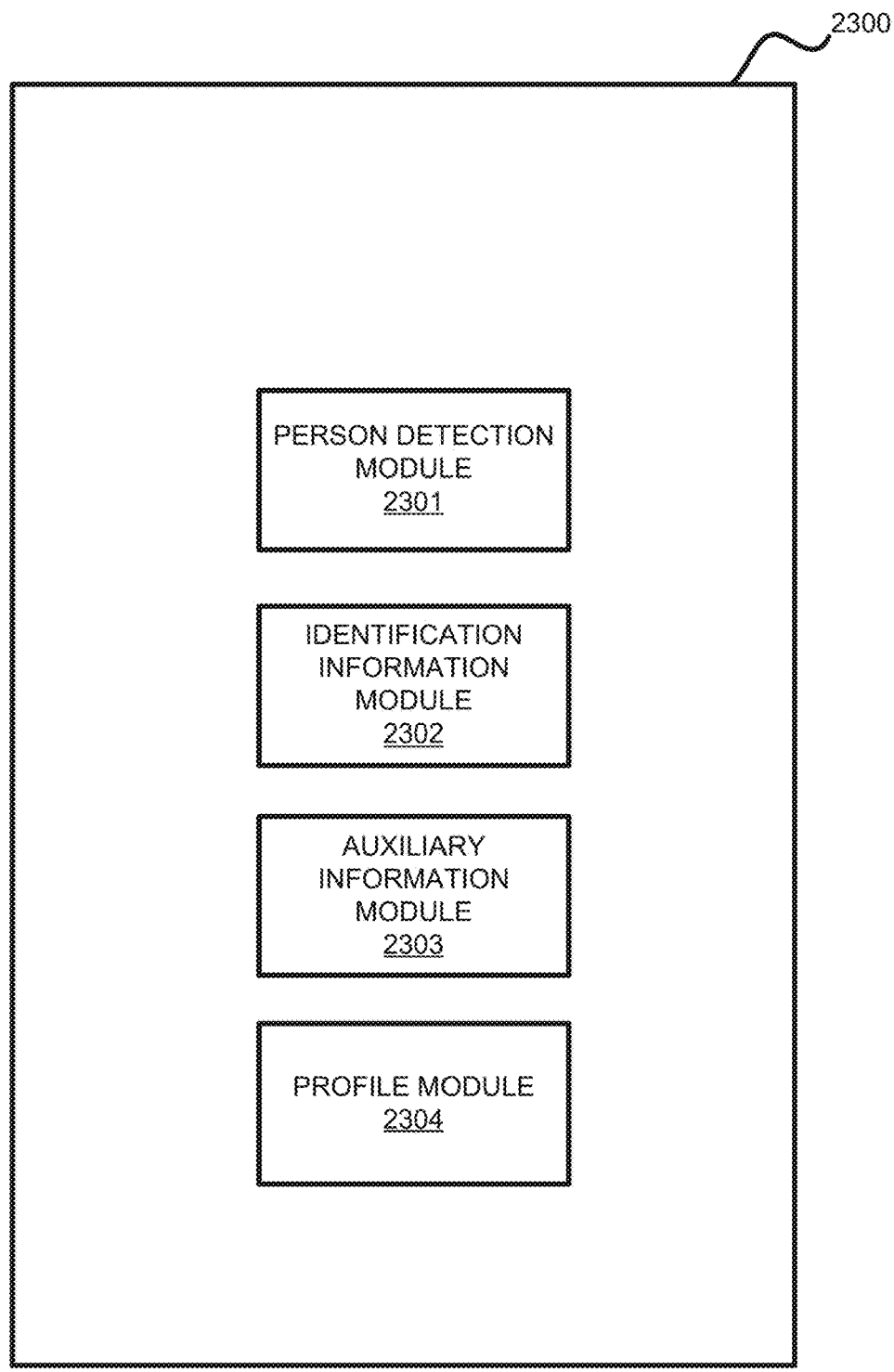
FIG. 23 illustrates an exemplary embodiment of a memory containing software modules for updating profile information based on data collected by a wearable apparatus consistent with the present disclosure.

FIG. 23 illustrates an exemplary embodiment of a memory 2300 containing software modules consistent with the present disclosure. Memory 2300 may be included in apparatus 110 in lieu of or in combination with memory 550. In some embodiments, one or more software modules of memory 2300 may be stored in a remote server, e.g., server 250. Memory 2300 may store more or fewer modules than those shown in FIG. 23.

As illustrated in FIG. 23, included in memory 2300 are software instructions to execute a person detection module 2301, an identification information module 2302, an auxiliary information module 2303, and a profile module 2304. Modules 2301, 2302, 2303, and 2304 may contain software instructions for execution by at least one processing device, e.g., one or more processes, included in a remote server, e.g., server 250. In some embodiments, person detection module 2301, identification information module 2302, auxiliary information module 2303, and profile module 2304 may cooperate to execute method 2500 (or a variant thereof) of FIG. 25.

Person detection module 2301 may be configured to analyze one or more images captured from a wearable apparatus to detect at least one person within the images. For example, person detection module 2301 may be configured to identify a subset of the captured data that includes at least one person. In some embodiments, person detection module 2301 may be configured to receive a plurality of images and to identify one or more of the plurality of images that include at least one person. For example, module 2301 may receive a plurality of images of an environment surrounding a user wearing wearable apparatus 110 and identify which of the plurality of images include at least one person.

In some embodiments, such an analysis may be performed by employing a facial recognition algorithm designed to detect facial features (e.g., mouth, eyes, etc.), facial contours, body shape, or any other suitable identifying feature of a person. In other embodiments, the at least one person may be identified using a thermal signature algorithm designed to detect the presence of at least one person based on the heat generated by the at least one person. In such embodiments, the wearable apparatus 110 may capture thermal images, either alone or in combination with visual images, for processing by the thermal signature algorithm. Thermal recognition of the at least one person may be desirable in implementations in which the wearable device 110 is operating in reduced lighting situations. In some embodiments, the at least one person may be identified through the application of one or more image classification techniques. For example, at least one image classification technique may be used to classify at least one feature of an image. In some embodiments, an image classification technique may include one or more of image enhancement, edge detection, image analysis, and data extraction. Specific examples of the methods for identifying at least one person are exemplary only, and a person of ordinary skill in the art will recognize other methods for identifying the at least one person that remain consistent with the present disclosure. In some examples, the at least one person may be detected using a facial detection algorithm, using a neural network trained to detect faces and/or persons in images, and so forth.

Identification information module 2302 may be configured to obtain identification information associated with the detected persons. For example, identification information may include a name, birthday, or other real life indicator of the detected person and/or may include an identification number, a username, or other artificial (optionally anonymous) indicator of the detected person. In some embodiments, the identification information may comprise a plurality of indicators.

In some embodiments, identification information of a detected person may be obtained based on analysis of one or more images of the detected person. For example, one or more algorithms may analyze one or more of detected facial features (e.g., mouth, eyes, etc.), facial contours, body shape, or any other suitable identifying feature of a person to determine one or more indicators associated with the detected person. In another example, identification information module 2302 may obtain identification information through facial recognition. Identification information module 2302 may then access a database included, for example, in remote server 250 and/or a database accessible over a network in order to search for and retrieve information related to the detected person.

In some embodiments, identification information module 2302 may apply at least one hashing function on at least part of at least one image of the detected person captured by the wearable image sensor to obtain a hash value of the detected person. Accordingly, obtaining the identification information may include obtaining a hash value associated with the detected person and accessing a plurality of hash values to determine the existence of a hash value associated with the detected person based on the obtained hash value. In some embodiments, then, a plurality of hash values may be stored in a lookup database, which may be separate from or form a part of the database of profiles.

In some examples, the at least part of at least one image of the detected person may comprise at least one image of a face of the detected person. By hashing the face (or any other portion of at least one image) of the detected person, identification information module 2302 may allow for indexing and lookup of the detected person in the database without compromising the anonymity of the detected person. Accordingly, in such embodiments, even if the hash value of the detected person were intercepted, for example, while traveling across a computer network, the identity of the detected person may remain hidden from the intercepting party.

In some examples, the at least one hashing function may comprise obtaining an identifier of a person (such as a unique identifier, a nearly unique identifier, a name, a login name, a user name from a social network, and so forth), for example using a person recognition algorithm and/or facial recognition algorithm, and evaluating a hash function on the unique identifier. Examples of such hash functions may include a cryptographic hash function, a perfect hash function, a nonlinear table lookup hash function, and so forth. In some examples, the at least one hashing function may comprise projecting the image of the detected person (or of the face of the detected person) to an n-dimensional space to obtain an n-dimensional vector, quantizing the n-dimensional vector, and using the resulting quantized n-dimensional vector as a hash value and/or evaluating a hash function on the quantized n-dimensional vector. In some cases, the projection function may be the result of training a machine learning dimensional reduction algorithm on training examples, where a training example may comprise an image of a person and/or a face with a desired n-dimensional vector and/or indication of desired distance and/or proximity to other data-points in the n-dimensional space.

Auxiliary information module 2303 may be configured to obtain auxiliary information associated with the detected person. For example, auxiliary information module 2303 may obtain position information, a capture time of at least one of the one or more images, information associated with a user of the wearable image sensor (e.g., identification information associated with the user, one or more images of the user, or the like).

Alternatively or concurrently, auxiliary information may be obtained from analysis of the one or more images of the detected person. For example, auxiliary information module 2303 may analyze one or more of detected facial features, facial contours, body position, or the like to determine an emotional state of the detected person and/or a facial expression of the detected person. In another example, auxiliary information module 2303 may analyze the one or more images to determine information associated with a distance (e.g., a measurement of the distance, a direction of the distance, etc.) of the wearable image sensor to the detected person. In some embodiments, auxiliary information may be obtained from analysis of one or more images of other detected persons. Accordingly, the auxiliary information may include information related to a second person appearing in the one or more images with the detected person. For example, auxiliary information module 2303 may analyze one or more of detected facial features, facial contours, body position, or the like to obtain information associated with at least one other person. In certain aspects, the detected person and the at least one other detected person may be detected in the same image.

Alternatively or concurrently, auxiliary information may be obtained from input to a wearable apparatus. For example, auxiliary information module 2303 may receive at least one of audio topics and video topics from the wearable apparatus (or from user input into the wearable apparatus). Similarly, an emotional state of the detected person, a facial expression of the detected person, and/or information associated with at least one other person may be obtained from user input into the wearable apparatus.

Moreover, the auxiliary information may directly include at least part of an image. For example, at least part of an image of the one or more images of the detected person may be included in the auxiliary information. Alternatively or concurrently, at least part of an image of the one or more images of other detected persons may be included in the auxiliary information.

In some embodiments, auxiliary information module 2303 may be configured to receive one or more images of detected persons and further analyze the one or more images to obtain at least one property associated with the detected person (e.g., age, gender, weight, height, facial expression, emotional state, etc.) associated with the identified persons.

In some embodiments, the at least one property of a detected person may be determined based on further analysis of one or more images of the detected person. For example, one or more algorithms may analyze one or more of detected facial features (e.g., mouth, eyes, etc.), facial contours, body shape, or any other suitable identifying feature of a person to estimate or determine information such as a the detected person's age, gender, weight, height, facial expression, emotional state, etc.

In some embodiments, auxiliary information module 2303 may determine an identity of a detected person (e.g., through facial recognition) or receive identification information from identification information module 2302, and then access one or more databases (stored, e.g., locally in a memory of wearable apparatus 110 and/or accessible remotely over a network, e.g., such as by accessing server 250) to retrieve at least one property of the detected person. For example, after identifying a detected person as a particular individual (e.g., determining a match based on facial recognition to a known person's image), auxiliary information module 2303 may access a database to retrieve information about the detected person, such as the detected person's age, gender, family members, friends, etc.

In some embodiments, the auxiliary information may include information related to at least one item associated with the detected person. For example, auxiliary information module 2303 may analyze one or more regions of the one or more images to identify the at least one item. In some embodiments, the regions may include regions within a particular distance of the detected person. In some embodiments, the at least one item may include a product appearing in the one or more images with the detected person. For example, auxiliary information module 2303 may compare at least a portion of the one or more regions to known patterns and/or images to identify the product. Alternatively or concurrently, auxiliary information module 2303 may use one or more classifiers on the one or more regions to identify the product.

In some embodiments, the auxiliary information may include information related to an action performed by the detected person. For example, using one or more comparisons to known patterns and/or images and/or using one or more classifiers, auxiliary information module 2303 may identify an action being performed by the detected person. In such an example, auxiliary information module 2303 may identify the detected person as cheering if a facial expression of the detected person matches known images and/or patterns of people cheering and/or is identified as an image of cheering by one or more classifiers trained to recognize people cheering.

Profile module 2304 may be configured to identify, in a database storing a plurality of profiles, a profile associated with the detected person based on the identification information and update the identified profile based on the auxiliary information. For example, profile module 2304 may identify the profile using at least a portion of the identification information. The profile may be included in a database indexed by identification information. Accordingly, in some embodiments, profile module 2304 may use an indicator determined by identification information module 2302 and query an index of indicators to identify the profile associated with the detected person. Alternatively or concurrently, profile module 2304 may query the identification information against the profiles directly (e.g., by performing a fuzzy search of images in the profiles against at least a portion of the one or more images of the detected person) to identify the profile associated with the detected person. Alternatively or concurrently, profile module 2304 may use a hash value, such as a hash value calculated by identification information module 2302, to select a profile.

In some embodiments, profile module 2304 may update the profile by adding at least a portion of the auxiliary information to the profile. Additionally or alternatively, profile module 2304 may update the profile by adding at least a portion of the identification information to the profile. For example, profile module 2304 may store at least a portion of the one or more images of the detected person and/or at least a portion of one or more images of other detected persons in the profile. In another example, profile module 2304 may store an emotional state of the detected person, a facial expression of the detected person, information associated with at least one other person, position information, a capture time of at least one of the one or more images, information associated with a user of the wearable image sensor, or other portions of the auxiliary information (and/or identification information) in the profile.

Alternatively or additionally, profile module 2304 may update the profile based on the auxiliary information (and/or the identification information). For example, information associated with a user of the wearable image sensor may be used to update a network of social connections of the detected person stored within the profile. By way of further example, an emotional state of the detected person and/or a facial expression of the detected person may be used to update an emotional timeline of the detected person stored within the profile.

In some embodiments, profile module 2304 may also provide information based on the identified profile. For example, profile module 2304 may provide the information to a device paired with the wearable apparatus (e.g., a smartphone or tablet) and/or may provide the information to a remote server (e.g., server 250) over a network. For example, profile module 2304 may transmit information from the identified profile to a paired device to alert a user of the wearable apparatus of the name of the detected person. In another example, profile module 2304 may transmit a determined emotional state of the detected person to alert the user that the detected person is feeling sad and may desire comforting.

Modules 2301, 2302, 2303, and 2304 may be implemented in software, hardware, firmware, a mix of any of those, or the like. For example, if the modules are implemented in software, they may be stored, for example, in memory 550. However, in some embodiments, any one or more of modules 2301, 2302, 2303, and 2304 may, for example, be stored in processor 540 and/or located on server 250, which may include one or more processing devices. Processing devices of server 250 may be configured to execute the instructions of modules 2301, 2302, 2303, and 2304. In some embodiments, aspects of modules 2301, 2302, 2303, and 2304 may include software, hardware, or firmware instructions (or a combination thereof) executable by one or more processors, alone or in various combinations with each other. For example, modules 2301, 2302, 2303, and 2304 may be configured to interact with each other and/or other modules of server 250 and/or a wearable camera system to perform functions consistent with disclosed embodiments. In some embodiments, any of the disclosed modules may each include dedicated sensors (e.g., IR, image sensors, etc.) and/or dedicated application processing devices to perform the functionality associated with each module.

Figure 24:
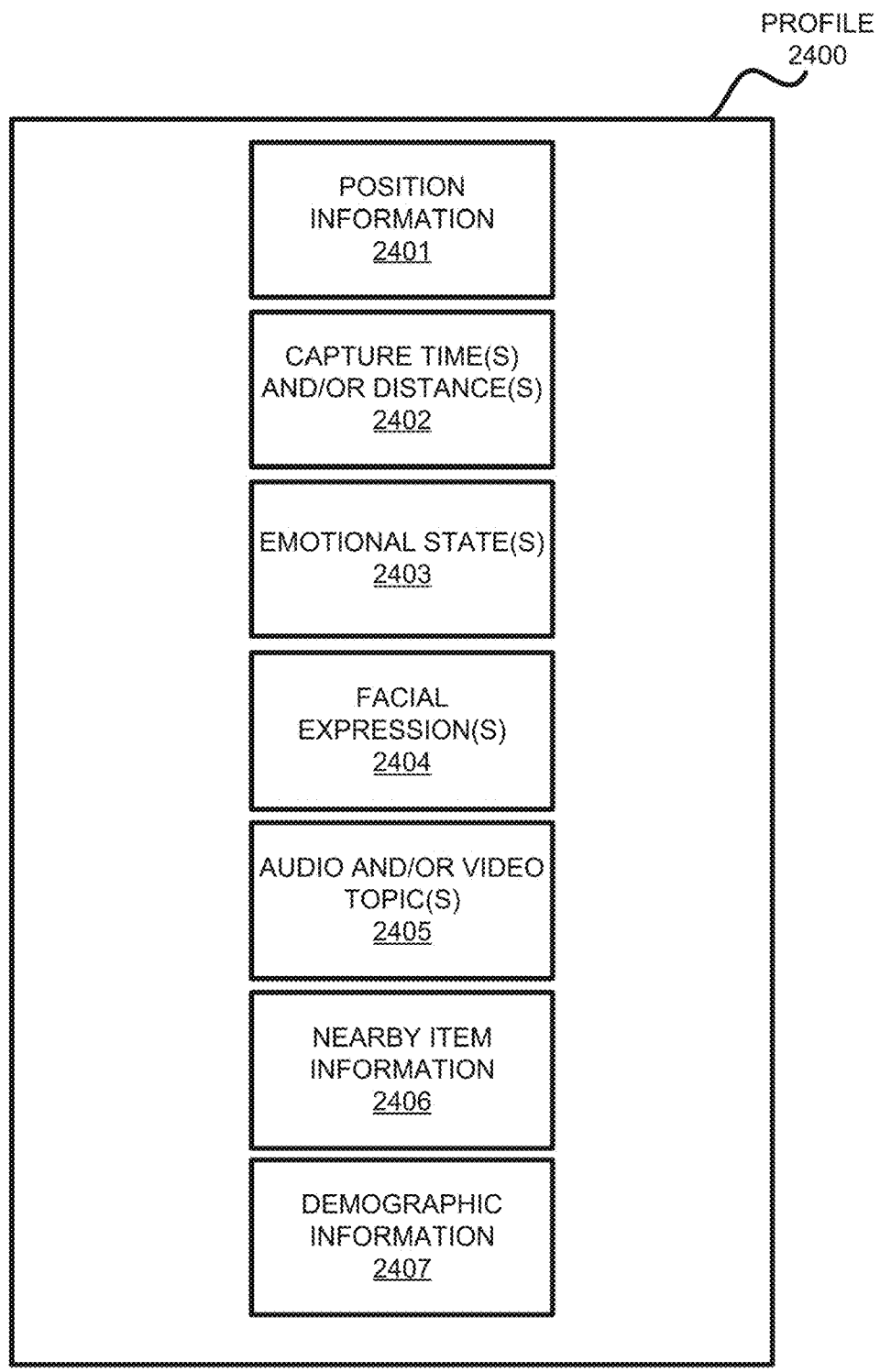
FIG. 24 is a schematic illustration of a profile stored in a database, consistent with an embodiment of the present disclosure.

FIG. 24 is an illustration of an example profile 2400 associated with a person. In some embodiments, at least some of the information stored in profile 2400 may include or be based upon information collected by one or more wearable apparatuses, such as wearable apparatus 110.

As would be understood by one of ordinary skill in the art, wearable apparatus 110 may capture images throughout a user's day at a variety of locations as the environment surrounding the user changes. In this way, wearable apparatus 110 may be configured to capture information related to the user and/or various detected persons. Disclosed embodiments may use the captured information to construct profiles associated with the user and/or detected persons and index those profiles within one or more databases.

In the example of FIG. 24, profile 2400 includes position information 2401. For example, position information 2401 may include indicators of locations in which a person was detected by one or more wearable apparatuses. For example, position information 2401 may include indicators that the person was detected in zip code 20001; at the Starbucks on New York Ave NW; at particular GPS coordinates; at a street address; in a particular country, city, state, and/or county; at a particular landmark; or the like.

As further illustrated in FIG. 24, profile 2400 may include times and/or distances 2402 related to the capture of one or more images of the person. For example, profile 2400 may include information such as the person being imaged at a particular date and/or time, such as at 4:30 pm on Tuesday, November 9; at 21:16 on Halloween 2018; or the like. Further, as other examples, such information may include distances between persons or between person and objects as determined from captured images.

Profile 2400 may further include emotional states 2403 and/or facial expressions 2404 of the person. For example, emotional states may include information and/or images reflected observed emotional states (e.g., happy, sad, etc.) determined from analysis of one or more images. In some embodiments, such information may be correlated with dates and/or times at which the emotional state was observed. Similarly, facial expressions may include information and/or images reflecting observed facial expressions (e.g., smiling, frowning, etc.) determined from analysis of one or more images. In some embodiments, such information may be correlated with dates and/or times at which the facial expression was observed.

As further illustrated in FIG. 24, profile 2400 may include audio topics and/or video topics 2405 associated with the person. In some embodiments, audio topics may have been determined through analysis of audio data recorded by a microphone included a wearable apparatus. Similarly, in some embodiments, video topics may have been determined through analysis of video data captured by an image sensor included a wearable apparatus.

In addition, profile 2400 may include information about nearby items 2406. Such information may be determined through analysis of one or more images captured by a wearable apparatus. As explained above in reference to auxiliary information module 2303, the nearby items may include products within a vicinity of a person included in an image and/or a user of a wearable apparatus.

In some embodiments, profile 2400 may include demographic information 2407. For example, estimates of age, height, weight, gender, socioeconomic status, or the like may be included in profile 2400.

Although profile 2400 include the foregoing exemplary information, profile 2400 may include any information collected related to a particular person, object, or location. In some embodiments, at least some of the information stored in profile 2400 includes and/or is based upon information collected by one or more wearable apparatus. Such collected information may include any combination of images, video, and audio, and/or or any information derived from analysis of any combination of images, video, and audio.

In some embodiments, profile 2400 may be stored in a server, in a shared storage device, in a distributed database, in a blockchain, and so forth.

Figure 25:
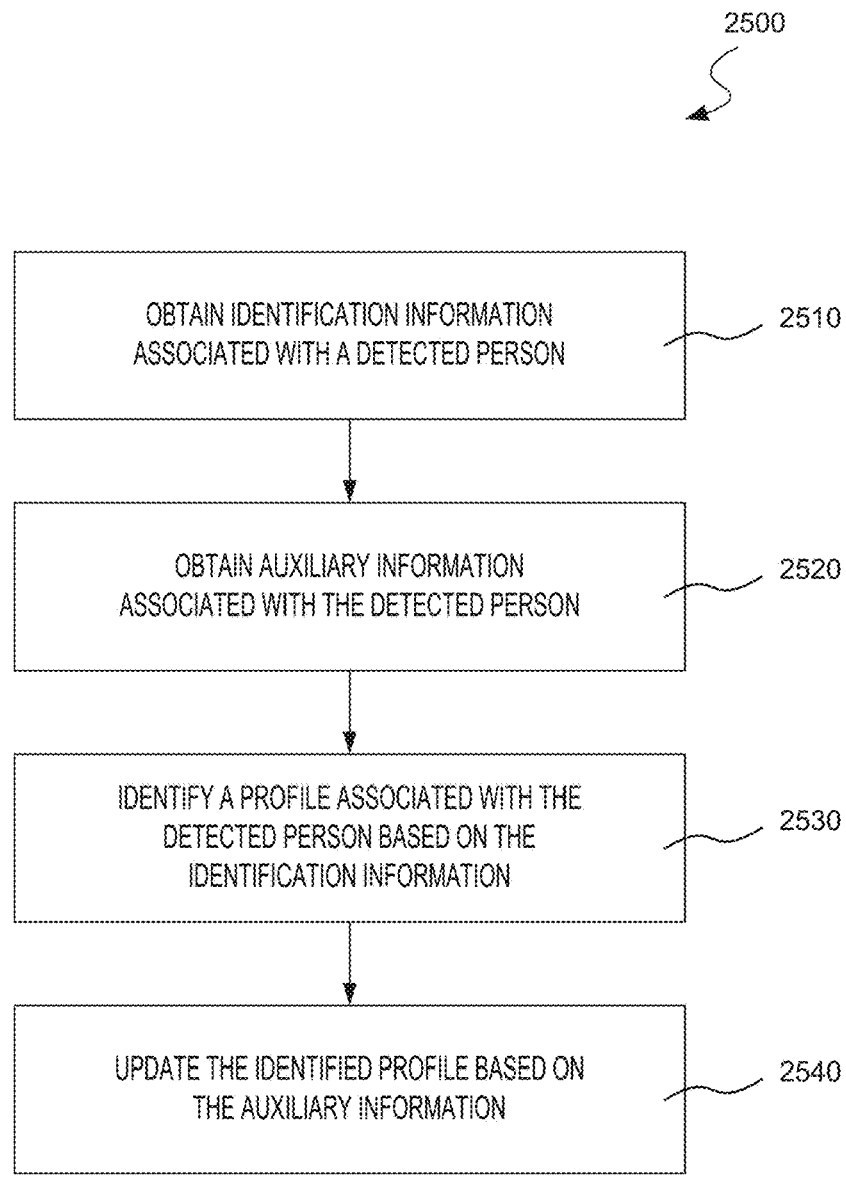
FIG. 25 is a flowchart of an example method for updating profile information based on data collected by a wearable apparatus consistent with the present disclosure.

FIG. 25 illustrates a flowchart of an example method 2500 for updating profile information based on data collected by a wearable apparatus. Method 2500 may be implemented by at least one processing device (e.g., one or more processors of server 250) receiving information from one or more wearable image sensors (e.g., image sensor 220 of wearable apparatus 110) configured to capture a plurality of images from the environment of the user(s) of the wearable apparatus(es).

At step 2510, the processing device may obtain identification information associated with a person detected in one or more images captured by a wearable image sensor included in the wearable apparatus. For example, received image data may be processed by software steps executed by person detection module 2301 and/or identification information module 2302. In some embodiments, the detection may include comparing one or more regions of the at least one image against a database of known patterns and/or images to determine whether a person is included in the one or more regions. Alternatively or concurrently, the detection may include applying one or more classifiers to the one or more regions, and the one or more classifiers may output whether a person is detected in the one or more regions. Still further, the detection may include using one or more algorithms to detect facial features (e.g., mouth, eyes, etc.), facial contours, body shape, or any other suitable identifying feature of a person. In some embodiments, the detection may be performed by a separate processing device. For example, the detection may be performed by processor 210 of wearable apparatus 110, and obtaining identification information associated with the detected person may be performed by one or more processors of server 250. In some embodiments, detecting and person and obtaining identification information associated with the detected person may be performed in a single device, for example by processor 210 of wearable apparatus 110, by server 250, and so forth.

In some embodiments, the identification information may include a name, birthday, or other real life indicator of the detected person and/or may include an identification number, a username, or other artificial (optionally anonymous) indicator of the detected person. In some embodiments, the identification information may comprise a plurality of indicators. In some embodiments, the identification information may comprise a hash value, such as a hash value calculated by identification information module 2302.

In some embodiments, identification information of a detected person may be obtained based on analysis of one or more images of the detected person. Similar to the detection, the processing device may compare one or more regions of the at least one image against a database of known patterns and/or images to obtain the identification information. Alternatively or concurrently, the processing device may apply one or more classifiers to the one or more regions, and the one or more classifiers may output the identification information. For example, as discussed earlier, one or more algorithms may extract one or more of detected facial features (e.g., mouth, eyes, etc.), facial contours, body shape, or any other suitable identifying feature of a person as the identification information.

In some embodiments, obtaining the identification information may include searching a lookup database, which may be separate from or form a part of a database of profiles, for identification information using one or more extracted features of the one or more images, as described above. In such embodiments, obtaining the identification information may include obtaining a hash value associated with the detected person and accessing a plurality of hash values to determine the existence of a hash value associated with the detected person based on the obtained hash value. Accordingly, the lookup database may include and/or be indexed by a plurality of hash values. In one example, the at least part of at least one image of the detected person may comprise at least one image of a face of the detected person.

At step 2520, the processing device may obtain, for example from the wearable apparatus, auxiliary information associated with the detected person. For example, received image data may be processed by software steps executed by auxiliary information module 2303 to produce the auxiliary information. In another example, step 2520 may comprise receiving the auxiliary information produced by auxiliary information module 2303.

In some embodiments, the auxiliary information may include at least one of position information, a capture time of at least one of the one or more images, and information associated with a user of the wearable image sensor (e.g., identification information associated with the user, one or more images or the user, or the like). Alternatively or concurrently, the auxiliary information may be obtained from analysis of the one or more images of the detected person. For example, the auxiliary information may include at least one of an emotional state of the detected person and a facial expression of the detected person. In another example, the auxiliary information may include information associated with a distance (e.g., a measurement of the distance, a qualitative label of the distance such as "far" or "near," or the like) of the wearable image sensor to the detected person.

In some embodiments, the auxiliary information may be obtained from analysis of one or more images of other detected persons. For example, the auxiliary information may include information associated with at least one other person detected in the one or more images and/or information related to a second person appearing in the one or more images with the detected person (e.g., identification information associated with the at least one other person and/or the second person, one or more images of the at least one other person and/or the second person, or the like). In some examples, the detected person and the at least one other detected person may be detected in the same image.

Alternatively or concurrently, the auxiliary information may be obtained from input to the wearable apparatus. For example, the processing device may receive at least one of audio topics and video topics from the wearable apparatus (or from user input into the wearable apparatus). Similarly, an emotional state of the detected person, a facial expression of the detected person, information associated with at least one other person, and/or information related to the second person may be obtained from user input into the wearable apparatus.

Moreover, the auxiliary information may directly include at least part of an image. For example, at least part of an image of the one or more images of the detected person may be included in the auxiliary information. Alternatively or concurrently, at least part of an image of one or more images of the at least one other person and/or the second person may be included in the auxiliary information.

In some embodiments, obtaining auxiliary information may include receiving one or more images of a detected person and further analyzing the one or more images to obtain at least one property associated with the detected person (e.g., age, gender, weight, height, facial expression, emotional state, etc.). In some embodiments, this analysis may be performed by a separate processing device. For example, the analysis may be performed by processor 210 of wearable apparatus 110, and the output may be received (and thus obtained as the auxiliary information) by one or more processors of server 250.

In some embodiments, the analysis may include applying one or more algorithms to analyze one or more of detected facial features (e.g., mouth, eyes, etc.), facial contours, body shape, or any other suitable identifying feature of a person to estimate or determine information such as a the detected person's age, gender, weight, height, facial expression, emotional state, etc. In some embodiments, the detected person be identified (e.g., through facial recognition), and the auxiliary information including at least one property may be obtained from one or more databases (stored, e.g., locally in a memory of wearable apparatus 110 and/or accessible remotely over a network, e.g., such as by accessing server 250).

In some embodiments, obtaining auxiliary information may include receiving one or more images of a detected person and further analyzing the one or more images to identify the at least one item associated with the detected person. For example, the analysis may include analysis of one or more regions of the one or more images to identify the at least one item. The regions may, for example, include regions within a particular distance of the detected person. In some embodiments, the analysis may further include identifying the at least one item as a product. For example, the analysis may include compare at least a portion of the one or more regions to known patterns and/or images to identify the product. Alternatively or concurrently, one or more classifiers may be used on the one or more regions to identify the product. In some embodiments, these analyses may be performed by a separate processing device. For example, the analysis to identify the at least one item and/or the analysis to identify the at least one item as a product may be performed by processor 210 of wearable apparatus 110, and the output may be received (and thus obtained as the auxiliary information) by one or more processors of server 250.

In some embodiments, the auxiliary information may include information related to an action performed by the detected person. For example, obtaining the auxiliary informing may include using one or more comparisons to known patterns and/or images and/or using one or more classifiers to identify an action being performed by the detected person. In some embodiments, this analysis may be performed by a separate processing device. For example, the analysis may be performed by processor 210 of wearable apparatus 110, and the output may be received (and thus obtained as the auxiliary information) by one or more processors of server 250.

In some embodiments, the auxiliary information may include at least one property associated with the detected person. Similar to step 2510, the processing device may compare one or more regions of the at least one image against a database of known patterns and/or images to determine the at least one property. Alternatively or concurrently, the processing device may apply one or more classifiers to the one or more regions, and the one or more classifiers may output the attribute. For example, as discussed earlier, one or more algorithms may analyze one or more of detected facial features (e.g., mouth, eyes, etc.), facial contours, body shape, or any other suitable identifying feature of a person to estimate or determine information such as a the detected person's age, gender, weight, height, facial expression, emotional state, etc. In some embodiments, this analysis may be performed by a separate processing device. For example, the analysis may be performed by processor 210 of wearable apparatus 110, and the output may be received (and thus obtained as the auxiliary information) by one or more processors of server 250.

At step 2530, the processing device may identify, in the database, a profile associated with the detected person based on the identification information. Identifying the profile may be facilitated by software steps executed by profile module 2304. For example, the processing device may identify the profile using an indicator included in the identification information and query an index of indicators to identify the profile associated with the detected person. Alternatively or concurrently, the processing device may query the identification information against the profiles directly (e.g., by performing a fuzzy search of names in the profiles against one or more names and/or partial names included in the obtained identification information) to identify the profile associated with the detected person.

At step 2540, the processing device may update the identified profile based on the auxiliary information. For example, the processing device may update the profile by adding at least a portion of the auxiliary information to the profile. Additionally or alternatively, the processing device may update the profile by adding at least a portion of the identification information to the profile. For example, the processing device may store at least a portion of one or more names associated with the detected person in the profile. In another example, the processing device may store an emotional state of the detected person, a facial expression of the detected person, information associated with a second person, position information, a capture time of at least one of the one or more images, information associated with a user of the wearable image sensor, or other portions of the auxiliary information (and/or identification information) in the profile.

Alternatively or additionally, the processing device may update the profile based on the auxiliary information (and/or the identification information). For example, information associated with at least one other detected person may be used to update a network of social connections of the detected person stored within the profile. By way of further example, information associated with at least one other detected person may be used to update a calendar of social interactions, business interactions, or the like stored within profile.

In some embodiments, the processing device may provide information based on the identified profile. For example, the processing device may provide the information to a device (e.g., a server, a computer, a smartphone, a tablet, etc.) or may transmit the information to an address (e.g., an email address) or a network address. In some embodiments, the device to which the information is provided may be paired with a wearable apparatus. A device paired with the wearable apparatus may include a smartphone, a tablet, a laptop, or the like. Accordingly, the processing device may send information to a device using a wired connection (such as a universal serial bus (USB), or the like), a direct wireless connection (such as Bluetooth®, or the like), and/or an indirect wireless connection (such as WiFi, 4G, or the like).

In some embodiments, the transmitted information may include at least a portion of the identification information, at least a portion of the auxiliary information, at least a portion of the profile, or the like.

Method 2500 may further include additional steps. For example, the processing device may obtain, from a second wearable apparatus, additional auxiliary information associated with the detected person, the additional auxiliary information being based on a second set of one or more images captured by the second wearable image sensor. The obtaining of additional auxiliary information associated with the detected person may be performed similar to the obtaining of the auxiliary information in step 2520. Furthermore, method 2500 may further include updating the profile of the detected person based on the additional auxiliary information. The updating of the profile based on the additional auxiliary information may be performed similar to the updating of the profile in step 2540.

Determining a Level of Information Detail Provided to a User

In some embodiments, wearable apparatus 110 may collect information related to at least one person detected in an environment of the user of the wearable apparatus 110. The wearable apparatus 101 may then determine what level of detail (e.g., how much) of information to provide to the user about the detected person. Some existing wearable device systems may encounter the technical problem of how to process the information collected by the wearable device and use that information to provide useful feedback to the user. For example, certain existing systems may capture images that include people in the user's environment, but given the increasing quantity of publicly available data about individuals and the likelihood that the majority of the available data is not of interest to the user, fail to provide information pertinent to the user (e.g., information that the user finds useful or of interest). Some of the presently disclosed embodiments, on the other hand, may address this problem by assigning affinity measurements to a degree of a relationship between the identified person and the user to determine what information and/or level of information to provide to the user.

For example, in one embodiment, the affinity measurement may be based on a relationship in a social network between the user of the wearable apparatus 110 and the detected person in the captured image. As a further example, in one embodiment, the user may not receive any information related to a stranger with whom the user has no social relationship, but may receive a name and affiliation for a person in a common social group, and a name and common friends for second degree connections. In this way, presently disclosed embodiments may address the technical problems associated with parsing out information useful to a user in view of the large quantity of data acquired by the wearable device and publicly available.

Figure 26:
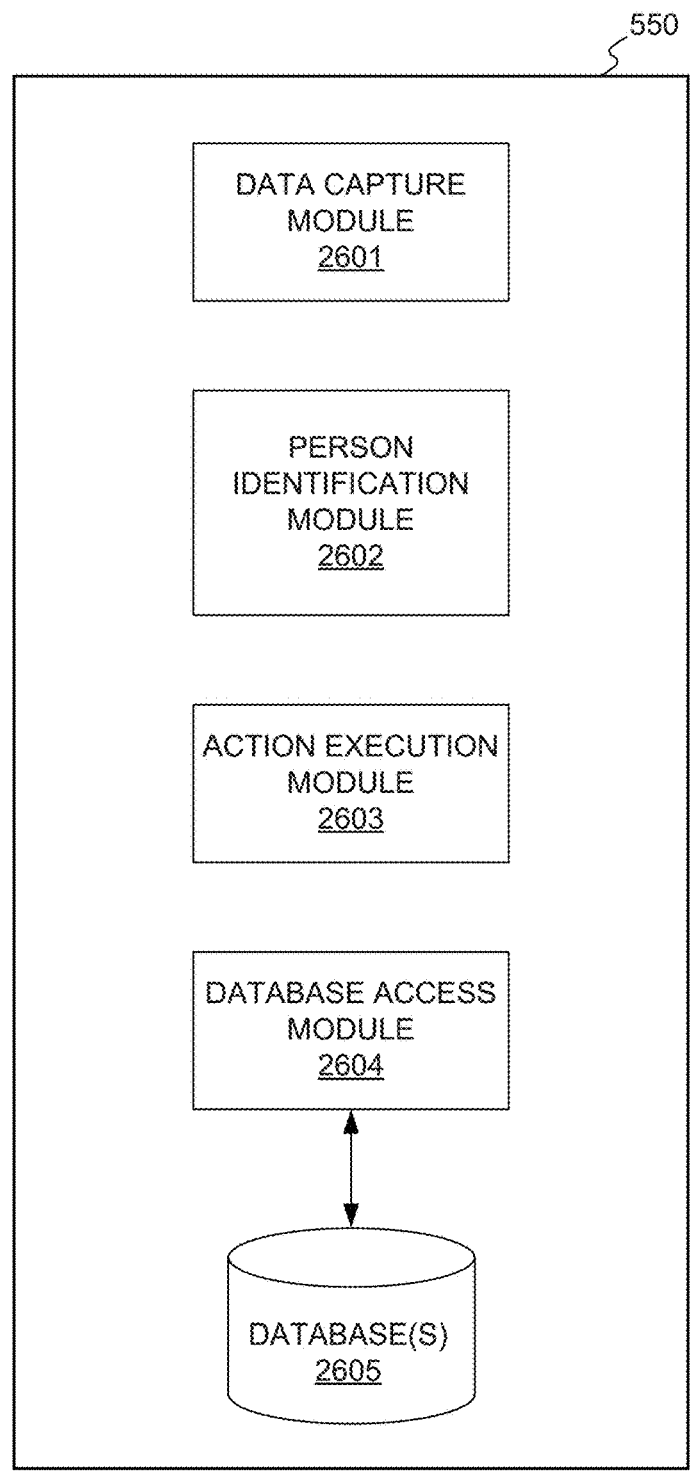
FIG. 26 illustrates an exemplary embodiment of a memory containing software modules consistent with the present disclosure.

FIG. 26 is a diagram illustrating an example of memory 550 storing a plurality of modules, consistent with the disclosed embodiments. The modules may be executable by at least one processing device to perform various methods and processes disclosed herein. Memory 550 may store more or fewer modules than those shown in FIG. 26.

As illustrated in FIG. 26, memory 550 may store software instructions to execute a data capture module 2601, a person identification module 2602, an action execution module 2603, a database access module 2604, and may also include database(s) 2605. Data capture module 2601 may include software instructions for receiving data from wearable apparatus 110. Person identification module 2602 may include software instructions for analyzing data obtained by wearable apparatus 110 to identify subsets of the captured data including at least one person and information associated with the at least one person. Action execution module 2603 may include software instructions to cause the occurrence of an action based on the information associated with the at least one person identified in the acquired data. Database access module 2604 may include software instructions executable to interact with database(s) 2605, to store and/or retrieve information.

Data capture module 2601 may include software instructions for receiving data from a wearable apparatus, such as a wearable camera system. Data received from a wearable camera system may include audio and image data, captured, by, for example, an image sensor or microphone associated with the wearable camera system. Image data may include raw images and may include image data that has been processed. Raw images may be provided, for example, in the form of still images and video data, either with or without embedded metadata. In some embodiments, image data and audio data may be preprocessed prior to capture by data capture module 2601. Preprocessing may include, for example, noise reduction, artifact removal, compression, and other image pre-processing techniques.

Person identification module 2602 may be configured to analyze data captured by data capture module 2601 to detect or identify a subset of the captured data that includes at least one person. In some embodiments, module 2602 may be configured to receive a plurality of images and to identify one or more of the plurality of images that include at least one person. For example, module 2602 may receive a plurality of images of an environment surrounding a user wearing the wearable device 110 and identify which of the plurality of images include at least one person.

In some embodiments, such an analysis may be performed by employing a facial recognition algorithm designed to detect facial features (e.g., mouth, eyes, etc.), facial contours, body shape, or any other suitable identifying feature of a person. In other embodiments, the at least one person may be identified using a thermal signature algorithm designed to detect the presence of at least one person based on the heat generated by the at least one person. In such embodiments, the wearable device 110 may capture thermal images, either alone or in combination with visual images, for processing by the thermal signature algorithm. Thermal recognition of the at least one person may be desirable in implementations in which the wearable device 110 is operating in reduced lighting situations. In some embodiments, the at least one person may be identified through the application of one or more image classification techniques. For example, at least one image classification technique may be used to classify at least one feature of an image. In some embodiments, an image classification technique may include one or more of image enhancement, edge detection, image analysis, and data extraction. Specific examples of the methods for identifying at least one person are exemplary only, and a person of ordinary skill in the art will recognize other methods for identifying the at least one person that remain consistent with the present disclosure. In some examples, the at least one person may be detected using a face detection algorithm, using a neural network trained to detect faces and/or persons in images, and so forth. In some examples, the at least one person may be identified using a face recognition algorithm, using a neural network trained to identify people in images, and so forth.

Person identification module 2602 may further be configured to determine or obtain information associated with the at least one person identified in the image(s). The information associated with the at least one person may include a name, nickname, social security number, account number, or any other identifier of the at least one person. Once identifying information is obtained for the at least one person, the person identification module 2602 may obtain or determine at least one affinity measurement representing a degree of a relationship between the user of the wearable device 110 and the identified at least one person.

The affinity measurement may be represented in any suitable manner. For example, the affinity measurement may be a numerical value assigned on a given scale, such as 0-1 or 1-100, with larger numbers representing a higher or closer degree of relationship between the user and the at least one person and lower numbers representing a lower or more distant degree of relationship between the user and the at least one person (or vice versa, with lower numbers indicating a higher degree). In other embodiments, the affinity measurement may be a level selected from a finite number of levels, for example with each level representing a range capturing the number of years the user has been associated with the at least one person. For example, a childhood friend whom the user has known for 15 years may be an affinity 1, which is assigned to people known by the user for 15 or more years. In this example, a friend for two months may be assigned an affinity 3, which is assigned to people known by the user for less than a year.

In some embodiments, the affinity measurement may be based on a category that indicates a relationship degree. For example, some affinity categories may include family, friends, acquaintances, co-workers, strangers, etc. In other embodiments, the affinity measurement may capture the emotional and/or social closeness of the user to the at least one person. For example, close friends and family (e.g., childhood friends and siblings) may be assigned a similar affinity measurement, while more distant friends and family (e.g., co-workers and second cousins) may be assigned a different affinity measurement. Indeed, the affinity measurement may be assigned in any suitable manner, not limited to the examples herein, depending on implementation-specific considerations.

In some embodiments, the affinity measurement may be based on a social network. In some examples, the distance between two persons in social network may calculated as the minimal number of social network connections required to connect the two persons, and the affinity measurement may be based on the distance. For example, let the number of social network connections required to connect the two persons be N, the affinity measure may be calculated as 1/N, as $\exp(-(N-A)/S)$ for some constants A and S, as $f(N)$ for some monotonically decreasing function $f$, and so forth. In some examples, the affinity measurement of two persons may be calculated based on the number of shared connections the two persons have in the social network. For example, let the number of shared connections the two persons have in the social network be M, the affinity measure may be calculated as M, log(M), as $\exp((M-A)/S)$ for some constants A and S, as $f(M)$ for some monotonically increasing function $f$, and so forth. For example, let the number of shared connections the two persons have in the social network be M, and let the number of connections the first person and second person have in the social network be M1 and M2 correspondingly, the affinity measure may be calculated as M/sqrt(M1*M2), as $f(M,M1,M2)$ for some function $f$ that is monotonically increasing in M and monotonically decreasing in M1 and M2, and so forth. In some examples, the affinity measurement of two persons may be calculated based on the number and/or length of interaction (e.g., conversations) the two persons conducted in the social network. For example, let the overall length of interaction the two persons conducted in the social network be M, the affinity measure may be calculated as M, log(M), $\exp((M-A)/S)$ for some constants A and S, $f(M)$ for some monotonically increasing function $f$, and so forth.

Action execution module 2603 may be configured to perform a specific action in response to the identification of one or more images including the at least one person. For example, action execution module 2603 may determine, based on the at least one affinity measurement, an information level to be disclosed to the user of the wearable apparatus. In certain embodiments, the information level may be an amount, quantity, extent, type, and/or quality of information. For example, a higher information level may provide the user a greater amount of information (e.g., name, athletic interests, and job title) than a lower information level (e.g., only name). In other embodiments, the information level may provide matchmaking information if the affinity measurement indicates a non-familial connection between the user and the at least one person.

Action execution module 2603 may further be configured to provide information to the user of the wearable apparatus based on the information associated with the at least one person identified in the captured images and the determined information level. The information provided to the user may include, for example, a person's name, job title, gender, interests, hobbies, political affiliation, work related information (e.g., whether the user and the at least one person have worked together in the past), leisure related information (e.g., whether the user and the at least one person have played sports together in the past, whether the user and the at least one person are predicted to be a successful match, whether the at least one person is single, etc.), matchmaking information (e.g., whether the user and the at least one person have dated in the past), or any other information about the at least one person that is available to the wearable device 110.

Database 2605 may be configured to store any type of information of use to modules 2601-2604, depending on implementation-specific considerations. For example, in embodiments in which action execution module 2603 is configured to provide the information about the identified at least one person to the user of the wearable apparatus 110, database 2605 may store prior-collected information about the user's social, familial, or other contacts. Further, the database 2605 may store the metadata associated with the captured images. In some embodiments, database 2605 may store the one or more images of the plurality of captured images that include the at least one person. Indeed, database 2605 may be configured to store any information associated with the functions of modules 2601-2604.

Modules 2601-2604 may be implemented in software, hardware, firmware, a mix of any of those, or the like. For example, if the modules are implemented in software, they may be stored in memory 550, as shown in FIG. 26. However, in some embodiments, any one or more of modules 2601-2604 and data associated with database 2605, may, for example, be stored in processor 540 and/or located on server 250, which may include one or more processing devices. Processing devices of server 250 may be configured to execute the instructions of modules 2601-2604. In some embodiments, aspects of modules 2601-2604 may include software, hardware, or firmware instructions (or a combination thereof) executable by one or more processors, alone or in various combinations with each other. For example, modules 2601-2604 may be configured to interact with each other and/or other modules of server 250 and/or a wearable camera system to perform functions consistent with disclosed embodiments. In some embodiments, any of the disclosed modules may each include dedicated sensors (e.g., IR, image sensors, etc.) and/or dedicated application processing devices to perform the functionality associated with each module.

Figure 27:
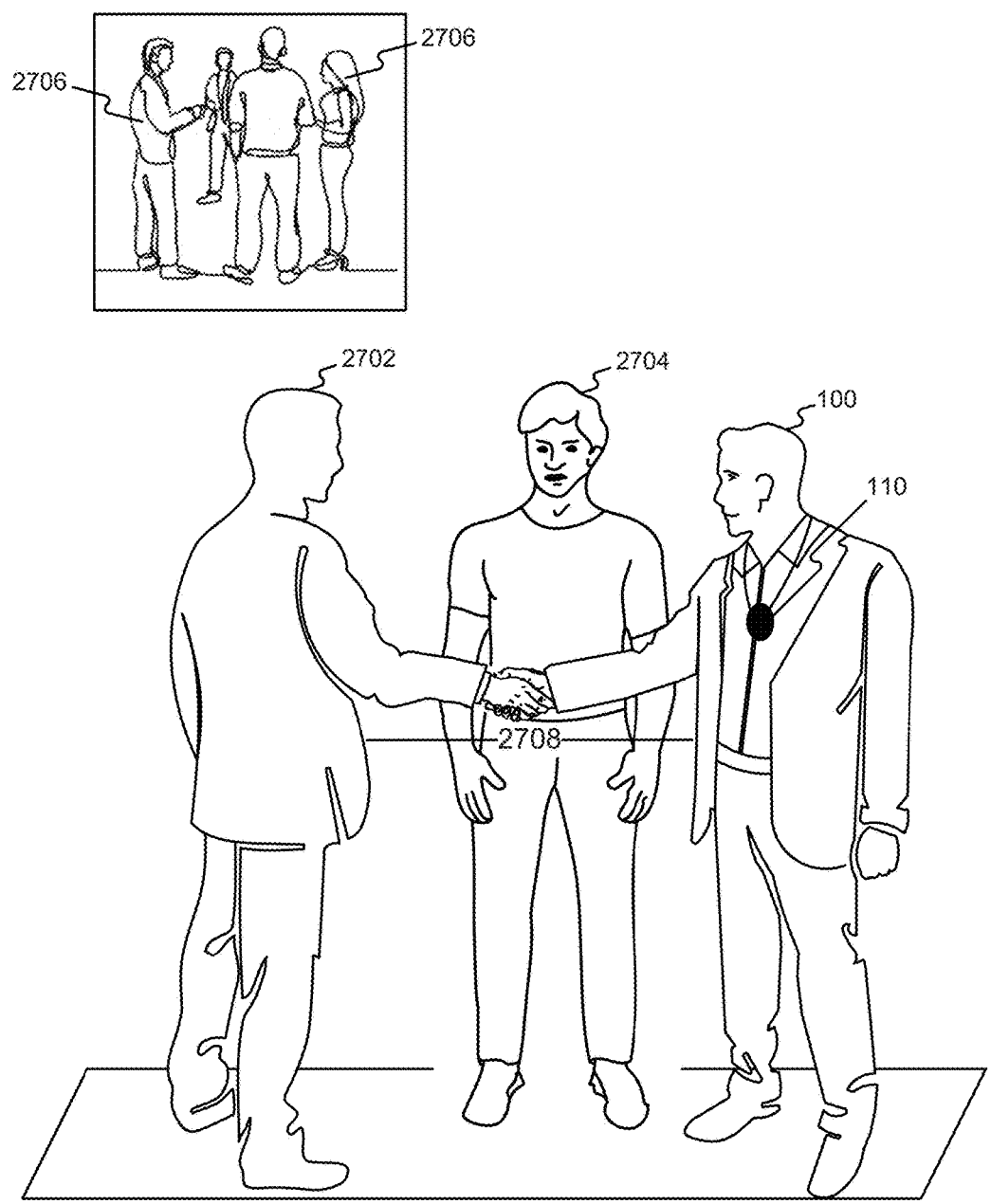
FIG. 27 shows an example environment including a wearable apparatus for capturing and processing images.

FIG. 27 shows an example environment including wearable apparatus 110 for capturing and processing images. In the depicted embodiment, user 100 may wear wearable apparatus 110 on his or her neck. However, in other embodiments, wearable apparatus 110 may be differently positioned in any suitable location to enable capture of images of the user's environment, such as the locations explained in detail above. User 100 may be in any location and engaging in any interaction encountered during user's daily activities. For example, user 100 may be at a convenience store, grocery store, sports event, social event, work-related event, movie theater, concert, etc. Wearable apparatus 110 may capture a plurality of images depicting the environment to which the user is exposed while user 100 is engaging in his/her chosen activity. For example, in the illustrated embodiment, wearable apparatus 110 may capture images that include a first person 2702 and/or a second person 2704 interacting with user 100. Further, wearable apparatus 110 may also capture, for example, when user 100 turns, one or more additional persons 2706 located at a distance from the area in which the conversation with persons 2702 and 2704 is occurring. As such, the images may show that the user 100 is exposed to persons 2702, 2704, and 2706. The images depicting the exposure of user 100 to particular persons 2702, 2704, and 2706 may be included in a log or otherwise saved in database 2605.

FIG. 27 shows user 100 being exposed to persons 2702, 2704, and 2706 while standing. However, as would be understood by one of ordinary skill in the art, wearable apparatus 110 may capture images throughout the user's day at a variety of locations with the user in a variety of positions as the environment surrounding the user changes. For example, images may be captured when the user visits a restaurant for dinner, commutes to and from work, attends social events, etc. In this way, wearable apparatus 110 may be configured to monitor the environment surrounding user 100 throughout the user's activities to identify exposure to one or more persons throughout the time user wears wearable apparatus 110.

In some embodiments, the one or more affinity measurements assigned to the identified persons 2702, 2704, and/or 2706 may depend on a type of interaction of the user 100 with the given identified person. For example, in the illustrated embodiment, the user 100 is shaking the hand of person 2702 while standing in a conversational position with respect to persons 2702 and 2704. As such, the user 100 and the person 2704 may be previously acquainted, while the user 100 and the person 2702 may have just met. Based on this interaction, a higher affinity measurement may be assigned to person 2704 than person 2702. For further example, while persons 2706 may be captured in images, user 100 is at a distance from persons 2706, thus indicating lack of a current interaction. As such, a lower affinity measurement may be assigned to persons 2706 than persons 2702 and 2704.

Further, in some embodiments, the affinity measurement(s) assigned to the identified person(s) may be based in whole or in part on a physical distance between user 100 and the person(s) identified. For example, in the illustrated embodiment, user 100 may be at a distance 2708 from person 2702. The distance 2708 may be determined, for example, by analyzing the size and/or location of the features of the captured person(s), using 3D and/or range imaging, and so forth. For example, let the physical distance between two persons be L, the affinity measure may be calculated as $1/L$, as $\exp(-(L-A)/S)$ for some constants A and S, as $f(L)$ for some monotonically decreasing function $f$, and so forth. Still further, in some embodiments, wearable device 110 may be programmed to determine the distance 2708 or interaction between, for example, user 100 and person 2702, by analyzing the captured image. For example, wearable device 110 may recognize that the chest of person 2702 is in the direct line of capture of the camera in wearable device 110, which may in turn indicate the relative position between user 100 and person 2702.

Figure 28A:
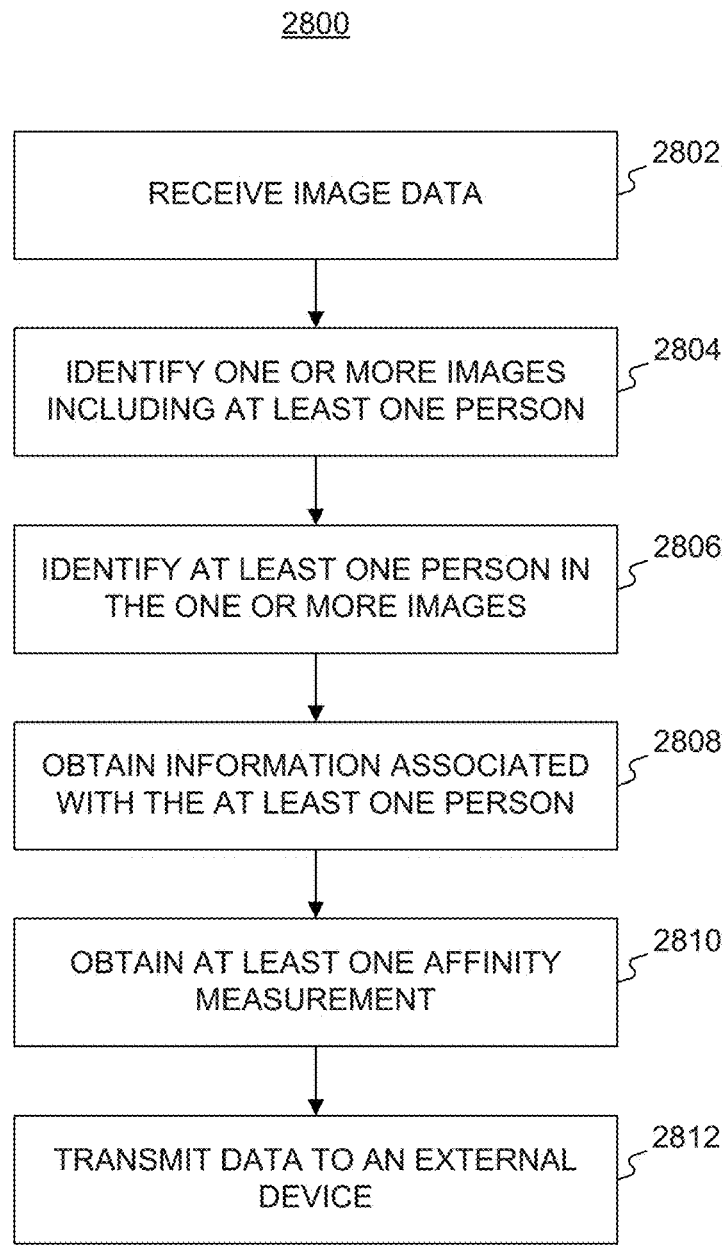
FIG. 28A is a flowchart illustrating an exemplary method for identifying a person and information associated with the person.
Figure 28B:
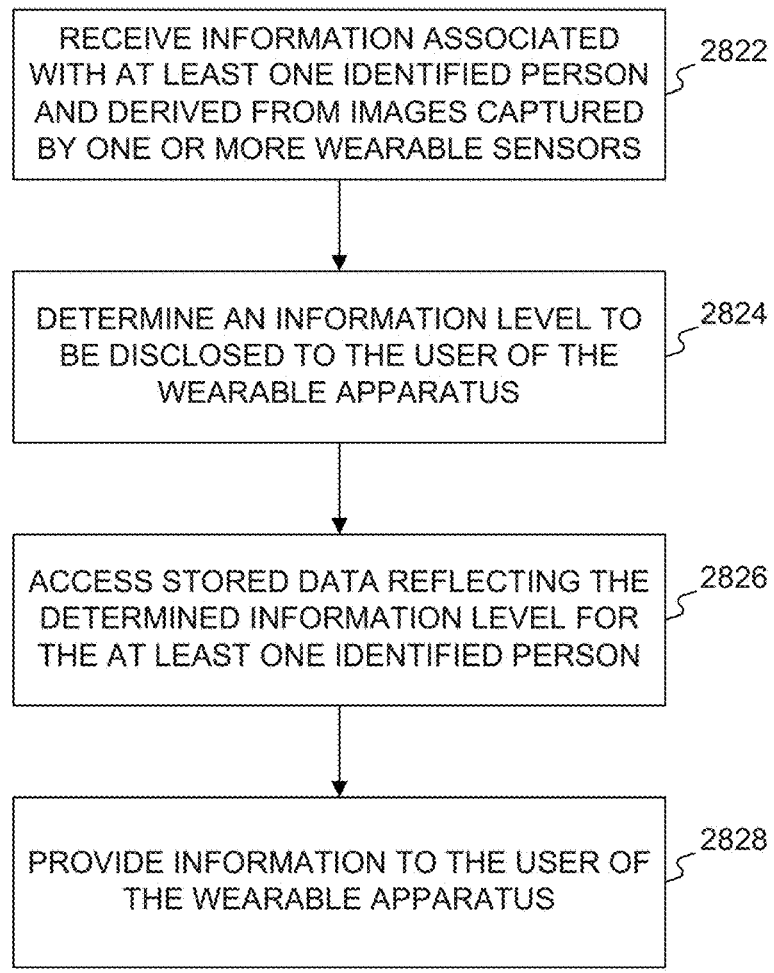
FIG. 28B is a flowchart illustrating an exemplary method for determining a level of detail of information relating to the identified person and provided to the user.

FIG. 28A illustrates a flowchart of an exemplary method 2800 for identifying exposure to at least one person, consistent with embodiments of the present disclosure. The method 2800 may be carried out, for example, by a processing device integrated with and/or associated with wearable apparatus 110. In such an embodiment, wearable apparatus 110 may include a wearable image sensor, e.g., image sensor 220, configured to capture a plurality of images from the environment of the user. For exemplary purposes only, method 2800 for identifying exposure to at least one person is described herein with respect to processing device 210 cooperating with memory 550 to execute modules 2601-2604.

In accordance with method 2800, processor 210 may receive image data captured by a wearable image sensor at block 2802. Block 2802 may be facilitated by software instructions of data capture module 2601. Data capture module 2601 may be configured to execute instructions to receive image data from a wearable image sensor, and may also be configured to execute instructions to control the wearable image sensor. Controlling the wearable image sensor may include issuing commands to record images and/or videos, and may also include issuing commands to control an orientation or direction of viewing of the image sensor.

Received image data may be processed via software steps executed by person identification module 2602. For example, at block 2804, person identification module 2602 may identify one or more images including the at least one person from a plurality of captured images. For example, the at least one person may be person 2702, and the module 2602 may analyze the plurality of images to identify a subset of the captured images that include features sized, shaped, or otherwise resembling a person. Further, at block 2806, the one or more identified images may be processed to identify the particular person(s) depicted in the images flagged as including person(s). In another example, at block 2804 and/or 2806, person identification module 2602 may identify unique instances of the at least one person appearing in the plurality of captured images.

At block 2808, person identification module 2602 may further analyze the subset of the captured images including the at least one person to determine information associated with the at least one person. The information associated with the at least one person may include a name, nickname, hobby, interest, like, dislike, places frequently visited, sexual orientation, gender, political affiliation, nationality, sporting events attended, or any other identifier or information available about the given person. Further, the information about the at least one person may be sourced from any desired location. For example, the information may be sourced from prior-sourced information stored in database(s) 2605 via database access module 2604. For further example, the information may be sourced from one or more social media accounts. In such embodiments, wearable device 110 may source the information publicly available via a web browser and/or through a private account of user 100. In other embodiments, the information may be sourced from records of email, text, voicemail, or telephone communications between user 100 and the at least one identified person. Indeed, the information may be sourced from any suitable location, not limited to those described herein, depending on implementation-specific considerations.

At block 2810, person identification module 2602 may determine or obtain at least one affinity measurement representing a degree of a relationship between the user 100 and the at least one identified person. The at least one affinity measurement may take any of the forms described above. Further, the at least one affinity measurement may be based on one or more factors indicative of the degree of the relationship between the user 100 and the identified at least one person. For example, in some embodiments, the affinity measurement may be based on a social graph, a social network, a type of interaction between the user 100 and the at least one person, a physical distance between the user 100 and the at least one person, or any other suitable factor. In one embodiment, the affinity measurement may capture the relationship between the user 100 and the at least one person in a social network (e.g., a list of contacts on a social media site) to ensure that an appropriate level of information is provided to the user 100. For example, in one embodiment, a low affinity measurement may ensure that the user 100 would not receive any information related to a stranger, but a higher affinity measurement would ensure that the user 100 would receive a name and affiliation for person in a common group, or a name and common friends for second degree connections. In some embodiments, an appropriate affinity measurement could ensure that for a detected person that is a first degree connection, even more information could be provided, such as the time of a last meeting, a last email, etc.

In the embodiment illustrated in FIG. 28A, at block 2812, the data including the information associated with the at least one person and/or the affinity measurement(s) is transmitted to an external device. The external device may be a smartphone, tablet, smartwatch, laptop, server, or any other suitable device configured to process the transmitted data. To that end, the external device and wearable apparatus 110 may include suitable components to enable data transfer between wearable apparatus 110 and the external device. For example, in one embodiment, the wearable apparatus may include a transmitter configured to enable wireless pairing with a receiver located in the external device. In such embodiments, the wearable apparatus and the external device may be reversibly or irreversibly paired to enable exclusive data transfer between the two devices. The pairing may be established by the user of the wearable apparatus and external device, or may be automatically performed when the wearable apparatus and the external device are within a given distance from one another (e.g., within a range such that the transmitter and receiver are capable of exchanging data).

However, in other embodiments, the transfer of data to the external device at block 2812 may be omitted from method 2800, and further processing of the data may be performed by the wearable apparatus 110, for example, in action execution module 2603 or using blocks 2824, 2826 and 2828. In the exemplary illustrated embodiment, however, the information associated with the at least one person and the affinity measurement are received by an external device at block 2822 in method 2820. At block 2824, method 2820 includes determining an information level to be disclosed to the user 100 of the wearable apparatus 110.

In some embodiments, the information level may be selected from a plurality of alternate information levels, as discussed above. For example, a first information level may be for a close social connection, and a second information level may be for a more distant connection. More specifically, with respect to FIG. 27, the first information level may be assigned to person 2704, with whom user 100 is already acquainted, and the second information level may be assigned to person 2702, whom the user 100 just met. In one embodiment, selection of the first information level may result in the shared information including the name of the person 2704, and selection of the second information level may result in the provided information not including the name of the person 2702.

The method 2820 further includes accessing stored data reflecting the determined information level for the at least one person at block 2826 and providing the information to the user 100 at block 2828 in accordance with the assigned information level(s). For example, in one embodiment, a given information level may correspond to a potential romantic match, and the information provided to the user 100 may be information relevant to whether or not the at least one person is a romantic match. In such an embodiment, the information provided to the user about the at least one person may include, for example, a name, age, gender, school(s) attended, mutual friends, common interests, dietary preferences, hair color, eye color, weight, height, etc. In such an embodiment, another information level may correspond to someone who is not a potential romantic match, for example, because the gender of the at least one person does not match the gender preference of the user 100, the age gap between the user 100 and the at least one person is too large, the at least one person is a family member, etc.

In some embodiments, the at least one person may include one or more persons. For example, in some embodiments, separate affinity measurement(s) and/or information level(s) may be assigned to different persons identified in the captured images. More particularly, in one embodiment, a first person identified in the captured images may be assigned a first affinity measurement representing a degree of relationship between the user 100 and the first person. A second person may also be identified in the captured images, and a second affinity measurement may be assigned to the second person. The determination of the information level provided to the user may be based on both the first affinity measurement and the second affinity measurement.

Identifying a Verbal Contract

In some embodiments, wearable apparatus 110 may collect information related to an interaction between the user of the wearable apparatus 110 and at least one person detected in an environment of the user of the wearable apparatus 110. For example, in some embodiments, the wearable apparatus 110 may identify when the user and another person detected in the user's environment enter into a verbal contract.

Some existing wearable device systems may encounter the technical problem of how to process the large amount of information collected by the wearable apparatus 110 and to use that information to provide useful feedback and/or services to the user. Some of the presently disclosed embodiments may address this problem by collecting visual and audio information, and using the collected information to determine which frames of the collected information to store for the user. For example, in some embodiments, the wearable apparatus 110 may store the collected information when the video and/or the audio information include features associated with a verbal contract.

Still further, when a verbal contract has been detected, presently disclosed embodiments may address the problem of authenticating the identity of the user of the wearable apparatus 110 and/or the other party to the verbal contract. For example, when using automatically collected information regarding a verbal contract, it may be desirable to the user of the wearable apparatus 110 and/or the other party to the contract to register or log the existence of the contract. However, given the possibility of identity fraud, it may be desirable to log only contracts for which one or both of the parties are authenticated. Presently disclosed embodiments may address this problem by using digital signatures or other electronic verifications of the identity of one or more of the parties to the contract.

Figure 29:
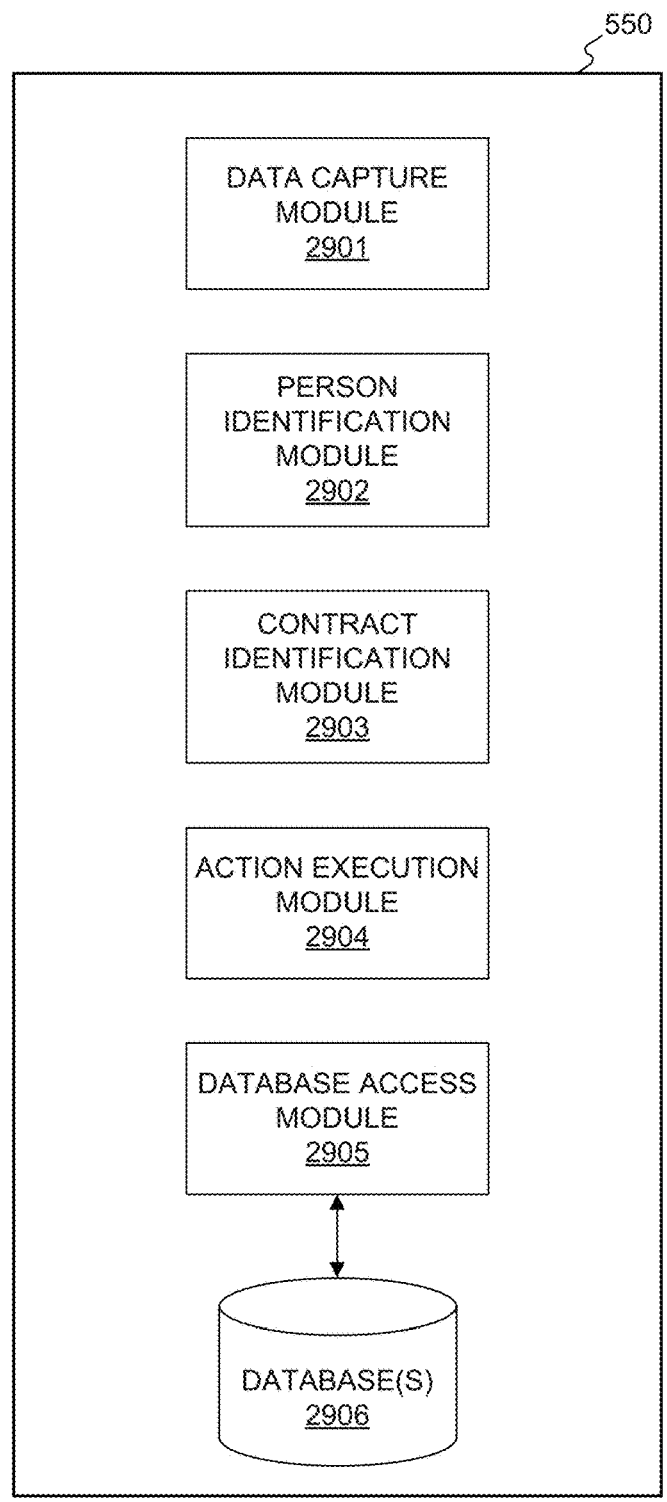
FIG. 29 illustrates an exemplary embodiment of a memory containing software modules consistent with the present disclosure.

FIG. 29 is a diagram illustrating an example of memory 550 storing a plurality of modules, consistent with the disclosed embodiments. The modules may be executable by at least one processing device to perform various methods and processes disclosed herein. Memory 550 may store more or fewer modules than those shown in FIG. 29.

As illustrated in FIG. 29, memory 550 may store software instructions to execute a data capture module 2901, a person identification module 2902, a contract identification module 2903, an action execution module 2904, a database access module 2905, and may also include database(s) 2906. Data capture module 2901 may include software instructions for receiving data from wearable apparatus 110. Person identification module 2902 may include software instructions for analyzing data obtained by wearable apparatus 110 to identify subsets of the captured data including at least one person and information associated with the at least one person. Contract identification module 2903 may include software instructions for analyzing images(s) and/or audio data capture by the wearable apparatus 110 to identify the presence of a verbal contract. Action execution module 2904 may include software instructions to cause the occurrence of an action based on the information that a verbal contract has been identified. Database access module 2905 may include software instructions executable to interact with database(s) 2906, to store and/or retrieve information.

Data capture module 2901 may include software instructions for receiving data from a wearable apparatus, such as a wearable camera system and/or a wearable audio system. Data received from a wearable camera system may include audio and image data, captured, by, for example, an image sensor or microphone associated with the wearable camera system. Image data may include raw images and may include image data that has been processed. Raw images may be provided, for example, in the form of still images and video data, either with or without embedded metadata. In some embodiments, image data and audio data may be preprocessed prior to capture by data capture module 2901. Preprocessing may include, for example, noise reduction, artifact removal, compression, and other image pre-processing techniques.

Person identification module 2902 may be configured to analyze data captured by data capture module 2901 to detect or identify a subset of the captured data that includes at least one person. In some embodiments, module 2902 may be configured to receive a plurality of images and to identify one or more of the plurality of images that include at least one person. For example, module 2902 may receive a plurality of images of an environment surrounding a user wearing the wearable device 110 and identify which of the plurality of images include at least one person, for example using person detection module 1701 described above, using person detection module 2001, using person detection module 2301, and so forth.

In some embodiments, such an analysis may be performed by employing a facial recognition algorithm designed to detect facial features (e.g., mouth, eyes, etc.), facial contours, body shape, or any other suitable identifying feature of a person. In other embodiments, the at least one person may be identified using a thermal signature algorithm designed to detect the presence of at least one person based on the heat generated by the at least one person. In such embodiments, the wearable device 110 may capture thermal images, either alone or in combination with visual images, for processing by the thermal signature algorithm. Thermal recognition of the at least one person may be desirable in implementations in which the wearable device 110 is operating in reduced lighting situations. In some embodiments, the at least one person may be identified through the application of one or more image classification techniques. For example, at least one image classification technique may be used to classify at least one feature of an image. In some embodiments, an image classification technique may include one or more of image enhancement, edge detection, image analysis, and data extraction. Specific examples of the methods for identifying at least one person are exemplary only, and a person of ordinary skill in the art will recognize other methods for identifying the at least one person that remain consistent with the present disclosure.

Person identification module 2902 may further be configured to determine or obtain information associated with the at least one person identified in the image(s). The information associated with the at least one person may include a name, nickname, social security number, account number, or any other identifier of the at least one person. The identification information of the at least one detected person may be sourced from any suitable location, such as prior-stored information in database 2906. In some embodiments, the identification information may be obtained by matching the captured image(s) of the person with one or more images accessible via the Internet associated with a given identity, and then assigning that identity to the at least one person detected in the image(s). In some embodiments, the identification information may be obtained using identification information module 2302, using person identification module 2602, and so forth.

In some embodiments, person identification module 2902 may further obtain one or more profiles of the at least one person in the image(s). Based on the one or more profiles of the at least one person, the person identification module 2902 may authenticate the identity of the at least one person. For example, in one embodiment, person identification module 2902 may access the digital signature of the at least one person to authenticate the at least one person. In other embodiments, person identification module 2902 may authenticate the identity of the at least one person based on one or more motions of a body part (e.g., a hand) of the at least one person, which may be a signature movement of the at least one person. In another example, person identification module 2902 may authenticate the identity of the at least one person based on a face image of the person and using a face recognition algorithm. In yet another example, person identification module 2902 may authenticate the identity of the at least one person using biometric readings captured by wearable apparatus 110 and by comparing the biometric readings with a biometric signature associated with the person, for example as retrieved from database 2906 using database access module 2905.

Contract identification module 2903 may be configured to analyze the plurality of images identified by the person identification module 2902 to determine if the images reflect an action associated with the formation of a verbal contract. Further, contract identification module 2903 may be configured to analyze at least a portion of the collected audio data to identify one or more sounds (e.g., words) associated with the formation of a verbal contract. In some embodiments, the identified sounds may be linked to the user of the wearable apparatus 110 and/or the detected person in the collected image(s). Still further, in some embodiments, contract identification module 2903 may utilize a combination of actions identified in the analyzed images and sounds identified in the audio data to determine that a verbal contract has occurred between the user of the wearable apparatus 110 and the detected person.

For example, in one embodiment, the collected images may show that a handshake occurred between the user of the wearable apparatus 110 and another detected person. The analysis of the audio data may show that one or more words associated with a verbal contract were spoken. For example, the audio data may detect words such as "I agree," "yes," "you have a deal," "it's a deal," "we're all set," "I agree to the contract," "those terms are acceptable to me," "we agree," or any other words indicative of the formation of a verbal contract. The one or more words indicative of a verbal contract may be used alone or in combination with one or more identified actions associated with a verbal contract in the captured images by the contract identification module 2903 to determine that a verbal contract was agreed upon.

Similarly, in some embodiments, the collected images and/or audio data may be analyzed to determine that a verbal contract did not occur. In such embodiments, the analysis of the collected images may show that no actions indicative of a verbal contract were taken (e.g., no handshake occurred). Further, the analysis of the audio data may include one or more words indicating the lack of a verbal contract, such as "I don't agree," "no," "you don't have a deal," "it's not a deal," "there's no contract," "we'll have to keep working on this," etc. The one or more words indicating the lack of a verbal contract may be used alone or in combination with the collected images to determine that a contract is likely not to have occurred.

Action execution module 2904 may be configured to perform a specific action in response to the identification of one or more images including the at least one person and/or the identification of one or more sounds indicative of a verbal contract. For example, action execution module 2904 may be configured to authenticate the identity of the user of the wearable apparatus 110, the at least one person identified in the collected images, and/or a witness to a verbal contract between the user and the at least one person when a verbal contract has been identified by contract identification module 2903. For example, in one embodiment, action execution module 2904 may obtain at least one profile of the user of the wearable apparatus 110 and authenticate the user's identity based on the at least one profile. The at least one profile may be any representation of identity that is suitable for linking the user and/or detected person to a given identity. For example, in one embodiment, authenticating the identity of the user may include analyzing one or more of the captured images, for example, to identify features in the image of the user's face that are unique to the user. In another embodiment, authentication of the user may be performed by analyzing the captured images to identify a motion of a body part (e.g., a hand) of the user and/or ego motion associated with the user. In some embodiments, authentication of the user may use biometric readings captured by wearable apparatus 110 and by comparing the biometric readings with a biometric signature associated with the user.

In some examples, authenticating the identity of the user may comprise identifying motion of a body part of the user (e.g., a hand, a head, etc.) from images captured by data capture module 2901, analyze the motion of the body part in the images to determine a distribution of motions (e.g., based on positions, relative positions, directions, relative directions, velocity, directional velocity, acceleration and/or deceleration, direction acceleration and/or deceleration, etc.), and comparing the distribution to a known past distributions of the user. For example, the distribution of motions may include a histogram of positions, relative positions, directions, relative directions, velocity, directional velocity, acceleration and/or deceleration, direction acceleration and/or deceleration, and so forth. In another example, the distribution of motions may include a statistical characteristic (such as mean, variance, entropy, etc.) of positions, relative positions, directions, relative directions, velocity, directional velocity, acceleration and/or deceleration, direction acceleration and/or deceleration, and so forth. Similarly, authenticating the identity of the at least one person may comprise identifying motion of a body part of the at least one person (e.g., a hand, a head, etc.) from images captured by data capture module 2901, analyze the motion of the body part in the images to determine a distribution of motions (e.g., based on positions, relative positions, directions, relative directions, velocity, directional velocity, acceleration and/or deceleration, direction acceleration and/or deceleration, etc., as described in details above), and comparing the distribution to a known past distributions of the at least one person.

In some embodiments, action module 2904 may authenticate the identity of at least one person identified in the collected images (which may be a side to the verbal contract, a witness, etc.) may include communicating with a device associated to the at least one person (for example, with a wearable device worn by the at least one person), and obtaining identifying information and/or identity proof of the at least one person from the device associated with the at least one person.

Action execution module 2904 may further be configured to register the verbal contract and the identification information associated with the detected person based on the authentication of the user, the detected person, and/or a witness to the verbal contract. For example, in one embodiment, the verbal contract may be registered upon authentication of the user. However, in other embodiments, the verbal contract may be registered when the identity of both the user and the detected person are identified. Still further, in some embodiments, the verbal contract may be registered when the identity of the user, the detected person, and the witness are authenticated.

Registration of the verbal contract may take on any of a variety of suitable forms, depending on implementation-specific considerations. For example, in one embodiment, registering the verbal contract and the identification information of the detected person may include storing at least a portion of the audio data associated with the verbal contract and at least part of the identification information associated with the detected person, for example, in database(s) 2906. The portion of the audio data that is stored may include the audio data reflecting the terms of the contract, the offer made by one of the parties, the acceptance made by another of the parties, and any consideration given for the contract. The portion of the identification information that is stored may be any portion suitable to identify the person, such as a social security number, full legal name, nickname, etc.

In some embodiments, registration of the verbal contract and the identification information of the detected person may include transmitting at least a portion of the audio data associated with the verbal contract and at least part of the identification information associated with the detected person using at least one communication device. For example, in some embodiments, wearable apparatus 110 may include a communication device, such as one or more wireless transceivers, as discussed above in connection with FIGS. 5A-5C, which may transmit information across network 240 to, for example, computing device 120 and/or server 250 In some embodiments, the registered verbal contract and identification information may be transmitted from the communication device to a longer term storage location, such as a cloud-based storage facility (e.g., server 250) via network 240. In some embodiments, wearable apparatus 110 may transmit the information to a paired device (e.g., computing device 120), which may then in turn transmit the information to another destination (e.g., server 250) via network 240.

In some embodiments, registration of the verbal contract and the identification information of the detected person may include posting on a public database and/or a blockchain information based on at least a portion of the audio data associated with the verbal contract and/or at least part of the identification information associated with the detected person. The posted information may include at least a portion of the audio data associated with the verbal contract, at least part of the identification information associated with the detected person, any other information related to the verbal contract (such as time, place, witnesses, context of the agreement, financial transfer and/or commitment, etc.), an encrypted version of any of the above, a digitally signed version of any of the above, a digital signature of any of the above with or without the signed data, and so forth. The posted information may also include any other information related to the contract.

In some embodiments, registration of the verbal contract and/or identification information may include digitally signing at least a portion of the audio data associated with the verbal contract and/or at least part of the identification information associated with the detected person. Digitally signing may refer to any technique used to validate the authenticity and/or integrity of the data being signed. For example, digitally signing may include applying a verified or previously authenticated digital signature of the user, detected person, or witness to the audio data or identification information. The digital signature may include a mark assigned to the user, detected person, or witness, for example, by a company that verifies the identity of its customers. For example, the company may have previously verified its customers' identities based on a review of government-issued documents, such as drivers' licenses, passports, etc.

In addition to the verbal contract and identification information, other data may also be registered by action execution module 2904. For example, at least one clock may be configured to provide time information associated with the audio data, for example, by timestamping the audio data as it is generated and/or collected with a date and/or time. The time information may be registered with the audio data when the verbal contract is registered. In other embodiments, additional details regarding the time, location, conditions, etc. surround the formation of the verbal contract may be registered. For example, at least one positioning device may be configured to generate position information associated with the verbal contract. The positioning device may be, for example, an accelerometer in a device paired with the wearable apparatus (e.g., the user's smartphone) configured to track the position of the user relative to the user's environment (e.g., that the user was sitting or standing when the contract was established), a global positioning device configured to obtain the position of the wearable apparatus and/or a device paired with the wearable apparatus, and so forth.

In some embodiments, action execution module 2904 may recognize that the verbal contract comprise an obligation and/or a desire of a first entity (such as the user, the at least one person, a third party, etc.) to transfer funds to a second entity (such as the user, the at least one person, a third party, etc.), and cause the funds to be transferred from an account of the first entity to an account of the second entity. In some examples, action execution module 2904 may also inform the first entity and/or the second entity about the transfer of funds, for example in an audible output, in an email, in a visual manner, and so forth. In some examples, before transferring the funds, action execution module 2904 may ask the first entity explicit permission, for example using a user interface, an audible user interaction bot, a graphical user interface, an email, etc.

In some embodiments, action execution module 2904 may provide information related to the verbal contract to parties involved in the verbal contract (such as the user, the at least one person, a witness, a third party, etc.). For example, the provided information may include a request to acknowledge and/or ratify the verbal contract, a summary of the verbal contract details, identifying information of parties of the verbal contract and/or witnesses to the verbal contract, a time and/or place associated with the verbal contract, a reminder (for example in the form of a calendar event, a pop-up message, an email, etc.) to perform an action related to the verbal contract (such as an action the party obligated to take in the verbal contract).

Database 2906 may be configured to store any type of information of use to modules 2901-2905, depending on implementation-specific considerations. For example, in embodiments in which action execution module 2904 is configured to obtain the identification information about the identified at least one person to the user of the wearable apparatus 110, database 2906 may store prior-collected information about the user's identity. Further, the database 2906 may store the metadata associated with the captured images and/or audio data. In some embodiments, database 2906 may store the one or more images of the plurality of captured images that include the at least one person. Database 2906 may further store some or all of the captured audio data indicating formation of the verbal contract. In other embodiments, database 2906 may be configured to store the profile of the user, detected person, and/or witness to the contract for reference when authenticating the identities of the parties to the verbal contract and/or witnesses to the verbal contract. For example, database 2906 may store one or more digital signatures. Indeed, database 2906 may be configured to store any information associated with the functions of modules 2901-2905.

Modules 2901-2905 may be implemented in software, hardware, firmware, a mix of any of those, or the like. For example, if the modules are implemented in software, they may be stored in memory 550. However, in some embodiments, any one or more of modules 2901-2905 and data associated with database 2906, may, for example, be stored in processor 540 and/or located on server 250, which may include one or more processing devices. Processing devices of server 250 may be configured to execute the instructions of modules 2901-2905. In some embodiments, aspects of modules 2901-2905 may include software, hardware, or firmware instructions (or a combination thereof) executable by one or more processors, alone or in various combinations with each other. For example, modules 2901-2905 may be configured to interact with each other and/or other modules of server 250 and/or a wearable camera system to perform functions consistent with disclosed embodiments. In some embodiments, any of the disclosed modules may each include dedicated sensors (e.g., IR, image sensors, audio sensors, etc.) and/or dedicated application processing devices to perform the functionality associated with each module.

Figure 30:
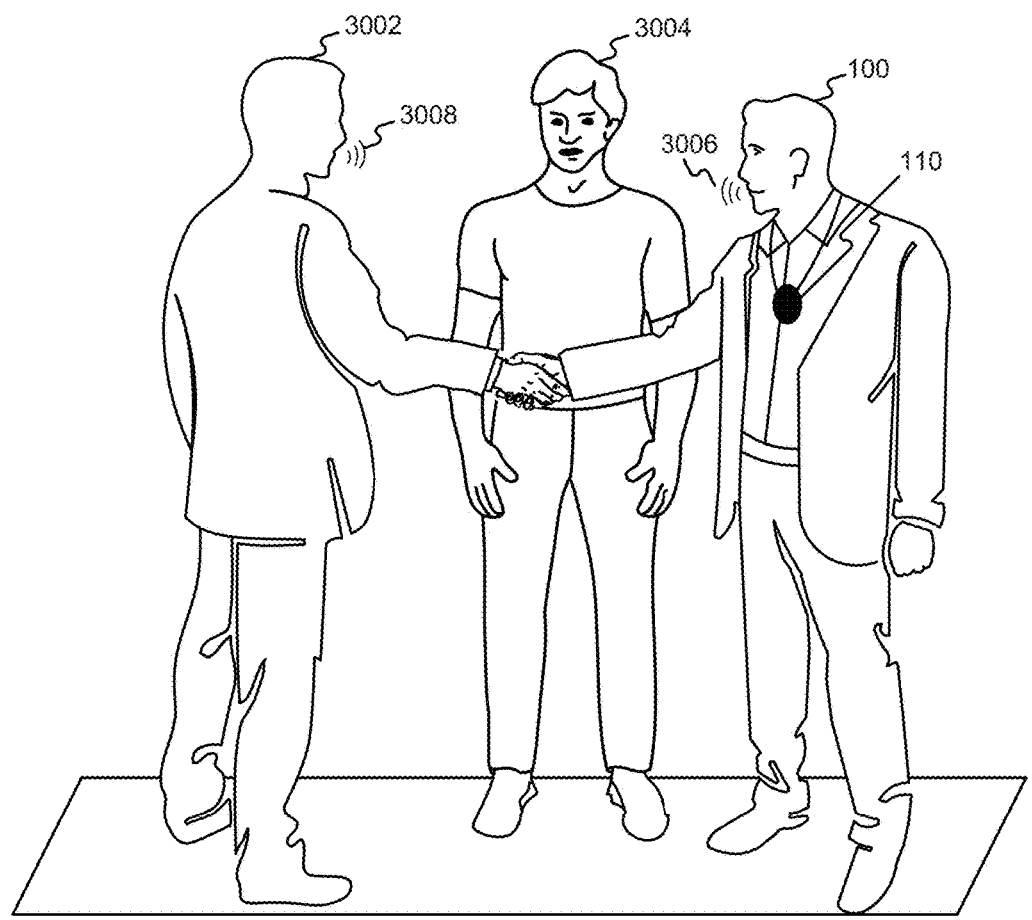
FIG. 30 shows an example environment including a wearable apparatus for capturing and processing images and audio data.

FIG. 30 shows an example environment including wearable apparatus 110 for capturing and processing images and audio data. In the depicted embodiment, user 100 may wear wearable apparatus 110 on his or her neck. However, in other embodiments, wearable apparatus 110 may be differently positioned in any suitable location to enable capture of images of the user's environment, such as the locations explained in detail above. User 100 may be in any location and engaging in any interaction encountered during user's daily activities. For example, user 100 may be at a convenience store, grocery store, sports event, social event, work-related event, office, move theater, concert, etc. Wearable apparatus 110 may capture a plurality of images depicting the environment to which the user is exposed while user 100 is engaging in his/her chosen activity. Wearable apparatus 110 may also capture audio data via at least one audio sensor (e.g., a microphone) reflecting the sounds occurring in the environment surrounding the user. For example, in the illustrated embodiment, wearable apparatus 110 may capture images that include a first person 3002 and/or a second person 3004 interacting with user 100. As such, the images may show that the user 100 is exposed to persons 3002 and 3004. The images depicting the exposure of user 100 to particular persons 3002 and 3004 may be included in a log or otherwise saved in database 2906. Wearable apparatus 110 may further capture audio sounds 3006 spoken by user 100 and/or audio sounds 3008 spoken by first person 3002.

Wearable apparatus 110 may also capture audio data reflecting one or more words spoken by user 100, first person 3002, and/or second person 3004. As such, at least a portion of the audio data may reflect that a verbal contract has occurred between user 100 and first person 3002 by detecting one or more words indicative of contract formation. For example, at least a portion of the audio data at a first timestamp may reflect that first person 3002 made an offer. Another portion of the audio data at a second, later timestamp may indicate that user 100 accepted the offer. Finally, another portion of the audio data may indicate that consideration was exchanged to support the offer and acceptance.

Still further, in some embodiments, wearable apparatus 110 may capture images showing that a handshake occurred between user 100 and first person 3002. This may be used either alone or in combination with the audio data indicating that a verbal contract occurred to determine whether to register the verbal contract. Additionally, wearable apparatus 110 may capture one or more words spoken by second person 3004, a witness to the verbal contract between user 100 and first person 3002. For example, witness 3004 may say one or more words indicating that witness 3004 believes a contract was formed, such as "congratulations," "I'm glad you were able to come to an agreement," "it's wonderful that you agree," "I'm excited that you decided to work together," or any other words that indicate the belief on the part of witness 3004 that a contract has occurred.

FIG. 30 shows user 100 being exposed to persons 3002 and 3004 while standing. However, as would be understood by one of ordinary skill in the art, wearable apparatus 110 may capture images throughout the user's day at a variety of locations with the user in a variety of positions as the environment surrounding the user changes. For example, images may be captured when the user visits a restaurant for dinner, commutes to and from work, attends social events, attends work meetings, etc. In this way, wearable apparatus 110 may be configured to monitor the environment surrounding user 100 throughout the user's activities to identify exposure to one or more persons throughout the time user wears wearable apparatus 110 and to capture audio data associated with the user's daily activities.

In some embodiments, wearable apparatus 110 may be programmed to selectively collect data from at least one image sensor and at least one audio sensor to reduce the quantity of data collected that is irrelevant to the monitoring of verbal contract formation. For example, in one embodiment, the at least one image sensor may be activated to collect data, and the collected images may be processed to determine if the images include at least one person. When at least one person is identified in the images, the at least one audio sensor may be triggered to collect data to capture any conversations that occur between user 100 and the at least one person. In this way, the image and audio sensor(s) may be selectively controlled to address the technical problems associated with logging and storing large quantities of data that may be acquired by wearable apparatus 110 throughout use by user 100.

Figure 31A:
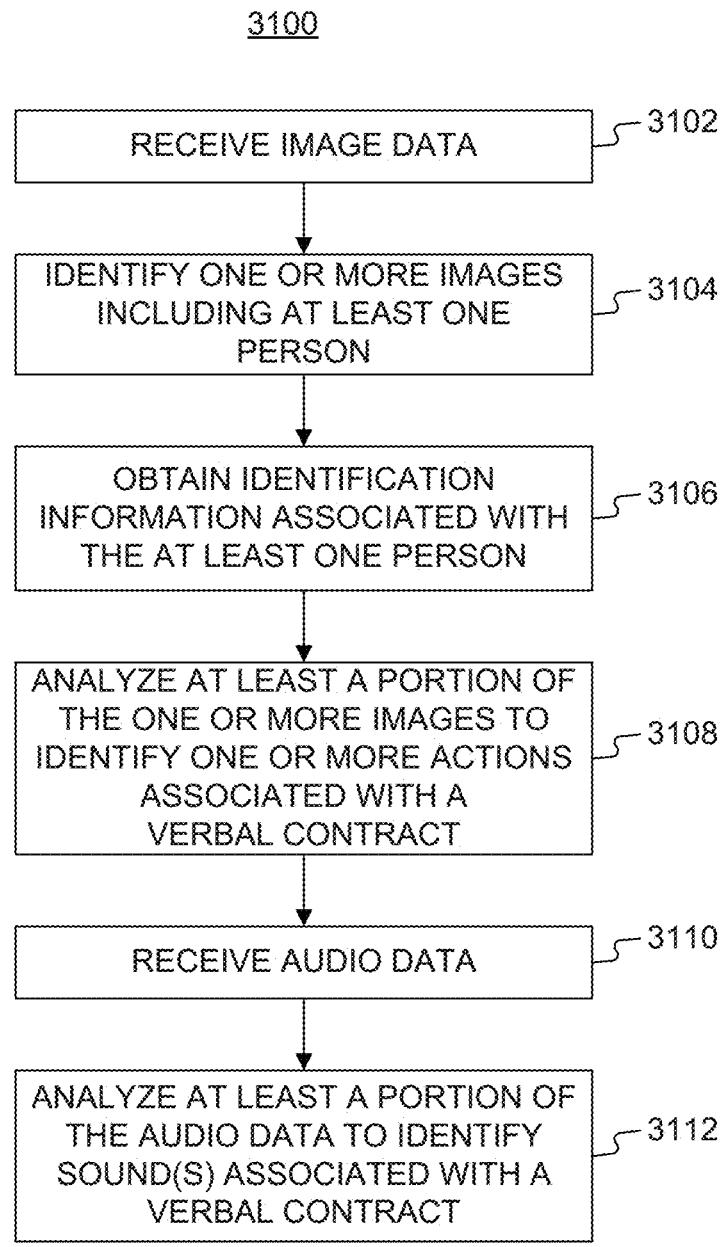
FIG. 31A is a flowchart illustrating an exemplary method for analyzing image and audio data captured by a wearable device.

FIG. 31A illustrates a flowchart of an exemplary method 3100 for receiving and analyzing image and/or audio data, consistent with embodiments of the present disclosure. The method 3100 may be carried out, for example, by a processing device integrated with and/or associated with wearable apparatus 110. In such an embodiment, wearable apparatus 110 may include a wearable image sensor, e.g., image sensor 220, configured to capture a plurality of images from the environment of the user. Wearable apparatus 110 may also include a wearable audio sensor configured to capture a plurality of sounds (e.g., one or more words) from the environment of the user. In some other examples, the entire method 3100 or parts of method 3100 may be performed by a device external to wearable apparatus 110, such as a device paired with wearable apparatus 110 (such as a smartphone, a tablet, etc.), a server communicating with wearable apparatus 110 (such as server 250), and so forth. For exemplary purposes only, method 3100 for image and/or audio data is described herein with respect to processing device 210 cooperating with memory 550 to execute modules 2901-2905.

In accordance with method 3100, processor 210 may receive image data captured by a wearable image sensor at block 3102. Block 3102 may be facilitated by software instructions of data capture module 2901. Data capture module 2901 may be configured to execute instructions to receive image data from a wearable image sensor, and may also be configured to execute instructions to control the wearable image sensor. Controlling the wearable image sensor may include issuing commands to record images and/or videos, and may also include issuing commands to control an orientation or direction of viewing of the image sensor.

Received image data may be processed via software steps executed by person identification module 2902. For example, at block 3104, person identification module 2902 may identify one or more images including the at least one person from a plurality of captured images. For example, the at least one person may be person 3002, and the module 2902 may analyze the plurality of images to identify a subset of the captured images that include features sized, shaped, or otherwise resembling a person. Further, at block 3106, the one or more identified images may be processed to identify the particular person(s) depicted in the images flagged as including person(s). In another example, at block 3104 and/or 3106, person identification module 2902 may identify unique instances of the at least one person appearing in the plurality of captured images.

At block 3108, contract identification module 2903 may further analyze the subset of the captured images including the at least one person to identify one or more actions associated with a verbal contract. For example, contract identification module 2903 may identify actions such as a handshake, head nod upward and downward, smiling, or any other physical movement cue associated with an offer or acceptance of a contract term.

At block 3110, processor 210 may receive audio data captured by a wearable image sensor. Block 3110 may be facilitated by software instructions of data capture module 2901. Data capture module 2901 may be configured to execute instructions to receive audio data from a wearable image sensor, and may also be configured to execute instructions to control the wearable image sensor. Controlling the wearable image sensor may include issuing commands to record audio data, and may also include issuing commands to control a collection volume or frequency of the audio sensor. Received audio data may be processed via software steps executed by contract identification module 2903. For example, at block 3112, contract identification module 2903 may identify at least a portion of the audio data including the at least one sound associated with the formation of a verbal contract.

For example, contract identification module 2903 may analyze the captured audio data to identify one or more portions that include one or more words associated with formation of a verbal contract, as discussed in detail above. Further, in other embodiments, the one or more sounds identified in the audio data may be sounds associated with certain actions that support the conclusion that a verbal contract was formed. For example, certain sound profiles or frequency components may be associated a handshake of user 100 and person 3002 and/or the upward and downward movement of the hand of user 100 during the handshake with person 3002. To that end, in some embodiments, wearable apparatus 110 may be located in other non-illustrated locations, such as proximate the user's hand, to better capture such audio data.

Figure 31B:
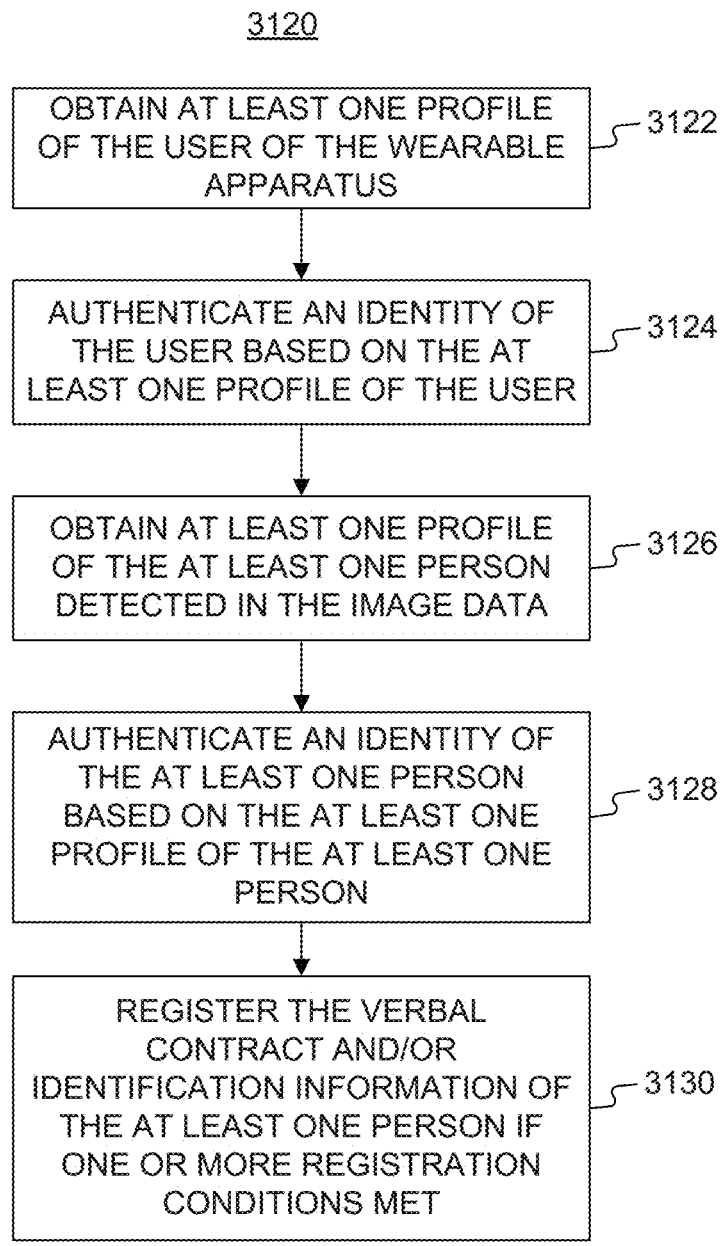
FIG. 31B is a flowchart illustrating an exemplary method for registering a verbal contract based on an analysis of captured image and audio data.

FIG. 31B illustrates a flowchart of an exemplary method 3120 for authenticating the identity of one or more of the parties to the identified verbal contract, consistent with embodiments of the present disclosure. The method 3120 may be carried out, for example, by a processing device integrated with and/or associated with wearable apparatus 110. In some other examples, the entire method 3120 or parts of method 3120 may be performed by a device external to wearable apparatus 110, such as a device paired with wearable apparatus 110 (such as a smartphone, a tablet, etc.), a server communicating with wearable apparatus 110 (such as server 250), and so forth. At block 3122, action execution module 2904 may obtain at least one profile of the user 100 of wearable apparatus 110. For example, action execution module 2904 may access a digital signature of user 100 stored in database 2906, as described above. At block 3124, action execution module 2904 may authenticate an identity of the user based on the accessed at least one profile. For example, in one embodiment, the identity of user 100 may be authenticated by analyzing the captured images to identify a motion of at least one hand of the user. In other embodiments, user 100 may be authenticated by identifying ego motion associated with user 100.

In the illustrated embodiment, method 3120 further includes obtaining at least one profile of the detected person at block 3126. For example, a digital signature of the detected person may be located in database 2906. Based on the at least one profile of the detected person, action execution module 2904 may authenticate the identity of the detected person at block 3128. The identity of the detected person may be authenticated in a similar way to the authentication of user 100 described above. However, although the embodiment of method 3120 is illustrated with authentication of both user 100 and the detected person, in other embodiments, only one of the parties to the contract may be authenticated prior to registering the verbal contract. For example, the identity of user 100 may be known such that only the detected person is authenticated prior to contract registration. In other embodiments, only the identity of user 100 may be authenticated prior to registration of the contract, for example, to reduce or eliminate the likelihood that the individual wearing wearable apparatus 110 is not user 100.

At block 3130, the verbal contract and/or identification information of the detected person are registered if one or more registration conditions are met, for example using action execution module 2904 as described in details above. The registration conditions may be any suitable prerequisite to registration. For example, the registration conditions may include authentication of user 100, authentication of the other party to the contract, presence of a detected witness, authentication of a detected witness, and so forth. Further, registration may occur in any suitable manner. For example, registration may include storing the image(s) and audio data evidencing the contract to database 2906, sending a confirmation of the verbal contract to one or more parties, etc.

Figure 31C:
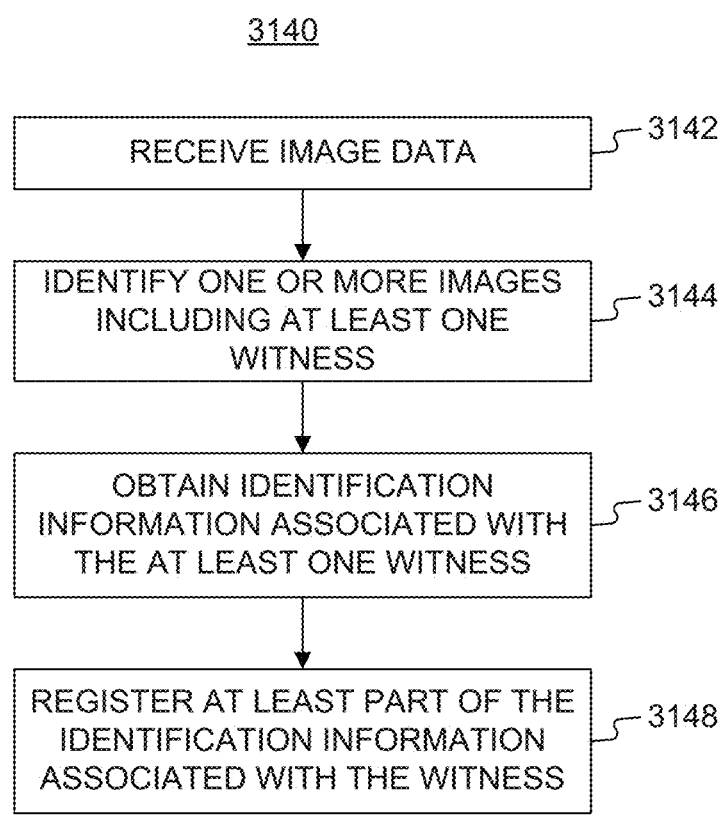
FIG. 31C is a flowchart illustrating an exemplary method for registering information related to a witness to a verbal contract.

FIG. 31C illustrates a flowchart of an exemplary method 3140 for identifying and/or authenticating the identity of one or more witnesses to the identified verbal contract, consistent with embodiments of the present disclosure. The method 3140 may be carried out, for example, by a processing device integrated with and/or associated with wearable apparatus 110. In some other examples, the entire method 3140 or parts of method 3140 may be performed by a device external to wearable apparatus 110, such as a device paired with wearable apparatus 110 (such as a smartphone, a tablet, etc.), a server communicating with wearable apparatus 110 (such as server 250), and so forth. At block 3142, action execution module 2904 may receive image data captured by a wearable image sensor. Block 3142 may be facilitated by software instructions of data capture module 2901. For example, data capture module 2901 may be configured to execute instructions to receive image data from a wearable image sensor.

At block 3144, the received image data may be processed via software steps executed by person identification module 2902. For example, at block 3144, person identification module 2902 may identify one or more images including the at least one witness from a plurality of captured images. For example, the at least one witness may be person 3004, and the module 2902 may analyze the plurality of images to identify a subset of the captured images that include features sized, shaped, or otherwise resembling a person other than person 3002 and user 100. Further, at block 3146, the one or more identified images may be processed to identify the particular person(s) that are witnesses and depicted in the images flagged as including person(s).

The identification information about the at least one witness may be sourced from any desired location. For example, the information may be sourced from prior-sourced information stored in database(s) 2906 via database access module 2905. For further example, the information may be sourced from one or more social media accounts. In such embodiments, wearable device 110 may source the information publicly available via a web browser and/or through a private account of user 100. In other embodiments, the information may be sourced from records of email, text, voicemail, or telephone communications between user 100 and the at least one identified witness. Indeed, the information may be sourced from any suitable location, not limited to those described herein, depending on implementation-specific considerations. Once located, the at least part of the identification information may be registered at block 3148. For example, the identification of the witness may be registered with the registration of the verbal contract to indicate that the contract is verified.

Transmitting Information Based on a Physical Distance

In some embodiments, wearable apparatus 110 may collect information related to at least one person or object detected in an environment of the user of the wearable apparatus 110. The wearable apparatus 110 may then transmit information related to the at least one person or object based on an estimated physical distance from the user of the wearable apparatus to the at least one person or object. Some existing wearable device systems may encounter the technical problem of how to process the information collected by the wearable device and use that information to provide useful feedback to the user. For example, certain existing systems may capture images that include people or objects in the user's environment, but given the amount of collected data and the likelihood that the majority of the data is not of interest to the user, fail to provide information pertinent to the user (e.g., information that the user finds useful or of interest). Some of the presently disclosed embodiments, on the other hand, may address this problem by providing information to the user based on the user's estimated physical distance to a particular person or object. Such embodiments may make use of the estimated physical distance to determine whether a person or object is likely relevant and/or of interest to the user and then provide information to the user on that basis.

As discussed above, system 200 may comprise a wearable apparatus 110, worn by user 100, and an optional computing device 120 and/or a server 250 capable of communicating with wearable apparatus 110 via a network 240. Consistent with this disclosure, wearable apparatus 110 may analyze image data to detect and identify an object or a person, may determine a distance or estimated distance from the user to the identified object or person, and may transmit information to, for example, update a social media account, as described in greater detail below. Wearable apparatus 110 may also transmit information to computing device 120, which may be, for example, a smartphone or tablet having a dedicated application installed therein. A graphical user interface (GUI) including, for example, a plurality of user-adjustable feature social media settings may be included on display 260 of computing device 120 to visibly output information to an operating user.

Figure 32:
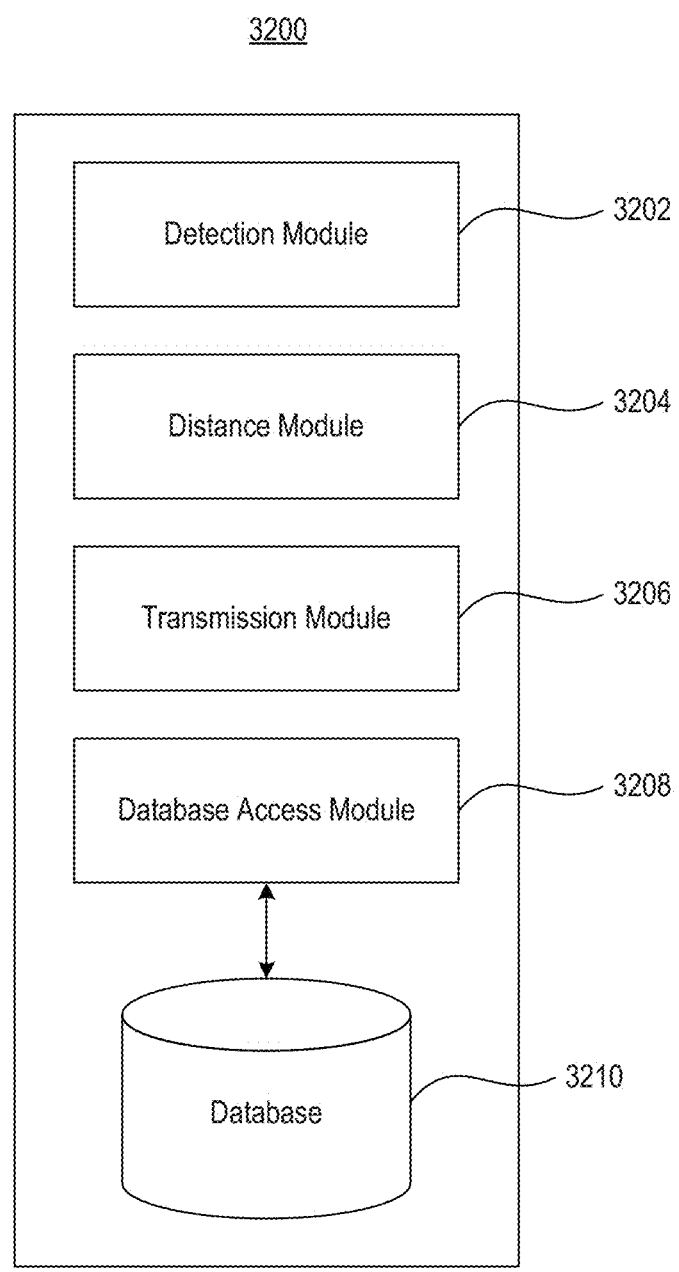
FIG. 32 illustrates an exemplary embodiment of a memory containing software modules consistent with the present disclosure.

FIG. 32 illustrates an exemplary embodiment of a memory containing software modules consistent with the present disclosure. In particular, as shown, memory 3200 may include a detection module 3202, a distance module 3204, a transmission module 3206, a database access module 3208, and a database 3210. Modules 3202, 3204, 3206, and 3208 may contain software instructions for execution by at least one processing device, e.g., processor 210, included with a wearable apparatus (e.g., wearable apparatus 110). Detection module 3202, distance module 3204, and transmission module 3206, database access module 3208, and database 3210 may cooperate to detect an object, determine a distance to the object, and transmit information related to the detected object. In some embodiments, memory 3200 may be included in, for example, memory 550, discussed above. Further, in other embodiments, the components of memory 3200 may be distributed over more than one location (e.g. stored in a server 250 in communication with, for example, network 240).

In some embodiments, detection module 3202 may detect a person or an object in the environment of the user of the wearable apparatus. Detection module 3202 may operate in a manner similar to data capture module 2601 and person identification module 2602, as illustrated in FIG. 26 and discussed above. For example, detection module 3202 may include software instructions for receiving data from wearable apparatus 110, such as a wearable camera system, and may include software instructions for analyzing data obtained by wearable apparatus 110 to identify a person or an object associated with at least one person. Data received from a wearable camera system may include audio and image data, captured, by, for example, an image sensor or a microphone associated with the wearable camera system and/or related to an audio topic. Audio data captured by the microphone may identify an audio topic associated with the person. Image data may include raw images and may include image data that has been processed. Raw images may be provided, for example, in the form of still images and video data, either with or without embedded metadata. In some embodiments, image data and audio data may be preprocessed prior to it being received by detection module 3202. Preprocessing may include, for example, noise reduction, artifact removal, compression, and other image pre-processing techniques.

In some embodiments, detection module 3202 may detect or identify a subset or portion of the captured data that includes at least one person or object. In some embodiments, detection module 3202 may be configured to receive a plurality of images that include at least one person or object. For example, detection module 3202 may receive a plurality of images of an environment surrounding a user wearing the wearable device 110 and may identify which of the plurality of images include at least one person or object.

In some embodiments, detection analysis may be performed by executing a facial recognition algorithm designed to detect facial features (e.g., mouth, eyes, etc.), facial contours, paralinguistic indicators such as facial gestures or expressions, body shape, or any other suitable identifying feature of a person. In other embodiments, the at least one person may be identified using a thermal signature algorithm design to detect the presence of at least one person based on the heat generated by the at least one person. In such embodiments, the wearable device 110 may capture thermal images, either alone or in combination with visual images, for processing by the thermal signature algorithm. Thermal recognition of the at least one person may be desirable in implementations in which wearable device 110 is operating in reduced lighting situations. In some embodiments, the at least one person may be identified through application of one or more classification techniques. For example, at least one image classification technique may be used to classify at least one feature of an image. In some embodiments, an image classification technique may include at least one or more of image enhancement, edge detection, image analysis, and data extraction. Specific examples of the methods for identifying at least one person or at least one object are exemplary only, and a person of ordinary skill in the art will recognize other methods for identifying the at least one person or object that remain consistent with present disclosure.

In some embodiments, the at least one person may be detected using a face detection algorithm, using a neural network trained to detect faces and/or persons in images, and so forth. In some examples, the at least one person may be identified using a face recognition algorithm, using a neural network trained to identify people in images, and so forth. In other examples, the at least one object may be detected using an object detection algorithm, using a neural network trained to detect objects and/or associated characteristics in images, and so forth. In some examples, the at least one object may be identified using an object recognition algorithm, using a neural network trained to identify objects in images, and so forth.

Detection module 3202 may be further configured to determine or obtain information associated with the at least one person or object identified in the image(s). Information associated with the at least one person may include a name, nickname, social security number, account number, or any other identifier of the at least one person. Information associated with the at least one object may include a length, width, depth, GPS position of an object, brand of an object, a value or cost of an object, an occupancy of an object, or any other identifier or characteristic indicator of the at least one object.

In some embodiments, distance module 3204 may determine a measurement of an estimated physical distance of a detected person or object from the user of wearable apparatus 110. In some examples, the distance to a detected person and/or object may be estimated using depth imaging, such as: stereo, active stereo, LIDAR, and so forth. Stereo imaging may include use of spatially separated multiple cameras to form images from different directions. Depth information may then be extracted from the differences in the images to determine a measurement of an estimated physical distance. In some embodiments, active stereo imaging may include a range of pulse techniques to measure a particular distance to a point of a person and/or object, and may include, for example, laser pulse or laser line scans, radar, and ultrasound.

In other embodiments, LIDAR techniques may be employed in accordance with software instructions from distance module 3204 to determine a measurement of an estimated physical distance to a person or an object. LIDAR relates generally to systems and processes for measuring distances to a target person or object by illuminating the target person or object with laser light and detecting the reflection of the light. For example, a pulsed laser light device, which may be included in wearable apparatus 110, may emit light incident upon a surface of a person or an object, and pulsed light reflected from the surface of the person or object may be detected at a receiver. A timer may measure an elapsed time from light being emitted from the laser light device to the reflection reaching the receiver. Based on a measurement of the elapsed time and the speed of light, processor 210 may be able to calculate the distance to the target person or object.

In some embodiments, a receiver in a LIDAR system of distance module 3204 of wearable apparatus 110 may be equipped with sensors such as avalanche photodiodes (APD) to detect reflected light pulses at particular wavelengths. LIDAR systems may also include a scanning mechanism so that the incident laser may scan over multiple points on the target person or object, and may generate 3-D point clouds that include object distance or depth information. Mechanical LIDAR systems are well known in the art and include mechanical scanning mechanisms to acquire distance information at multiple points of coverage, and may be incorporated as part of wearable apparatus 110.

In other embodiments, wearable apparatus 110 may include a mechanical rotatable LIDAR system that may include an upper scanning mechanism and a fixed lower part to determine a distance in accordance with software instructions from distance module 3204. The upper scanning mechanism may include a predetermined number of laser-detector pairs, and may rotate at a fixed frequency to determine an estimated distance to a person or object. Software instructions from distance module 3204 may change the operation of a number of laser-detector pairs and may change the frequency of rotation in order to capture additional data and provide additional distance measurements.

In other embodiments, the distance to a detected person and/or object may be estimated by distance module 3204 based on the size in pixels of the person and/or object in the captured images, the position in the captured images, and/or based on an estimation of the physical size of the person and/or object. For example, if the size in pixels of the person and/or object in the captured images is determined to be large or covering a large pixel area, a short distance to the person and/or object may be estimated. Conversely, if the size in pixels of the person and/or object in the captured images is determined to be small or covering a small pixel area, a far distance to the person and/or object may be estimated. Similarly, if a position of the person and/or object in the captured images is determined to be in the foreground, a short distance to the person and/or object may be estimated. Conversely, if a position of the person and/or object in the captured images is determined to be in the background, a far distance to the person and/or object may be estimated. Indeed, the distance measurement may be estimated in any suitable manner relating to a person and/or object, not limited to the examples herein, depending on implementation-specific considerations.

In some embodiments, transmission module 3206 may transmit, according to the determined distance measurement, information related to the detected person and/or object. For example, information may be communicated or transmitted from wearable apparatus 110 to a paired device, such as computing device 120, or an external server, such as server 250. In some embodiments, wearable apparatus 110 may include a communication device, such as one or more wireless transceivers, as discussed above in connection with FIGS. 5A-5C, which may transmit information across network 240 to, for example, computing device 120 and/or server 250

In some embodiments, transmission module 3206 may determine whether to transmit information based on at least the determined distance estimated by distance module 3204. For example, transmission module 3206 may determine whether to transmit information in accordance with a predetermined distance threshold. If, for example, it is determined that an estimated distance to a person or object exceeds a particular predetermined distance estimate (e.g., greater than 1 meter, greater than 5 meters, greater than 10 meters, etc.), information may not be transmitted to the user. Alternatively, if, for example, it is determined that an estimated distance to a person or object is within a particular predetermined distance estimate (e.g., less than 5 meters, less than 2 meters, less than 1 meter, etc.), information may be transmitted to the user.

The information transmitted by transmission module 3206 may include any meaningful data extracted from the image and may include, for example, a person's identifier, name, job title, gender, interests, hobbies, political affiliation (e.g., whether the user and the at least one person have worked together in the past), leisure related information (e.g., whether the user and the at least one person have played sports together in the past, whether the user and the at least one person are predicted to be a successful match, whether the at least one person is single, etc.), matchmaking information (e.g., whether the user and the at least one person have dated in the past), or any other information about the at least one person that is available to the wearable device 110. The information transmitted by transmission module 3206 may also include, for example, any meaningful data related to a detected object such as a description of the object, value of the object, brand name of the object, and any other information about the at least one object that is available to the wearable device 110. In some examples, the information transmitted by transmission module 3206 may include images depicting the at least one person and/or the object. For example, the portions of the image data identified by detection module 3202 as depicting the at least one person and/or the object may be transmitted by transmission module 3206. In some examples, the information transmitted by transmission module 3206 may include properties related to the at least one person and/or object identified by analyzing the images.

In some embodiments, detection module 3202 may detect multiple persons and/or objects, distance module 3204 may determine measurements of estimated physical distances of the detected persons and/or objects from the user of wearable apparatus 110, and transmission module 3206 may determine whether to transmit information based on at least the distances estimated by distance module 3204. For example, transmission module 3206 may determine a threshold based on the person and/or object with the smallest estimated physical distance (for example, twice the estimated physical distance, three times the estimated physical distance, etc.), transmit information related to persons and/or objects corresponding to estimated physical distances smaller than the determined threshold, and withhold transmission of information related to persons and/or objects corresponding to estimated physical distances greater than the determined threshold. In another example, transmission module 3206 may cluster the distances estimated by distance module 3204, for example using a clustering algorithm, and perform different actions with information related to persons and/or objects corresponding to different clusters, for example the actions may include transmitting information related to persons and/or objects corresponding to one cluster, providing audible output to a wearer of wearable apparatus 110 about persons and/or objects corresponding to a second cluster, storing information related to persons and/or objects corresponding to a third cluster, ignoring information related to persons and/or objects corresponding to a fourth cluster, and so forth.

In some embodiments, database access module 3208 may cooperate with database 3210 to retrieve a plurality of captured images or any type of information. Database 3210 may be configured to store any type of information of use to modules 3202-3208, depending on implementation-specific considerations. For example, in embodiments in which action execution database access module 3208 is configured to provide the information about the identified at least one person or object to the user of the wearable apparatus 110, database 3210 may store prior-collected information about the user's social, familial, or other contacts. Further, database 3210 may store the metadata associated with the captured images. In some embodiments, database 3210 may store the one or more images of the plurality of captured images that include the at least one person or object. In some embodiments, database 3210 may store images of known persons, places, or objects, which may be compared with one or more images captured by wearable apparatus 110. Indeed, database 3210 may be configured to store any information associated with the functions of modules 3202-3208.

Modules 3202-3208 may be implemented in software, hardware, firmware, a mix of any of those, or the like. For example, if the modules are implemented in software, they may be stored in memory 550, as shown in FIG. 32. However, in some embodiments, any one or more of modules 3202-3208 and data associated with database 3210, may, for example, be stored in processor 540 and/or located on server 250, which may include one or more processing devices. Processing devices of server 250 may be configured to execute the instructions of modules 3202-3208. In some embodiments, aspects of modules 3202-3208 may include software, hardware, or firmware instructions (or a combination thereof) executable by one or more processors, alone or in various combinations with each other. For example, modules 3202-3208 may be configured to interact with each other and/or other modules of server 250 and/or a wearable camera system to perform functions consistent with disclosed embodiments. In some embodiments, any of the disclosed modules may each include dedicated sensors (e.g., IR, image sensors, etc.) and/or dedicated application processing devices to perform the functionality associated with each module.

FIG. 33A is a schematic illustration 3300 of an example of a user wearing a wearable apparatus and capturing an image of a person 3222 according to a disclosed embodiment. User 100 may wear a wearable apparatus 110 consistent with an embodiment of the present disclosure (as shown in FIG. 9). Capturing unit 710 may be located on an exterior surface of the clothing 750 of user 100. Capturing unit 710 may also be connected to power unit 720 (not seen in this illustration) via connector 730, which wraps around an edge of clothing 750. Wearable apparatus 110 may be differently positioned in any suitable location to enable capture of images of the user's environment, such as the locations explained in detail above. User 100 may be in any location and engaging in any interaction encountered during user's daily activities. For example, user 100 may be at a convenience store, grocery store, sports event, social event, work-related event, movie theater, concert, etc. Wearable apparatus 110 may capture a plurality of images depicting the environment to which the user is exposed while user 100 is engaging in his/her chosen activity. For example, in the illustrated embodiment, wearable apparatus 110 may capture images that include person 3222.

A captured image may be analyzed to estimate at least one of: an age of person 3222, a height of person 3222, a weight of person 3222, a gender of person 3222, and so forth. For example, the analysis may determine the gender of person 3222 is male. In other embodiments, an image may be analyzed to identify at least one of: an action associated with the person, a product associated with the person, a facial expression of the person, an emotional state of the person, and/or other paralinguistic indicators. For example, as shown in FIG. 33A, the analysis may determine person 3222 is smiling and in a happy emotional state. A captured image may be analyzed according to any digital processing techniques, as discussed above with regard to detection module 3202, to identify person 3222 and to measure an estimated physical distance, using any mechanisms as discussed above with regard to distance module 3204, from the user to person 3222.

In some embodiments, capturing unit 710 may capture an image of person 3222 and may estimate a distance D to person 3222. Distance D to detected person 3222 may be estimated in accordance with instructions from distance module 3204 to implement at least one of depth imaging, such as: stereo, active stereo, LIDAR, and so forth. For example, in one embodiment, wearable apparatus 110 may include at least one LIDAR sensor. As discussed above, wearable apparatus 110 may be equipped with LIDAR sensors such as avalanche photodiodes (APD) to detect reflected light pulses at particular wavelengths. LIDAR systems may also include a scanning mechanism so that an incident laser may scan over multiple points on the target person, and may generate 3-D point clouds that include object distance or depth information to provide an estimate of distance D to person 3222.

In some examples, distance D to detected person 3222 may be estimated based on the size in pixels of person 3222 in the captured images, the position of person 3222 in the captured images, and possibly on an estimation of the physical size (height and weight) of person 3222. For example, if the size in pixels of the person in the captured images is determined to be large or covering a large pixel area, a short distance to the person may be estimated. Conversely, if the size in pixels of the person in the captured images is determined to be small or covering a small pixel area, a far distance to the person may be estimated.

In some embodiments, an affinity measurement to the person may be determined based, at least in part, on estimated distance D. For example, the degree to which user 100 likes or dislikes person 3222 may be estimated based on distance D. When user 100 likes person 3222, distance D may be small, whereas when user 100 dislikes person 3222, distance D may be large. A social graph (not shown) may also be updated based on the affinity measurement. Additional details regarding affinity measurements are provided above in connection with FIGS. 26-28B.

FIG. 33B is a schematic illustration of an example of an update of a social network profile according to a disclosed embodiment. Social network profile 3310 may be displayed as part of a personalized social media page and linked to a user's social media account. In some cases, social network profile 3310 may include the name 3320 of user 100, and may further include a captured image of person 3222 during an update as part of the social network profile 3110. As shown case in FIG. 33B, user 3320 "Mike Smith" is linked to his social network profile 3310, and social network profile 3310 may include features such as a "News Feed," "Message," "Business," "Shortcuts," "Events," "Groups," "Saved," and "Pages" functions to customize and control social network profile 3310. User 3320 may post textual, photo, and video content, as well as share any emoticons or other paralinguistic indicators expressing a current emotional state of user 3320.

In some embodiments, social network profile 3310 may include a notification or alert to other users that user 3320 is in the company of the person 3222. For example, as shown in FIG. 33B, the notification may include a textual posting 3380 that "Mike Smith is with Joe Johnson" and may include a pictorial posting of person 3222 or an image of "Joe Johnson." This update may be triggered when it is determined that user 100 is within a predetermined threshold distance D to person 3222. The updated posting may remain until it is determined that user 100 is no longer within a predetermined threshold distance D to person 3222. This determination may be made based on image analysis of a plurality of images of person 3222 over a selected period of time. The update may include only one or both of textual and pictorial changes to the social network profile 3310. In addition, the size of person 3222 as displayed within social network profile 3310 may increase or decrease based on a decrease or increase of distance D from user 100 to person 3222. For example, the size of person 3222 as displayed may be proportional to the distance D, to log(D), to exp((D−A)/B) for some constants A and B, to $f$(D) for some monotonically increasing function $f$, and so forth. The update may further include additional alerts or notifications sent out directly to friends included the social network of user 100, and the alerts or notifications may also be distributed as part of a shareable feed that friends in the social network of user 100 may be able to subscribe to and/or follow. Mutual friends, and friends not directly part of the social network of user 100 may also be able to receive alerts or notifications based on adjustable social media settings set by user 100.

FIG. 33C is a schematic illustration 3330 of an example of a user wearing a wearable apparatus and capturing an image of an object in the environment of the user according to a disclosed embodiment. In some embodiments, a plurality of images captured from an environment of a user of a wearable apparatus may be obtained. The plurality of images may be analyzed to detect an object. Tent 3332 may be included in a plurality of captured images.

Capturing unit 710 may capture an image of an object or tent 3332 and may estimate a distance D to tent 3332. Distance D to detected tent 3332 may be estimated using depth imaging, such as: stereo, active stereo, LIDAR, and so forth. For example, in one embodiment, wearable apparatus 110 may include at least one LIDAR sensor. As discussed above, wearable apparatus 110 may be equipped with LIDAR sensors such as avalanche photodiodes (APD) to detect reflected light pulses at particular wavelengths. LIDAR systems may also include a scanning mechanism so that an incident laser may scan over multiple points on the target object, and may generate 3-D point clouds that include object distance or depth information to provide an estimate of distance D to object 3332. In some examples, distance D to detected tent 3332 may be estimated based on the size in pixels of tent 3332 in the captured images, the position of tent 3332 in the captured images, and possibly on an estimation of the physical size (length, width, and depth) of tent 3332. A proximity measure to tent 3332 may be based, at least in part, on estimated distance D. For example, the degree to which user 100 is near or far from tent 3332 may be determined based on distance D. In addition, information associated with distance D measurement may be stored in memory and/or transmitted to an external device.

In some embodiments, captured audio data may be captured by a microphone and analyzed to identify audio topics associated with tent 3332. For example, captured audio data may include sounds from nature such as rushing river rapids or other sounds determined near to tent 3332, and may indicate the location of tent 3332 and/or associated camping grounds. Consistent with this disclosure, captured lighting data such as intensity or brightness may also be analyzed to determine a time of date, sunrise, sunset, and so forth.

FIG. 33D is a schematic illustration of an example of an update of a social network profile according to a disclosed embodiment. Social network profile 3340 may be displayed as part of a personalized social media page and linked to a user's social media account. In some cases, social network profile 3340 may include the name 3344 of user 100, and may further include an image of tent 3332 during an update as part of social network profile 3340. As shown in FIG. 33D, user 3344 "Mike Smith" is linked to his social network profile 3340, and social network profile 3340 may include features such as a "News Feed," "Message," "Business," "Shortcuts," "Events," "Groups," "Saved," and "Pages" functions to customize and control social network profile 3340. User 3344 may post textual, photo, and video content, as well as share any emoticons or other paralinguistic indicators expressing a current emotional state of user 3344 in association with the detection of object or tent 3332.

In some embodiments, a social network profile 3340 update may include a notification or alert to other users that user 3344 is positioned in the location of tent 3332. For example, as shown in FIG. 33D, the notification may include a textual posting 3390 that "Mike Smith is at Local Campgrounds," and may include a pictorial posting of tent 3332. This update may be triggered when it is determined that user 3344 is within a predetermined threshold distance D to tent 3332. The updated posting may remain until it is determined that user 3344 is no longer within a predetermined threshold distance D to tent 3332. This determination may be made based on image analysis of a plurality of images of tent 3332 over a period of time. The update may include only one or both of textual and pictorial changes to the social network profile 3340. In addition, the size of tent 3332 as displayed within social network profile 3340 may increase or decrease based on a decrease or increase of distance D from user 100 to tent 3332. For example, the size of tent 3332 as displayed may be proportional to the distance D, to log(D), to exp((D−A)/B) for some constants A and B, to $f(D)$ for some monotonically increasing function $f$, and so forth. In other embodiments, images may be analyzed to estimate at least one of: a location of an object, such as tent 3332, a GPS position of an object, a brand of an object, a value or cost of an object, an occupancy status of an object, or other characteristic indicators.

Figure 34:
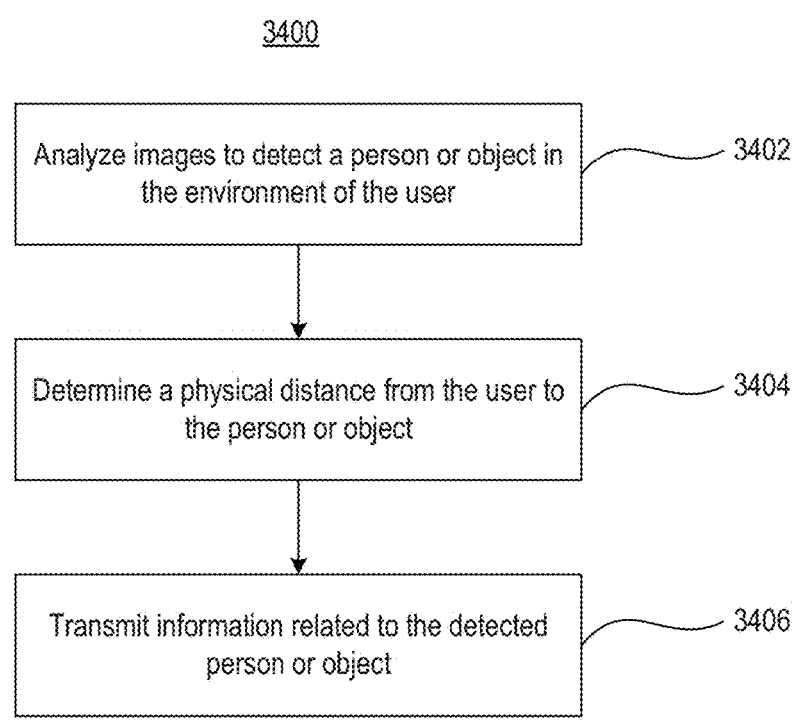
FIG. 34 is a flowchart of an example of a method for providing information to a user of a wearable apparatus.

FIG. 34 is a flowchart of an example of a method 3400 for providing information to a user of a wearable apparatus. Steps of method 3400 may be performed by one or more processors of server 250 and/or memory 550 and memory modules 3200.

At step 3402, detection module 3202 may detect a person or an object in the environment of the user of the wearable apparatus. Detection module 3202 may operate in a manner similar to data capture module 2601 and person identification module 2602, as illustrated in FIG. 26. Detection module 3202 may include software instructions for receiving data from wearable apparatus 110, such as a wearable camera system, and may include software instructions for analyzing data obtained by wearable apparatus 110 to identify a person or an object associated with at least one person. An object may include, for example, person 3222 or tent 3332. In some embodiments, detection module 3202 may detect or identify a subset or portion of the captured data that includes person 3222 or object 3332. In some embodiments, detection module 3202 may be configured to receive a plurality of images that include person 3222 or object 3332. For example, detection module 3202 may receive a plurality of images of an environment surrounding a user wearing the wearable device 110 and may identify which of the plurality of images include person 3222 or object 3332.

In some embodiments, detection analysis may be performed by executing a facial recognition algorithm designed to detect facial features (e.g. mouth, eyes, etc.), facial contours, paralinguistic indicators such as facial gestures or expressions, body shape, or any other suitable identifying feature of person 3222. The plurality of images may be analyzed to estimate an age of person 3222, a height of person 3222, a weight of person 3222, a gender of person 3222, an action associated with person 3222, a product associated with person 3222, and an action associated with tent 3332 and person 3222 associated with tent 3332. The analysis may include extraction of meaningful data and may employ digital processing techniques to identify a person or an object captured in a digital image.

At step 3404, distance module 3204 may determine a measurement of an estimated physical distance from the user to the detected person and/or object. For example, wearable apparatus 110 may include at least one LIDAR sensor. As discussed above, wearable apparatus 110 may be equipped with LIDAR sensors such as avalanche photodiodes (APD) to detect reflected light pulses at particular wavelengths. LIDAR systems may also include a scanning mechanism so that an incident laser may scan over multiple points on the target person, and may generate 3-D point clouds that include object distance or depth information to provide an estimate of distance D to person 3222 or tent 3332. In other examples, the distance to detected person and/or object may be estimated based on the size in pixels of person 3222 or tent 3332 in the captured images, the position in the captured images, and possibly on an estimation of the physical size of person 3222 or tent 3332. In some embodiments, the plurality of images may depict a second object in the environment of the user of the wearable apparatus, and may determine a second distance measurement for basing a transmission. The second measurement may include an estimated physical distance from the user to the second object.

At step 3406, transmission module 3206 may transmit, based on the determined physical distance measurement, information related to the detected person and/or object. As discussed, in some embodiments, transmission module 3206 may determine whether to transmit information in accordance with a predetermined distance threshold (e.g., when the determined distance measurement is within the predetermined distance threshold). Information may be communicated or transmitted from wearable apparatus 110 via a communication device (e.g., wireless transceiver 530) to a paired device, such as computing device 120, or an external server, such as server 250. In some embodiments, transmission module 3206 may provide information to the user of the wearable apparatus 110 based on information associated with the at least one person or object identified in the captured images.

In some embodiments, information related to the detected object may be transmitted to update at least one of a social graph and a social network profile. This update may be triggered when it is determined that user 100 is within a predetermined threshold distance to to a person or object. The update may remain in place until it is determined that user 100 is no longer within a predetermined threshold distance to the person or object, for a selected time period, until another notification arrives, and so forth. The update may include a notification of a textual and/or pictorial posting, and may be based on information related to the detected person or object.

In some embodiments, step 3406 of method 3400 may be replaced by other steps performing other actions with information related to detected persons and/or objects based on the determined physical distance measurement. For example, method 3400 may provide audible information about detected persons and/or objects when the determined physical distance measurement corresponding to the detected person and/or object is smaller than a selected threshold. In another example, the level of details provided to a user (for example, as audible and/or visual output) may be determined on the determined physical distance measurement corresponding to the detected person and/or object, for example as described above in connection with FIGS. 26-28B.

Providing a Social Media Recommendation

In some embodiments, wearable apparatus 110 may analyze one or more images captured by a wearable image sensor included in the wearable apparatus, obtain information based on analysis of the one or more captured images, and generate one or more contact recommendations for at least one new social network contact based on the obtained information. In some embodiments, the one or more contact recommendations may include new social network contact recommendations, and the at least one new social network contact may be a member of one or more social networks.

Some existing wearable device systems may encounter the technical challenge of how to process the information collected by the wearable device and use that information to provide useful feedback to the user. Some of the presently disclosed embodiments may address this problem by providing social media recommendations to the user based on image data captured by a wearable device. As such, the recommendations may be targeted as they may be based on information related to persons and/or objects encountered by the user of the wearable device.

For example, in one embodiment, wearable apparatus (e.g. wearable apparatus 110) may analyze images for providing social media recommendations based on images captured in the environment of a user. The analysis may include extraction of meaningful data and may employ digital processing techniques to obtain information captured in a digital image that may be relevant to providing a social media recommendation. In some embodiments, the obtained information may include identity information of at least one person present in the environment of the user. At least one contact recommendation of the user may be made based on an interaction with identified people and a length of the interaction with identified people. The at least one contact recommendation of the user may also include a new contact in a social network. In other embodiments, the obtained information may include information related to an activity or object present in the environment of the user of the wearable apparatus. For example, the activity may include reading a book and an object may include a book written by an author. The obtained information may further include information related to the author of the book.

As discussed above, system 200 may comprise a wearable apparatus 110, worn by user 100, and an optional computing device 120 and/or a server 250 capable of communicating with wearable apparatus 110 via a network 240. Consistent with this disclosure, apparatus 110 may analyze image data to obtain information captured in a digital image and may provide a social media recommendation, as described in greater detail below. Apparatus 110 may also transmit information to computing device 120, which may be, for example, a smartphone or tablet having a dedicated application installed therein. A graphical user interface (GUI) including a plurality of user-adjustable feature social media settings may be included on display 260 of computing device 120 to visibly output social media recommendations to an operating user. Additionally or alternatively, server 250 may receive information based on image data captured by wearable apparatus 110, server 250 may analyze the received information to provide a social media recommendation, as described in greater detail below, and transmit information to computing device 120 associated with a user of wearable apparatus 110, which may be, for example, a smartphone or tablet having a dedicated application installed therein.

Figure 35:
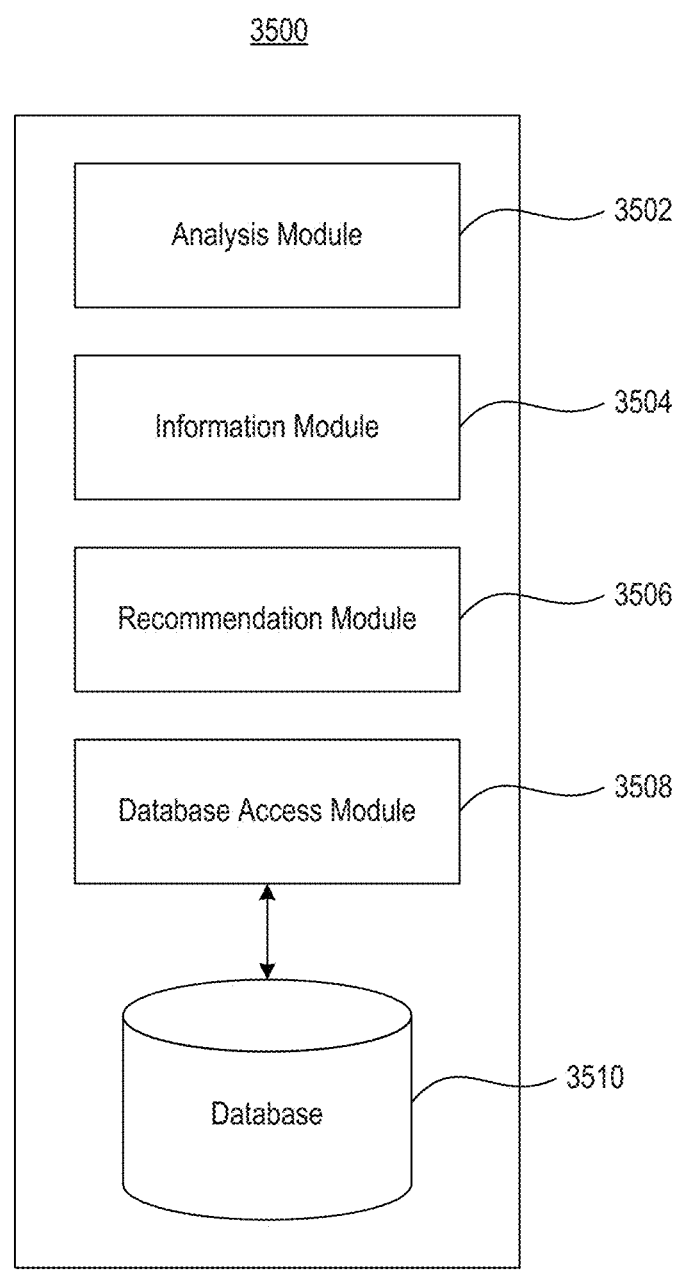
FIG. 35 illustrates an exemplary embodiment of a memory containing software modules consistent with the present disclosure.

FIG. 35 illustrates an exemplary embodiment of a memory containing software modules consistent with the present disclosure. In particular, as shown, memory 3500 may include an analysis module 3502, an information module 3504, a recommendation module 3506, a database access module 3508, and a database 3510. Modules 3502, 3504, 3506, and 3508 may contain software instructions for execution by at least one processing device, e.g., processor 210, included with a wearable apparatus (e.g., wearable apparatus 110). Analysis module 3502, information module 3504, recommendation module 3506, database access module 3508, and database 3510 may cooperate to analyze a captured image, obtain information based on the analysis, and generate and provide a contact recommendation. The contact recommendation may be generated for a user of a wearable apparatus. In some embodiments, the contact recommendation may be generated for the user of the wearable apparatus and an other person. Further, the contact recommendation may be for a new social network contact. In some embodiments, memory 3500 may be included in, for example, memory 550, discussed above. Further, in other embodiments, the components of memory 3500 may be distributed over more than one location (e.g. stored in a server 250 in communication with, for example, network 240).

In some embodiments, analysis module 3502 may analyze at least one image captured by a wearable image sensor included in the wearable apparatus from an environment of a user of the wearable apparatus. Analysis module 3502 may operate in a manner similar to detection module 3202, as illustrated in FIG. 32 and discussed above. Analysis module 3502 may include software instructions for receiving data from wearable apparatus 110, such as a wearable camera system, and may include software instructions for analyzing data obtained by wearable apparatus 110 to identify a person, activity, or an object associated with at least one person. Data received from a wearable camera system may include audio and image data, captured, by, for example, an image sensor or a microphone associated with the wearable camera system and/or related to an audio topic. Audio data captured by the microphone may identify an audio topic associated with the person. Image data may include raw images and may include image data that has been processed. Raw images may be provided, for example, in the form of still images and video data, either with or without embedded metadata. In some embodiments, image data and audio data may be preprocessed prior to capture by analysis module 3502. Preprocessing may include, for example, noise reduction, artifact removal, compression, and other image preprocessing techniques.

In some embodiments, analysis module 3502 may detect or identify a subset or portion of the captured data that includes at least one person, activity, or object. In some embodiments, analysis module 3502 may be configured to receive a plurality of images that include at least one person or object. For example, analysis module 3502 may receive a plurality of images of an environment surrounding a user wearing the wearable device 110 and may identify which of the plurality of images include at least one person or object.

In some embodiments, analysis may be performed by performing a facial recognition algorithm designed to detect facial features (e.g. mouth, eyes, etc.), facial contours, paralinguistic indicators such as facial gestures or expressions, body shape, or any other suitable identifying feature of a person. In other embodiments, at least one person may be identified using a thermal signature algorithm design to detect the presence of at least one person based on the heat generated by the at least one person. In such embodiments, the wearable device 110 may capture thermal images, either alone or in combination with visual images, for processing by the thermal signature algorithm. Thermal recognition of the at least one person may be desirable in implementations in which wearable device 110 is operating in reduced lighting situations. In some embodiments, at least one person may be identified through application of one or more classification techniques. For example, at least one image classification technique may be used to classify at least one feature of an image, such as a particular activity of the user, such as reading a book. In some embodiments, an image classification technique may include at least one or more of image enhancement, edge detection, image analysis, and data extraction.

In some examples, the at least one person may be detected using a face detection algorithm, using a neural network trained to detect faces and/or persons in images, and so forth. In some examples, the at least one person may be identified using a face recognition algorithm, using a neural network trained to identify people in images, and so forth. In other examples, the at least one object may be detected using an object detection algorithm, using a neural network trained to detect objects and/or associated characteristics in images, and so forth. In some examples, the at least one object may be identified using an object recognition algorithm, using a neural network trained to identify objects in images, and so forth. Specific examples of the methods for identifying at least one person or at least one object, such as a book, are exemplary only, and a person of ordinary skill in the art will recognize other methods for identifying the at least one person or object that remain consistent with present disclosure.

Information module 3504 may then obtain information based on a result of the analysis of the at least one captured image. For example, information module 3504 may be further configured to determine or obtain information associated with the at least one person or object identified in the image(s). Information module 3504 may, for example, access a local database (e.g., database 3510) and/or one or more remote databases (e.g., available via server 250) to search for information based on the analysis. Information that may be obtained for the at least one person may include a name, nickname, social security number, account number, or any other identifier of the at least one person. Information obtained for the at least one object may include a length, width, depth, GPS position of an object, brand of an object, a value or cost of an object, an occupancy of an object, or any other identifier or characteristic indicator of the at least one object. In some embodiments, information module 3504 may obtain or determine at least one activity of the person in relation to the object, such as a person reading a book, and search a local or remote database based on the activity or information related to the activity (e.g., an author of the book being read).

Recommendation module 3506 may then generate at least one contact recommendation for the user based on the obtained information. In some embodiments, recommendation module 3506 may generate at least one contact recommendation for at least one new social network contact based on the obtained information. For example, the at least one contact recommendation may include a recommendation for a new social network contact for the user and/or for a person other than the user. In some embodiments, the new social network contact and the user and/or the person other than the user may be members of one or more common social networks.

Recommendation module 3506 may facilitate transmission of obtained information and a corresponding recommendation. For example, information may be communicated or transmitted from wearable apparatus 110 to a paired device, such as computing device 120, to a device associated with the user of wearable apparatus 110 and/or a person other than the user, to an external server (such as server 250), and so forth.

In some embodiments, recommendation module 3506 may provide a social media recommendation to the user of the wearable apparatus 110 based on information associated with the at least one person or object identified in the captured images. The at least one other person may also receive a social media recommendation.

The at least one contact recommendation may include, for example, any one or more of a person's name, job title, gender, interests, hobbies, political affiliation (e.g., whether the user and the at least one person have worked together in the past), leisure related information (e.g., whether the user and the at least one person have played sports together in the past, whether the user and the at least one person are predicted to be a successful match, whether the at least one person is single, etc.), matchmaking information (e.g., whether the user and the at least one person have dated in the past), etc. The at least one contact recommendation may also include, for example, any meaningful data related to a detected object or activity such as one or more of a description of the object, value of the object, brand name of the object, etc.

In some embodiments, recommendation module 3506 may generate at least one contact recommendation for the user based also on an affinity between the user and the at least one person in a social network, for example as calculated by step 2810 described above.

In some embodiments, database access module 3508 may cooperate with database 3510 to retrieve a plurality of captured images or any type of information. Database 3510 may be configured to store any type of information of use to modules 3502-3508, depending on implementation-specific considerations. For example, in embodiments in which database access module 3508 is configured to provide the information about a detected person, database 3510 may store prior-collected information about the detected person's social, familial, or other contacts. Further, database 3510 may store the metadata associated with the captured images. In some embodiments, database 3510 may store the one or more images of the plurality of captured images that include the at least one person or object. In some embodiments, database 3510 may store a social graph, such as a social graph of a social network. Indeed, database 3510 may be configured to store any information associated with the functions of modules 3502-3510.

Modules 3502-3508 may be implemented in software, hardware, firmware, a mix of any of those, or the like. For example, if the modules are implemented in software, they may be stored in memory 550, as shown in FIG. 35. However, in some embodiments, any one or more of modules 3502-3508 and data associated with database 3510, may, for example, be stored in processor 540 and/or located on server 250, which may include one or more processing devices. Processing devices of server 250 may be configured to execute the instructions of modules 3502-3508. In some embodiments, aspects of modules 3502-3508 may include software, hardware, or firmware instructions (or a combination thereof) executable by one or more processors, alone or in various combinations with each other. For example, modules 3502-3508 may be configured to interact with each other and/or other modules of server 250 and/or a wearable camera system to perform functions consistent with disclosed embodiments. In some embodiments, any of the disclosed modules may each include dedicated sensors (e.g., IR, image sensors, etc.) and/or dedicated application processing devices to perform the functionality associated with each module.

Figure 36B:
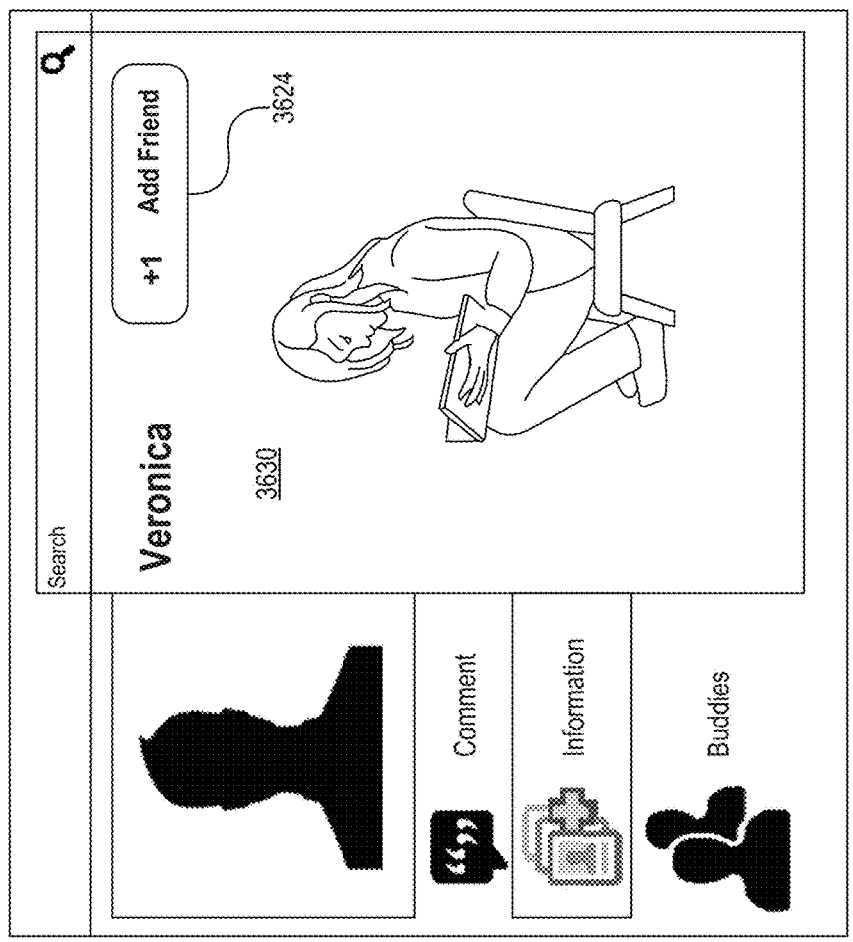
FIG. 36B is a schematic illustration of an example of a contact recommendation according to a disclosed embodiment.
Figure 36A:
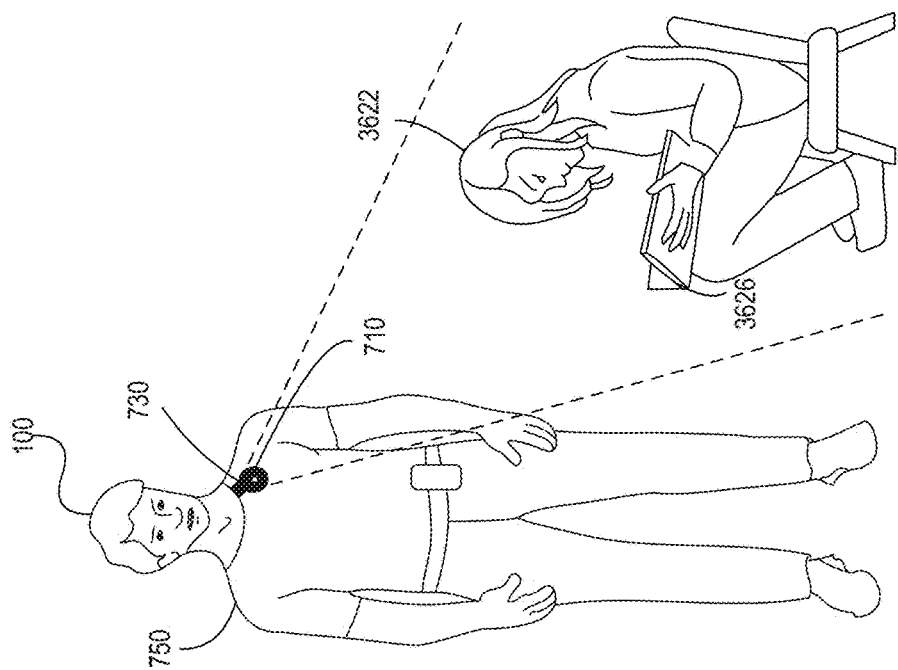
FIG. 36A is a schematic illustration of an example of a user wearing a wearable apparatus capturing an image of a person according to a disclosed embodiment.

FIG. 36A is a schematic illustration of an example 3600 of a user wearing a wearable apparatus and capturing an image of a person according to a disclosed embodiment. User 100 may wear a wearable apparatus 110 consistent with an embodiment of the present disclosure (as shown in FIG. 9). Capturing unit 710 may be located on an exterior surface of the clothing 750 of user 100. Capturing unit 710 may also be connected to power unit 720 (not seen in this illustration) via connector 730, which wraps around an edge of clothing 750.

As shown, capturing unit 710 may capture an image including person 3622 and a processor may determine an identity of a person 3622 for providing a social media recommendation. Further, capturing unit 710 may also capture book 3626 and a processor may determine an author of book 3626.

Wearable apparatus 110 may be differently positioned in any suitable location to enable capture of images of the user's environment, such as the locations explained in detail above. User 100 may be in any location and engaging in any interaction encountered during user's daily activities. For example, user 100 may be at a convenience store, grocery store, sports event, social event, work-related event, movie theater, concert, etc. Wearable apparatus 110 may capture a plurality of images depicting the environment to which the user is exposed while user 100 is engaging in his/her chosen activity. For example, in the illustrated embodiment, wearable apparatus 110 may capture images that include person 3622.

A captured image may be analyzed to obtain information in accordance with software instructions from information module 3504. For example, an image 3630 may be analyzed to obtain information including an age of person 3622, a height of person 3622, a weight of person 3622, a gender of person 3622, facial features of person 3622 suitable for facial recognition analysis, and so forth. For example, the analysis may determine the gender of person 3622, named "Veronica" is female. In other embodiments, an image may be analyzed to identify at least one of: an action or activity associated with the person, a product associated with the person, a facial expression of the person, an emotional state of the person, and/or other paralinguistic indicators. For example, the analysis may determine "Veronica" is reading a book. Information module 3504 may obtain information from image 3630 that may include information related to an activity present in the environment of the user of the wearable apparatus, information related to an object present in the environment of the of the wearable apparatus, and identity information of person 3622 present in the environment of the user of the wearable apparatus. For example, information module 3504 may obtain information including information related to the author of the book "Veronica" is reading.

FIG. 36B is a schematic illustration of an example of generating a contact recommendation 3610 according to a disclosed embodiment. For example, in some embodiments, recommendations for new contacts for a user of a wearable apparatus may be based on obtained information from image data captured using the wearable apparatus. For example, people and objects appearing in captured image data may be identified, and social media recommendations may be made based on their identity. In some embodiments, wearable apparatus 110 may transmit information including social media recommendations across network 240 to computing device 120 and/or server 250, and recommendation module 3506 may provide a social media recommendation to the user of the wearable apparatus 110 based on information associated with the at least one person, activity, or object identified in the captured images.

As shown in FIG. 36B, a GUI displaying a contact recommendation of a profile image 3630 of person 3622 identified in the captured image as "Veronica" may be provided to the user of the wearable image device 110. Contact recommendation 3610 may be made based on obtained information. For example, the obtained information may indicate that the book "Veronica" is reading is by an author that the user has read. The contact recommendation may source user author information from database 3510 in accordance with the obtained information prior to providing recommendation 3610. As shown in FIG. 36B, the user may select button 3624 to add "Veronica" as a friend to his social network. The user may also select "Comments," "Information," and "Buddies" as displayed in the GUI to see comments relating to "Veronica," obtained information leading to contact recommendation 3610, and buddies or other contacts that "Veronica" has in her network before deciding to add "Veronica" to his social network. In some examples, the system may access a list of favorite authors of the user in database 3510, may determine if the author of the book "Veronica" is reading is in the list, and may decide whether to provide contact recommendation 3610 based on said determination, for example providing contact recommendation 3610 if the author is in the list, and not to provide contact recommendation 3610 or to turn to other decision rules if the author is not in the list. In some examples, the system may measure a distance to "Veronica", for example using distance module 3204 described above, and may decide whether to provide contact recommendation 3610 based on the measured distance, for example withholding contact recommendation 3610 when the measured distance is larger than a selected distance. In some examples, the system may determine whether the person is physically present, for example using physical presence identification module 2002 and/or step 2210 described above, and may decide whether to provide contact recommendation 3610 based on whether the person is present. In some examples, the system may determine whether the person is visible on a display, for example using physical presence identification module 2002 and/or step 2240 described above, and may decide whether to provide contact recommendation 3610 based on whether the person is visible on a display. In some examples, the system may determine whether the person is visible in a photo, for example using physical presence identification module 2002 described above, and may decide whether to provide contact recommendation 3610 based on whether the person is visible in a photo.

Figure 36D:
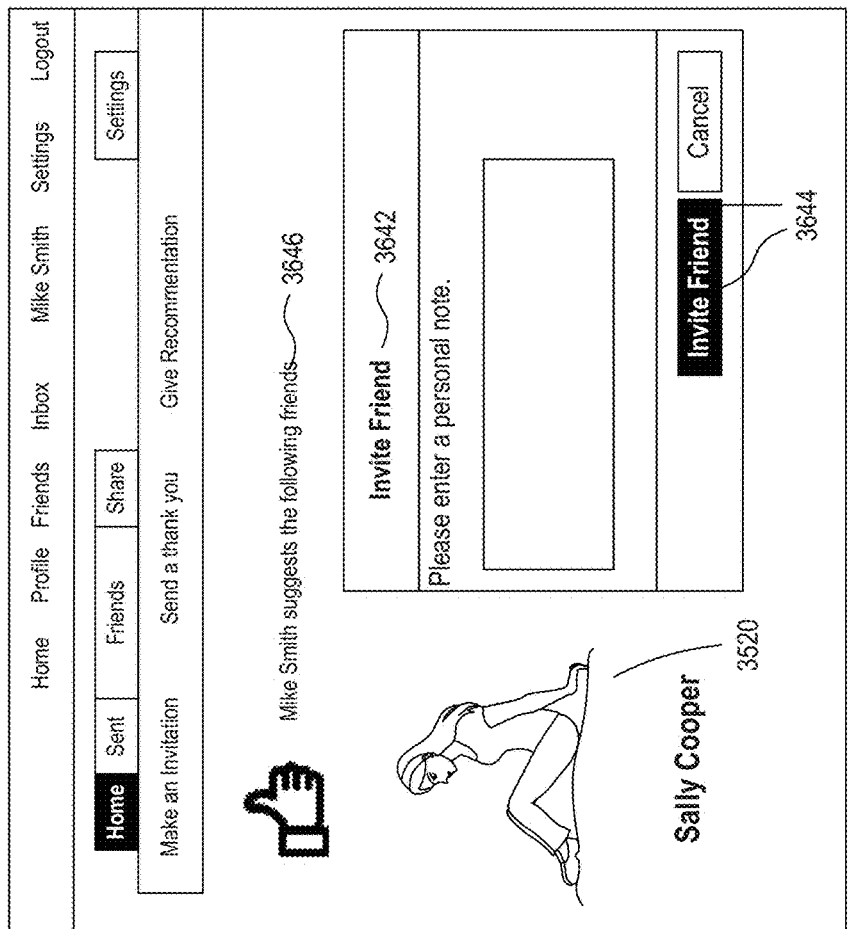
FIG. 36D is a schematic illustration of an example of a contact recommendation according to a disclosed embodiment.
Figure 36C:
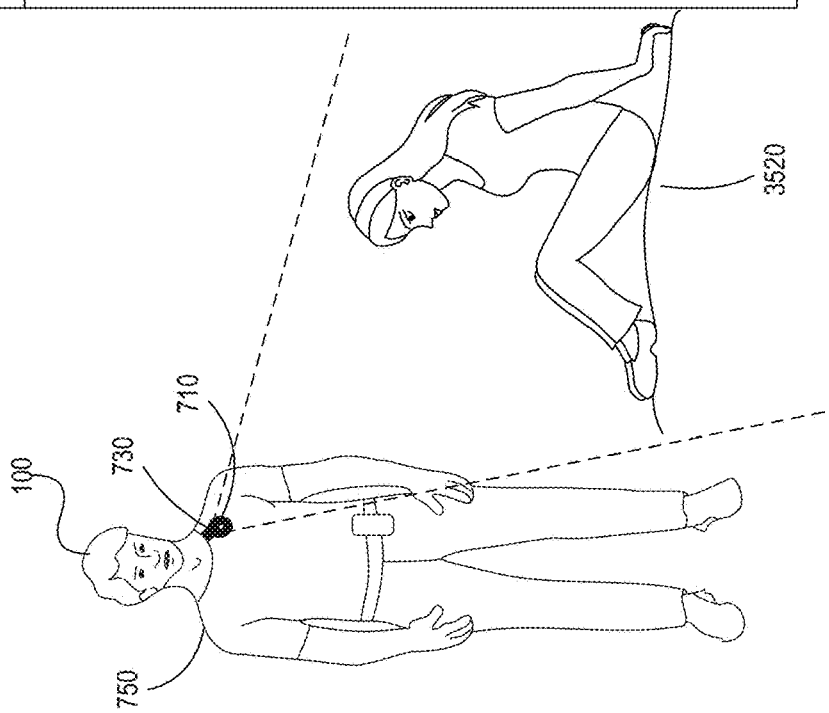
FIG. 36C is a schematic illustration of an example of a user wearing a wearable apparatus capturing an image of a person according to a disclosed embodiment.

FIG. 36C is a schematic illustration of an example 3634 of a user wearing a wearable apparatus 110 and capturing an image of person 3520 in the environment of the user according to a disclosed embodiment. User 100 may wear a wearable apparatus 110 consistent with an embodiment of the present disclosure (as shown in FIG. 9) and discussed above in connection with FIG. 36A.

A show in FIG. 36C, capturing unit 710 may capture an image including person 3520 and a processor may determine an identity of a person 3520 for providing a social media recommendation. As shown in FIG. 36C, an image of "Sally Cooper" 3520 is captured and information from her image may be gathered in the form of a social media recommendation discussed in FIG. 36D.

FIG. 36D is a schematic illustration of an example of generating a contact recommendation 3640 according to a disclosed embodiment. In some embodiments, a contact recommendation may be made based on a level or length of interaction with at least one other person. For example, social media recommendations may be made and further based on the type of interaction with identified people, on the length of the interaction, and so forth. As shown in FIG. 36D, the user's interaction with person 3520 may yield a social media recommendations. As shown in FIG. 36D, a recommendation to add a new contact "Sally Cooper" may be provided.

As shown, an invite friend window 3642 with an invite friend button 3644 based on a suggestion text 3646, e.g. "Mike Smith suggests the following friends" may be displayed in a GUI. This recommendation may be made to a person other than the user or the person in the captured image. For example, rather than providing a social media recommendation directly to person 3520, a social media suggestion to add "Sally Cooper" is provided to another person (e.g., a contact of the user of the wearable apparatus, e.g., Mike Smith).

In some embodiments, second information based on a second plurality of images captured by one or more wearable apparatuses may be obtained. For example, second information may include information relating to the stretching, exercising, or Yoga posture associated with person 3520. Generating the at least one recommendation may also be based on the second information. For example, since person 3520 likes to exercise, a social recommendation may be made to friends of the user of the wearable apparatus who also like to exercise according to information stored in database 3510. In some examples, a plurality of wearable apparatuses may be associated with a plurality of users to generate a plurality of social media content recommendations. In other embodiments, generating the at least one recommendation may also be based on identity of people appearing in the plurality of images. In some examples, a plurality of wearable apparatuses may be associated with a plurality of users, information based on image data captured by two or more wearable apparatuses may be analyzed (for example by analyzing profile 2400 described above), and generating the at least one recommendation may also be based on the analysis results.

Figure 37:
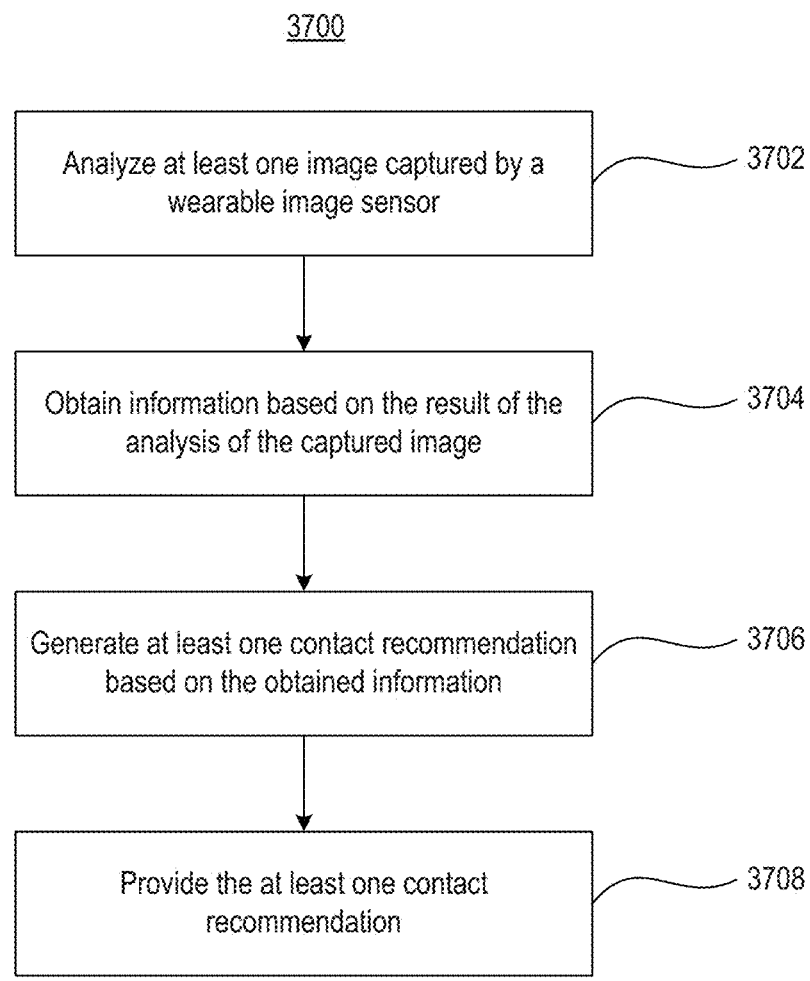
FIG. 37 is a flowchart of an example of a method for providing contact recommendations based on captured images to a user of a wearable apparatus.

FIG. 37 is a flowchart of an example of a method 3700 for providing recommendations based on captured images, consistent with disclosed embodiments. Steps of method 3700 may be performed by one or more processors of server 250 and/or memory 550 or memory modules 3500.

At step 3702, analysis module 3702 may analyze at least one image captured by a wearable image sensor. For example, as discussed earlier, analysis module 3702 may analyze the at least one image to detect a person, an object, and/or an activity. Analysis of a person included in the at least one image may be performed by performing a facial recognition algorithm designed to detect facial features (e.g. mouth, eyes, etc.), facial contours, paralinguistic indicators such as facial gestures or expressions, body shape, or any other suitable identifying feature of a person.

At step 3704, information module 3504 may obtain information based on the result of the analysis of the captured image. For example, obtained information in accordance with software instructions from information module 3504 may include an age, a height, a weight, a gender, etc., of a person detected in the at least one image. In some embodiments, the obtained information may include information related to an activity or an object present in the environment of the user of the wearable apparatus. For example, the object may include a book written by an author and the obtained information may include information related to the author (e.g., stored in database 3510). In some examples, the obtained information may also include identity information of at least one other person present in the environment of the user of the wearable apparatus 110.

At step 3706, recommendation module 3706 may generate at least one contact recommendation of the user of the wearable apparatus 110 and/or a person other than the user. The other person may be a person who is known to or a new social network contact of the user. As discussed earlier, the at least one contact recommendation may include a recommendation for a new social network contact (e.g., a person who is a member of a social network of which the user and/or the at least one other person may also be members).

At step 3708, recommendation module may provide the contact recommendation to the user and/or the other person. For example, recommendation module 3506 may provide a social media recommendation to the user of the wearable apparatus 110 based on information associated with the at least one person or object identified in the captured images.

In some embodiments, the at least one contact recommendation of the user may be based on an interaction with identified people and a length of interaction. The contact recommendation may include a recommendation for the user in a user window to add a new friend as shown in FIG. 36B, and/or based on a detected identify of a user in a captured image. Alternatively, as shown in FIG. 36D, the contact recommendation may be based on the identity of the user in the captured image and provided to another person or user. This recommendation may include a mutual friend of the user and the identified person at a person deemed worthy of the friendship of the identified person. In some embodiments, the contact recommendation of the user may include a new contact in a social network. The contact recommendation of the user may also include an existing contact in a social network. The contact recommendation may be provided to one or both of the user and at least one other person.

Providing Visual Feedback of a Field of View

In some embodiments, a wearable apparatus (e.g., wearable apparatus 110) may include at least one image sensor and at least one projector configured to move together, and the projector may be configured to emit a light pattern that shows the borders of the field of view of the at least one image sensor.

In some examples, the at least one projector may be controlled by a processing unit, such as processing unit 210. The processing unit may activate and/or deactivate the at least one projector. In some examples, the at least one projector may be activated and/or deactivated based, at least in part, on a visual trigger appearing in images captured using the at least one image sensor. In some examples, the at least one projector may be activate and/or deactivated based, at least in part, on visual context associated with images captured using the at least one image sensor.

In some embodiments, a wearable apparatus (e.g., wearable apparatus 110) may obtain a plurality of images captured from an environment of a user of the wearable apparatus. The plurality of images may be analyzed to identify a visual trigger. At least one projector may be configured to project a light pattern, for example based on the identification of the visual trigger. In some examples, the light pattern may be indicative of a field of view of an image sensor. In some examples, the light pattern may comprise two parallel lines; for example, two parallel lines showing two borders of the field of view of the image sensor. In some examples, the light pattern may comprise two perpendicular lines; for example, two perpendicular lines showing two borders of the field of view of the image sensor. In some examples, the light pattern may comprise lines or dashes in a rectangular pattern; for example, a rectangular pattern showing the borders of the field of view of the image sensor.

As discussed earlier, the visual trigger that may activate and/or deactivate the at least one light projector may comprise a hand gesture. In some examples, the visual trigger may comprise a textual document appearing in the plurality of images. In some examples, a first visual trigger may appear in at least a first one of a plurality of images to activate at least one projector. The at least one projector may also be deactivated, for example, after being activated for a selected duration, after a second visual trigger is identified, and so forth. The second trigger may appear in at least a second of the plurality of images.

Figure 38A:
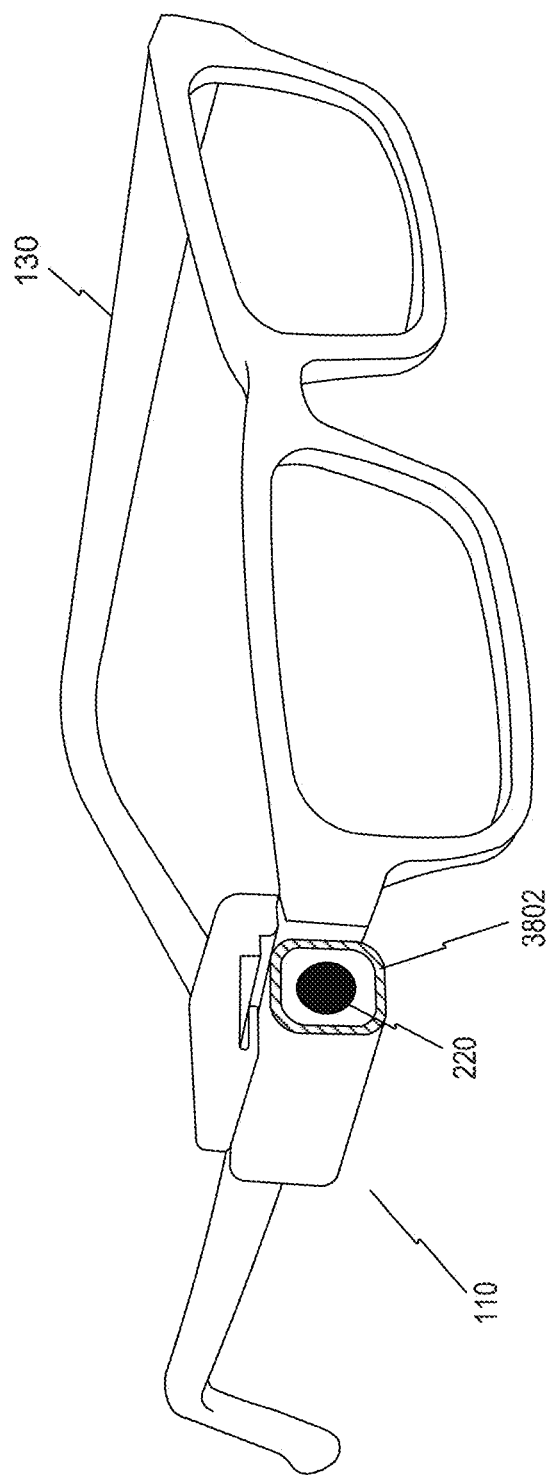
FIG. 38A is a diagrammatic view of an apparatus including a light projector.

FIG. 38A provides a diagrammatic view of wearable apparatus 110, including glasses 130 fitted with image sensor system 220, which may include a light projector 3802, such as the light projector described above. As discussed, light projector 3802 may provide feedback to the user of wearable apparatus 110 of a field of view associated with one or more image sensors provided on the wearable apparatus. In such a way, the user may be informed, through a visual guide, of where the image sensor or image sensors of the apparatus are aimed, what those sensors "see," and/or what area of text or object that the processing device may effectively analyze through processing of images captured by the image sensor(s).

For example, in some embodiments, a wearable apparatus (e.g., wearable apparatus 110) equipped with light projector 3802 may assist a visually impaired user of the wearable apparatus by providing the user with an indication of a field of view of one or more image sensors included in the wearable apparatus. Such information may help the user provide input to the wearable apparatus through the use of gestures, which may act as triggers for causing the wearable apparatus to undertake certain actions.

Although FIG. 38A depicts light projector 3802 as surrounding image sensor system 220, light projector 3802 may be arranged in an appropriate manner or location on wearable apparatus 110. For example, light projector 3802 may be located above, below, or beside image sensor system 220. In some embodiments, light projector 3802 may be attached to a side surface of wearable apparatus 110 (e.g., positioned on a surface other than the surface including image sensor system 220) or included in a component attached to wearable apparatus 110. Any appropriate location and positioning of light projector 3802 is contemplated.

In some embodiments, light projector 3802 and image sensor system 220 may be configured to move with the head of the user, for example by being connected and/or mounted to glasses 130 as depicted in FIG. 38A.

Figure 38B:
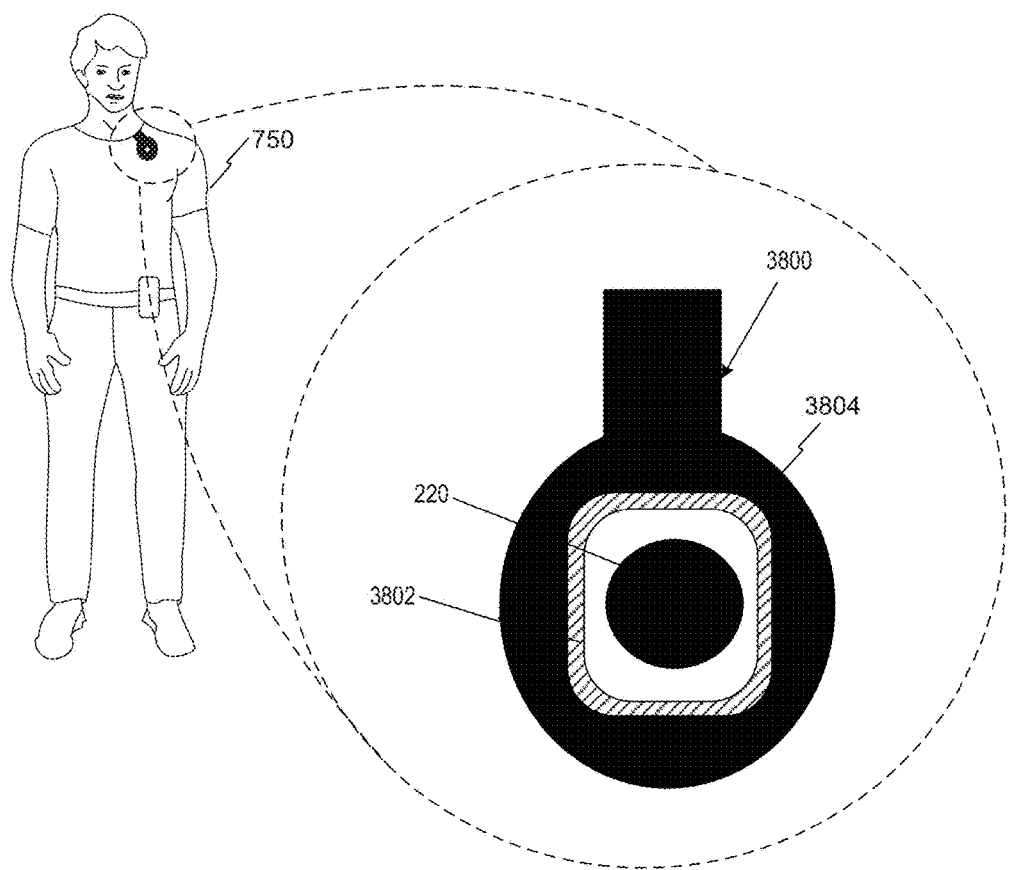
FIG. 38B is a diagrammatic view of a wearable apparatus securable to an article of clothing that includes a light projector consistent with the present disclosure.

Although the example shown on FIG. 38A shows apparatus 110, including glasses 130 fitted with image sensor system 220, in other embodiments, a light projector (such as light projector 3802) may be included in any of the variations of wearable apparatus 110 shown in FIGS. 1-16, and in the example shown in FIG. 38B.

FIG. 38B shows an example of a wearable apparatus that can be secured to an article of clothing, consistent with disclosed embodiments. In particular, FIG. 38B provides a diagrammatic view of a wearable apparatus 3800, including a capturing unit 3804 fitted with image sensor system 220. Capturing unit 3804 may be located on an exterior surface of the clothing 750 of user 100. Capturing unit 3804 may be connected to power unit 720 (not seen in this illustration) via a connector, which may wrap around an edge of clothing 750. Capturing unit 3804 may further include a light projector, such as light projector 3802 described above. Consistent with this disclosure, light projector 3802 may generate light and project light onto a surface, object, text, etc., in an environment of the user. Although FIG. 38B depicts light projector 3802 as surrounding image sensor system 220, light projector 3802 may be arranged in an appropriate manner or location on wearable apparatus 3800, as discussed above in connection with FIG. 38A.

Light projector 3802 may be configured to include any component or components capable of generating light and projecting light onto a surface, object, text, etc., in an environment of the user. In some embodiments, light projector 3802 may include a light emitting diode (LED). In some embodiments, light projector 3802 may include an array of LEDs. The array of LEDs may be positioned in any suitable arrangement, such as around an aperture of an image sensor associated with system 220, for example. In some cases, light projector 3802 may include one or more light path altering structures. For example, light projector 3802 may include one or more lenses to direct light from a light source onto a surface or object, etc., in an environment of the user along a desired light path. Light projector 3802 may also include one or more light hoods or shrouds to aid in selectively illuminating only a portion of a surface or object in an environment of the user (e.g., by blocking light or otherwise reducing or limiting a light field emitted from one or more light sources of light projector 3802).

In addition to LEDs, light projector 3802 may also include one or more solid state lasers. Such lasers (and/or LEDs) may be used to illuminate a fixed area relative to a surface or object in an environment of the user. In other embodiments, however, lasers and/or LEDs may be configured to scan at least a portion of a surface or object in an environment of the user. For example, such scanning light sources may be scanned over a particular pattern such that portions of the pattern are illuminated at different times. A scan may be associated with a lighting profile comparing light intensity over the scan pattern as a function of time. At relatively low scan rates (e.g., 30 Hz or below), the scanning of the pattern may be perceptible to a user. At higher scan rates (e.g., 30 Hz or above, 60 Hz or above, or even higher), scanning of the pattern may be more difficult to discern. For certain light sources and scan rates, the scanned light pattern may appear to a user as a continuously illuminated pattern.

Figure 39:
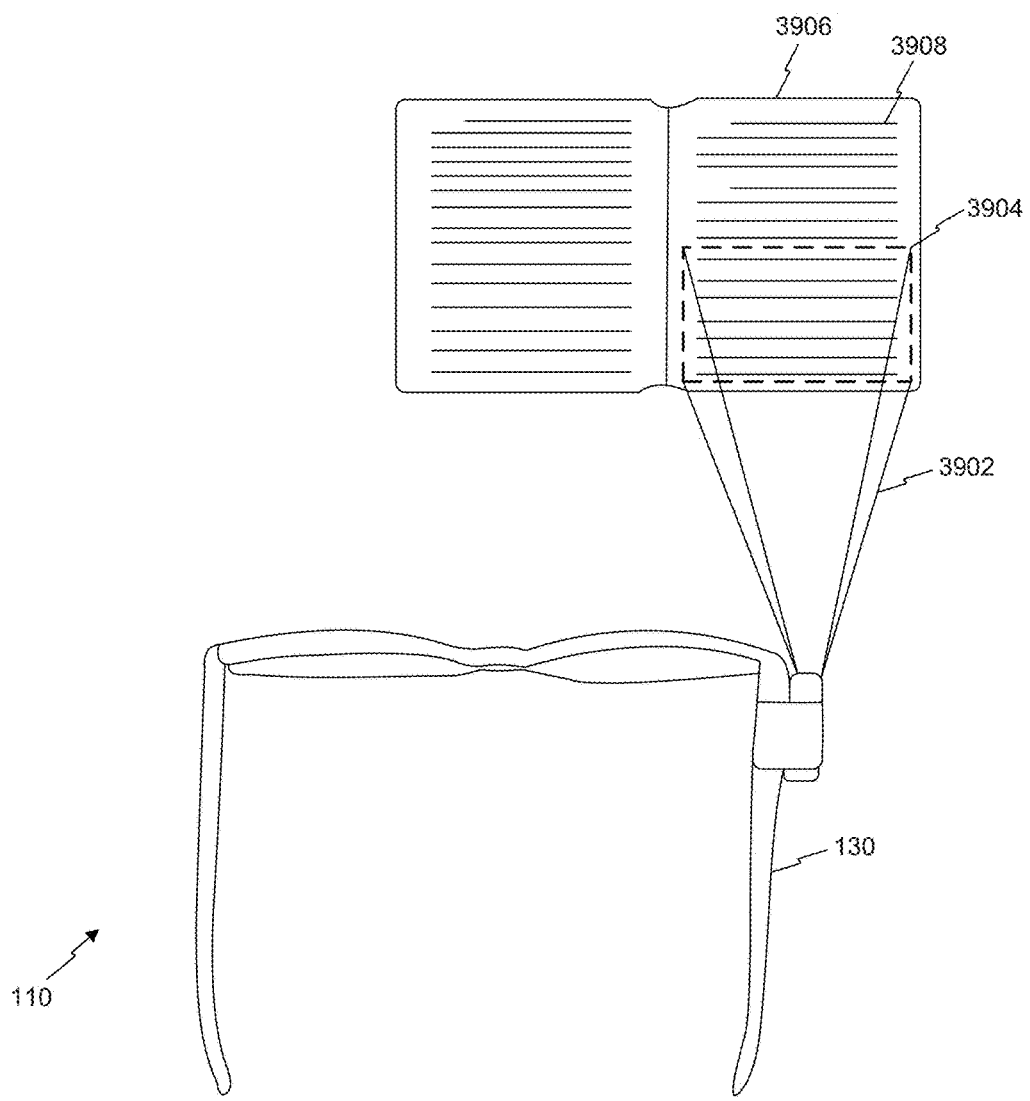
FIG. 39 is a diagrammatic illustration of one example of a type of visual feedback that the light projector shown in FIG. 38A may provide to a user.
Figure 40A:
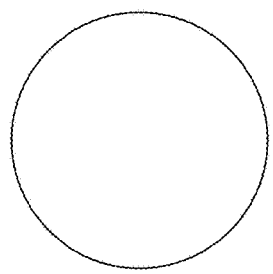
FIGS. 40A-40H are examples of various patterns that can be generated by the light projector of FIG. 38A and/or by the light projector of FIG. 38B.
Figure 40B:
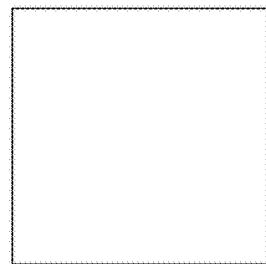
Figure 40C:
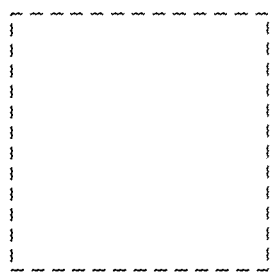
Figure 40D:
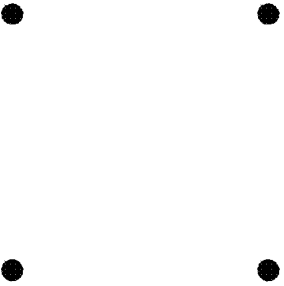
Figure 40E:
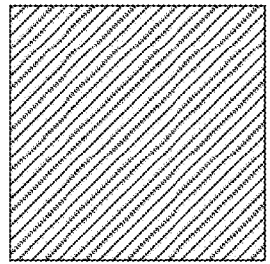
Figure 40F:
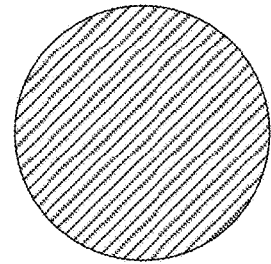
Figure 40G:
Figure 40H:
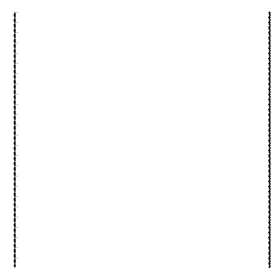

FIG. 39 provides a diagrammatic illustration of one example of a type of visual feedback that light projector 3802 in FIG. 38A may provide to a user of wearable apparatus 110. For example, light projector 3802 may generate a light projection pattern 3902 that illuminates one or more surfaces or objects in an environment of the user. As shown in FIG. 39, light projection pattern 3902 is illuminating a text book 3906 including multiple lines of text 3908 with a light incident pattern 3904. As shown, light incident pattern 3904 includes a series of dashed lines roughly arranged in a rectangular outline pattern. Light projector 3802 may provide visual feedback to the user to indicate that wearable apparatus 110, including one or more image sensors and/or one or more processing devices associated with wearable apparatus 110, is able to capture and/or process images from a field of view at least partially overlapping with an area bounded by light incident pattern 3904. In some cases, image capture area can be substantially the same as the area bounded by light incident pattern 3904. In this way, a user may better understand what the apparatus "sees" and, therefore, whether the apparatus will be able to provide information relative to an object, etc., within the environment of the user. If the light incident pattern 3904 does not align with an area of interest to the user, the user can reposition his or her head and facing direction until light incident pattern 3904 surrounds or covers an area of interest (e.g., text, bank note, object portion, person, etc.) in an environment of the user.

In some embodiments, as discussed above, wearable apparatus 110 may be securable to clothing, such as shown in FIG. 39B. In such embodiments, wearable apparatus 110 and light projector 3802 may operate in a substantially similar manner as shown in FIG. 39 to project a light projection patter that illuminates one or more surfaces or objects in an environment of a user.

Moreover, light incident pattern 3904 is not limited to the dashed outline pattern shown in FIG. 39. Rather, any suitable illumination pattern for providing visual feedback to the user may be employed. FIGS. 40A-40H provide several examples of various patterns that can be generated by light projector 3802. For example, light incident pattern 3904 can have a circular or elliptical outline pattern (FIG. 40A), a rectangular/square outline pattern (FIG. 40B), a dashed pattern (FIG. 40C), one or more illuminated dots (FIG. 40D), a rectangular/square solid illumination pattern (FIG. 40E), a circular or elliptical solid illumination pattern (FIG. 40F), two parallel horizontal lines (FIG. 40G), two parallel vertical lines (FIG. 40H), or any other suitable pattern.

Light incident pattern 3904 may also comprise one or more colors. In some embodiments, pattern 3904 may be created by white light, red light, green light, blue light, or any other color or combination of colors.

There may also be various ways to initiate illumination by light projector 3802. In some cases, light projector 3802 may be illuminated in response to a user input. For example, the user may manually activate a switch, button, etc. to change illumination states of the light projector 3802 (e.g., from OFF to ON or from ON to OFF). In some cases, the user may control operation of light projector 3802 through voice commands. In addition to changes in illumination state, other operational characteristics of the light projector may also be controlled by the user. For example, the user may control a brightness level associated with light generated by the light projector, may change colors of one or more portions of light incident pattern 3904, or may control any other operational characteristic of light projector 3802. As discussed above, operation of light projector 3802 may occur automatically. For example, light projector 3802 may be activated, deactivated, dimmed, etc. by at least one processing device in response to a detected trigger (e.g., a gesture by the user, including pointing, hand wave, or any other gesture), in response to a detected type of object (e.g., text, bank note, etc.), in response to an object detected in the user's hand, or any other type of trigger. In another example, light projector 3802 may be activated, deactivated, dimmed, etc. by at least one processing device in response to a determination that a text and/or an object of interest is partially captured by an image sensor, for example as determined by analyzing images captured using the image sensor. Light projector 3802 may also be controlled based on an amount of time that an object remains present in a field of view of the user. For example, if an object lingers in a field of view of the user for more than 1 second, 2 seconds (or any other suitable time threshold), then the at least one processing device may determine that the user would like information about the object and may take one or more actions relative to the object, including illuminating at least a portion of the object with an incident light pattern 3904. As discussed in FIG. 5A, apparatus 110 may also include microphone, which may initiate illumination by light projector 3802. For example, a processing device may change, based on a voice command captured at the microphone, an illumination state of light projector 3802, a color of the light pattern, or a shape of the light pattern.

Alignment of light incident pattern 3904 with an active field of view of one or more image sensors associated with wearable apparatus 110 may be accomplished with an adjustment component and/or in various ways. For example, in some embodiments, the user may be prompted (e.g., by audible signals or voice instructions) generated by at least one processor in response to the processor's analysis of one or more images captured by an image capture device (e.g., camera) associated with apparatus 110. Such an alignment procedure may occur through the processor causing light projector to turn ON and analyzing at least one image captured by a camera associated with apparatus 110 to detect the presence of light incident pattern 3904 on a surface or object represented by the captured image. If the light incident pattern is fully present in the captured image, then no alignment may be needed. However, if only a portion of the incident pattern present in the captured image, the processor may instruct the user (e.g., voice commands, audible signals, visible guides, etc.) to manipulate one or more alignment controls (set screws, knobs, etc.) until the incident pattern is sufficiently present in one or more subsequently captured images. Such an alignment process can also be fully automatic. That is, rather than instructing the user to manipulate one or more adjustments to align light incident pattern 3904 with an operational field of view of the image capture device(s), the processor may automatically control one or more adjusters to align light incident pattern 3904 with the field of view of the image capture device(s). Such adjusters may include, e.g., micromotors for adjusting set screws, splined or threaded rods (e.g., screw drive units), piezoelectric steppers, or any other type of electromechanical adjustment device.

Figure 41:
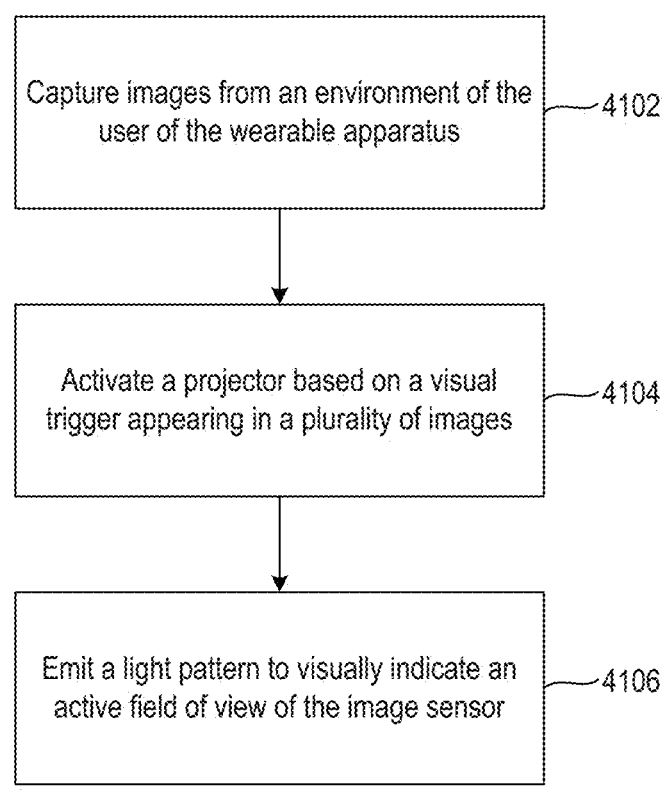
FIG. 41 is a flowchart of an example of a method for providing visual feedback to a user of a wearable apparatus.

FIG. 41 is a flowchart of an example of a method 4100 for providing visual feedback to a user of a wearable apparatus, such as wearable apparatus 110 or wearable apparatus 3800, consistent with disclosed embodiments. Some of the steps of method 4100 may be performed by at least one processor, which may execute software instructions stored in, for example, memory 550.

At step 4102, the wearable apparatus may capture, via image sensor system 220 included in the wearable apparatus, a plurality of images from an environment of the user of the wearable apparatus. For example, glasses 130 may be fitted with image sensor system 220, as shown in FIG. 38A. Alternatively, as shown in FIG. 38B, capturing unit 3804 may be fitted with image sensor system 220. Capturing unit 3804 may be located, for example, on an exterior surface of the clothing 750 of user 100 and as such may be positioned so that image sensor system 220 may capture images from the environment of user 100.

At step 4104, the at least one processor may activate a projector included in the wearable apparatus based on a visual trigger appearing in a plurality of images. In some embodiments, the activation may occur in response to a user input. The user input may include a voice command or an input associated with a depressible button or other input device of the wearable apparatus. In some embodiments, the activation may be based at least one a visual trigger appearing in at least one of the plurality of images or based on at least an amount of time that an object remains present in the active field of view of the at least one image sensor. In some embodiments, the activation may be based on a determination that images captured in step 3802 include only partial view of a text and/or an object of interest. For example, a determination that images captured in step 3802 include only partial view of a text may be made based on a detection of a partial view of letters at the edge of the images. In another example, a determination that images captured in step 3802 include only partial view of a text may be made based on a natural language processing of textual information obtained by analyzing the images using OCR algorithms. In a third example, a determination that images captured in step 3802 include only partial view of an object may be made by analyzing the images with a classifier and/or a neural network trained to identify and/or detect partial views of objects.

At step 4106, light projector 3802 may emit a light pattern to visually indicate to the user of the wearable apparatus an active field of view of the image sensor. For example, the light pattern may include a circular or elliptical outline pattern, a rectangular outline pattern, a square outline pattern, a dashed pattern, one or more illuminated dots, a rectangular solid illumination pattern, a square solid illumination pattern, a circular solid illumination pattern, an elliptical solid illumination pattern, two parallel horizontal lines, or two parallel vertical lines. In some embodiments, the light pattern may coincide with one or more borders of the active field of view of the at least one image sensor. In some embodiments, the light pattern may also be included with the active field of view of the at least one image sensor or the light pattern may substantially overlap with the active field of view of the at least one image sensor.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, Ultra HD Blu-ray, or other optical drive media.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A wearable apparatus, the wearable apparatus comprising:
    at least one image sensor configured to capture a plurality of images from an environment of a user of the wearable apparatus, the wearable apparatus configured to be secured to an object worn by the user;
    at least one projector configured to emit a light pattern configured to visually indicate to the user of the wearable apparatus an active field of view of the at least one image sensor; and
    at least one processing device programmed to activate or deactivate the at least one projector based at least on an amount of a time that an object remains present in the active field of view of the at least one image sensor.

2. The wearable apparatus of claim 1, wherein the light pattern coincides with one or more borders of the active field of view of the at least one image sensor.

3. The wearable apparatus of claim 1, wherein the light pattern is included within the active field of view of the at least one image sensor.

4. The wearable apparatus of claim 1, wherein the light pattern overlaps with the active field of view of the at least one image sensor.

5. The wearable apparatus of claim 1, wherein the at least one processing device is further programmed to activate or deactivate the at least one projector in response to a user input.

6. The wearable apparatus of claim 5, wherein the user input includes a voice command or an input associated with a depressible button of the wearable apparatus.

7. The wearable apparatus of claim 1, wherein the at least one processing device is further programmed to activate or deactivate the at least one projector based at least on a visual trigger appearing in at least one of the plurality of images.

8. The wearable apparatus of claim 7, wherein the visual trigger includes a hand gesture.

9. The wearable apparatus of claim 7, wherein the visual trigger includes an appearance of a document or a bank note.

10. The wearable apparatus of claim 7, wherein the visual trigger includes detecting an object in a hand of the user.

11. The wearable apparatus of claim 1, wherein the at least one processing device is further programmed to: activate the at least one projector based at least on a first visual trigger appearing in at least a first one the plurality of images; and deactivate the at least one projector based at least on a second visual trigger appearing in at least a second one of the plurality of images.

12. The wearable apparatus of claim 1, wherein the at least one processing device is further programmed to activate or deactivate the at least one projector based at least on a visual context associated with at least one of the plurality of images.

13. The wearable apparatus of claim 1, wherein the light pattern includes at least two parallel lines, each of the two parallel lines being associated with a border of the active field of view of the at least one image sensor.

14. The wearable apparatus of claim 1, wherein the light pattern includes at least two perpendicular lines, each of the two perpendicular lines being associated with a border of the active field of view of the at least one image sensor.

15. The wearable apparatus of claim 1, wherein the light pattern includes lines or dashes in a rectangular pattern, the rectangular pattern being associated with a border of the active field of view of the at least one image sensor.

16. The wearable apparatus of claim 1, wherein the projector includes one or more light path altering structures, one or more light hoods, or one or more shrouds.

17. The wearable apparatus of claim 1, wherein the projector includes one or more solid state lasers.

18. The wearable apparatus of claim 17, wherein the one or more solid state lasers are configured to scan at least a portion of a surface or object in the environment of the user.

19. The wearable apparatus of claim 1, wherein the light pattern includes a circular or elliptical outline pattern, a rectangular outline pattern, a square outline pattern, a dashed pattern, one or more illuminated dots, a rectangular solid illumination pattern, a square solid illumination pattern, a circular solid illumination pattern, an elliptical solid illumination pattern, two parallel horizontal lines, or two parallel vertical lines.

20. The wearable apparatus of claim 1, further comprising a switch or a button configured to change an illumination state of the projector.

21. The wearable apparatus of claim 1, further comprising a microphone, wherein the at least one processing device is further programmed to change, based on a voice command captured at the microphone, an illumination state of the projector, a color of the light pattern, or a shape of the light pattern.

22. The wearable apparatus of claim 1, further comprising an adjustment component configured to align the at least one projector with the active field of view of the at least one image sensor.

23. The wearable apparatus of claim 22, wherein the adjustment component includes one or more micromotors, one or more splined or threaded rods, or one or more piezoelectric steppers.

24. The wearable apparatus of claim 1, wherein the object worn by the user is glasses.

25. The wearable apparatus of claim 1, wherein the object worn by the user is an article of clothing.

26. A method for providing visual feedback to a user of a wearable apparatus, the method comprising:
    capturing, via at least one image sensor included in the wearable apparatus, a plurality of images from an environment of the user of the wearable apparatus, the wearable apparatus configured to be secured to an object worn by the user;
    activating at least one projector included in the wearable apparatus based at least on a visual trigger appearing in at least one of the plurality of images;
    emitting, via the at least one projector, a light pattern configured to visually indicate to the user of the wearable apparatus an active field of view of the at least one image sensor; and
    activating or deactivating the at least one projector based at least on an amount of a time that an object remains present in the active field of view of the at least one image sensor.

27. The method of claim 26, further comprising:
    activating or deactivating the at least one projector in response to a user input.

28. The method of claim 27, wherein the user input includes a voice command or an input associated with a depressible button of the wearable apparatus.

29. A non-transitory computer-readable medium that stores instructions that, when executed by at least one processing device, cause the at least one processing device to perform operations comprising:
    receiving, from at least one image sensor included in the wearable apparatus, a plurality of images from an environment of the user of the wearable apparatus, the wearable apparatus configured to be secured to an object worn by the user;
    activating at least one projector included in the wearable apparatus based at least on a visual trigger appearing in at least one of the plurality of images;
    causing the at least one projector to emit a light pattern configured to visually indicate to the user of the wearable apparatus an active field of view of the at least one image sensor; and
    activating or deactivating the at least one projector based at least on an amount of a time that an object remains present in the active field of view of the at least one image sensor.

* * * * *